United States Patent
Becker et al.

(10) Patent No.: US 10,598,479 B2
(45) Date of Patent: Mar. 24, 2020

(54) THREE-DIMENSIONAL MEASURING DEVICE REMOVABLY COUPLED TO ROBOTIC ARM ON MOTORIZED MOBILE PLATFORM

(71) Applicant: FARO Technologies, Inc., Lake Mary, FL (US)

(72) Inventors: Bernd-Dietmar Becker, Ludwigsburg (DE); Hamidreza Rajaie, Stuttgart (DE); Oliver Zweigle, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 312 days.

(21) Appl. No.: 15/609,519

(22) Filed: May 31, 2017

(65) Prior Publication Data

US 2017/0276472 A1    Sep. 28, 2017

Related U.S. Application Data

(63) Continuation of application No. 15/146,925, filed on May 5, 2016, now Pat. No. 9,964,398.

(60) Provisional application No. 62/157,673, filed on May 6, 2015, provisional application No. 62/157,679, filed on May 6, 2015, provisional application No. 62/157,689, filed on May 6, 2015, provisional application No. 62/157,698, filed on May 6, 2015, provisional application No. 62/157,708, filed on May 6, 2015, provisional application No. 62/157,717, filed on May 6, 2015, provisional application No. 62/157,722, filed on May 6, 2015, provisional application No. 62/157,730, filed on May 6, 2015, provisional application No. 62/315,861, filed on Mar. 31, 2016.

(51) Int. Cl.
*G01B 11/00* (2006.01)
*G01B 11/25* (2006.01)

(52) U.S. Cl.
CPC ............ *G01B 11/005* (2013.01); *G01B 11/25* (2013.01); *Y10S 901/01* (2013.01); *Y10S 901/47* (2013.01)

(58) Field of Classification Search
CPC .......... G01B 11/005; G06T 7/20; G06T 7/60; G05B 2219/39013; B25J 9/1692; Y10S 901/01; Y10S 901/15; Y10S 901/47
See application file for complete search history.

(56) References Cited

U.S. PATENT DOCUMENTS

| | | | |
|---|---|---|---|
| 5,499,306 A | 3/1996 | Sasaki et al. | |
| 7,443,124 B2 | 10/2008 | Bischoff et al. | |
| 8,220,335 B2 * | 7/2012 | Dubois | G01B 11/2518 345/419 |

(Continued)

FOREIGN PATENT DOCUMENTS

| CN | 101716568 B | 6/2010 |
|---|---|---|
| CN | 104493829 A | 4/2015 |

OTHER PUBLICATIONS

PCT International Search Report and Written Opinion for International Application No. PCT/US2016/031089 dated Jun. 30, 2016; dated Jul. 7, 2016; 11 pages.

*Primary Examiner* — Elias Desta
(74) *Attorney, Agent, or Firm* — Cantor Colburn LLP

(57) ABSTRACT

A motorized mobile platform includes a robotic articulated arm and a triangulation scanner for performing three-dimensional measurements, the robotic arm and the triangulation scanner removably coupled with connectors.

22 Claims, 69 Drawing Sheets

(56) References Cited

U.S. PATENT DOCUMENTS

| | | | |
|---|---|---|---|
| 8,412,484 B2 | 4/2013 | Gaspardo et al. | |
| 8,868,236 B2 | 10/2014 | Brogardh | |
| 9,187,188 B2 | 11/2015 | Richter et al. | |
| 9,664,508 B2 | 5/2017 | Mcafee et al. | |
| 9,964,398 B2 * | 5/2018 | Becker | G01B 11/005 |
| 2006/0142657 A1 | 6/2006 | Quaid et al. | |
| 2007/0239315 A1 | 10/2007 | Sato et al. | |
| 2007/0267570 A1 | 11/2007 | Park et al. | |
| 2015/0241203 A1 | 8/2015 | Jordil et al. | |
| 2016/0129594 A1 | 5/2016 | Telling | |
| 2016/0195390 A1 | 7/2016 | Nissen et al. | |
| 2016/0264262 A1 | 9/2016 | Colin et al. | |
| 2016/0313114 A1 | 10/2016 | Tohme et al. | |
| 2016/0327383 A1 | 11/2016 | Becker et al. | |
| 2016/0346936 A1 | 12/2016 | Hietmann | |
| 2017/0054965 A1 | 2/2017 | Raab et al. | |
| 2017/0075116 A1 | 3/2017 | Gardiner | |

* cited by examiner

RIGHT SIDE VIEW

FRONT VIEW

TOP VIEW

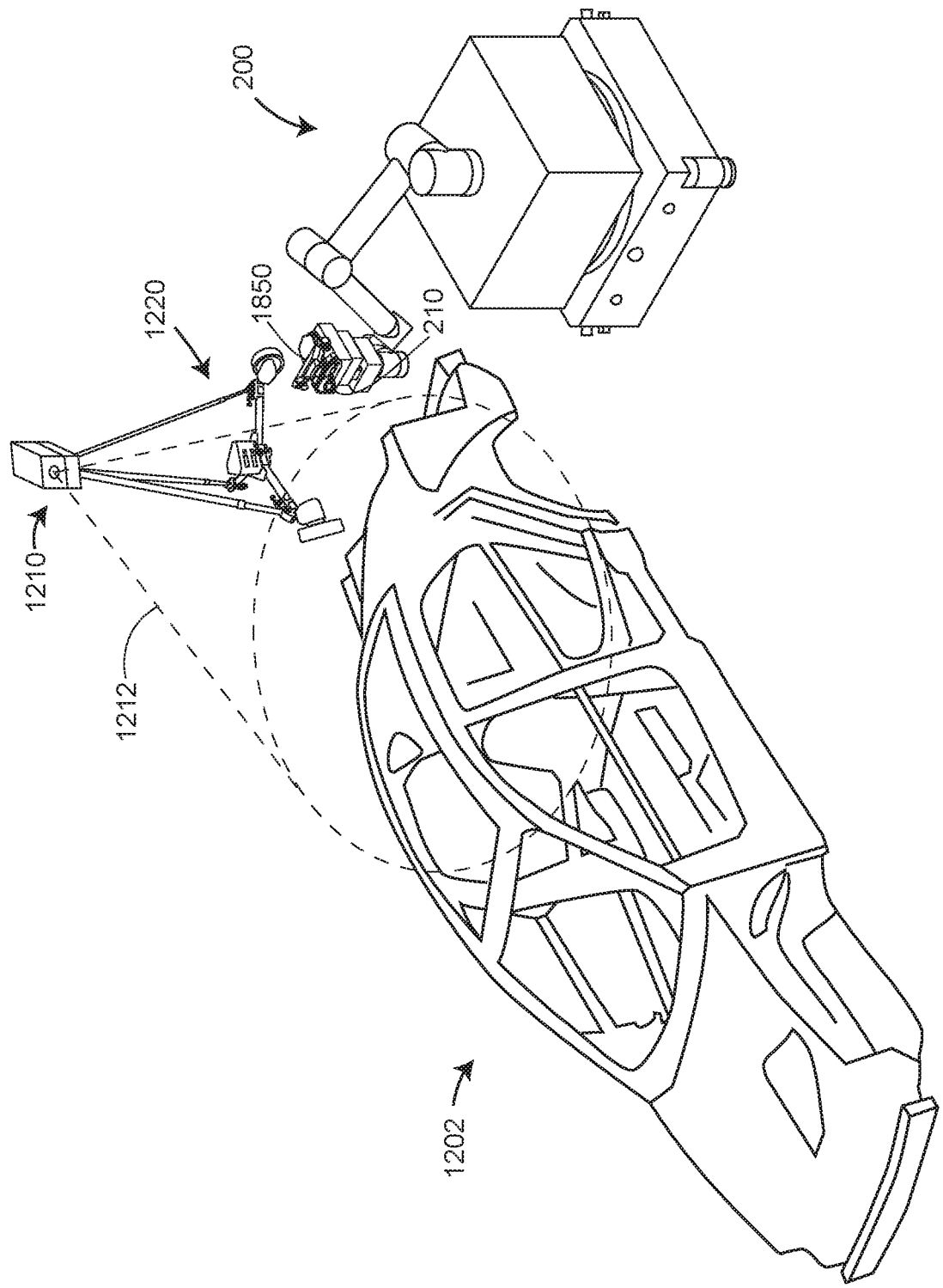

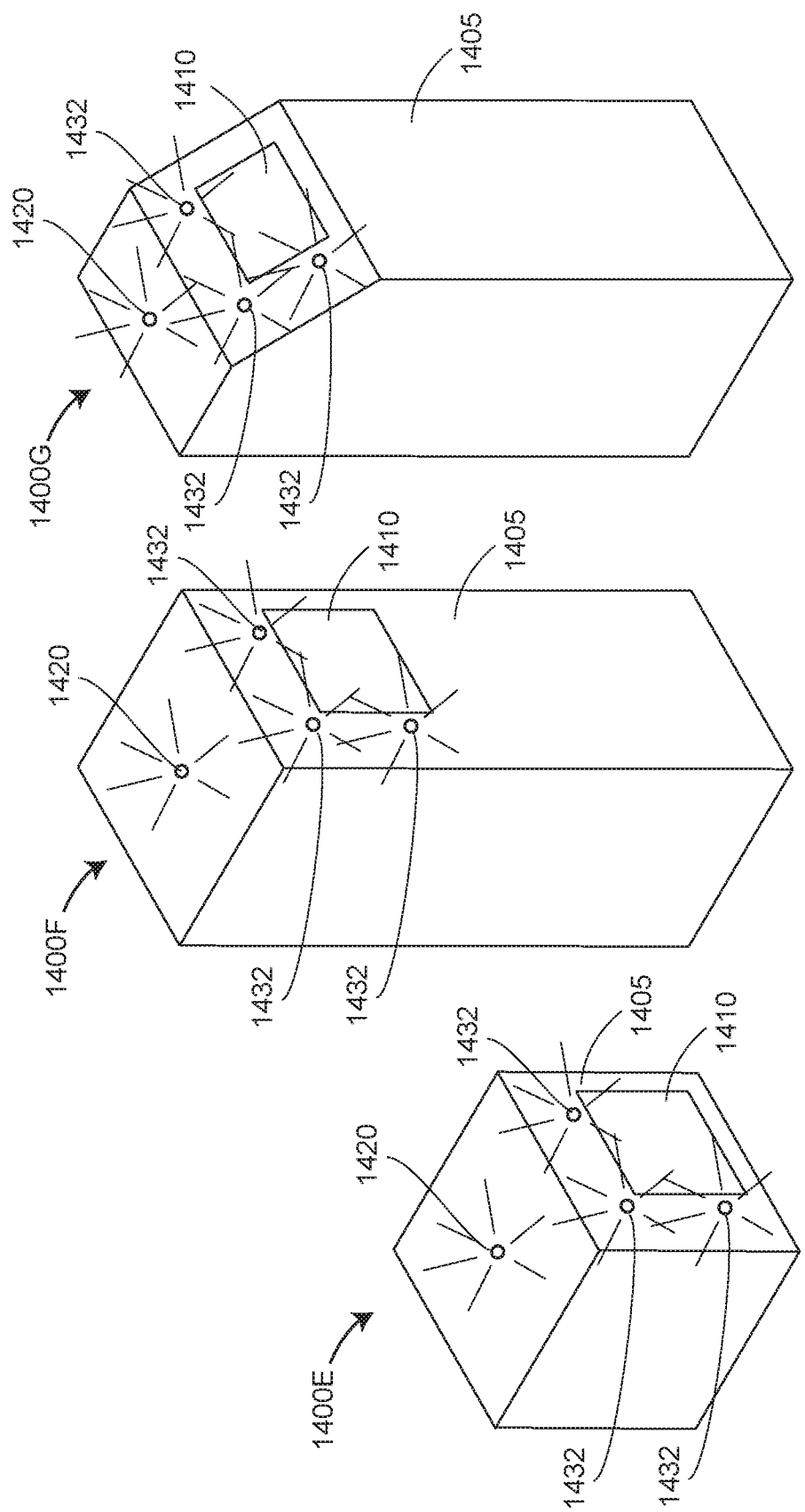

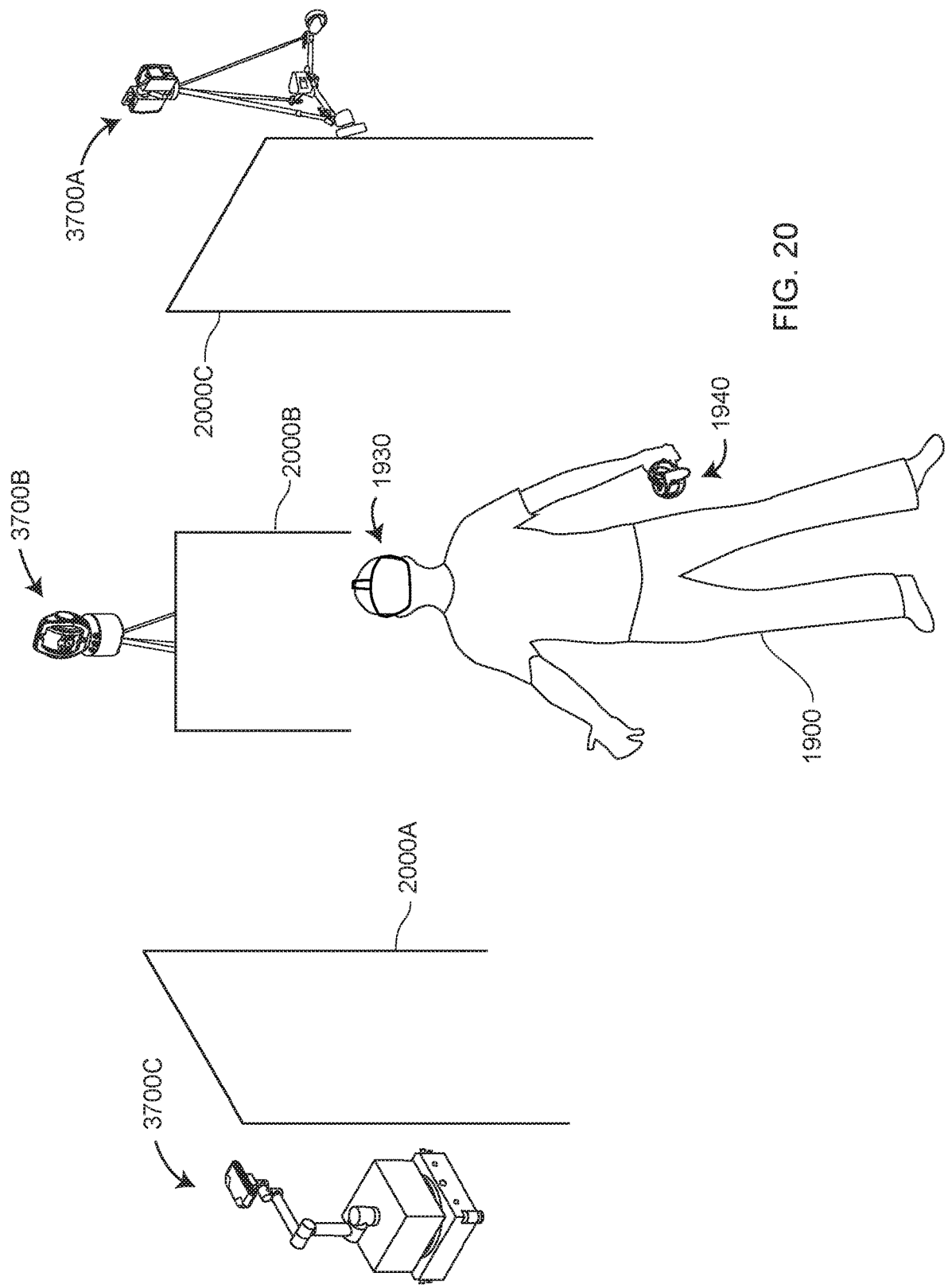

| | STRAIGHTNESS | |
| --- | --- | --- |
| — | FLATNESS | FORM |
| ▱ | CIRCULARITY | |
| ○ | CYLINDRICITY | |
| ⌭ | | |
| ⌒ | PROFILE OF A LINE | PROFILE |
| ⌓ | PROFILE OF A SURFACE | |
| ∠ | ANGULARITY | |
| ⊥ | PERPENDICULARITY | ORIENTATION |
| ∥ | PARALLELISM | |
| ⌖ | POSITION | |
| ◎ | CONCENTRICITY | LOCATION |
| ═ | SYMMETRY | |
| ↗ | CIRCULAR RUNOUT | RUNOUT |
| ↗↗ | TOTAL RUNOUT | |

GD&T SYMBOLS

FIG. 26

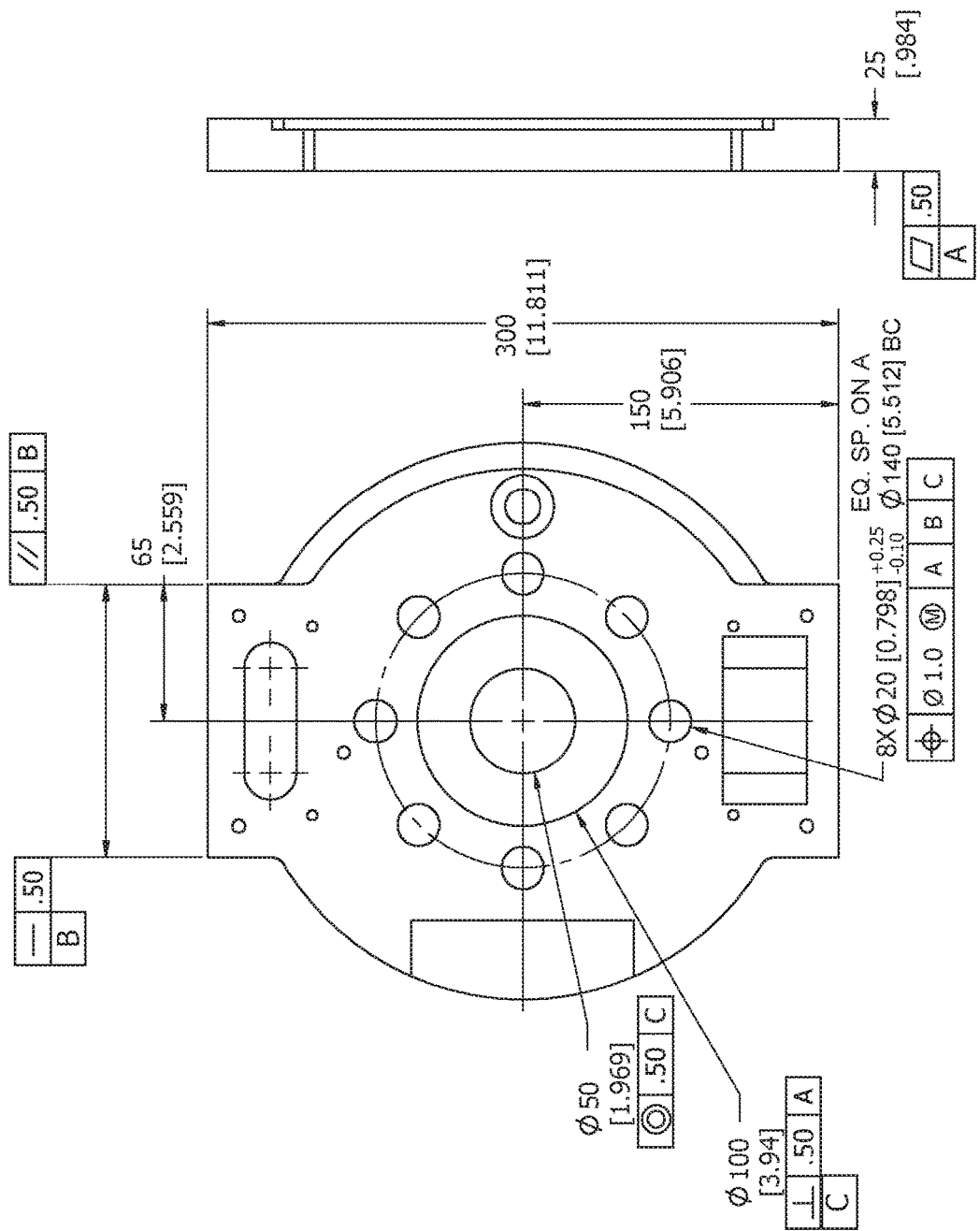

GEOMETRICAL FEATURE CHARACTERISTIC

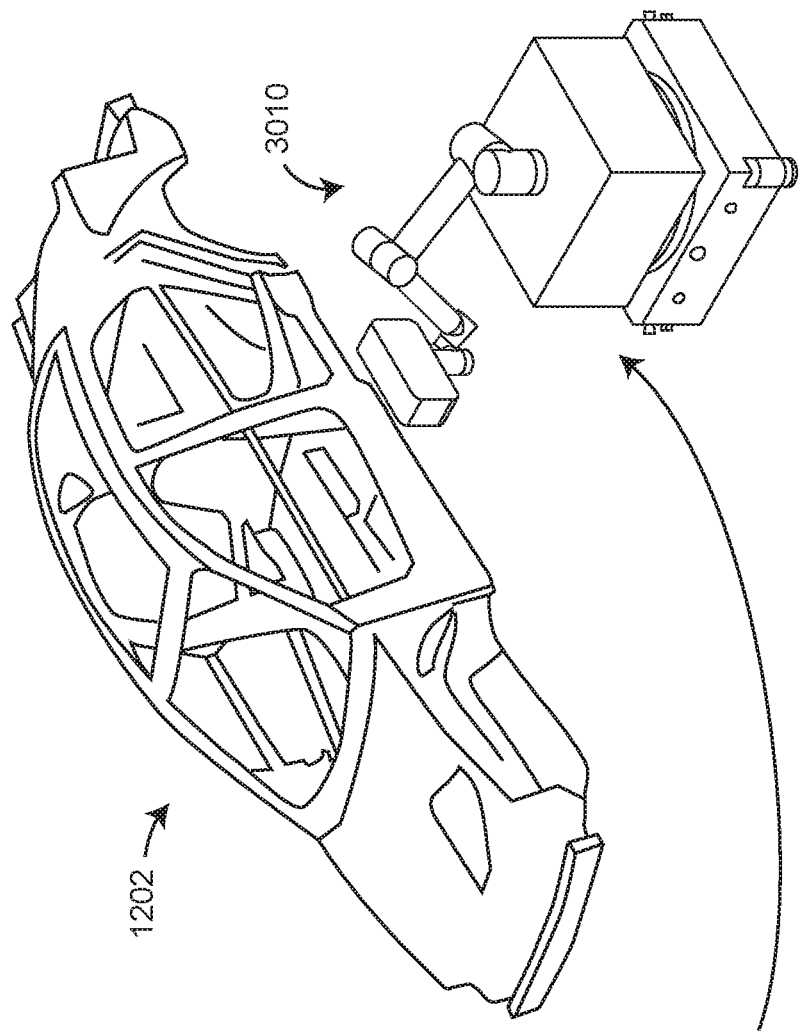
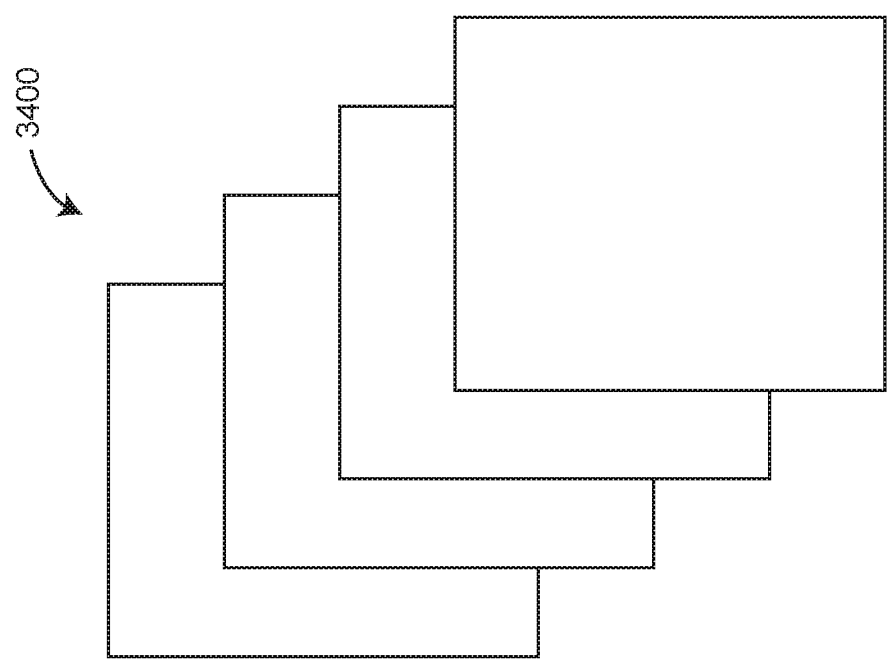
FIG. 34

THREE-DIMENSIONAL MEASURING DEVICE REMOVABLY COUPLED TO ROBOTIC ARM ON MOTORIZED MOBILE PLATFORM

CROSS REFERENCE TO RELATED APPLICATIONS

The present application is a continuation application of U.S. patent application Ser. No. 15/146,925, filed on May 5, 2016, now U.S. Pat. No. 9,964,398, which claims the benefit of U.S. Provisional Patent Application No. 62/157,673, filed on May 6, 2015, U.S. Provisional Patent Application No. 62/157,679, filed on May 6, 2015, U.S. Provisional Patent Application No. 62/157,689, filed on May 6, 2015, U.S. Provisional Patent Application No. 62/157,698, filed on May 6, 2015, U.S. Provisional Patent Application No. 62/157, 708, filed on May 6, 2015, U.S. Provisional Patent Application No. 62/157,717, filed on May 6, 2015, U.S. Provisional Patent Application No. 62/157,722, filed on May 6, 2015, U.S. Provisional Patent Application No. 62/157,730, filed on May 6, 2015, and U.S. Provisional Patent Application No. 62/315,861, filed on Mar. 31, 2016, the entire contents all of which are incorporated herein by reference.

FIELD OF THE INVENTION

The present disclosure relates to automated methods for inspecting objects to obtain three-dimensional (3D) coordinates.

BACKGROUND

Today dimensional measurements may be made by handheld measuring instruments that are not automated or by fixed instruments that are automated. Examples of such handheld instruments include triangulation scanners such as structured light scanners. Another example of a handheld instrument is a laser tracker having an operator that carries around a spherically mounted retroreflector (SMR) to determine 3D coordinates of points in contact with the SMR. An example of an instrument that can be automated but is fixed in place is a Cartesian CMM. Another example of an automated instrument fixed in place is a robot that holds a measurement device such as a triangulation scanner.

There is a need today for a system having the capability of performing automated dimensional measurements while moving from spot to spot. Such dimensional measurements should be obtained in a common frame of reference. Furthermore a way is needed to enable the device to navigate to the required measurement positions.

While existing line scanners and area scanners are suitable for their intended purposes, what is needed is a device having the capability of making automated dimensional measurements, with results obtained in a common frame of reference.

SUMMARY

According to one aspect of the invention, a system for measuring an object includes: the object having a surface; one or more processors; a mobile platform including a plurality of motorized wheels configured to translate and rotate the platform; a robotic articulated arm coupled to the mobile platform at a first end and to an end effector at a second end, there being a plurality of connected arm segments between the mobile platform and the end effector, the end effector coupled to an adapter, the adapter including an upper adapter connector; and a first 3D measuring device including a first-device lower connector configured to detachably couple to the upper adapter connector, the first 3D measuring device further configured to send a first electrical signal to the one or more processors, wherein the one or more processors are configured to control rotation of the motorized wheels, to control movement of the arm segments, and to operate the first 3D measuring device, the one or more processors further configured to determine 3D coordinates of a first point on the object surface based at least in part on the first electrical signal.

These and other advantages and features will become more apparent from the following description taken in conjunction with the drawings.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 12A shows a triangulation scanner and camera assembly measuring 3D coordinates in cooperation with an external projector on a mobile structure according to an embodiment;

FIGS. 14B-14G are perspective views of kiosks according to embodiments;

FIG. 20 is a schematic perspective representation of an operator wearing a VR headset configured to work in a combined VR/remote-AR mode with any of several 3D mobile measuring systems according to an embodiment;

FIG. 26 is a table describing common symbols of geometrical dimensioning and tolerancing (GD&T) according to an embodiment;

FIGS. 27A and 27B are a front view and a right side view, respectively, of the part of FIGS. 25A-25D, dimensioned using datum features and GD&T notation according to an embodiment;

FIG. 34 is a schematic perspective view illustrating a method of robotic simulation to teach elements of an inspection plan according to an embodiment.

Figure 1A:
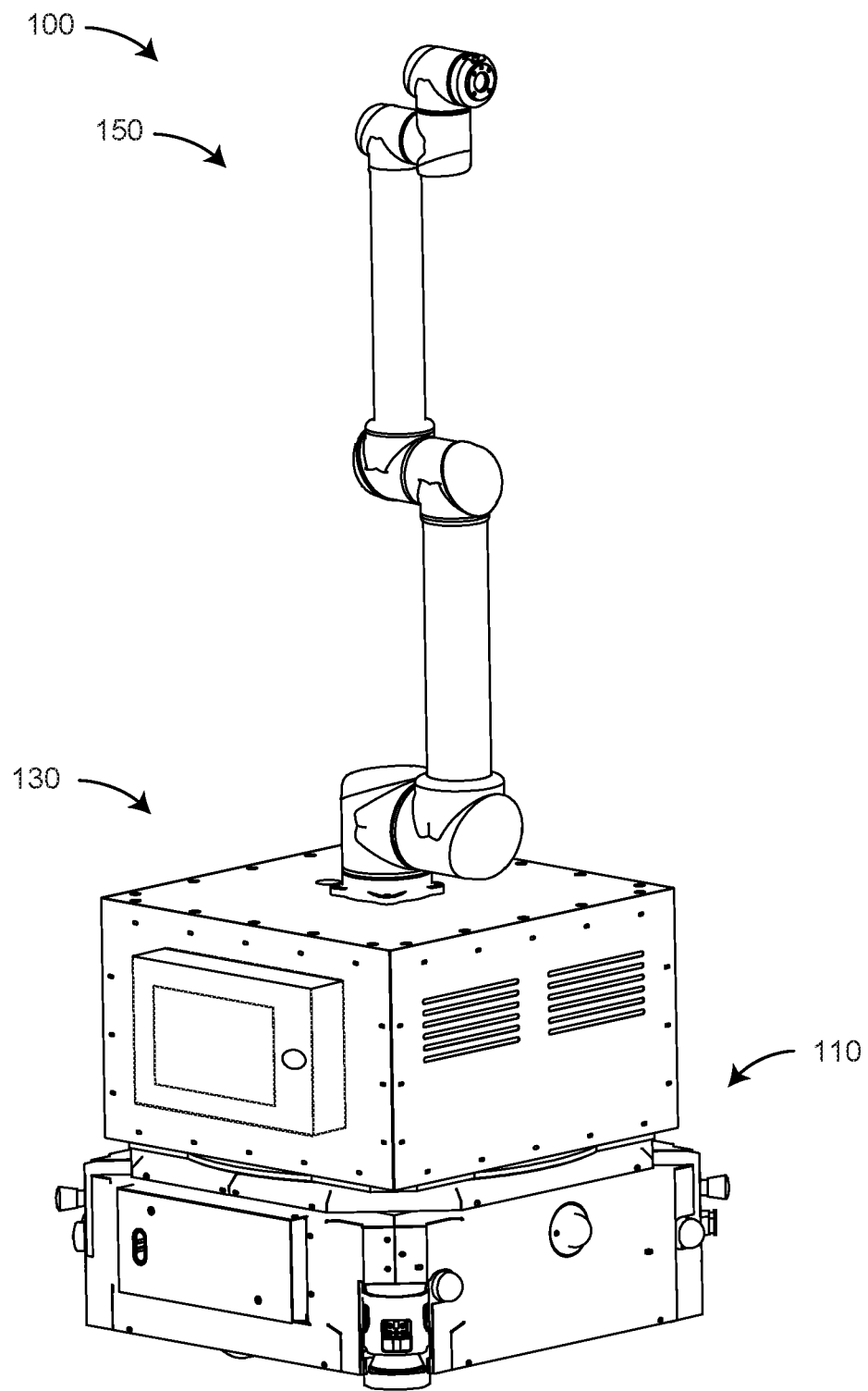
FIGS. 1A-1D are perspective, left-side, front-side, and top views of a mobile platform according to an embodiment.
Figure 1B:
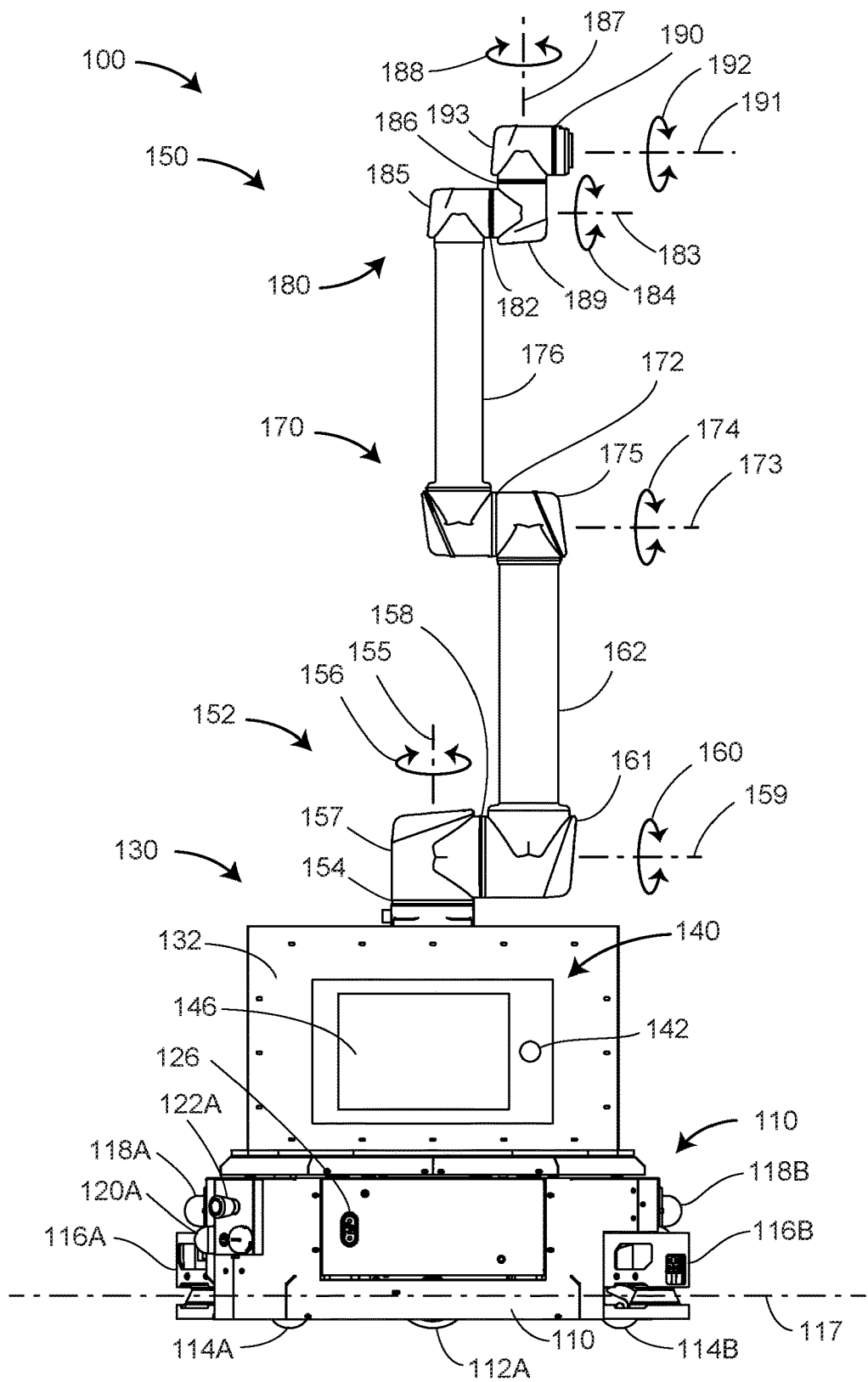
Figure 1C:
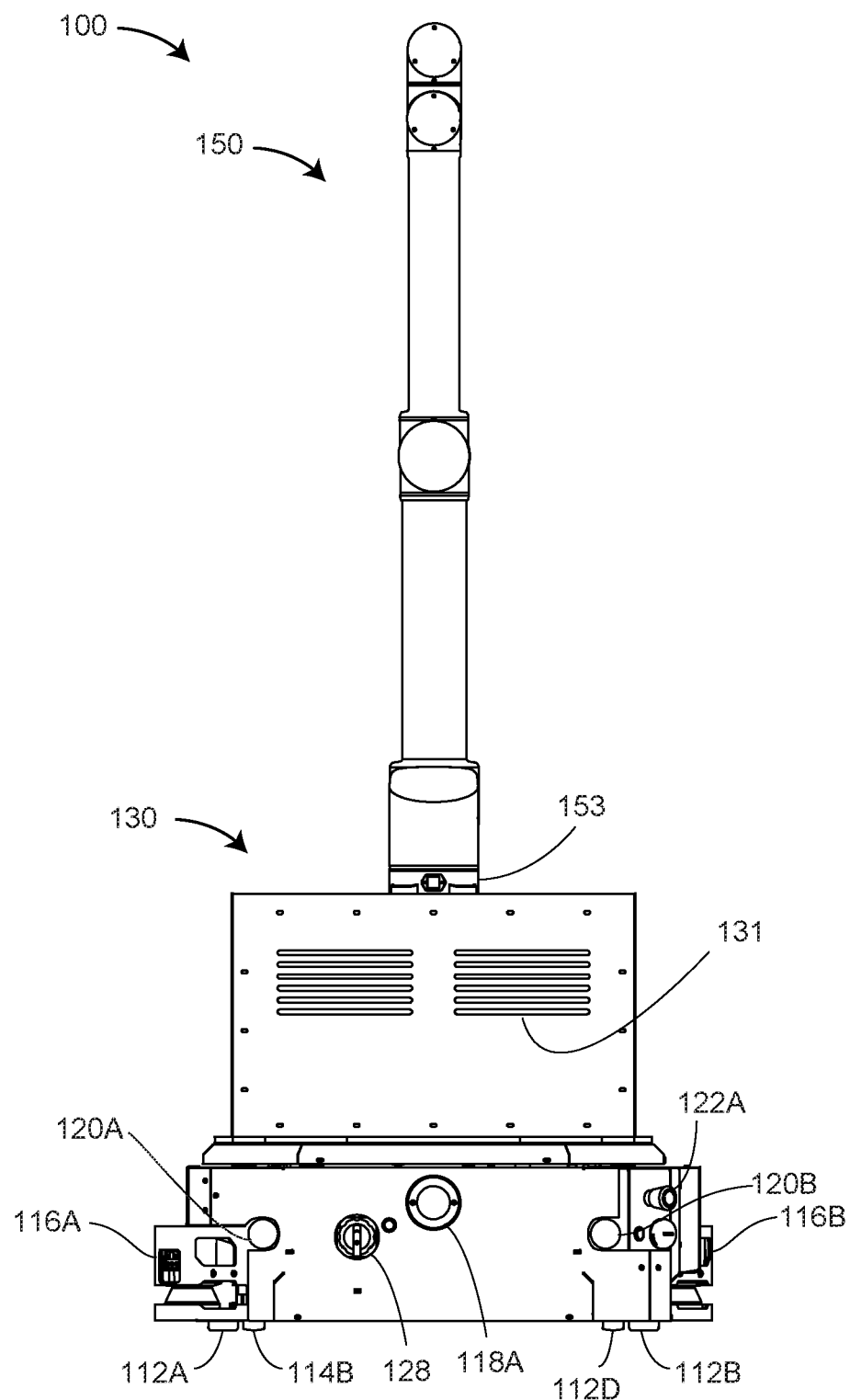
Figure 1D:
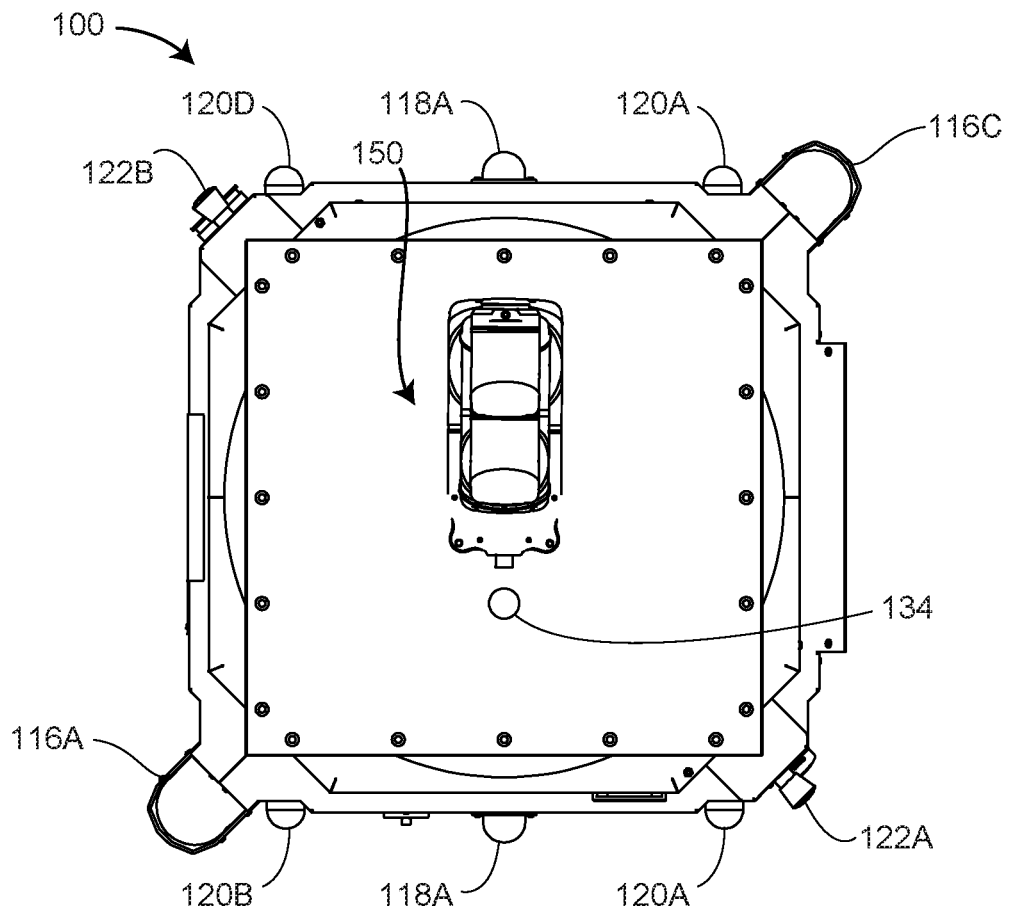

The detailed description explains embodiments of the invention, together with advantages and features, by way of example with reference to the drawings.

DETAILED DESCRIPTION

FIGS. 1A-1D illustrate perspective, left, front, and top views, respectively, of a mobile measurement platform 100, which includes a mobile base assembly 110, an arm electronics assembly 130, and a robotic articulated arm 150. Many different types of wheels may be used to drive the mobile measurement platform 100. In an embodiment, two active wheels are used to propel the mobile measurement platform 100, while one or more additional wheels are used to provide balance to the structure. In other embodiments, additional active wheels may be used. Types of wheels that may be used include simple wheels, omni-wheels, and Mecanum wheels. In an embodiment, wheels 112A, 112B are simple active wheels, and wheels 114A, 114B, 114C, and 114D are simple, passive, free-turning wheels. In an embodiment, active wheels 112A, 112B operate independently and may rotate forward, rotated backward, and hold in place. If both wheels turn together at the same rate, the mobile robot platform 100 is propelled forward or backward according to the direction of wheel rotation. If the left wheel 112B is held in place while the right wheel propels the platform forward, the mobile robot platform 100 will turn about the left wheel 112B in a counterclockwise direction as seen from the top view. If the left wheel 112B turns relatively slowly while the right wheel 112A turns relatively quickly, the effect will be turn the robot in a counterclockwise direction (as seen from the top view) but in an arc. By adjusting the rotation rates and directions of the wheels 112A, 112B, the mobile measurement platform 100 may be directed to follow any desired path.

In an embodiment, the mobile measurement platform 100, including the robotic articulated arm 150, is considered a human-friendly robotic device, which is a type of robotic device that can work safely around people. In an embodiment, the speed of the mobile platform is limited to one meter/second, which by German law is maximum speed for autonomous vehicles in a factory environment that includes people. In addition, the mobile measurement platform 100 includes an obstacle detection and avoidance system. In an embodiment, obstacle detection is provided by two two-dimensional (2D) scanners 116A, 116B. In an embodiment, the 2D scanners are SICK model S300 Professional safety laser scanner. These scanners emit a horizontal plane of light that measures distance and angle for each angle in a horizontal plane 117 over an angular range of 270 degrees. Because the 2D laser scanners 116A, 116B are in diagonally opposite corners of the mobile base assembly 110, the scanner obtains dimensional information on potential obstacles over the full 360 degrees. In an embodiment, the horizontal plane 117 is close to the floor, which is the region most in which obstacles are best detected. If an obstacle is detected, a signal is sent to processors in the system that cause the mobile platform to stop movement. In addition, a person may press an emergency stop button 122A to stop movement of the mobile platform. In an embodiment, ultrasound sensors may be provided for obstacle avoidance when glass or other transparent surfaces are present. In an embodiment, the mobile base assembly 110 includes an on-off switch 128. It also includes indicator lights 118A, 118B, 120A, 120B, 120C, and 120D.

In an embodiment, the robotic articulated arm 150 is safely used around people. In an embodiment, the robotic articulated arm 150 is a Universal Robots model UR10. In other embodiments, the robotic articulated arm is one provided by Kuka Robotics, ABB Robotics, FANUC Corporation, or another robot manufacturer. The robotic articulated arm 150 includes a shoulder 152, an elbow 170, and a wrist 180, in correspondence to human anatomy. In an embodiment the robotic articulated arm 150 includes six joint 154, 158, 172, 182, 186, 190 configured to rotate about axes 155, 159, 173, 183, 187, 191, respectively, bidirectionally by angular movements 156, 160, 174, 184, 188, 192, respectively.

In an embodiment, the arm electronics assembly 130 includes an arm electronics housing 132. In an embodiment, the robotic articulated arm 150 is mounted on a top surface of the arm electronics housing 132 of the robotic articulated arm 150 through an arm base element 153. In an embodiment, cables internal to the robotic arm assembly 150 are routed out of the arm base element 153 through a hole 134 into the arm electronics assembly 130. Inside the assembly 130, the cables from the robotic articulated arm 150 are routed to control box and teach pendant electronics 250, as shown in FIG. 2B.

In an embodiment, the robotic articulated arm is attached at a first end to the top surface of the arm electronics housing 132 and at a second end to an end effector that includes a 3D measurement device, as discussed further herein below. Between the first and second end are a plurality of connected arm segments 162, 176. Each joint assembly 157, 161, 175, 185, 189, 193 includes a motor and an angle measuring device, typically an angular encoder.

The robotic articulated arm includes a collection of joints. Each joint has a corresponding axis of rotation. Each joint is coupled to an associated arm segment or to the end effector, where there is no intervening arm segment between the joint and the associated arm segment. Some of the joints are swivel joints having a swivel axis as the corresponding axis of rotation. Each of the swivel joints is configured to produce rotation of the associated arm segment or end effector about the swivel axis. Other joints are hinge joints having a hinge axis as the corresponding axis of rotation, each of the plurality of hinge joints being configured to produce rotation of the associated arm segment or end effector in a direction perpendicular to the hinge axis. In the example of FIG. 2B, the swivel joints are 154, 186, and 190, and the corresponding swivel axes are 155, 187, and 191. The hinge joints are 158, 172, and 182, and the corresponding hinge axes are 159, 173, and 183.

The physical hardware for the teach pendant 140 is connected to the control box through a cable. In an embodiment, the teach pendant hardware 140 is fixedly attached to the arm electronics assembly 130. In another embodiment, the teach pendant 140 may be removed from the side of the arm electronics assembly and held in the hand of an operator. The teach pendant is used to teach the robotic arm assembly 150 how to perform prescribed movements. In an embodiment, the teach pendant 140 includes a touch screen display 146 and an emergency stop button 142 for the robotic articulated arm. A user may press the emergency stop button to cause the robotic articulated arm to stop movement. The arm electronics assembly 130 may include fans that cooperate with vents 131 to provide cooling.

In an embodiment, the complete movements of the mobile measurement platform 100 are controlled by one or more processors in the system. The one or more processors may be any of the processors shown in elements 220 in FIG. 2B, including computer processors 270 available in a network. The one or more processors may also include processors beyond those in the elements 220. In an embodiment, all of the movements of the mobile measurement platform, including movements of the wheels, the robotic articulated arm, and end effector measurement devices are performed autonomously. In other embodiments, an operator may train the robotic articulated arm 150 to perform desired movements using the teach pendant 140.

Figure 2A:
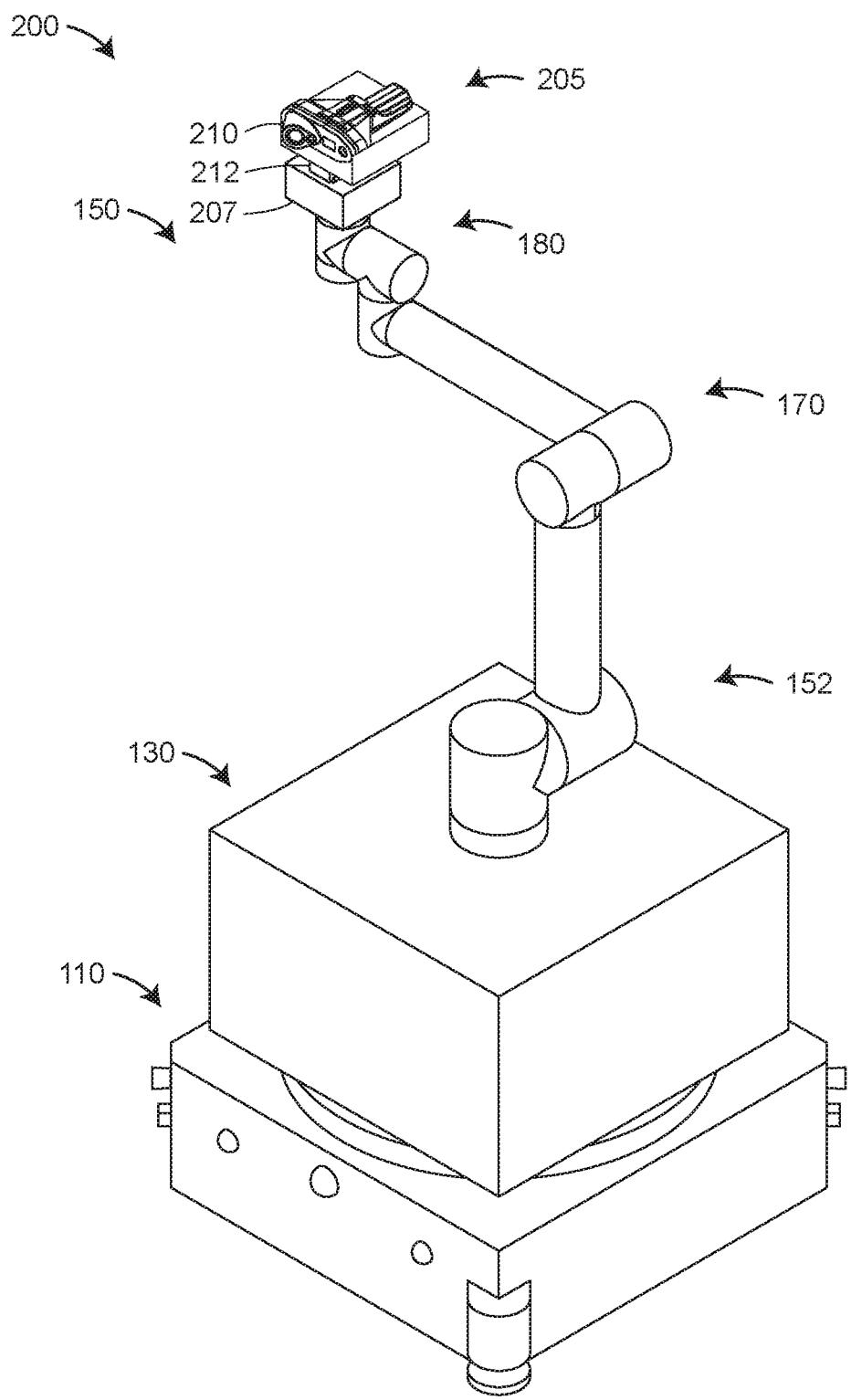
FIG. 2A is an orthographic view of a mobile platform that includes a triangulation scanner according to an embodiment.
Figure 2B:
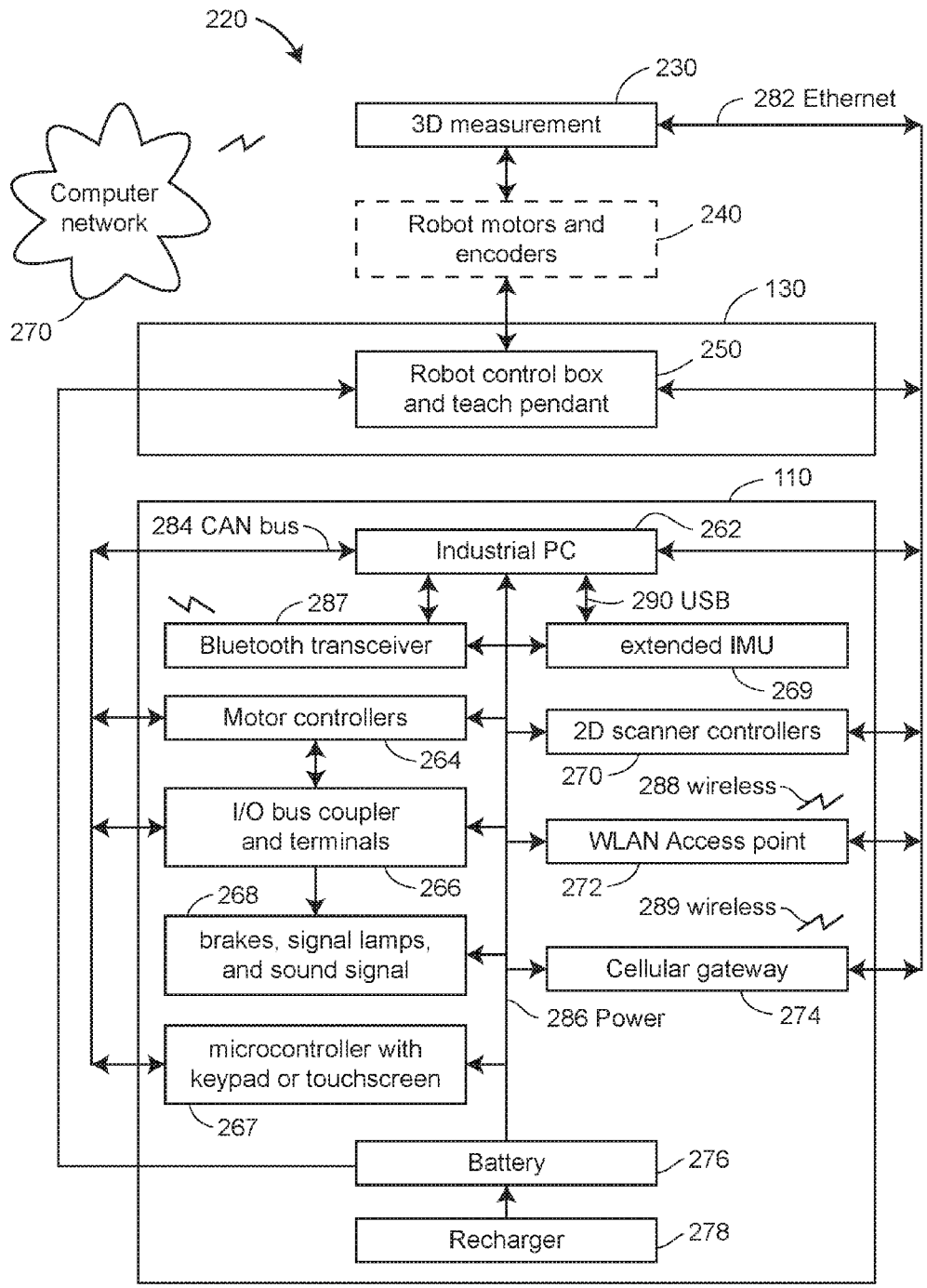
FIG. 2B is a block diagram of an electrical and computing system according to an embodiment.
Figure 2C:
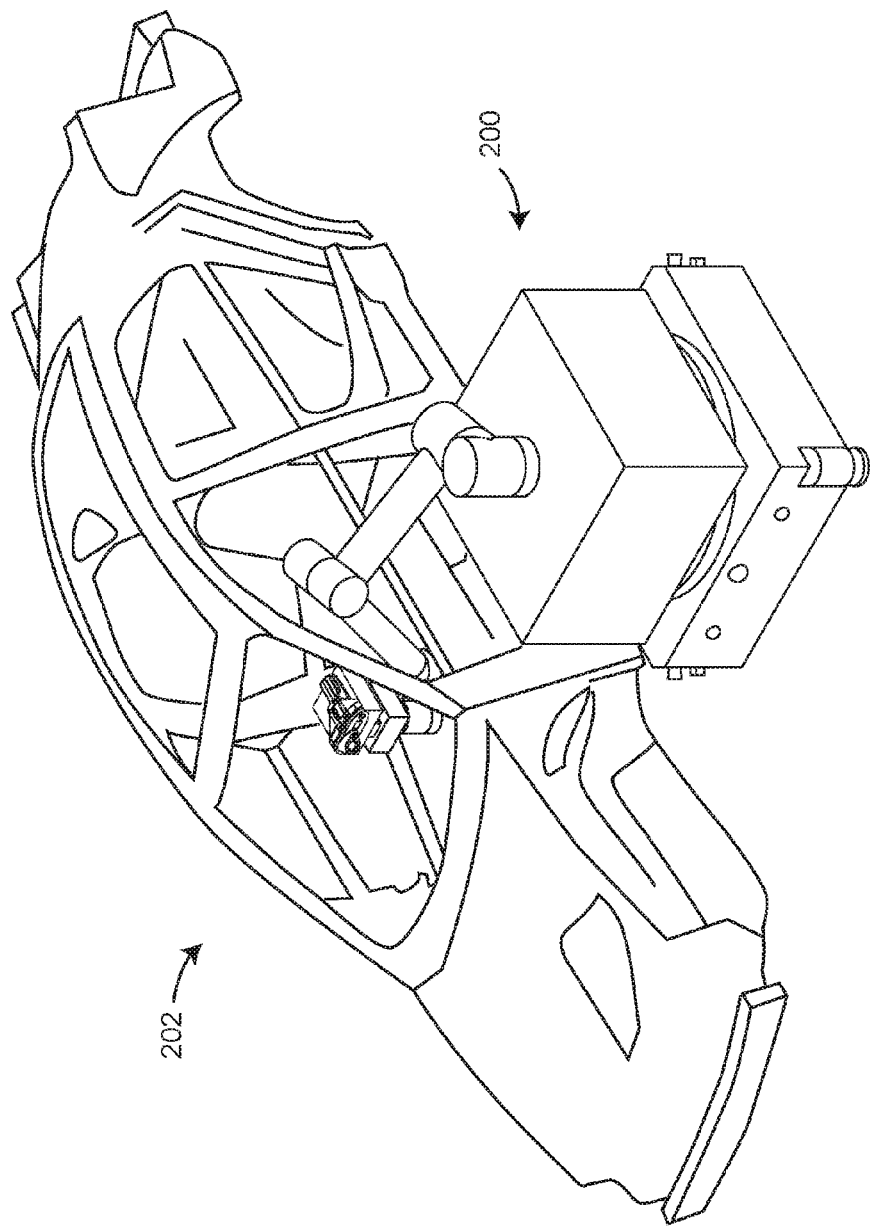
FIG. 2C illustrates, in a perspective view, a mobile platform measuring an interior of an automobile body-in-white (BIW) according to an embodiment.

FIG. 2A is an isometric view of a complete mobile measurement platform 200, which is the same as the mobile measurement platform 100 except that an end effector 205 has been added, including an electronics interface box 207 and a triangulation scanner 210. In an embodiment, the triangulation scanner 210 is detachably connected to the electronics box 207 through a connector 212. The motors of the robotic articulated arm 150 have turned the arm segments and end effector to orientations that are different than those of FIGS. 1A-1D. The shoulder 152 is positioned the same as before, but the elbow has been rotated about a hinge axis by 90 degrees and the wrist rotated about a swivel axis by 90 degrees. In making 3D measurements of objects having relatively complicated geometry, for example, the interior of an automobile Body-in-White (BiW) as shown in FIG. 2C. To perform a wide range of 3D measurements, the measurement platform 200 in most cases needs to provide a plurality of swivel and hinge joints. For example, the rotation of a hinge joint and a swivel joint are essential in FIG. 2C to access the region to be measured.

FIG. 2B is a block diagram of the electrical and computing system 220 of the complete mobile measurement platform 200. The mobile base assembly 110 includes an industrial PC (IPC) 262. In an embodiment, the IPC is a Beckhoff C6920-0050 Control Cabinet that includes an Intel® Core™ i7 processor. Other electrical devices in the electrical and computing system 220 include two motor controllers 264, input/output (I/O) bus couplers and terminals 266, microcontroller 268, extended inertial measurement unit (IMU) 269, two 2D scanner controllers 270, wireless local area network (WLAN) access point 272, cellular gateway 274, battery 276, and recharger 278. The IPC exchanges digital information with motor controller 264 over a Controller Area Network (CAN) bus 284. In an embodiment, the motor controller includes an H-bridge that enables the wheels to be turned forward or backward. The motor controller 264 also sends data from the angular encoders to the IPC 262. An angular encoder tied to each wheel axle provides relatively accurate odometry readings. In an embodiment, each wheel is attached to a sealed unit that includes a motor and an encoder.

In an embodiment, a battery 276 provides 24 volts to multiple devices in the system, as indicated in FIG. 2B. A recharger 278 is accessed through the mains adapter 126 in FIG. 1B. In another embodiment, a separate battery provides power to the robot control box and teach pendant 250 in the arm electronics assembly 130.

The I/O bus coupler cooperates with bus terminals to send and receive digital data. In an embodiment, the I/O bus coupler is a Beckhoff BK5150 CANopen bus coupler that cooperates with Beckhoff KL1408 digital input terminals and Beckhoff KL2408 digital output terminals. The digital input and digital output terminals are 8 channel terminals that operate on 24 volts. In an embodiment, digital output signals are sent to the brakes, signals lamps, and sound maker over digital output channels.

In an embodiment, a microcontroller 268 is provided as a watchdog for use in monitoring digital traffic in the system and troubleshooting problems. In an embodiment, the microcontroller is integrated with a touchscreen or keypad for use by an operator.

In an embodiment, an extended IMU 269 is provided that includes a magnetometer to provide heading information as well as accelerometers and gyroscopes found in traditional IMUS. In addition, the IMU may include a pressure sensor to provide elevation information. In an embodiment, a processor located within extended IMU unit fuses the information obtained from the various sensors, for example, using a Kalman filter or other similar mathematical methods, to improve accuracy of position and orientation information over time. In an embodiment, the extended IMU 269 communicates with the IPC 262 over a Universal Serial Bus (USB) communication link. In an embodiment, the extended IMU is the x-IMU manufactured by x-io Technologies.

The IPC 262 communicates with several devices over Ethernet 282, including the 3D measurement device robot control box and teach pendant 250, 2D scanner controllers 270, WLAN access point 272, and cellular gateway 274. The 2D scanner controllers provide the interface for the IPC to send control signals to the 2D scanners 116A, 116B and receive back distance information for a collection of horizontal angles.

The WLAN access point 272 allows wireless devices such as smart phones, tablets, or laptop computers to connect via communication channel 288 to a wired network of the mobile measurement platform 200 using the IEEE 802.11 standard (WiFi) or a related standard. Wireless communication is also possible over the IEEE 802.15.1 (Bluetooth) standard using a Bluetooth transceiver 287. In an embodiment, devices such as cellular phones may establish wireless communication over cellular communication channels such as 3G/4G LTE. In an embodiment, a communication channel is established using a cellular gateway 274. In an embodiment, the cellular gateway is a Sierra Wireless model GX400.

In some embodiments, signals are sent from the 3D measurement device directly to the IPC 262, either over a wired or wireless network. In an embodiment, a cable is tacked to the robotic articulated arm 150 at a few positions and then routed through the hole 134 to the IPC 262. Some robots provide the possibility of routing some signals directly through the robot arm. In an embodiment, signals are routed from the 3D measurement device electronics 230 to a real-time bus, which might be EtherCAT, SERCOS III, PROFINET, POWERLINK, or EtherNet/IP, for example. Such a real-time bus may attach to dozens or hundreds of other devices in an automation network.

Figure 3A:
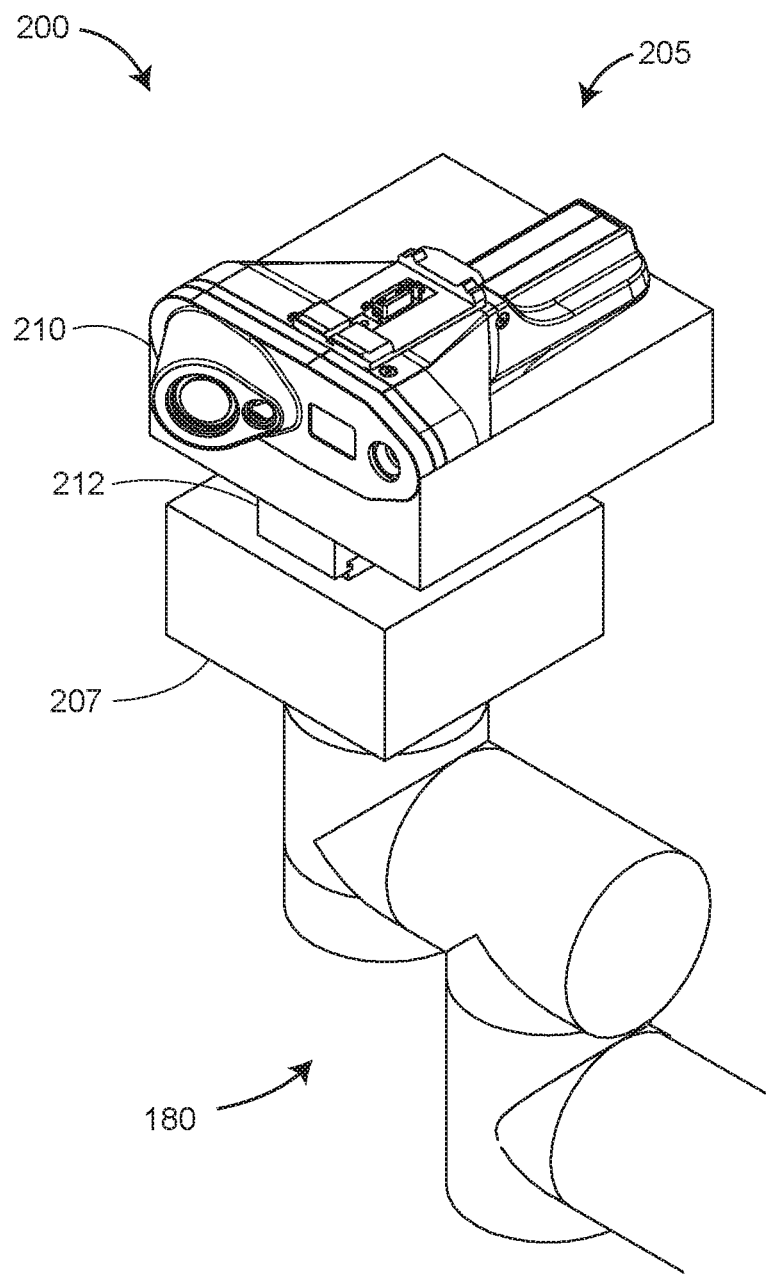
FIG. 3A is a close-up view of a portion of an end effector that holds a triangulation scanner according to an embodiment.
Figure 3B:
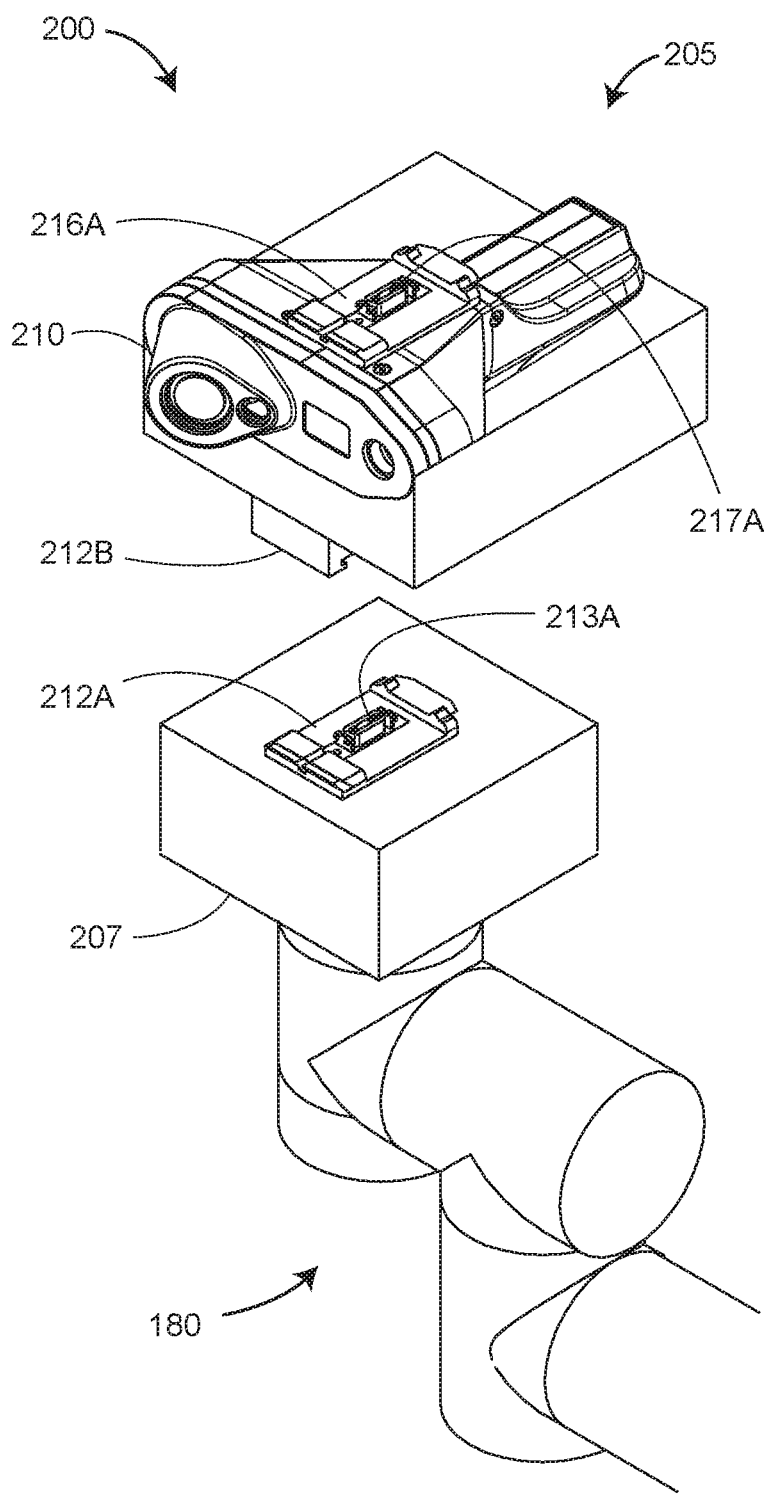
FIG. 3B is an exploded isometric view of an electronics box and triangulation scanner on an end effector of an robotic articulated arm on the mobile platform according to an embodiment.
Figure 3C:
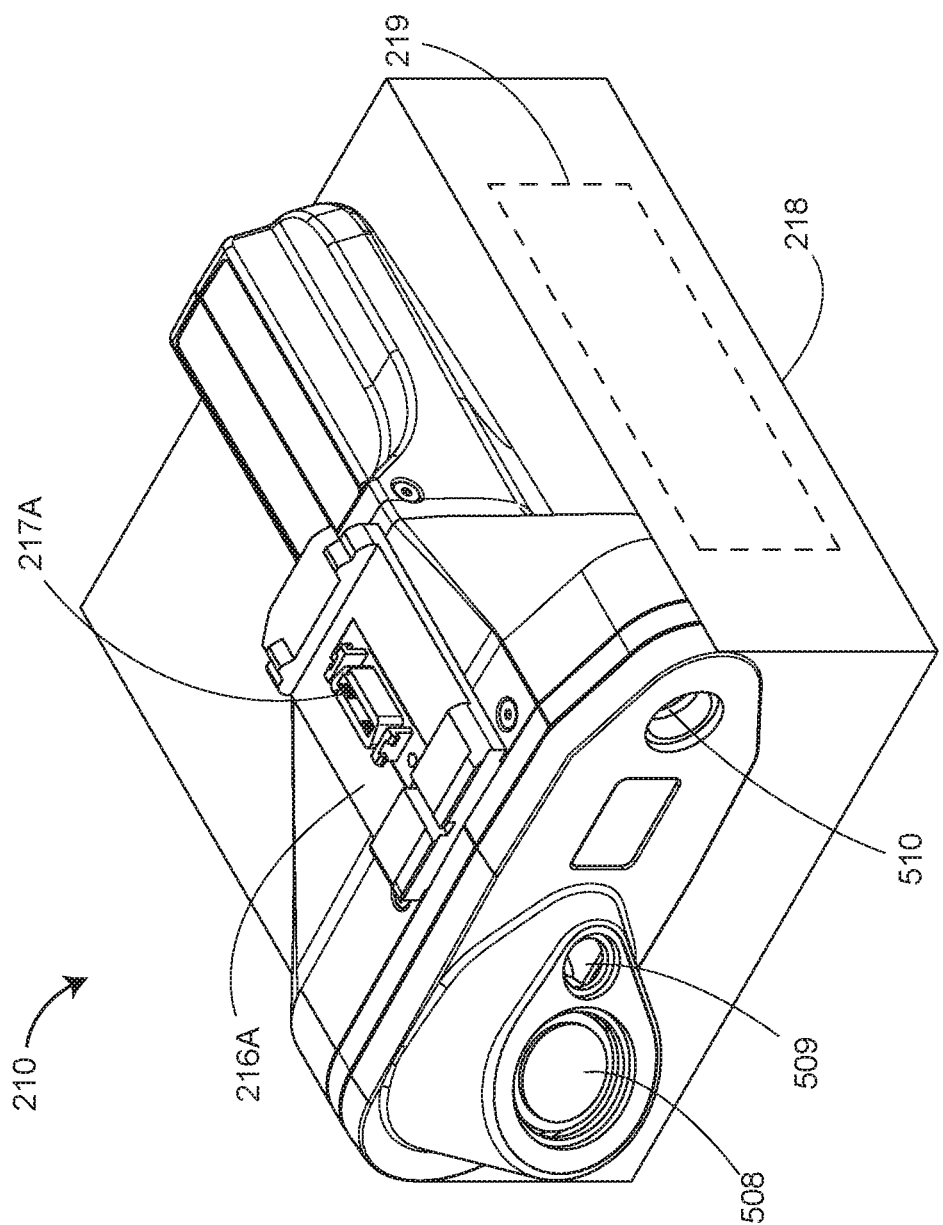
FIG. 3C is a close up view of the triangulation scanner according to an embodiment.

FIGS. 3A-3C show a portion of a mobile measurement system 200 having an end effector 205 that includes a triangulation scanner 210 attached to electronics box 207 through a connector 212. The end effector 205 is attached to wrist elements 180 of the robotic articulated arm 150. The triangulation scanner 210 includes a camera 508 and a projector 510. In the exemplary embodiment, the projector 510 uses a light source that generates a straight line projected onto an object surface. The light source may be a laser, a superluminescent diode (SLD), an incandescent light, a light emitting diode (LED), for example. The projected light may be visible or invisible, but visible light may be more convenient in some cases. The camera 508 includes a lens and an imaging sensor. The imaging sensor is a photosensitive array that may be a charge-coupled device (CCD) two-dimensional (2D) area sensor or a complementary metal-oxide-semiconductor (CMOS) 2D area sensor, for example, or it may be some other type of device. Each imaging sensor may comprise a 2D array (i.e., rows, columns) of a plurality of light sensing picture elements (pixels). Each pixel typically contains at least one photodetector that converts light into an electric charge stored within the pixel wells, and read out as a voltage value. Voltage values are converted into digital values by an analog-to-digital converter (ADC). Typically for a CMOS sensor chip, the ADC is contained within the sensor chip. Typically for a CCD sensor chip, the ADC is included outside the sensor chip on a circuit board.

The projector 510 and camera 508 are electrically coupled to an electrical circuit 219 disposed within the enclosure 218. The electrical circuit 219 may include one or more microprocessors, digital signal processors, memory, and other types of signal conditioning and/or storage circuits.

The marker light source 509 emits a beam of light that intersects the beam of light from the projector 510. The position at which the two beams intersect provides an indication to the user of the optimum distance from the scanner 500 to the object under test. In an embodiment, a camera on the end effector 205 is provided to assist in identifying the optimum distance from the object surface under investigation. In another embodiment, the system uses other information in its inspection procedure, as discussed further herein below, to move the triangulation scanner 500 to an optimum distance from the object surface.

Figure 4:
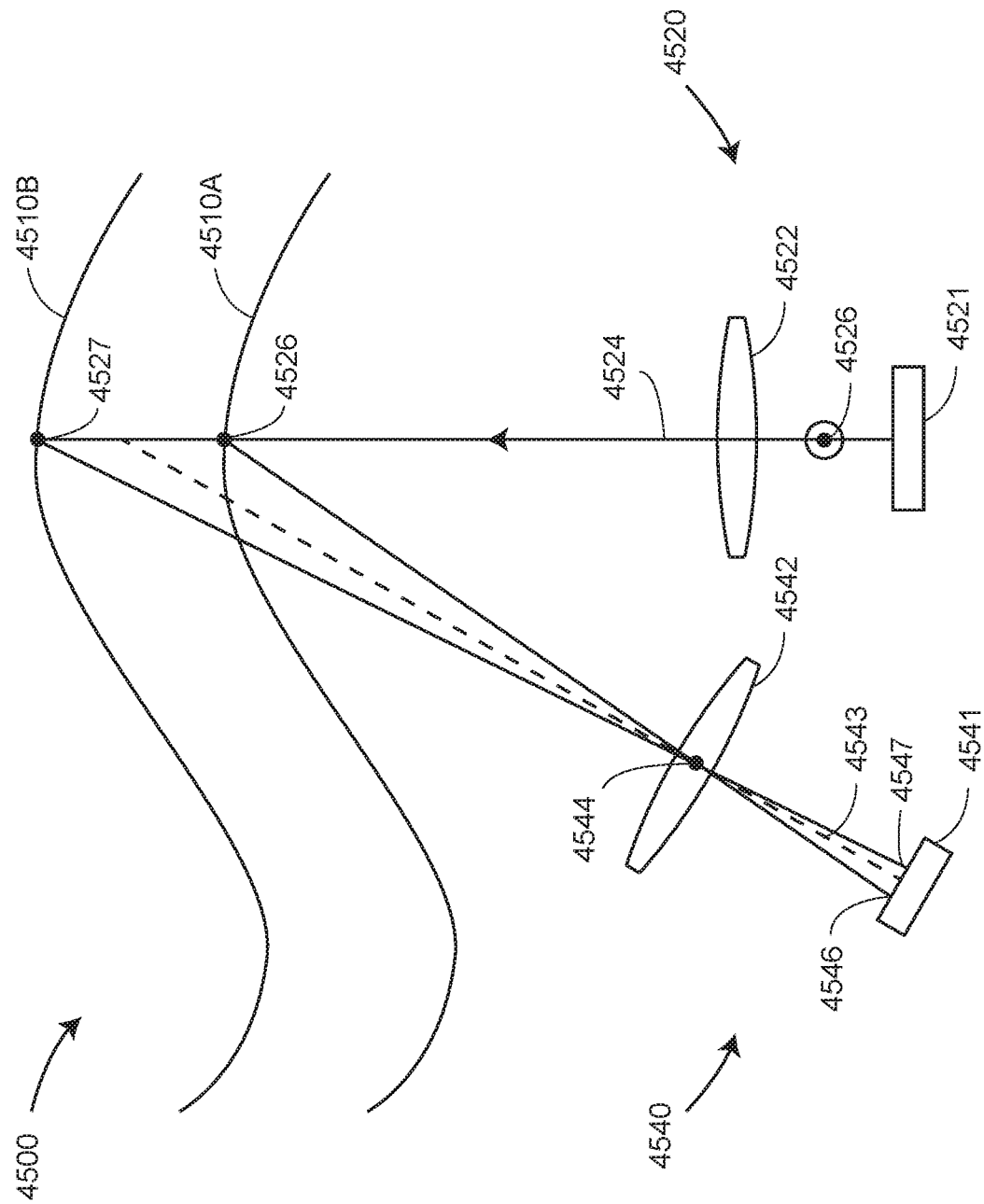
FIG. 4 is a schematic illustration of the principle of operation of a triangulation scanner that emits a line of light according to an embodiment.

FIG. 4 shows elements of a laser line probe (LLP) 4500 that includes a projector 4520 and a camera 4540. The projector 4520 includes a source pattern of light 4521 and a projector lens 4522. The source pattern of light includes an illuminated pattern in the form of a line. The projector lens includes a projector perspective center and a projector optical axis that passes through the projector perspective center. In the example of FIG. 4, a central ray of the beam of light 4524 is aligned with the projector optical axis. The camera 4540 includes a camera lens 4542 and a photosensitive array 4541. The lens has a camera optical axis 4543 that passes through a camera lens perspective center 4544. In the exemplary system 4500, the projector optical axis, which is aligned to the beam of light 4524 and the camera lens optical axis 4544, are perpendicular to the line of light 4523 projected by the source pattern of light 4521. In other words, the line 4523 is in the direction perpendicular to the paper in FIG. 4. The line strikes an object surface, which at a first distance from the projector is object surface 4510A and at a second distance from the projector is object surface 4510B. It is understood that at different heights above or below the plane of the paper of FIG. 4, the object surface may be at a different distance from the projector. The line of light intersects surface 4510A (in the plane of the paper) in a point 4526, and it intersects the surface 4510B (in the plane of the paper) in a point 4527. For the case of the intersection point 4526, a ray of light travels from the point 4526 through the camera lens perspective center 4544 to intersect the photosensitive array 4541 in an image point 4546. For the case of the intersection point 4527, a ray of light travels from the point 4527 through the camera lens perspective center to intersect the photosensitive array 4541 in an image point 4547. By noting the position of the intersection point relative to the position of the camera lens optical axis 4544, the distance from the projector (and camera) to the object surface can be determined using the principles of triangulation. The distance from the projector to other points on the line of light 4526, that is points on the line of light that do not lie in the plane of the paper of FIG. 4, may similarly be found.

In an embodiment, the photosensitive array 4541 is aligned to place either the array rows or columns in the direction of the reflected laser stripe. In this case, the position of a spot of light along one direction of the array provides information needed to determine a distance to the object, as indicated by the difference in the positions of the spots 4546 and 4547 of FIG. 4. The position of the spot of light in the orthogonal direction on the array provides information needed to determine where, along the length of the laser line, the plane of light intersects the object.

In this specification, it is understood that the terms column and row refer simply to a first direction along the photosensitive array and a second direction perpendicular to the first direction. As such, the terms row and column as used herein do not necessarily refer to row and columns according to documentation provided by a manufacturer of the photosensitive array 4541. In the discussion that follows, the rows are taken to be in the plane of the paper on the surface of the photosensitive array. The columns are taken to be on the surface of the photosensitive array and orthogonal to the rows. However, other arrangements are possible.

Figure 5A:
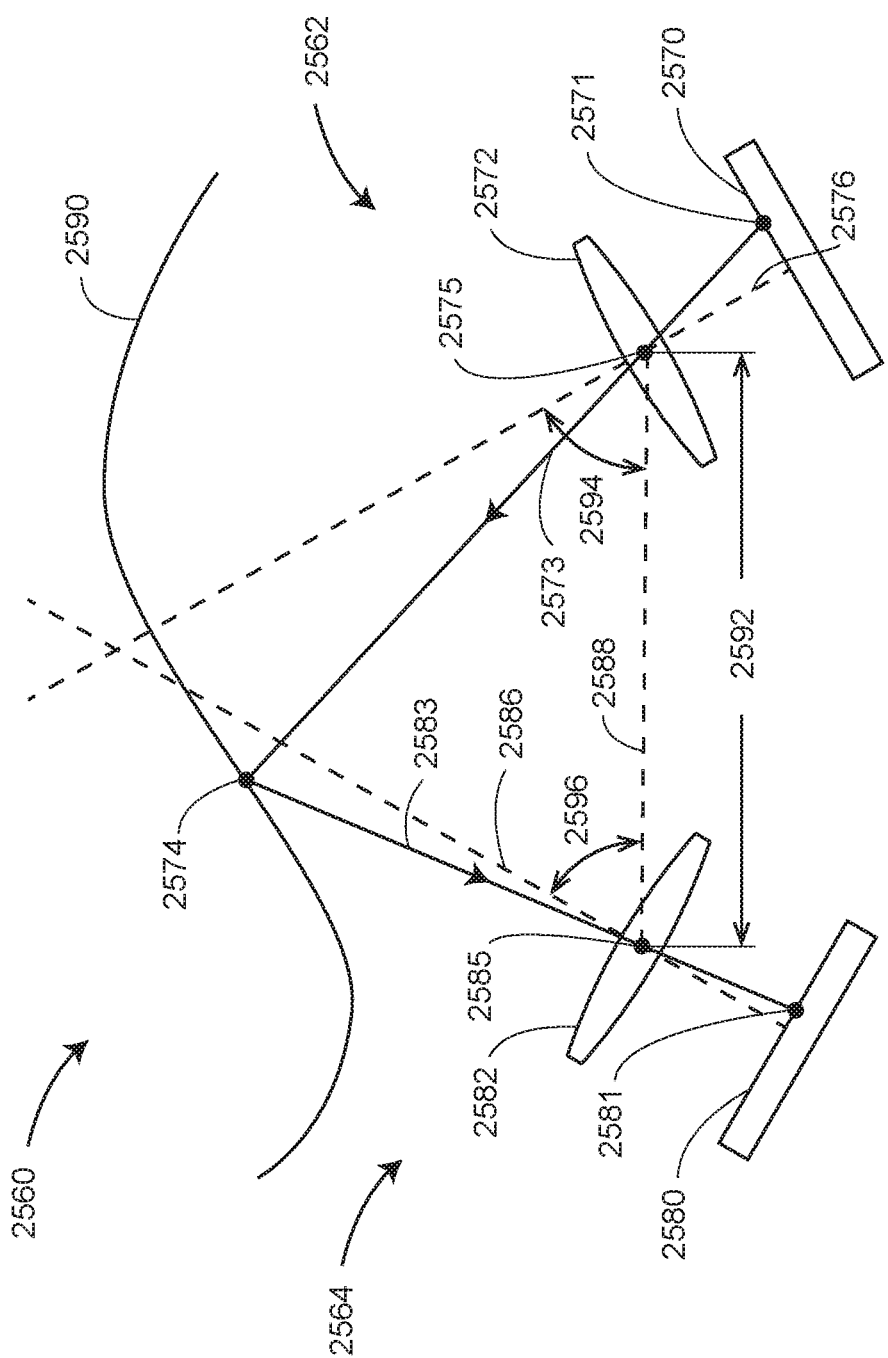
FIGS. 5A and 5B are schematic illustrations of the principle of operation for a structured light triangulation scanner according to two embodiments.

As explained herein above, light from a scanner may be projected in a line pattern to collect 3D coordinates over a line. Alternatively, light from a scanner may be projected to cover an area, thereby obtaining 3D coordinates over an area on an object surface. In an embodiment, the projector 510 in FIG. 3C is an area projector rather than a line projector. An explanation of triangulation principles for the case of area projection is now given with reference to the system 2560 of FIG. 5A and the system 4760 of FIG. 5B. Referring first to FIG. 5A, the system 2560 includes a projector 2562 and a camera 2564. The projector 2562 includes a source pattern of light 2570 lying on a source plane and a projector lens 2572. The projector lens may include several lens elements. The projector lens has a lens perspective center 2575 and a projector optical axis 2576. The ray of light 2573 travels from a point 2571 on the source pattern of light through the lens perspective center onto the object 2590, which it intercepts at a point 2574.

The camera 2564 includes a camera lens 2582 and a photosensitive array 2580. The camera lens 2582 has a lens perspective center 2585 and an optical axis 2586. A ray of light 2583 travels from the object point 2574 through the camera perspective center 2585 and intercepts the photosensitive array 2580 at point 2581.

Figure 5B:
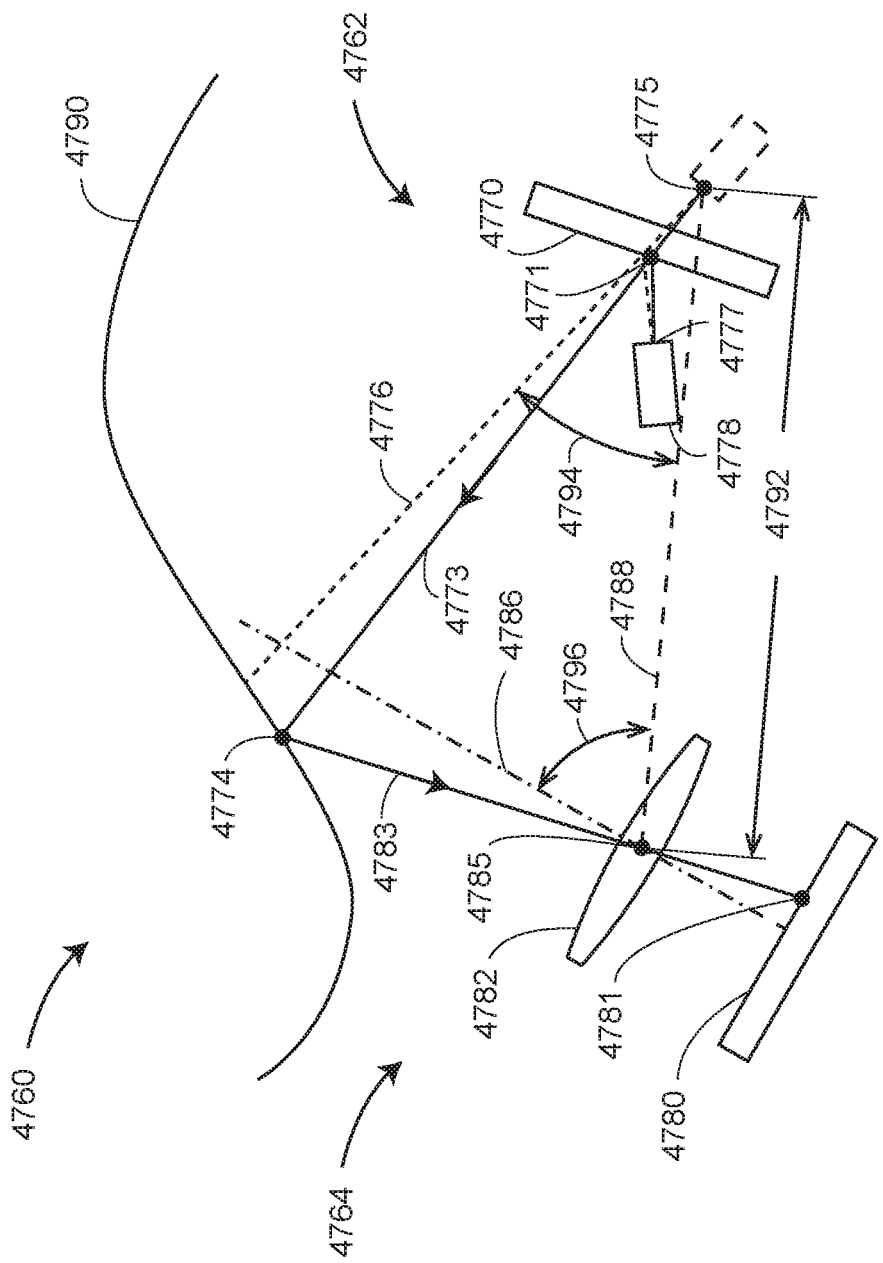

The line segment that connects the perspective centers is the baseline 2588 in FIG. 5A and the baseline 4788 in FIG. 5B. The length of the baseline is called the baseline length (2592, 4792). The angle between the projector optical axis and the baseline is the baseline projector angle (2594, 4794). The angle between the camera optical axis (2583, 4786) and the baseline is the baseline camera angle (2596, 4796). If a point on the source pattern of light (2570, 4771) is known to correspond to a point on the photosensitive array (2581, 4781), then it is possible using the baseline length, baseline projector angle, and baseline camera angle to determine the sides of the triangle connecting the points 2585, 2574, and 2575, and hence determine the surface coordinates of points on the surface of object 2590 relative to the frame of reference of the measurement system 2560. To do this, the angles of the sides of the small triangle between the projector lens 2572 and the source pattern of light 2570 are found using the known distance between the lens 2572 and plane 2570 and the distance between the point 2571 and the intersection of the optical axis 2576 with the plane 2570. These small angles are added or subtracted from the larger angles 2596 and 2594 as appropriate to obtain the desired angles of the triangle. It will be clear to one of ordinary skill in the art that equivalent mathematical methods can be used to find the lengths of the sides of the triangle 2574-2585-2575 or that other related triangles may be used to obtain the desired coordinates of the surface of object 2590.

Referring first to FIG. 5B, the system 4760 is similar to the system 2560 of FIG. 5A except that the system 4760 does not include a lens. The system may include a projector 4762 and a camera 4764. In the embodiment illustrated in FIG. 5B, the projector includes a light source 4778 and a light modulator 4770. The light source 4778 may be a laser light source since such a light source may remain in focus for a long distance using the geometry of FIG. 5B. A ray of light 4773 from the light source 4778 strikes the optical modulator 4770 at a point 4771. Other rays of light from the light source 4778 strike the optical modulator at other positions on the modulator surface. In an embodiment, the optical modulator 4770 changes the power of the emitted light, in most cases by decreasing the optical power to a degree. In this way, the optical modulator imparts an optical pattern to the light, referred to here as the source pattern of light, which is at the surface of the optical modulator 4770. The optical modulator 4770 may be a DLP or LCOS device for example. In some embodiments, the modulator 4770 is transmissive rather than reflective. The light emerging from the optical modulator 4770 appears to emerge from a virtual light perspective center 4775. The ray of light appears to emerge from the virtual light perspective center 4775, pass through the point 4771, and travel to the point 4774 at the surface of object 4790.

The baseline is the line segment extending from the camera lens perspective center 4785 to the virtual light perspective center 4775. In general, the method of triangulation involves finding the lengths of the sides of a triangle, for example, the triangle having the vertex points 4774, 4785, and 4775. A way to do this is to find the length of the baseline, the angle between the baseline and the camera optical axis 4786, and the angle between the baseline and the projector reference axis 4776. To find the desired angle, additional smaller angles are found. For example, the small angle between the camera optical axis 4786 and the ray 4783 can be found by solving for the angle of the small triangle between the camera lens 4782 and the photosensitive array 4780 based on the distance from the lens to the photosensitive array and the distance of the pixel from the camera optical axis. The angle of the small triangle is then added to the angle between the baseline and the camera optical axis to find the desired angle. Similarly for the projector, the angle between the projector reference axis 4776 and the ray 4773 is found can be found by solving for the angle of the small triangle between these two lines based on the known distance of the light source 4777 and the surface of the optical modulation and the distance of the projector pixel at 4771 from the intersection of the reference axis 4776 with the surface of the optical modulator 4770. This angle is subtracted from the angle between the baseline and the projector reference axis to get the desired angle.

The camera 4764 includes a camera lens 4782 and a photosensitive array 4780. The camera lens 4782 has a camera lens perspective center 4785 and a camera optical axis 4786. The camera optical axis is an example of a camera reference axis. From a mathematical point of view, any axis that passes through the camera lens perspective center may equally easily be used in the triangulation calculations, but the camera optical axis, which is an axis of symmetry for the lens, is customarily selected. A ray of light 4783 travels from the object point 4774 through the camera perspective center 4785 and intercepts the photosensitive array 4780 at point 4781. Other equivalent mathematical methods may be used to solve for the lengths of the sides of a triangle 4774-4785-4775, as will be clear to one of ordinary skill in the art.

Although the triangulation method described here is well known, some additional technical information is given hereinbelow for completeness. Each lens system has an entrance pupil and an exit pupil. The entrance pupil is the point from which the light appears to emerge, when considered from the point of view of first-order optics. The exit pupil is the point from which light appears to emerge in traveling from the lens system to the photosensitive array. For a multi-element lens system, the entrance pupil and exit pupil do not necessarily coincide, and the angles of rays with respect to the entrance pupil and exit pupil are not necessarily the same. However, the model can be simplified by considering the perspective center to be the entrance pupil of the lens and then adjusting the distance from the lens to the source or image plane so that rays continue to travel along straight lines to intercept the source or image plane. In this way, the simple and widely used model shown in FIG. 5A is obtained. It should be understood that this description provides a good first order approximation of the behavior of the light but that additional fine corrections can be made to account for lens aberrations that can cause the rays to be slightly displaced relative to positions calculated using the model of FIG. 5A. Although the baseline length, the baseline projector angle, and the baseline camera angle are generally used, it should be understood that saying that these quantities are required does not exclude the possibility that other similar but slightly different formulations may be applied without loss of generality in the description given herein.

In some cases, a scanner system may include two cameras in addition to a projector. In other cases, a triangulation system may be constructed using two cameras alone, wherein the cameras are configured to image points of light on an object or in an environment. For the case in which two cameras are used, whether with or without a projector, a triangulation may be performed between the camera images using a baseline between the two cameras. In this case, the triangulation may be understood with reference to FIG. 5A, with the projector 2562 replaced by a camera.

In some cases, different types of scan patterns may be advantageously combined to obtain better performance in less time. For example, in an embodiment, a fast measurement method uses a two-dimensional coded pattern in which three-dimensional coordinate data may be obtained in a single shot. In a method using coded patterns, different characters, different shapes, different thicknesses or sizes, or different colors, for example, may be used to provide distinctive elements, also known as coded elements or coded features. Such features may be used to enable the matching of the point 2571 to the point 2581. A coded feature on the source pattern of light 2570 may be identified on the photosensitive array 2580.

An advantage of using coded patterns is that three-dimensional coordinates for object surface points can be quickly obtained. However, in most cases, a sequential structured light approach, such as the sinusoidal phase-shift approach discussed above, will give more accurate results. Therefore, the user may advantageously choose to measure certain objects or certain object areas or features using different projection methods according to the accuracy desired. By using a programmable source pattern of light, such a selection may easily be made.

A line emitted by a laser line scanner intersects an object in a linear projection. The illuminated shape traced on the object is two dimensional. In contrast, a projector that projects a two-dimensional pattern of light creates an illuminated shape on the object that is three dimensional. One way to make the distinction between the laser line scanner and the structured light scanner is to define the structured light scanner as a type of scanner that contains at least three non-collinear pattern elements. For the case of a two-dimensional coded pattern of light, the three non-collinear pattern elements are recognizable because of their codes, and since they are projected in two dimensions, the at least three pattern elements must be non-collinear. For the case of the periodic pattern, such as the sinusoidally repeating pattern, each sinusoidal period represents a plurality of pattern elements. Since there is a multiplicity of periodic patterns in two dimensions, the pattern elements must be non-collinear. In contrast, for the case of the laser line scanner that emits a line of light, all of the pattern elements lie on a straight line. Although the line has width, and the tail of the line cross section may have less optical power than the peak of the signal, these aspects of the line are not evaluated separately in finding surface coordinates of an object and therefore do not represent separate pattern elements. Although the line may contain multiple pattern elements, these pattern elements are collinear.

It should be noted that although the descriptions given above distinguish between line scanners and area (structured light) scanners based on whether three or more pattern elements are collinear, it should be noted that the intent of this criterion is to distinguish patterns projected as areas and as lines. Consequently patterns projected in a linear fashion having information only along a single path are still line patterns even though the one-dimensional pattern may be curved.

As explained herein above, an LLP or area scanner may be used with an AACMM to obtain the position and orientation of the LLP or area scanner. Another method of measuring with an LLP is to remove the LLP from the AACMM and hold it by hand. The position and orientation of the LLP or area scanner relative to an object may be determined by registering multiple scans together based on commonly observed features.

Figure 6A:
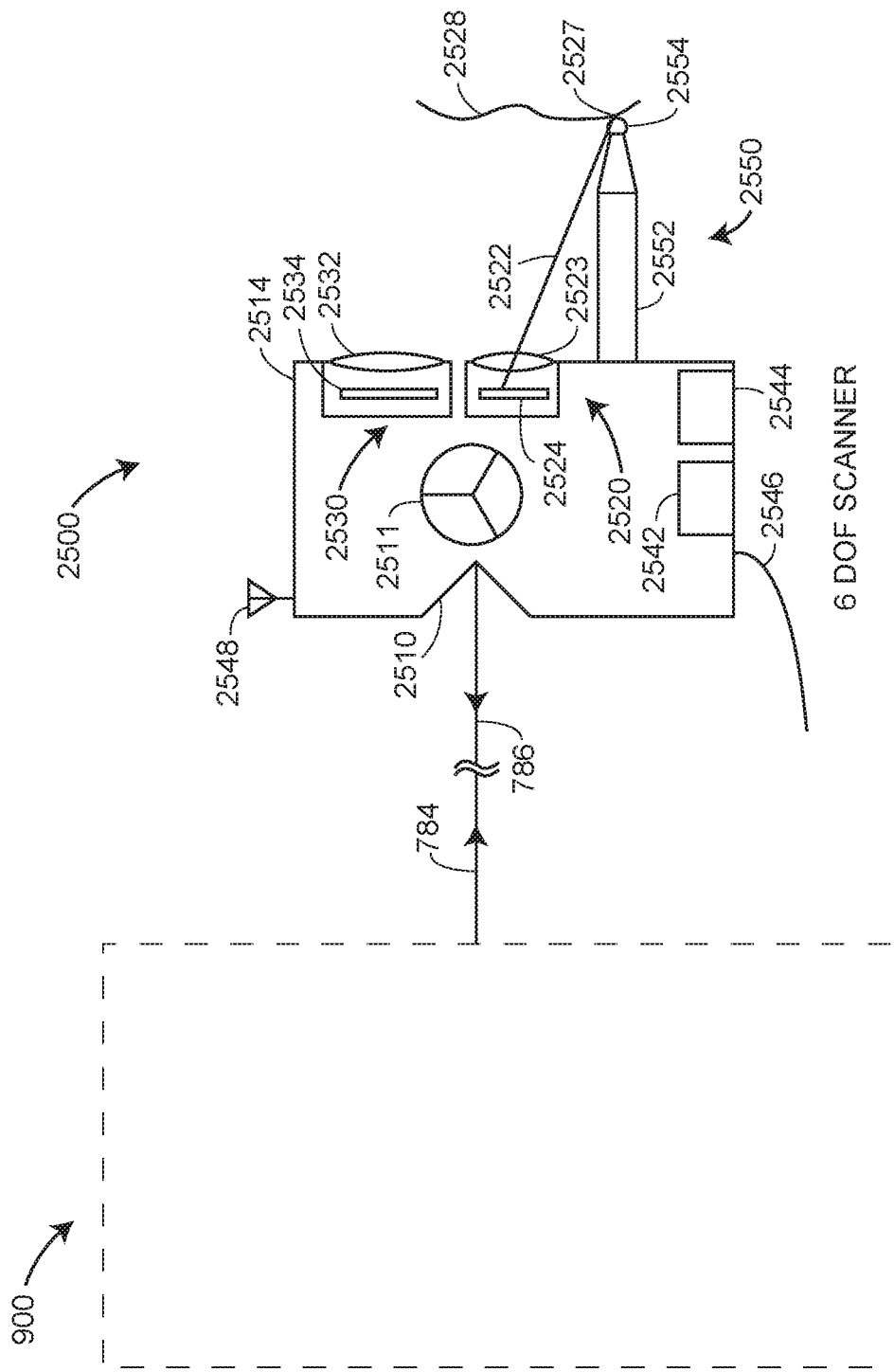
FIG. 6A is a schematic representation of elements of a six-DOF scanner according to an embodiment.

It is also known to use scanner 2500, which might be a line scanner or area scanner, with a six-DOF (degree-of-freedom) laser tracker 900 as shown in FIG. 6A. The scanner 2505 includes a projector 2520 that in an embodiment projects a two dimensional pattern of light (structured light). Such light emerges from the projector lens perspective center and travels in an expanding pattern outward until it intersects the object 2528. Examples of this type of pattern are the coded pattern and the periodic pattern, as explained herein above. The projector 2520 may alternatively project a one-dimensional pattern of light, thereby behaving as an LLP or line scanner.

Figure 6B:
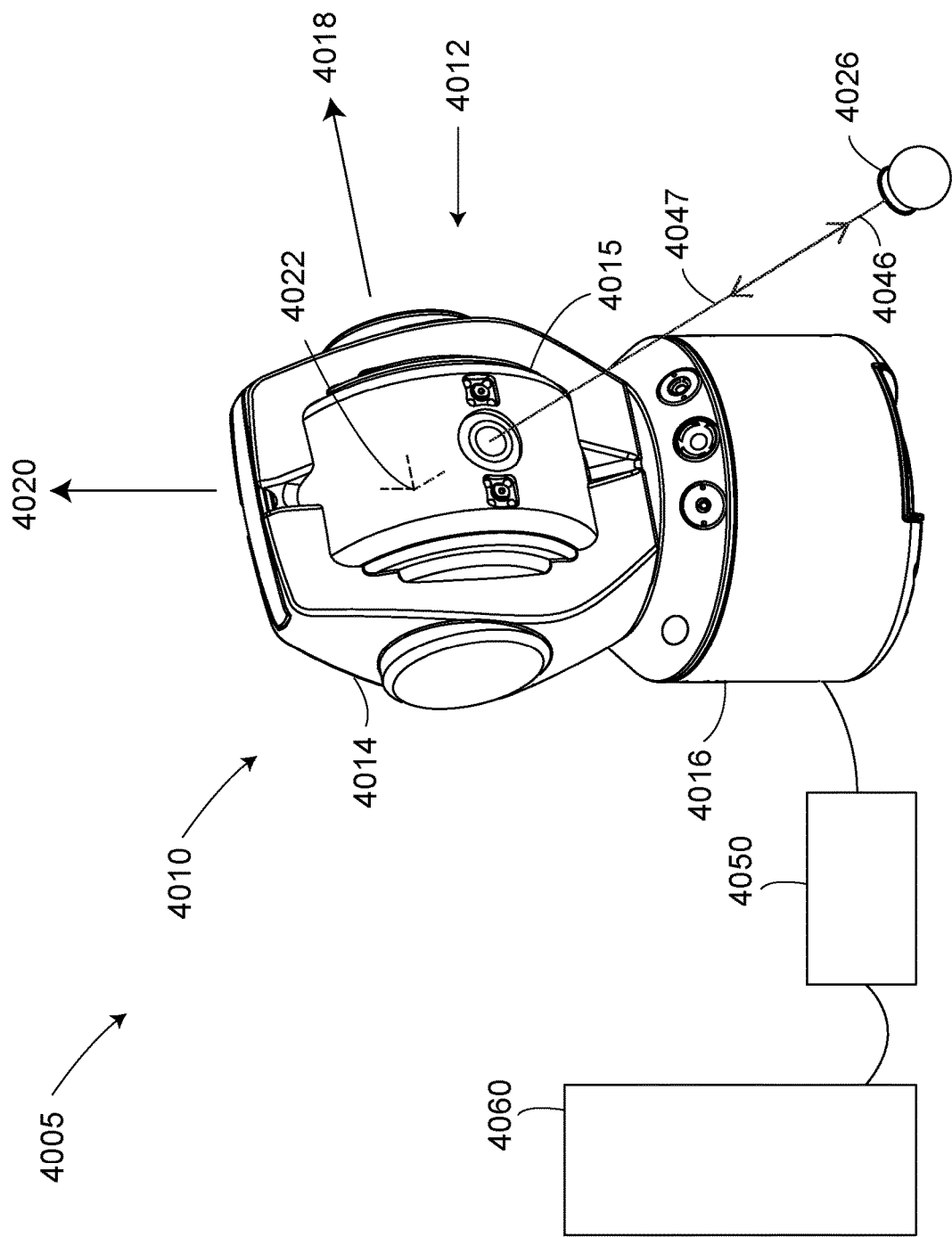
FIG. 6B is an isometric view of a laser tracker according to an embodiment.

An exemplary laser tracker system 4005 illustrated in FIG. 6B includes a laser tracker 4010, a retroreflector target 4026, an optional auxiliary unit processor 4050, and an optional auxiliary computer 4060. An exemplary gimbaled beam-steering mechanism 4012 of laser tracker 4010 comprises a zenith carriage 4014 mounted on an azimuth base 4016 and rotated about an azimuth axis 4020. A payload 4015 is mounted on the zenith carriage 4014 and rotated about a zenith axis 4018. Zenith axis 4018 and azimuth axis 4020 intersect orthogonally, internally to tracker 4010, at gimbal point 4022, which is typically the origin for distance measurements. A laser beam 4046 virtually passes through the gimbal point 4022 and is pointed orthogonal to zenith axis 4018. In other words, laser beam 4046 lies in a plane approximately perpendicular to the zenith axis 4018 and that passes through the azimuth axis 4020. Outgoing laser beam 4046 is pointed in the desired direction by rotation of payload 4015 about zenith axis 4018 and by rotation of zenith carriage 4014 about azimuth axis 4020. A zenith angular encoder, internal to the tracker, is attached to a zenith mechanical axis aligned to the zenith axis 4018. An azimuth angular encoder, internal to the tracker, is attached to an azimuth mechanical axis aligned to the azimuth axis 4020. The zenith and azimuth angular encoders measure the zenith and azimuth angles of rotation to relatively high accuracy. Outgoing laser beam 4046 travels to the retroreflector target 4026, which might be, for example, a spherically mounted retroreflector (SMR) as described above. By measuring the radial distance between gimbal point 4022 and retroreflector 4026, the rotation angle about the zenith axis 4018, and the rotation angle about the azimuth axis 4020, the position of retroreflector 4026 is found within the spherical coordinate system of the tracker.

Outgoing laser beam 4046 may include one or more laser wavelengths, as described hereinafter. For the sake of clarity and simplicity, a steering mechanism of the sort shown in FIG. 6B is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Several laser trackers are available or have been proposed for measuring six, rather than the ordinary three, degrees of freedom. Exemplary six degree-of-freedom (six-DOF) systems are described by U.S. Pat. No. 7,800,758 ('758) to Bridges et al., U.S. Pat. No. 8,525,983 ('983) to Bridges et al., U.S. Pat. No. 6,166,809 ('809) to Pettersen et al., and U.S. Patent Application No. 2010/0149525 ('525) to Lau, the contents all of which are incorporated by reference. Six-DOF systems provide measurements of three orientational degrees-of-freedom as well as three positional degrees-of-freedom (i.e., x, y, z).

FIG. 6A shows an embodiment of a six-DOF scanner 2500 used in conjunction with a six-DOF laser tracker 900. The six-DOF laser tracker 900 sends a beam of light 784 to a retroreflector 2510, 2511 on the six-DOF scanner 2500. The six-DOF tracker 900 measures the distance from the tracker 900 to scanner 2500 with a distance meter (not shown) in the tracker, and it measures two angles from the tracker 900 to the six-DOF scanner 2500 using two angle transducers such as angular encoders (not shown). The six-DOF scanner 2500 includes a body 2514, one or more retroreflectors 2510, 2511 a scanner camera 2530, a scanner light projector 2520, an optional electrical cable 2546, an optional battery 2444, an antenna 2548, and electronics circuit board 2542. The antenna 2548 if present provides wireless communication between the six-DOF scanner 2500 and other computing devices such as the laser tracker 900 and external computers. The scanner projector 2520 and the scanner camera 2530 together are used to measure the three dimensional coordinates of a workpiece 2528. The camera 2530 includes a camera lens system 2532 and a photosensitive array 2534. The photosensitive array 2534 may be a CCD or CMOS array, for example. The scanner projector 2520 includes a projector lens system 2523 and a source pattern of light 2524. The source pattern of light may emit a point of light, a line of light, or a structured (two dimensional) pattern of light. If the scanner light source emits a point of light, the point may be scanned, for example, with a moving mirror, to produce a line or an array of lines. If the scanner light source emits a line of light, the line may be scanned, for example, with a moving mirror, to produce an array of lines. In an embodiment, the source pattern of light might be an LED, laser, or other light source reflected off a digital micromirror device (DMD) such as a digital light projector (DLP) from Texas Instruments, an liquid crystal device (LCD) or liquid crystal on silicon (LCOS) device, or it may be a similar device used in transmission mode rather than reflection mode. The source pattern of light might also be a slide pattern, for example, a chrome-on-glass slide, which might have a single pattern or multiple patterns, the slides moved in and out of position as needed. Additional retroreflectors, such as retroreflector 2511, may be added to the first retroreflector 2510 to enable the laser tracker to track the six-DOF scanner from a variety of directions, thereby giving greater flexibility in the directions to which light may be projected by the six-DOF projector 2500.

The three dimensional coordinates of the workpiece 2528 is measured by the scanner camera 2530 by using the principles of triangulation. There are several ways that the triangulation measurement may be implemented, depending on the pattern of light emitted by the scanner light source 2520 and the type of photosensitive array 2534. For example, if the pattern of light emitted by the scanner light source 2520 is a line of light or a point of light scanned into the shape of a line and if the photosensitive array 2534 is a two dimensional array, then one dimension of the two dimensional array 2534 corresponds to a direction of a point 2526 on the surface of the workpiece 2528. The other dimension of the two dimensional array 2534 corresponds to the distance of the point 2526 from the scanner light source 2520. Hence the three dimensional coordinates of each point 2526 along the line of light emitted by scanner light source 2520 is known relative to the local frame of reference of the six-DOF scanner 2500. The six degrees of freedom of the six-DOF scanner are known by the six-DOF laser tracker using the methods described in patent '758. From the six degrees of freedom, the three dimensional coordinates of the scanned line of light may be found in the tracker frame of reference, which in turn may be converted into the frame of reference of the workpiece 2528 through the measurement by the laser tracker of three points on the workpiece, for example.

If the six-DOF scanner 2500 is moved by the end effector 205 of the mobile measurement platform 200, a line of laser light emitted by the scanner light source 2520 may be moved in such a way as to "paint" the surface of the workpiece 2528, thereby obtaining the three dimensional coordinates for the entire surface. It is also possible to "paint" the surface of a workpiece using a scanner light source 2520 that emits a structured pattern of light. Alternatively, when using a scanner 2500 that emits a structured pattern of light, more accurate measurements may be made by mounting the six-DOF scanner on a tripod or instrument stand. The structured light pattern emitted by the scanner light source 2520 might, for example, include a pattern of fringes, each fringe having an irradiance that varies sinusoidally over the surface of the workpiece 2528. In an embodiment, the sinusoids are shifted by three or more phase values. The amplitude level recorded by each pixel of the camera 2530 for each of the three or more phase values is used to provide the position of each pixel on the sinusoid. This information is used to help determine the three dimensional coordinates of each point 2526. In another embodiment, the structured light may be in the form of a coded pattern that may be evaluated to determine three-dimensional coordinates based on single, rather than multiple, image frames collected by the camera 2530. Use of a coded pattern may enable relatively accurate measurements while the six-DOF scanner 2500 is moved by hand at a reasonable speed.

In some cases, it is advantageous to measure the features such as edges or holes using an optional tactile probe 2550 attached to the six-DOF scanner 2500. The tactile probe 2550 in FIG. 6A includes such as a probe tip 2554, which is part of a probe extension assembly 2550. In an embodiment, the projector 2520 sends a laser beam to illuminate the region to be measured.

As explained herein above, the laser tracker 900 measures a distance and two angles to determine three positional degrees-of-freedom (x, y, z) of the six-DOF scanner 2500. There are many possible methods of determining the three orientational degrees-of-freedom of the six-DOF scanner 2500. These methods are described in more detail herein below.

Figure 7A:
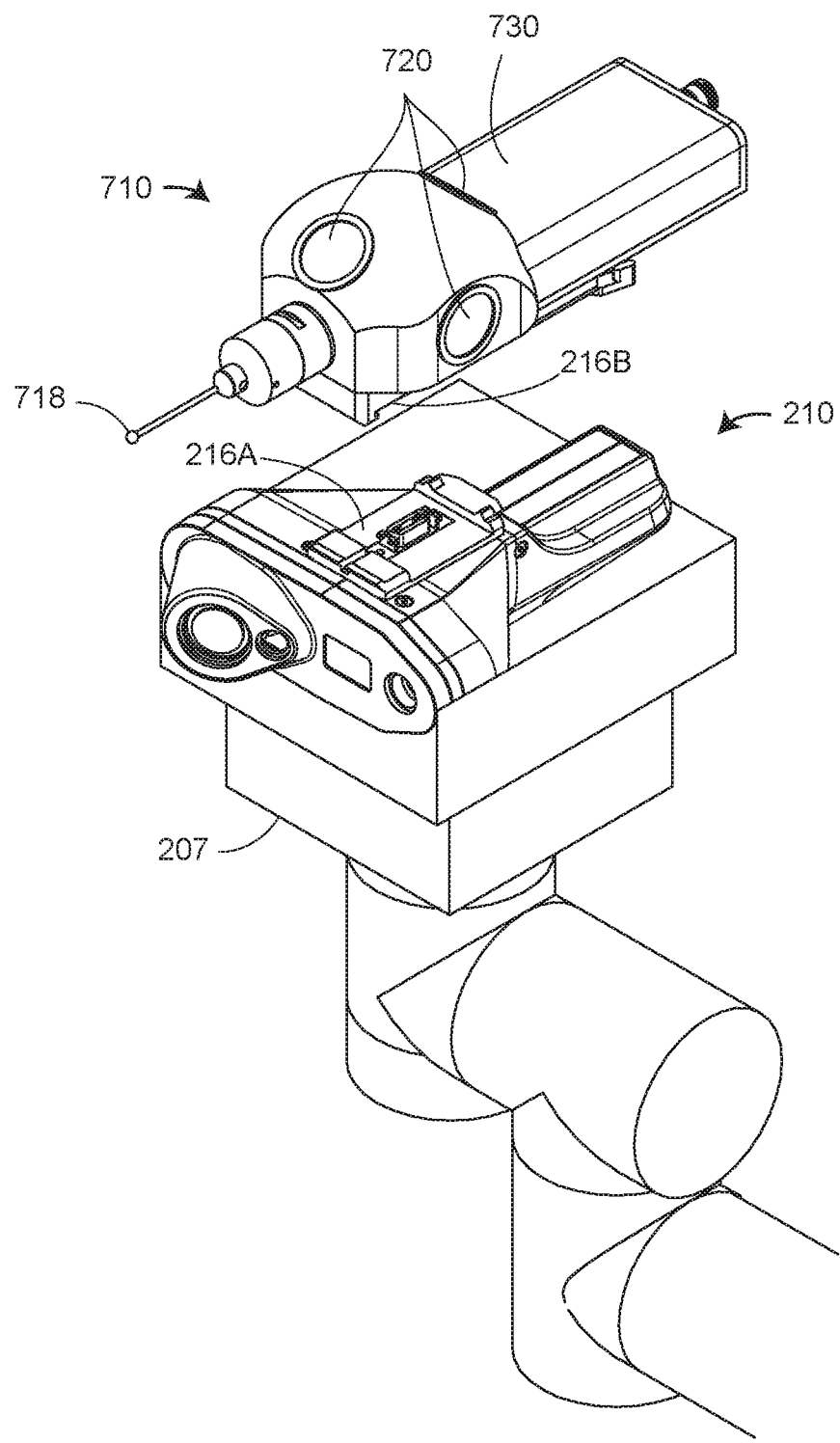
FIG. 7A is an isometric exploded view of triangulation scanner and six-DOF tracker target assembly on a robotic articulated arm according to an embodiment.
Figure 7B:
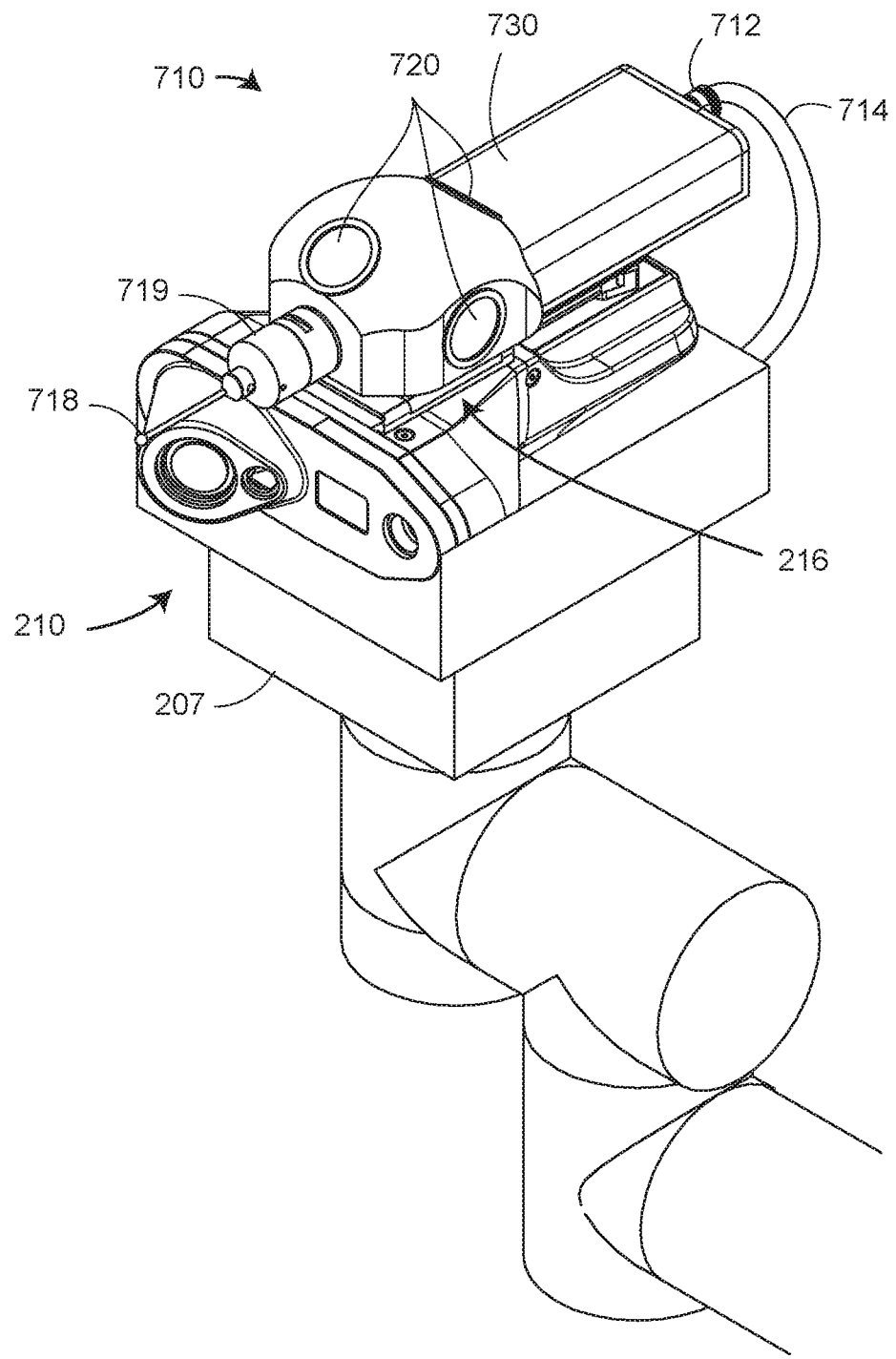
FIG. 7B is an isometric view of a triangulation scanner and a six-DOF tracker target assembly according to an embodiment.

FIGS. 7A and 7B are isometric exploded and isometric views, respectively, of a detachable six-DOF tracker target assembly 710 coupled to a triangulation scanner 210. FIG. 7A is an isometric view of the detachable six-DOF tracker target assembly 710 configured for coupling to the triangulation scanner 210. Coupling is made through the mechanical and electrical interface 216. The electrical interface 216 includes two parts, a first part 216A, which in this case is an upper scanner connector 216A, and a second part 216B, which in this case is a lower six-DOF tracker assembly connector 216B. The first part and the second part couple together to hold the scanner 210 in fixed position and orientation relative to the six-DOF tracker target assembly 710.

The six-DOF tracker target assembly 710 cooperates with a laser tracker 4010 to determine six degrees of freedom of the assembly 710. The six degrees of freedom include three translational degrees of freedom (e.g., x, y, z), which the tracker determines as explained herein above with reference to FIG. 6B. The tracker also determines three orientational degrees of freedom (e.g., pitch, roll, and yaw angles) through cooperative action with the six-DOF tracker target assembly 710. Such a six-DOF tracker target assembly may any of a variety of types, for example, as described in the patents '758, '983, '809, and patent application '525, all which are incorporated by reference herein above. By measuring the six degrees of freedom of the connected six-DOF accessory 710 and scanner 210, the tracker can track the position and orientation of the scanner 210 relative to the object, thereby enabling relatively simple and accurate registration of multiple line scans or area scans. In an embodiment, a probe tip 718 is attached to a probe coupler 719. The tracker determines the 3D coordinates of the probe tip 718 based on the measured six degrees of freedom.

In an embodiment, the laser tracker 4010 cooperates with the six-DOF tracker target assembly 710 and a processor to determine the six degrees of freedom of the six-DOF tracker target assembly 710. In an embodiment, the laser tracker 4010 sends a beam of light to a six-DOF target 710, which may include a retroreflector target that in an embodiment is a cube-corner retroreflector. A collection of multiple six-DOF targets 720 may be provided to permit convenient viewing of the six-DOF targets from a wide range of angles. A first portion of the light returning from the retroreflector travels to a distance meter in the laser tracker 4010 to determine a distance from the tracker to the retroreflector and a second portion of the light travels to a tracker position detector that generates an electrical position signal indicating the position of the beam of light on the retroreflector. In one mode of operation, the position detector provides the electrical signal to a control system that includes motors to steer the beam of light to keep it centered on the retroreflector, thereby enabling tracking of the retroreflector as it is moved. In addition, as explained herein above, the tracker uses angular transducers such as angular encoders to provide two angles that specify the direction of the laser beam. With these two angles and the distance provided by the distance meter, the three translational degrees of freedom are obtained for the six-DOF tracker target assembly 710. Signals from the six-DOF targets may be sent to an electrical unit 730 for processing and synchronization of data. In an embodiment, electrical signals are sent to or from the electrical processing unit 730 to electronics box 707 through connector 712 and cable 714.

As explained herein above, many methods are possible for determining the three orientational degrees of freedom, for example, as taught in the patents '758, '983, '809, and patent application '525. These disclose methods that include (1) measuring the position of multiple light sources on a tracker six-DOF target with a camera on the laser tracker to determine the three orientational degrees of freedom; (2) measuring lines marked on a cube-corner retroreflector to determine the three orientational degrees of freedom; and (3) measuring light passing through an opening in a cube-corner retroreflector to determine pitch and yaw angles and measuring angle of inclination to determine roll angle. Many other methods of measuring three orientational degrees of freedom are possible, and any method of measuring three orientational degrees of freedom may be used with the six-DOF tracker target assembly 710.

A preliminary step in the methods described below is to obtain a common frame of reference for the scanner 210 and six-DOF tracker target assembly 710. Such a preliminary step may be carried out at the manufacturer's factory or by the operator by performing procedures prescribed by the manufacturer. The common frame of reference can be obtained, for example, by viewing common features with the scanner 210 and camera assembly 710, and then performing a least-squares optimization procedure to match the observed features. Such methods are well known in the art and are not discussed further.

In an embodiment, the six-DOF tracker target assembly 710 further includes a tactile probe 718, which connects to the collection of six-DOF targets 720 through an interface unit 719. The interface unit may provide convenient attaching and detaching of different tactile probes 718. It may also provide electrical functionality needed to special types of probes such as a "touch probe" that takes a measurement as soon as the probe touches an object.

Figure 7C:
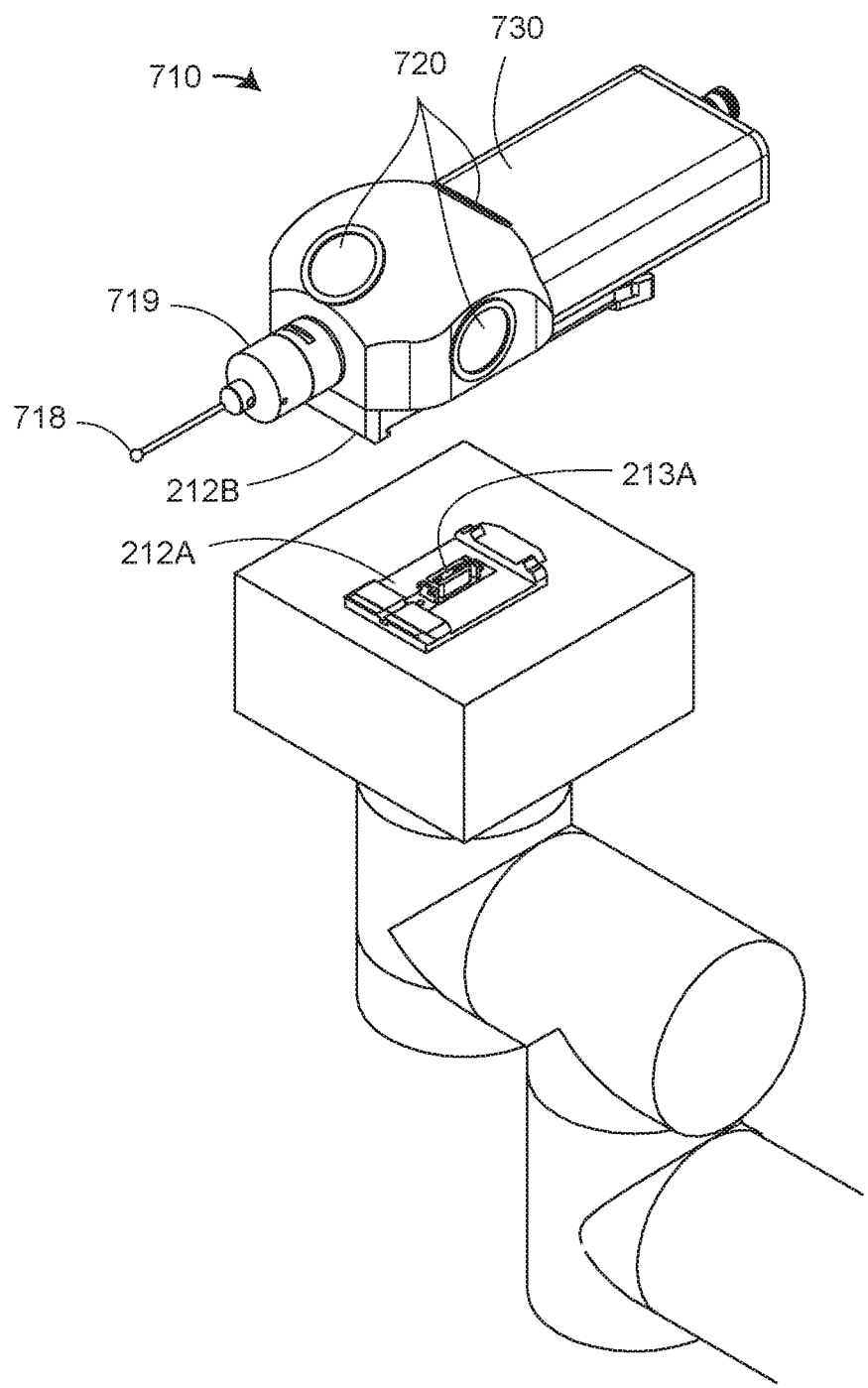
FIG. 7C is an isometric exploded view of an electronics box on an end effector and a six-DOF tracker target assembly according to an embodiment.
Figure 7D:
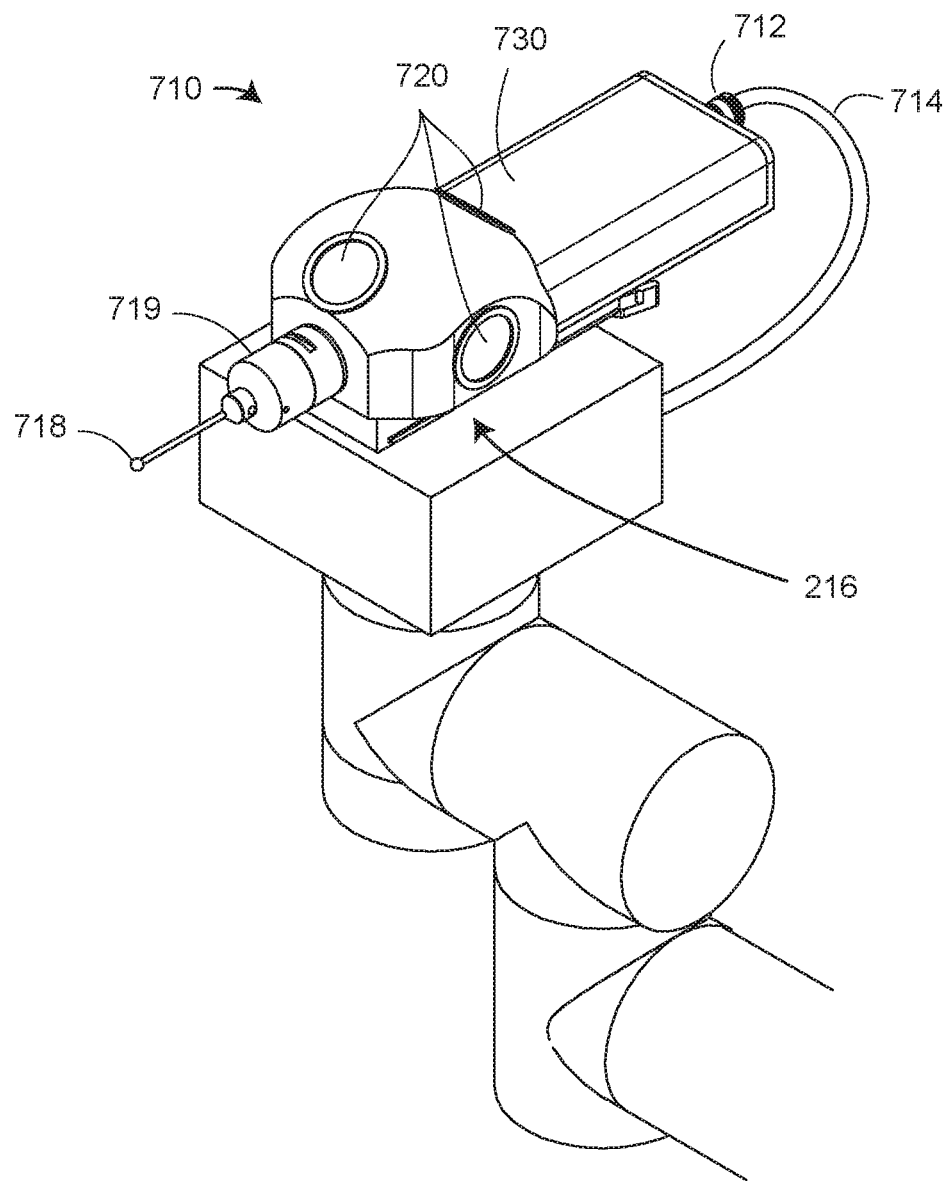
FIG. 7D is an isometric view of an electronics box on an end effector and a six-DOF tracker target assembly according to an embodiment.

In an embodiment, the triangulation scanner 210 is removed and the six-DOF tracker target assembly 710 attached directly to the electronics box 207 or directly to a mechanical coupler on the final joint of the robotic articulated arm 150. This arrangement is illustrated in FIGS. 7C and 7D.

Figure 8A:
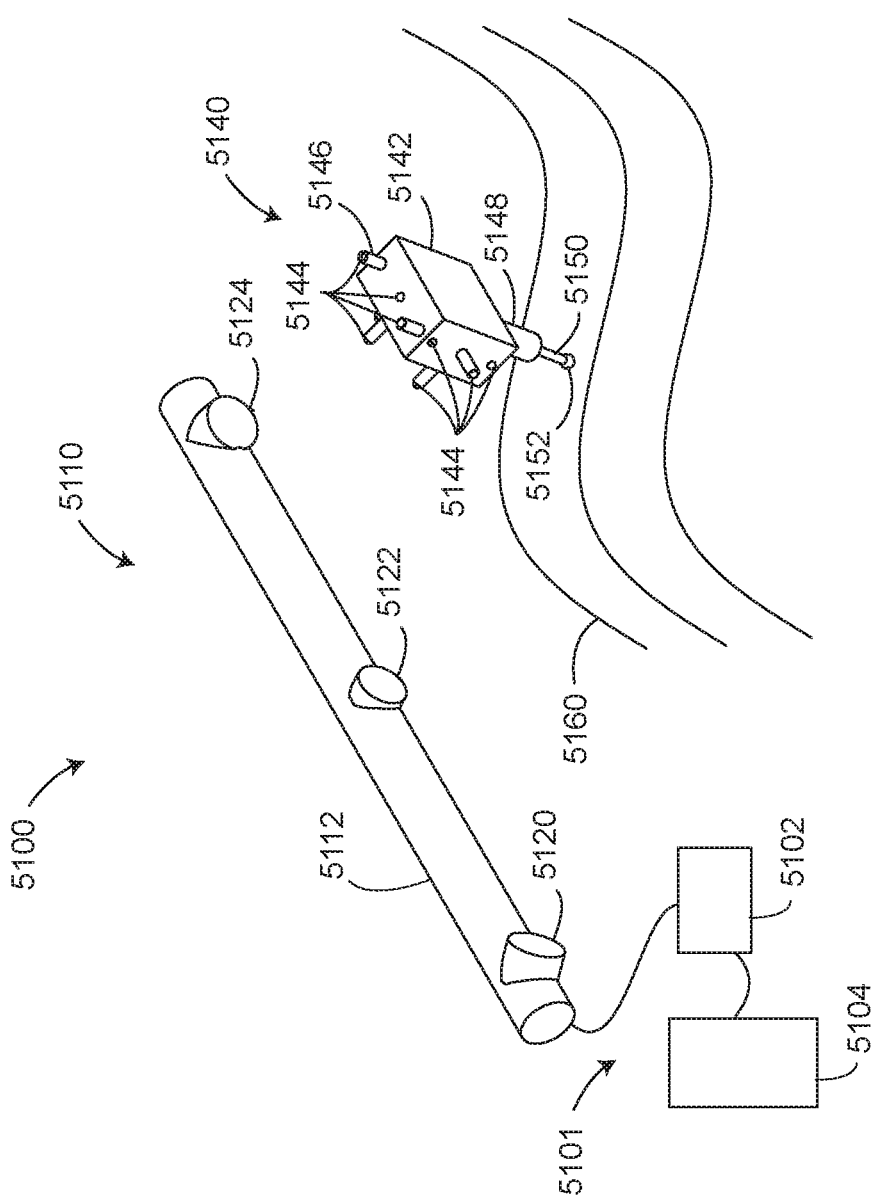
FIG. 8A shows a camera bar used to measure a tactile probe having targets viewable by the camera bar according to an embodiment.

FIG. 8A is a perspective view of a three-dimensional tactile probing system 5100 that includes a camera bar 5110 and a probe assembly 5140. The camera bar includes a mounting structure 5112 and at least two triangulation cameras 5120, 5124. It may also include an optional camera 5122. The cameras each include a lens and a photosensitive array, for example, as shown in the lens 2564 of FIG. 5A. The optional camera 5122 may be similar to the cameras 5120, 5124 or it may be a color camera. The probe assembly 5140 includes a housing 5142, a collection of lights 5144, optional pedestals 5146, shaft 5148, stylus 5150, and probe tip 5152. The position of the lights 5144 are known relative to the probe tip 5152. The lights may be light sources such as light emitting diodes or they might be reflective spots that may be illuminated by an external source of light. Factory or on-site compensation procedures may be used to find these positions. The shaft may be used to provide a handle for the operator, or an alternative handle may be provided.

Triangulation of the image data collected by the cameras 5120, 5124 of the camera bar 5110 are used to find the three-dimensional coordinates of each point of light 5144 within the frame of reference of the camera bar. Throughout this document, and in the claims, the term "frame of reference" is taken to be synonymous with the term "coordinate system." Mathematical calculations, which are well known in the art, are used to find the position of the probe tip within the frame of reference of the camera bar. By bringing the probe tip 5152 into contact with an object 5160, surface points on the object can be measured.

An electrical system 5101 may include an electrical circuit board 5102 and an external computer 5104. The external computer 5104 may comprise a network of computers. The electrical system 5101 may include wired and wireless portions, either internal or external to the components of FIG. 8A that carry out the measurements and calculations required to obtain three-dimensional coordinates of points on the surface. In general, the electrical system 5101 will include one or more processors, which may be computers, microprocessors, field programmable gate arrays (FPGAs), or digital signal processing (DSP) units, for example.

Figure 8B:
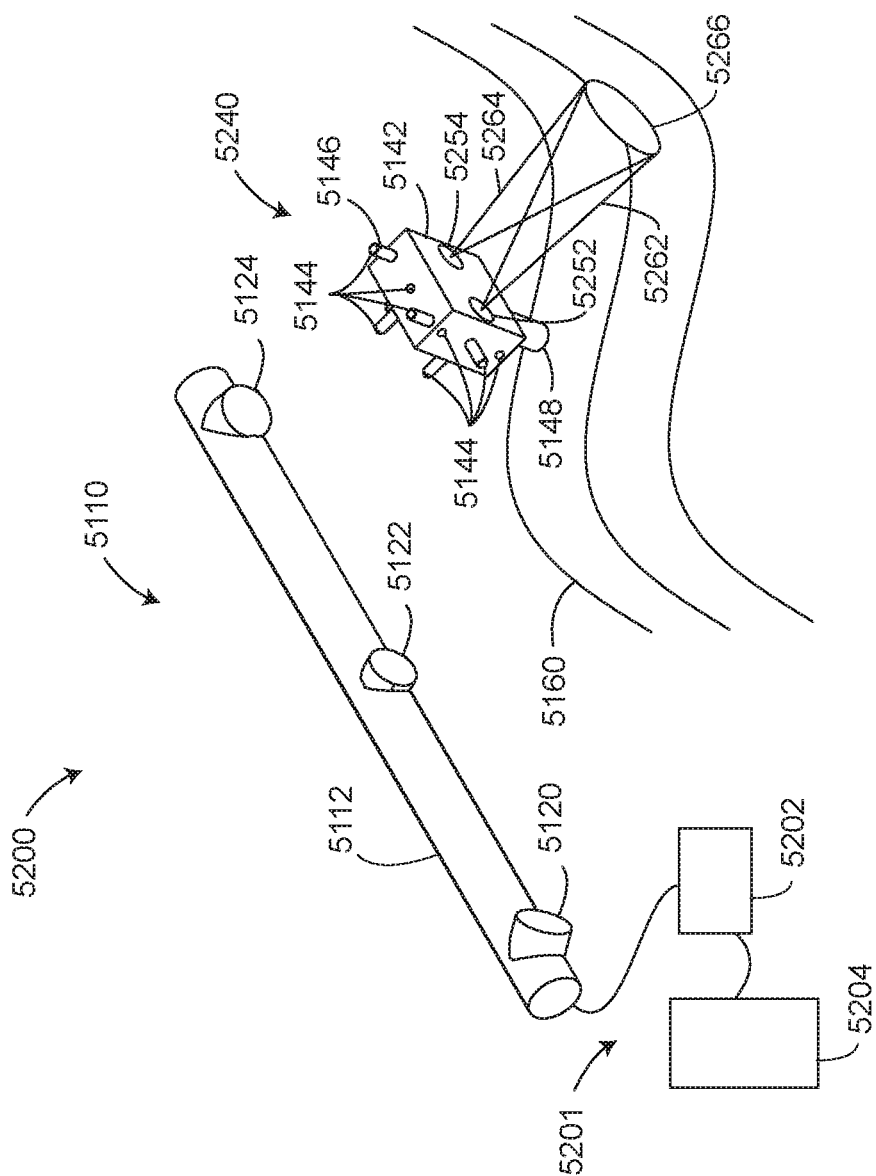
FIG. 8B shows a camera bar used to measure a triangulation area scanner having targets viewable by the camera bar according to an embodiment.

FIG. 8B is a perspective view of a three-dimensional area scanning system 5200 that includes a camera bar 5110 and a scanner assembly 5240. The camera bar was described herein above in reference to FIG. 8A. The scanner assembly 5240 includes a housing 5142, a collection of lights 5144, optional pedestals 5146, shaft 5148, projector 5252, and camera 5254. The characteristics of the housing 5142, lights 5144, optional pedestals 5146, and shaft 5148 were described hereinabove in reference to FIG. 8A. The projector 5252 projects light onto the object 5160. The projector 5252 may be a variety of types, for example, LED, laser, or other light source reflected off a digital micromirror device (DMD) such as a digital light projector (DLP) from Texas Instruments, a liquid crystal device (LCD) or liquid crystal on silicon (LCOS) device. The projected light might come from light sent through a slide pattern, for example, a chrome-on-glass slide, which might have a single pattern or multiple patterns, the slides moved in and out of position as needed. The projector 5252 projects light 5262 into an area 5266 on the object 5160. A portion of the illuminated area 5266 is imaged by the camera 5254 to obtain digital data.

The digital data may be partially processed using electrical circuitry within the scanner assembly 5240. The partially processed data may be provided to an electrical system 5201 that includes an electrical circuit board 5202 and an external computer 5204. The external computer 5204 may comprise a network of computers. The electrical system 5201 may include wired and wireless portions, either internal or external to the components of FIG. 8B, that carry out the measurements and calculations required to obtain three-dimensional coordinates of points on the surface 5160. In general, the electrical system 5201 will include one or more processors, which may be computers, microprocessors, field programmable gate arrays (FPGAs), or digital signal processing (DSP) units, for example. The result of the calculations is a set of coordinates in the camera bar frame of reference, which may in turn be converted into another frame of reference, if desired.

Figure 8C:
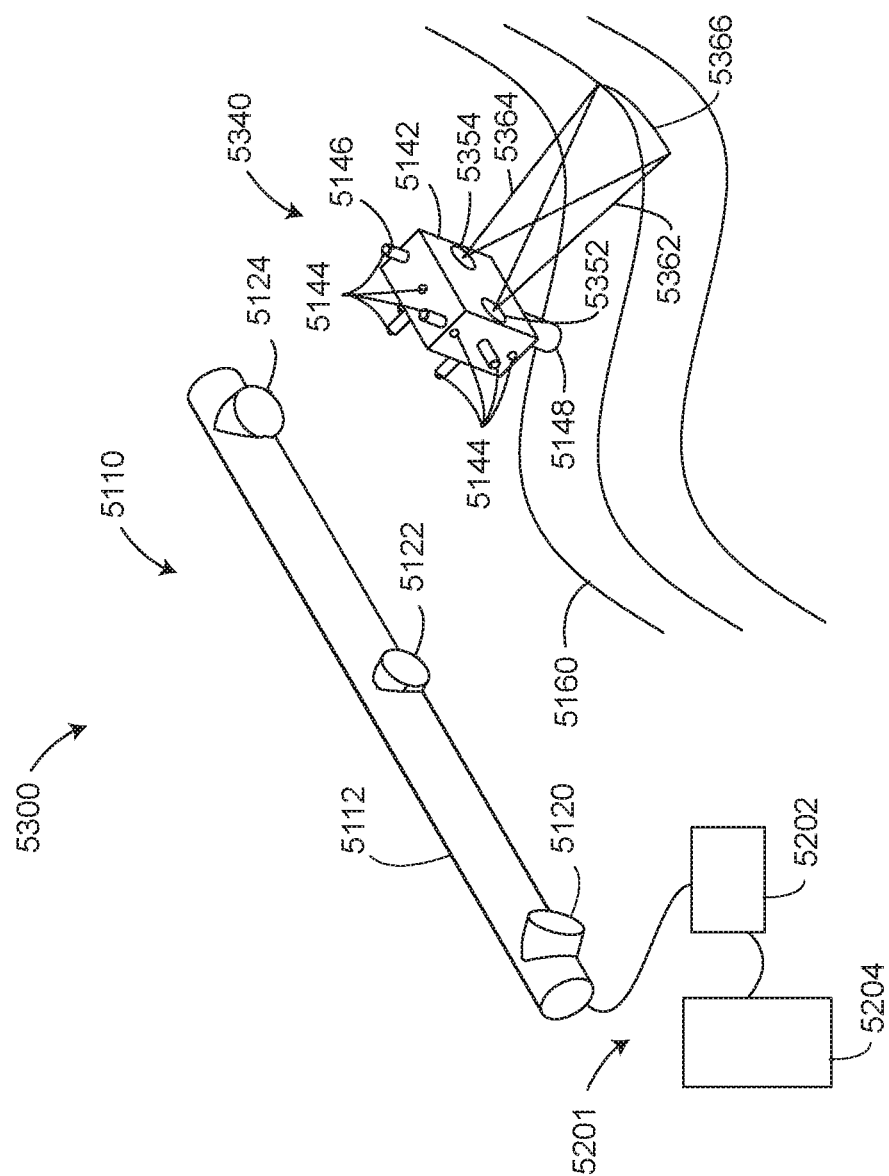
FIG. 8C shows a camera bar used to measure a triangulation line scanner having targets viewable by the camera bar according to an embodiment.

FIG. 8C is a perspective view of a three-dimensional line scanning system 5300 that includes a camera bar 5110 and a scanner assembly 5340. The camera bar was described hereinabove in reference to FIG. 8A. The scanner assembly 5340 includes a housing 5142, a collection of lights 5144, optional pedestals 5146, shaft 5148, projector 5352, and camera 5354. The characteristics of the housing 5142, lights 5144, optional pedestals 5146, and shaft 5148 were described hereinabove in reference to FIG. 8A. The projector 5352 projects light onto the object 5160. The projector 5352 may be a source of light that produces a stripe of light, for example, a laser that is sent through a cylinder lens or a Powell lens, or it may be a DLP or similar device also having the ability to project 2D patterns, as discussed hereinabove in reference to FIG. 8B. The projector 5352 projects light 5362 in a stripe 5366 onto the object 5160. A portion of the stripe pattern on the object is imaged by the camera 5354 to obtain digital data. The digital data may be processed in a manner similar to that described in reference to FIG. 8B using for example electrical components 5201. The result of the calculations is a set of three-dimensional coordinates of the object surface in the camera-bar frame of reference, which may in turn be converted into another frame of reference, if desired.

Figure 9:
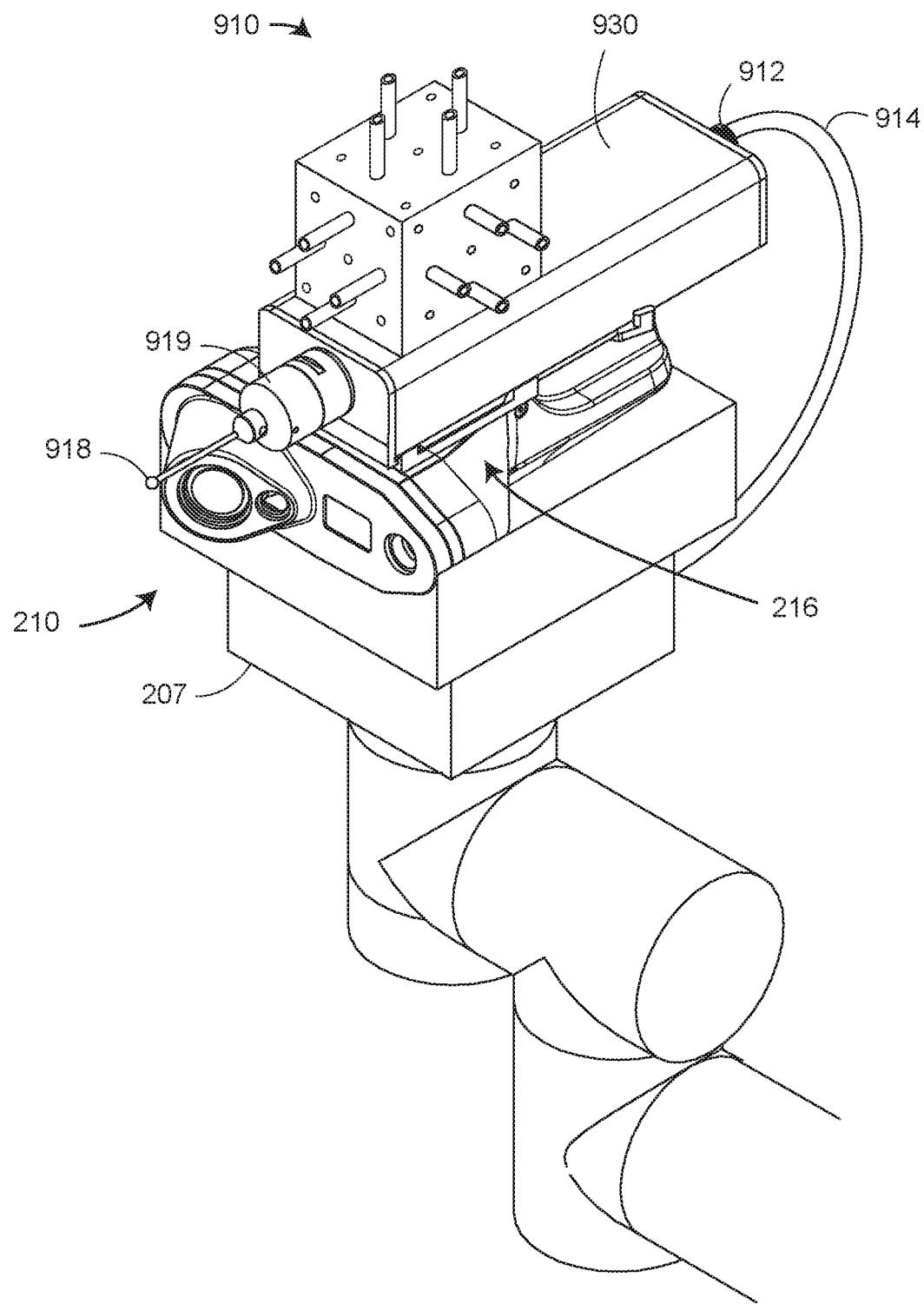
FIG. 9 is an isometric view of a triangulation scanner and a six-DOF light-point target assembly on an end effector according to an embodiment.

FIG. 9 is an isometric view of a detachable six-DOF target assembly 910 coupled to a handheld triangulation scanner 210. The targets on the six-DOF target assembly 910 may be measured with a camera bar, such as the camera bar 5110 of FIGS. 8A-8C. Alternatively, the targets on the six-DOF target assembly may be measured with two or more cameras separately mounted in an environment, which is to say, not attached to a common bar. A camera bar includes two or more cameras spaced apart by a camera-bar baseline. Triangulation is applied to the images of the targets obtained by the two cameras to determine the six degrees of freedom of the six-DOF target assembly and scanner 210. Additional geometrical information such as camera-bar baseline and orientation of the cameras in the camera bar are used by a processor in the triangulation calculation.

In an embodiment, the six-DOF target assembly 910 includes a collection of light points 920, an electrical enclosure 930, and a tactile probe 918. In an embodiment, the collection of light points 920 include some points 922 mounted directly to the structure 912 and other points of light 924 mounted on pedestals 926. In an embodiment, the points of light 922, 924 are LEDs. In another embodiment, the points of light 922, 924 are reflective spots. In an embodiment, the reflective spots are illuminated by an external source of light. In an embodiment, the points or light are positioned so as to be visible from a wide range of viewing angles relative to the scanner 210.

In an embodiment, the structure 912 sits on an electrical enclosure 930 that provides processing and synchronization of data. In an embodiment, the interface 216 includes a scanner connector 216A and an assembly connector 216B. The connectors 216A and 216B are configured to detachably couple the scanner 210 to the target assembly 910. A processor receives data from the scanner 210 and target assembly 910 to register multiple scans of data to obtain 3D coordinates of points on an object surface.

In an embodiment, the six-DOF target assembly includes a tactile probe 918 which connects to the electrical enclosure 930 through a probe interface 216. The probe interface 216 may provide touch probe or analog probe electronics. A scanner 210 may provide a lot of detailed information quickly, but may provide less information about edges or holes than might be desired. The tactile probe 918 can be used by the operator to obtain this desired information.

Figure 10A:
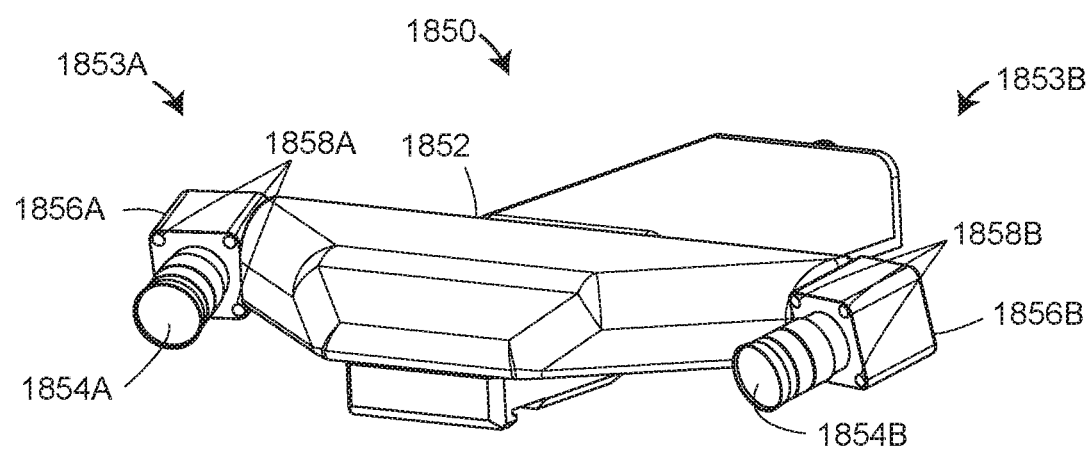
FIG. 10A is an isometric view of a detachable camera assembly configured for coupling to a triangulation scanner according to an embodiment.

FIG. 10A shows a camera assembly 1850 configured for attachment to a triangulation scanner or other 3D measurement device. In an embodiment, the camera assembly 1810 includes at least one camera. In another embodiment, the camera assembly 1850 includes two cameras 1853A, 1853B.

The camera 1853A includes a lens assembly 1854A and an electronics box 1856A that includes a photosensitive array (not shown). The camera 1853B includes a lens assembly 1854B and an electronics box 1856B that includes a photosensitive array. In an embodiment, the cameras 1853A, 1853B have fields-of-view (FOVs) that partially overlap, thereby providing stereo imaging. Such imaging enables determination of 3D coordinates of targets using triangulation methods as described herein above. In some embodiments, the cameras together provide a FOV larger than the camera 508. In other embodiments, the cameras together provide a smaller FOV than the camera 508. In some embodiments, a single wide FOV camera is provided on the assembly 1850. In other cases, several wide FOV, but non-overlapping, cameras are provided on the camera assembly 1850.

If the triangulation scanner 210 is a line scanner, then the 3D coordinates are projected on a line, which is to say that the 3D coordinates are found in the line of light sent from the projector 510 onto an object. If the scanner 210 is an area scanner, then the 3D coordinates are projected in a 2D area on the surface of the object. It is necessary to register the multiple collections of 3D coordinates obtained from individual scans by the scanner 210. In the case of a line scanner 210, the individual scans to be registered are line scans. In the case of an area scanner 210, the individual scans to be registered are area scans.

Methods are now described for using the camera assembly 1350 in combination with the scanner 210 to register multiple scans obtained by the scanner 210, thereby enabling scans to be taken without being tracked by a six-DOF measuring device.

For all of the methods described herein below, a preliminary step is to obtain a common frame of reference for the scanner 210 and camera assembly 1850. Such a preliminary step may be carried out at the manufacturer's factory or by the operator by performing procedures prescribed by the manufacturer. The common frame of reference can be obtained, for example, by viewing common features with the scanner 210 and camera assembly 1850, and then performing a least-squares optimization procedure to match the observed features. Such methods are well known in the art and are not discussed further.

Figure 11A:
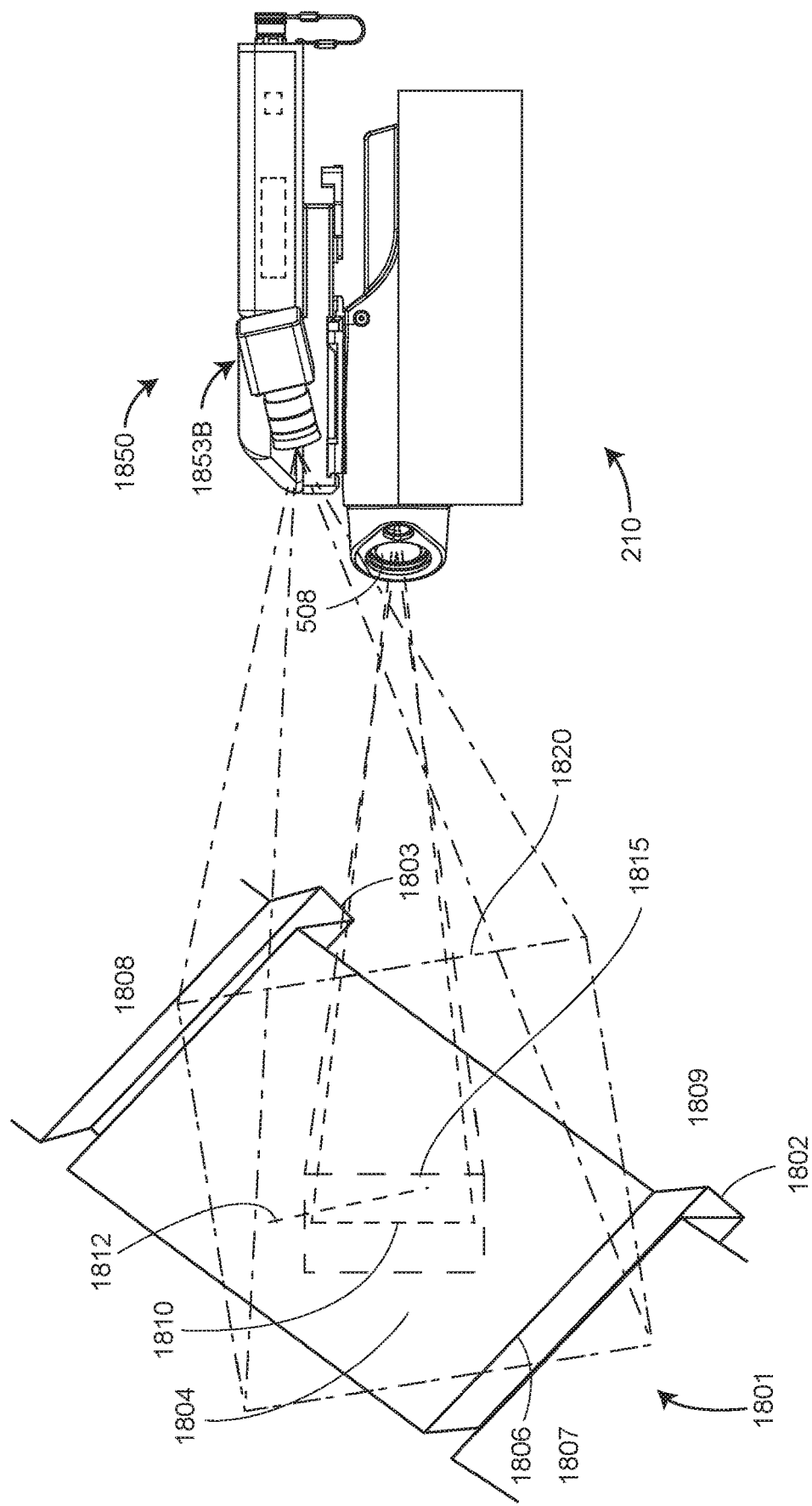
FIGS. 11A-11G illustrate methods of measuring 3D coordinates according to an embodiment.

FIG. 11A illustrates a first method for using the cameras 1853A, 1853B to register multiple 3D coordinates obtained from line scans taken by a line scanner 210, wherein the registration is based on the matching of natural features. In a first instance, a first line of light 1810 is projected by the projector 510 onto an object 1801. In some regions, the object 1801 may include some fine details, as in the features 1802 and 1803, and in other regions, the object 1801 may include large regions 1804 that have few features. The first line of light 1810 is viewed by the 2D image sensor (e.g., photosensitive array) of the camera 508 in a region 1815 of the object imaged by the camera 508. As explained herein above with reference to FIG. 4, the appearance of the first line of light 1810 on the 2D image sensor of the camera 508 provides the information needed for a processor in the system to determine the 3D coordinates of the first line of light on the object 1801, where the 3D coordinates are given in the frame of reference of the scanner 210.

In a second instance, a second line of light 1812 is projected by the projector 510 onto the object 1801. The appearance of the second line of light 1812 on the 2D image sensor of the camera 508 provides the information need for the processor in the scanner 210 to determine the 3D coordinates of the second line of light, again in the frame of reference of the scanner 210. What is needed is a way to register scans in the first instance and the second instance so that the 3D coordinates of the first line of light and the second line of light are put into a common frame of reference.

In a first method of registration, which uses natural features, the cameras 1853A, 1853B image a region 1820 of the object. In the example shown, detailed features 1806, 1807, and 1808 are imaged by the cameras 1853A, 1853B. Using triangulation, a processor in the system use the images of the cameras 1853A, 1853B find the 3D coordinates of these detailed features in the frame of reference of the scanner 210. As explained herein above, such triangulation requires a baseline distance between the camera 1853A and 1853B and the relative orientation of these cameras relative to the baseline. Because the 3D coordinates of the detailed features captured by the cameras 1853A, 1853B cover an area of the object 1801, rather than just a line, it may be possible to match the features in 2D, thereby determining the coordinate transformation required to place the first line of light 1810 and the second line of light 1812 in the same frame of reference. Some natural features such as the point of intersection of three planes 1809 in FIG. 11A have an unambiguous position in 3D space. Such features are relatively easy to match in multiple camera images and hence are particularly useful in registering images based on natural targets.

Figure 10B:
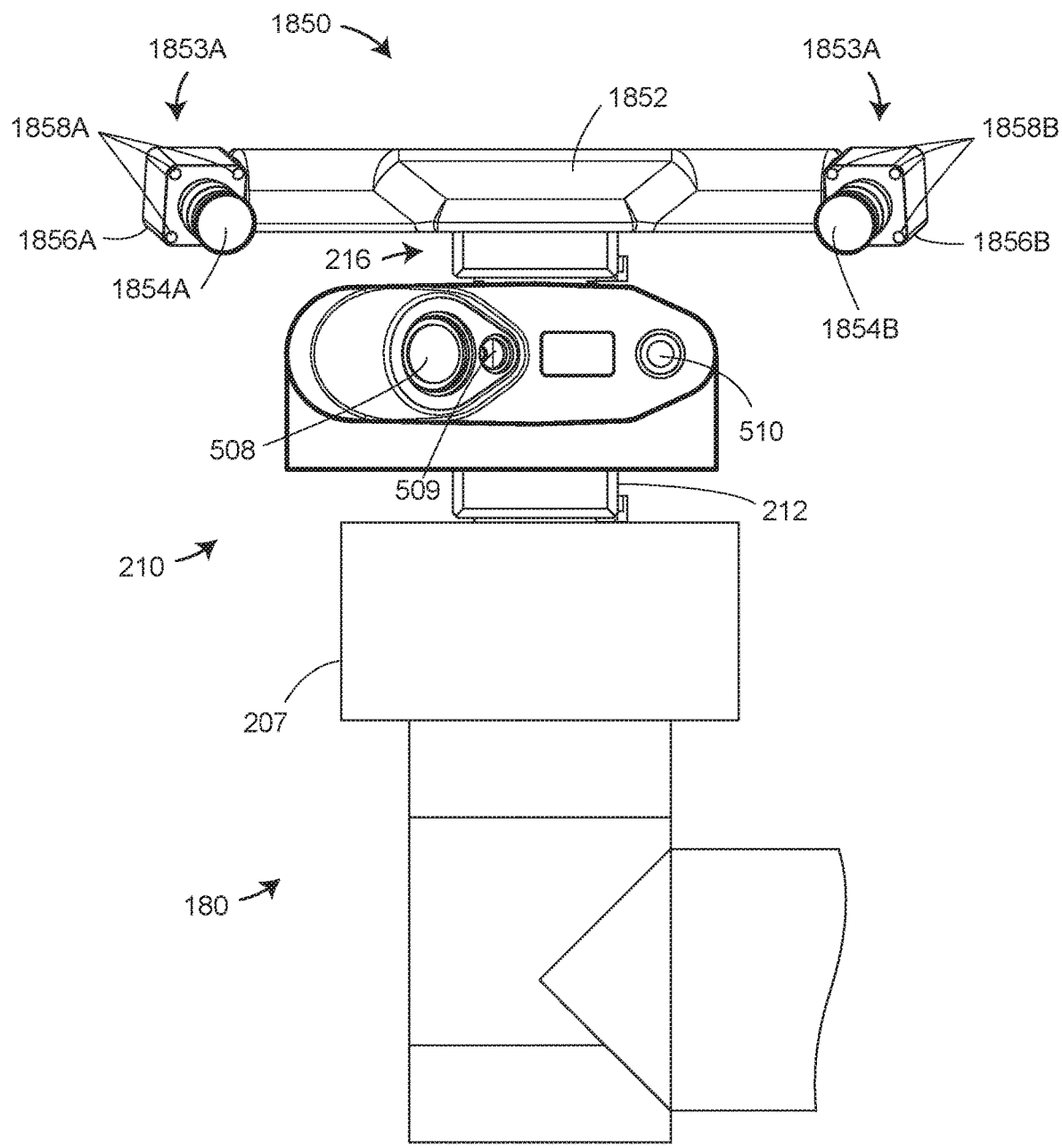
FIG. 10B is a front view of a detachable camera assembly attached to a triangulation scanner according to an embodiment.
Figure 11B:
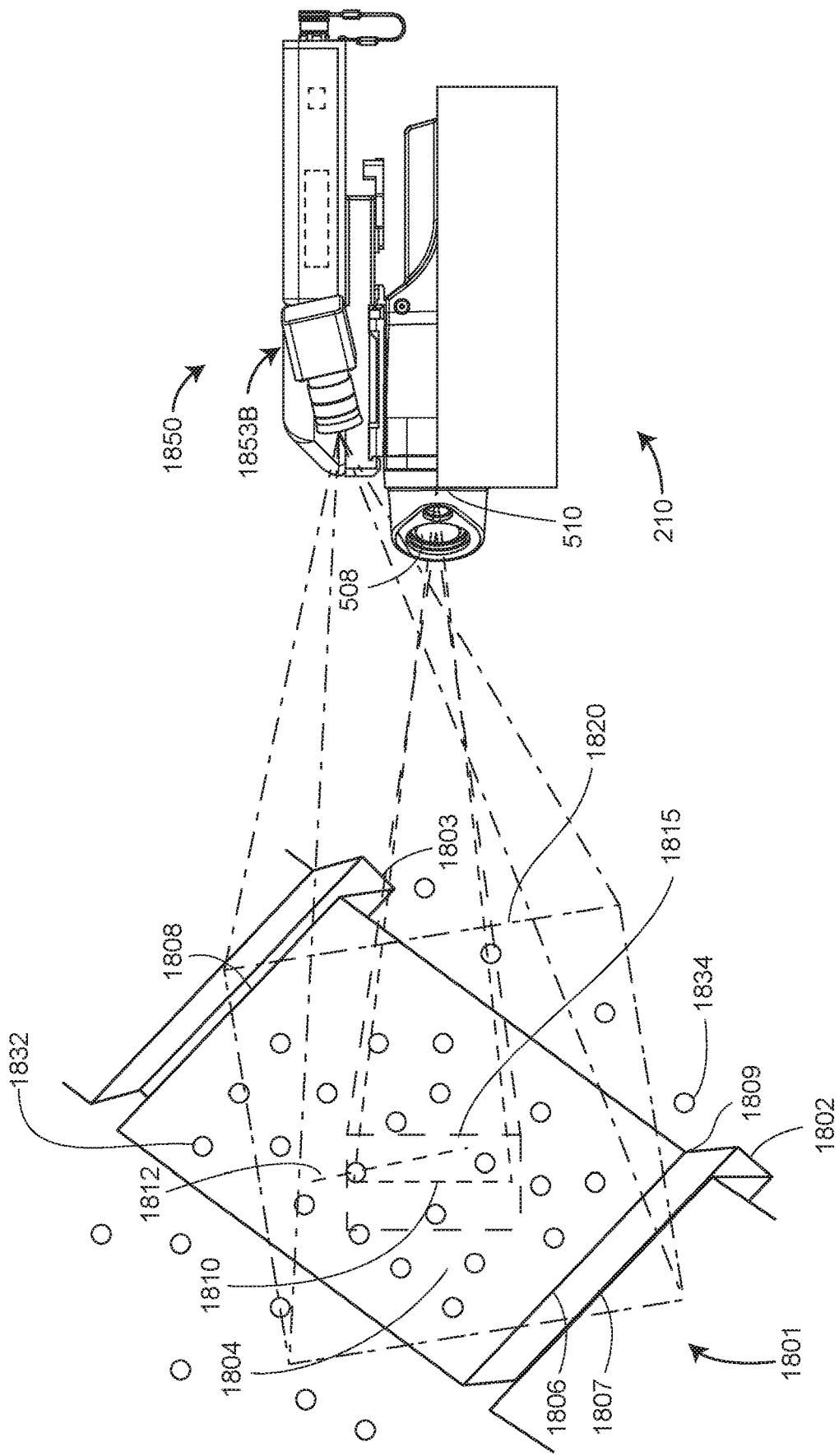

FIG. 11B illustrates a second method for using the cameras 1853A, 1853B to register multiple 3D coordinates obtained from line scans taken by a line scanner 210, wherein the registration is based on the matching of physical targets rather than natural targets. FIG. 11B is the same as FIG. 11B except that FIG. 11B further includes markers 1832 on the object 1801 and/or markers 1834 in the vicinity of the object but not on the object. In an embodiment, the targets are reflective targets, for example, white circular targets sometimes referred to as photogrammetry targets. In an embodiment, such targets are illuminated by light sources 1858A, 1858B in FIGS. 10A and 10B. In other embodiments, the targets 1832, 1834 are illuminated by ambient light sources or by other light sources located off the camera assembly 1850. In an embodiment, the targets 1832, 1834 are themselves light sources, for example, LEDs. In an embodiment, the targets 1832, 1834 are a combination of photogrammetry targets and LEDs.

In a first instance, the projector 510 projects a first line of light 1810 onto the object 1801. In a second instance, the projector 510 projects a second line of light 1812 onto the object 1801. In an embodiment, in each of the first and second instances, the cameras 1853A, 1853B each image three common non-collinear targets, which might be 1832, 1834. These three points enable a processor in the system to place the 3D coordinates obtained from the first and second lines of light in a common frame of reference. This registration procedure is carried out repeatedly as the scanner 210 is moved across the object 1801, thereby enabling the processor to determine 3D coordinates of the surface of the object 1801. In another embodiment, image information provided by physical targets is combined with image information provided by natural targets to register together 3D coordinates from line scans to obtain 3D coordinates over the surface of the object 1801.

Figure 11C:
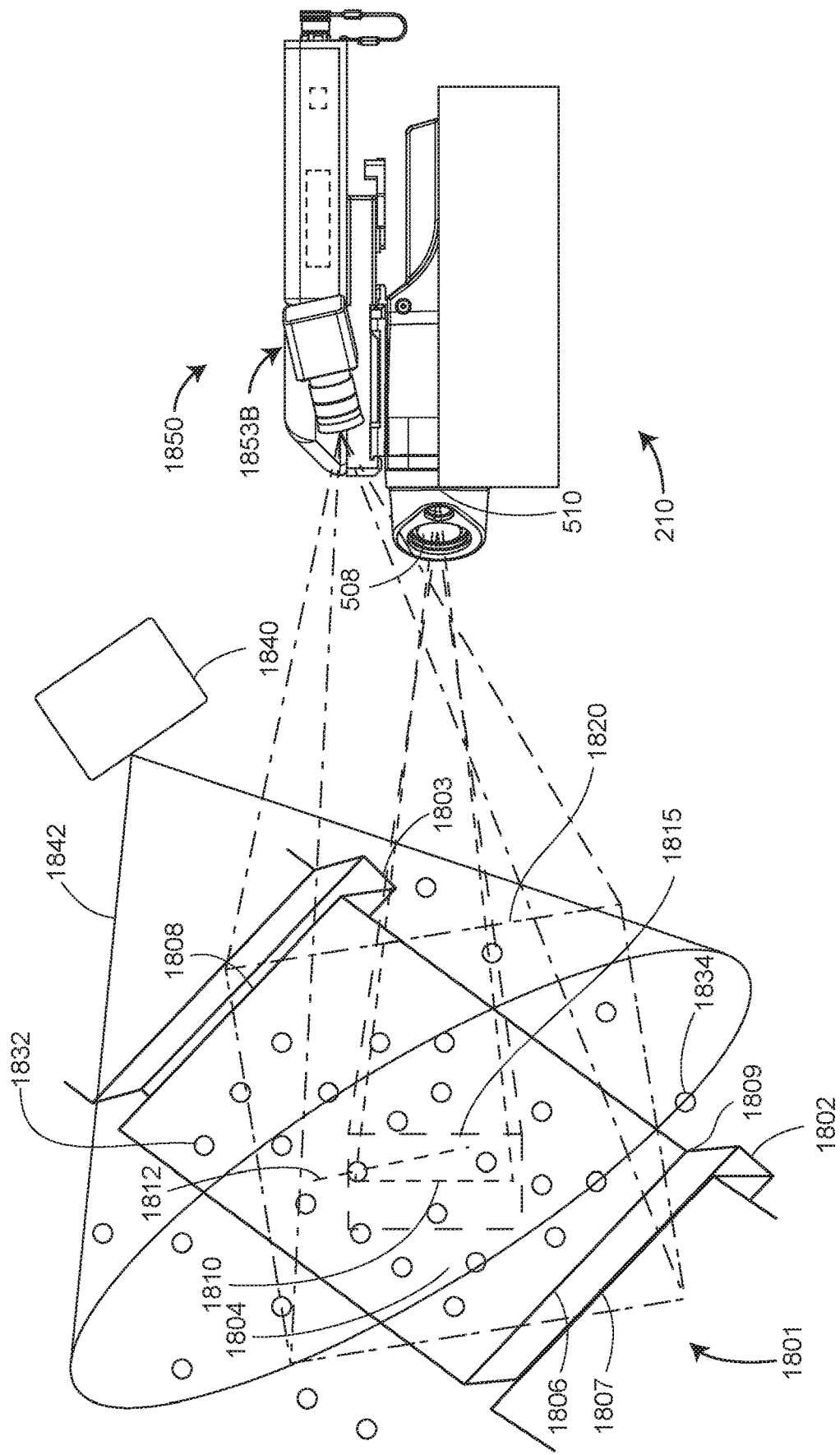

FIG. 11C illustrates a third method for using the cameras 1853A, 1853B to register multiple 3D coordinates obtained from line scans taken by a line scanner 210, wherein the registration is based on the matching of projected spots of light rather than physical targets or natural targets. An external projector 1840 separate from the scanner 210 and camera assembly 1350 projects spots of light 1832 onto the object and/or spots of light 1834 off the object but in the vicinity of the object. The cameras 1853A, 1853B image these spots of light in the same way they imaged the physical targets in FIG. 11B, and the processor determines 3D coordinates of the object surface in the same manner in each case.

Figure 11D:
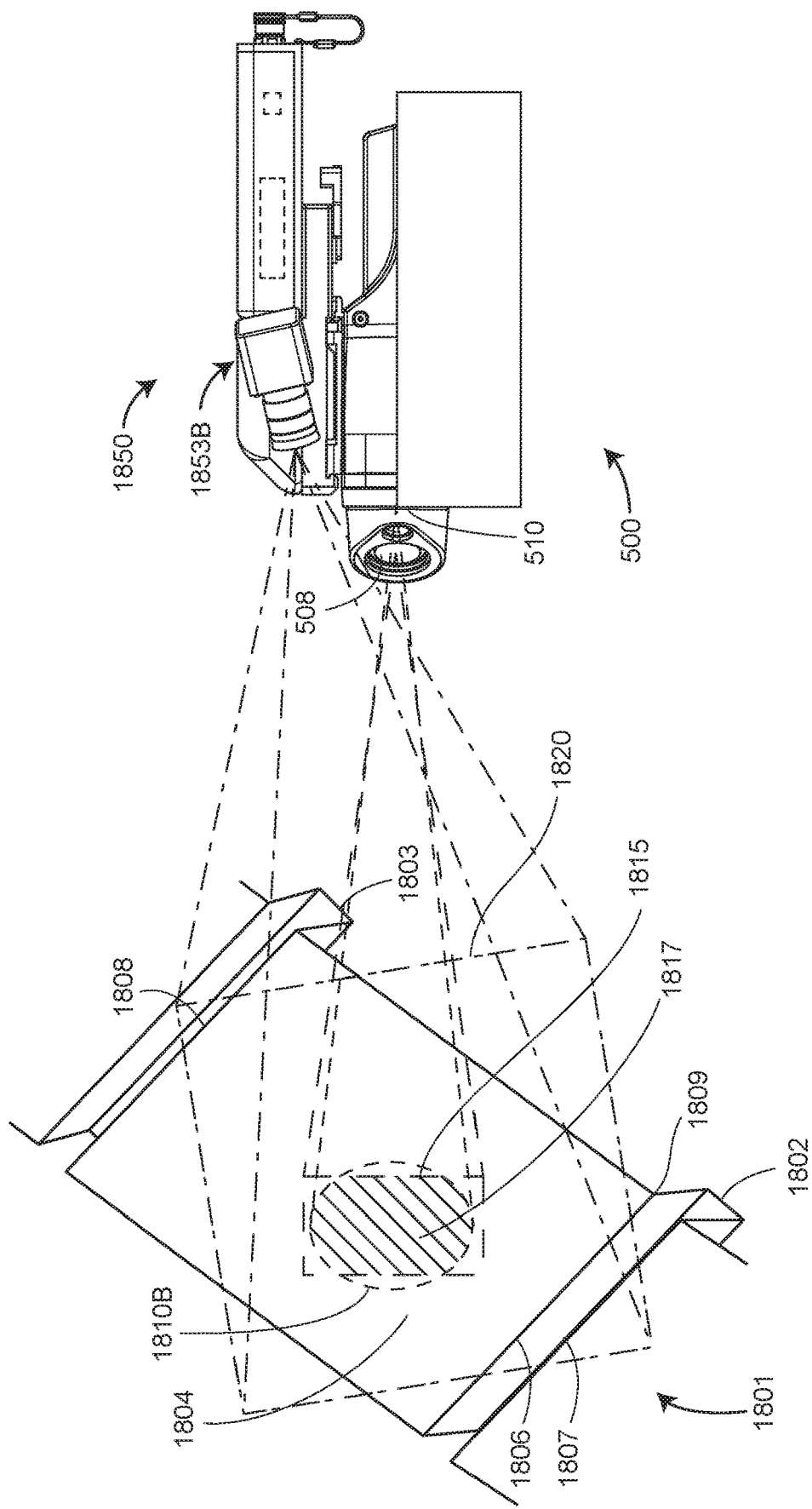
Figure 11E:
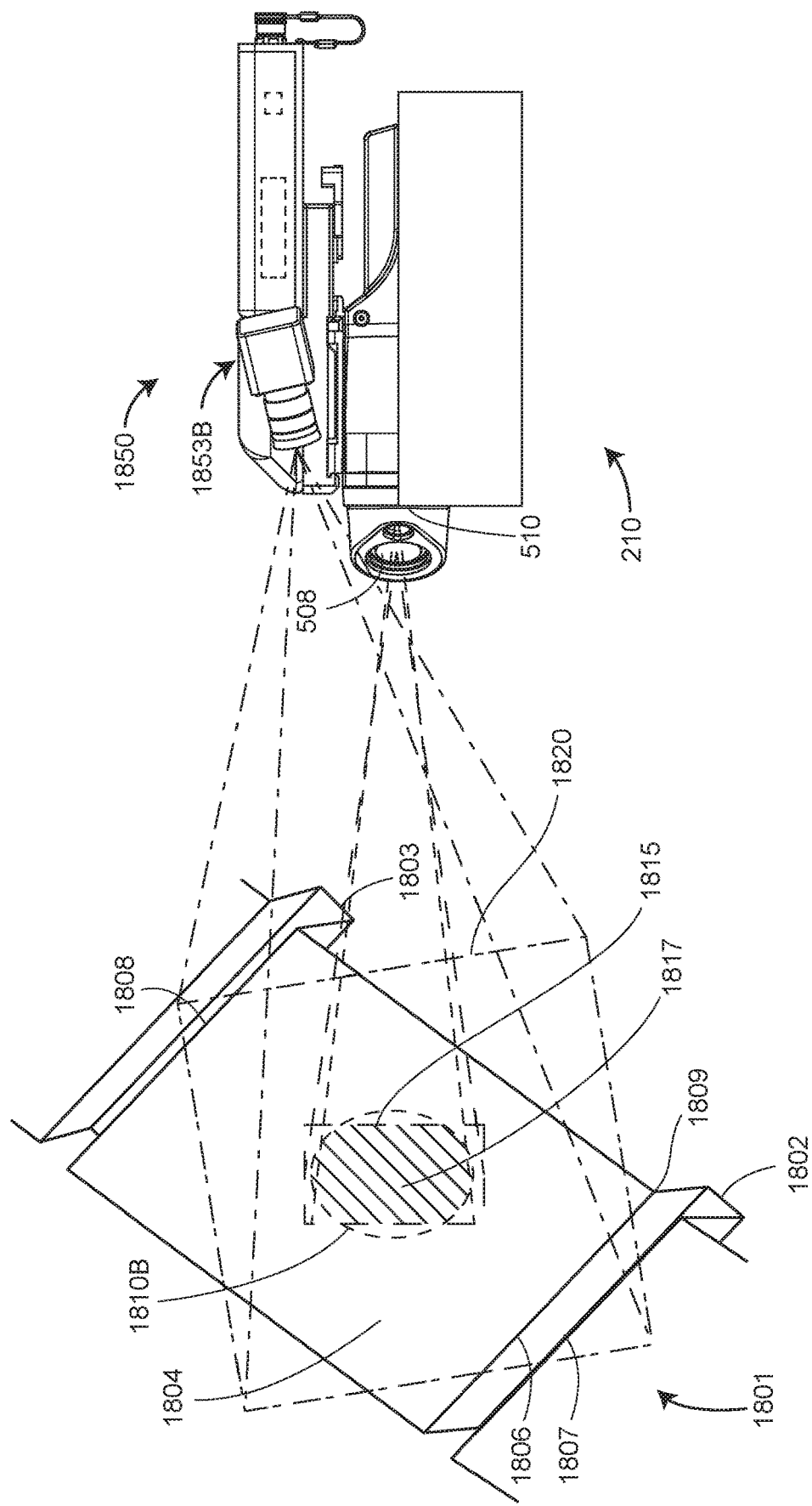

FIG. 11D illustrates a first method for using the cameras 1853A, 1853B to register multiple 3D coordinates obtained from area scans taken by an area scanner 210, wherein the registration is based on the matching of natural features. In a first instance, a first area of light 1810B is projected by the projector 510 onto an object 1801. The portion of the first area of light 1810B is viewed by the 2D image sensor (e.g., photosensitive array) of the camera 508 in a region 1815 of the object imaged by the camera 508. The overlap of the projected region of light 1810B and the imaged region 1815 is an overlap region 1817. In this overlap region 1817, a processor may determine 3D coordinates of the surface of the object 1801. These 3D coordinates are found in the frame of reference of the scanner 210.

In a second instance, a second area of light 1812B and the area imaged by the cameras 1853A, 1853B are to the right of the first area of light by the projector 510 onto the object 1801, thereby producing a second overlap region 1817B to the right of the first overlap region 1817. In some cases, there are enough common natural feature details within the first and second overlap regions to enable registration of the 3D coordinates in the frame of reference of the scanner 210 in the first and second instances to be put into a common frame of reference. However, if the object 1801 has relatively few features in the overlap regions 1817 and 1817B, it may not be possible to accurately register the first and second area scans based on scan data alone.

In an embodiment, the cameras 1853A, 1853B have a wider FOV than the camera 508, thereby enabling additional features such as 1806, 1807, and 1808 to improve the registration by matching of the 3D features as discussed herein above using the methods described with respect to FIGS. 11A, 11B, and 11C. If an object 1801 lacks distinct features, as in the region 1804, the registered 3D images may end up warping. For example, the flat surface in the region 1804 may end up looking like a saddle. This effect is sometimes referred to as the "potato chip" or "potato crisp" effect.

Figure 11F:
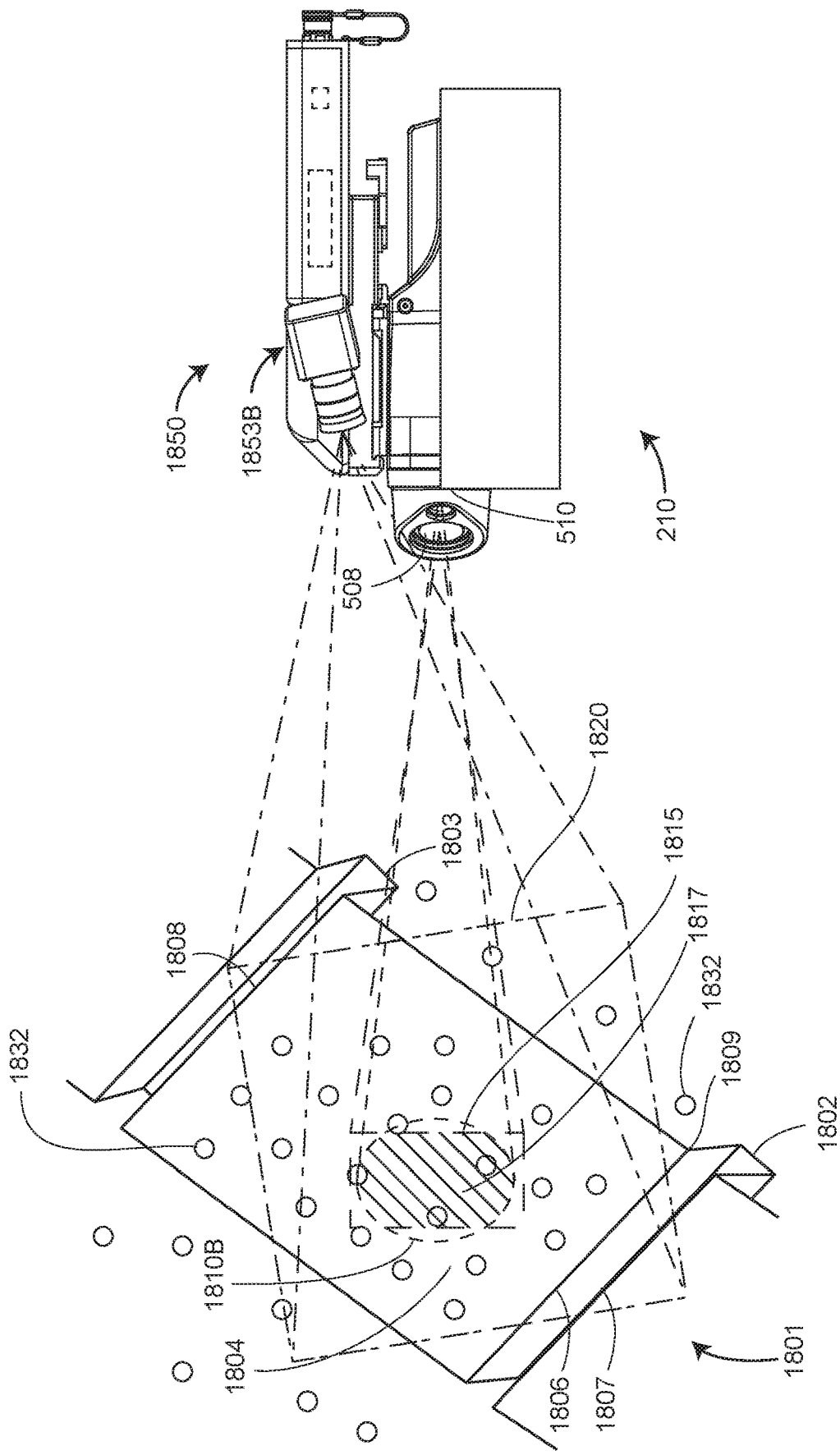

For scanned regions with few features, registration can be improved by providing targets on or off the object 1801. FIG. 11F illustrates a second method for using the cameras 1853A, 1853B to register multiple 3D coordinates obtained from area scans taken by an area scanner 210, wherein the registration is based on the matching of physical targets rather than natural targets. FIG. 11F is the same as FIG. 11D except that FIG. 11F further includes markers 1832 on the object 1801 and/or markers 1834 in the vicinity of the object but not on the object. By using the method described with reference to FIG. 11B, improved registration of the 3D coordinates obtained from the successive area scans may in many cases be obtained.

Figure 11G:
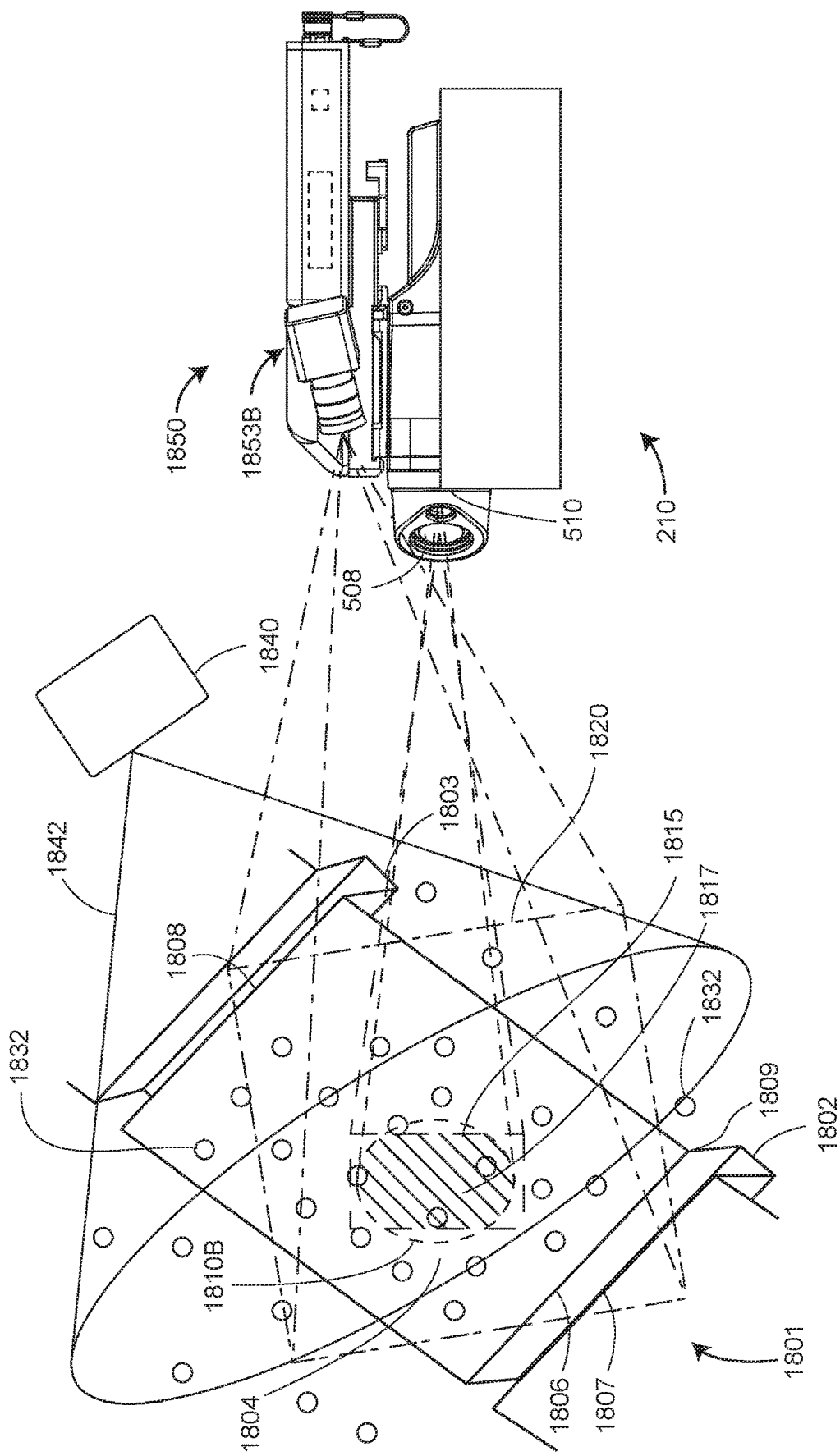

FIG. 11G illustrates a third method for using the cameras 1853A, 1853B to register multiple 3D coordinates obtained from area scans taken by an area scanner 210, wherein the registration is based on the matching of projected spots of light rather than physical targets or natural targets. An external projector 1840 separate from the scanner 210 and camera assembly 1850 projects spots of light 1832 onto the object and/or spots of light 1834 off the object but in the vicinity of the object. The cameras 1853A, 1853B image these spots of light in the same way they imaged the physical targets in FIG. 11F, and the processor determines 3D coordinates of the object surface in the same manner in each case.

The term "mark" may be used to refer to any of the physical features used to assist in the registration of multiple sets of 3D coordinates obtained by the scanner 210 in combination with the camera assembly 1850. In the discussion herein above, four marks were described: (1) natural features of the object surface (or features on a stationary surface proximate the object); (2) LED markers (targets) on the object or proximate to the object; (3) reflective markers (targets) on the object or proximate the object; and (4) spots of light projected onto the object or proximate the object by an external projector not located on the scanner 210 or camera assembly 1850.

Much of the discussion herein above has described improvements in registration possible when, for each single determination of 3D coordinates of surface points by the scanner 210, three or more marks are viewed by the two cameras 1853A, 1853B on the camera assembly 1350, with any two successive scans having at least three common points. However, in some cases, registration is possible based on information obtained by a single camera on the camera assembly and by fewer than three marks viewed by the camera. For example, the projected light (line of light or area of light) from the projector 510 may also be viewed by the one or more cameras 1853A, 1853B and matched along with at least one mark in successive images, thereby providing much more registration information in some cases than the marks alone. Furthermore, it is also possible to process data so that registration is not based entirely on a matching of two 2D images obtained by one or more cameras on the camera assembly, but on a matching of multiple 2D images obtained by one or more cameras obtained on a large number of 2D images and on the corresponding large number of 3D images obtained by the scanner 210.

FIG. 12A shows a mobile measurement platform 200 having an end effector that includes a triangulation scanner 210 and a camera assembly 1850. The mobile measurement platform is measuring a rear portion of an automobile BiW 1202. An external projector projects spots of light 1212 onto a wide measurement region to enable the camera assembly 1850 to provide information to the one or more processors in the system to assist in registering the multiple scans from the scanner 210. In an embodiment, the external projector 1210 is on a mobile tripod 1220 which may move autonomously or under user direction from place to place to provide projected spots where needed.

Figure 12B:
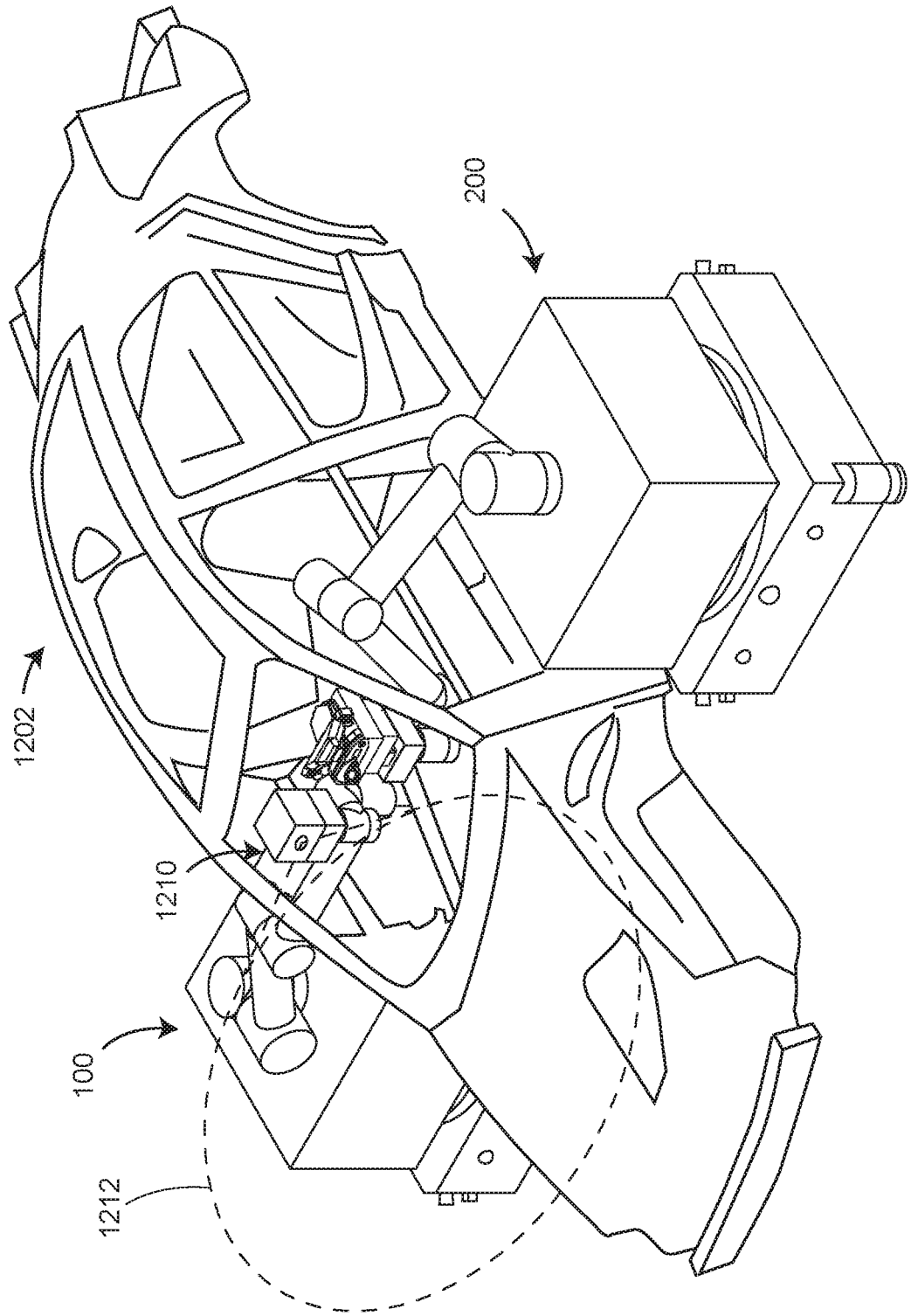
FIG. 12B shows a triangulation scanner and camera assembly measuring 3D coordinates in cooperation with an external projector on a second mobile platform according to an embodiment.

FIG. 12B shows the mobile measurement platform 200 having an end effector that includes a triangulation scanner 210 and a camera assembly 1850. The mobile measurement platform is measuring an interior portion of the BiW 1202. In this case, a projector located outside one of the windows would likely project spots in elongated ellipses because of the angle of entry of the projected spots on the interior regions. In addition, as the mobile platform 200 moves its end effector from place to place, it will tend to block some of the spots. In some cases, this could be a problem. A way around this potential difficulty is to place the projector 1810 on a mobile platform 100. The robotic articulated arm can position the external projector 1810 into whatever position and orientation is considered optimum for the situation.

Figure 13A:
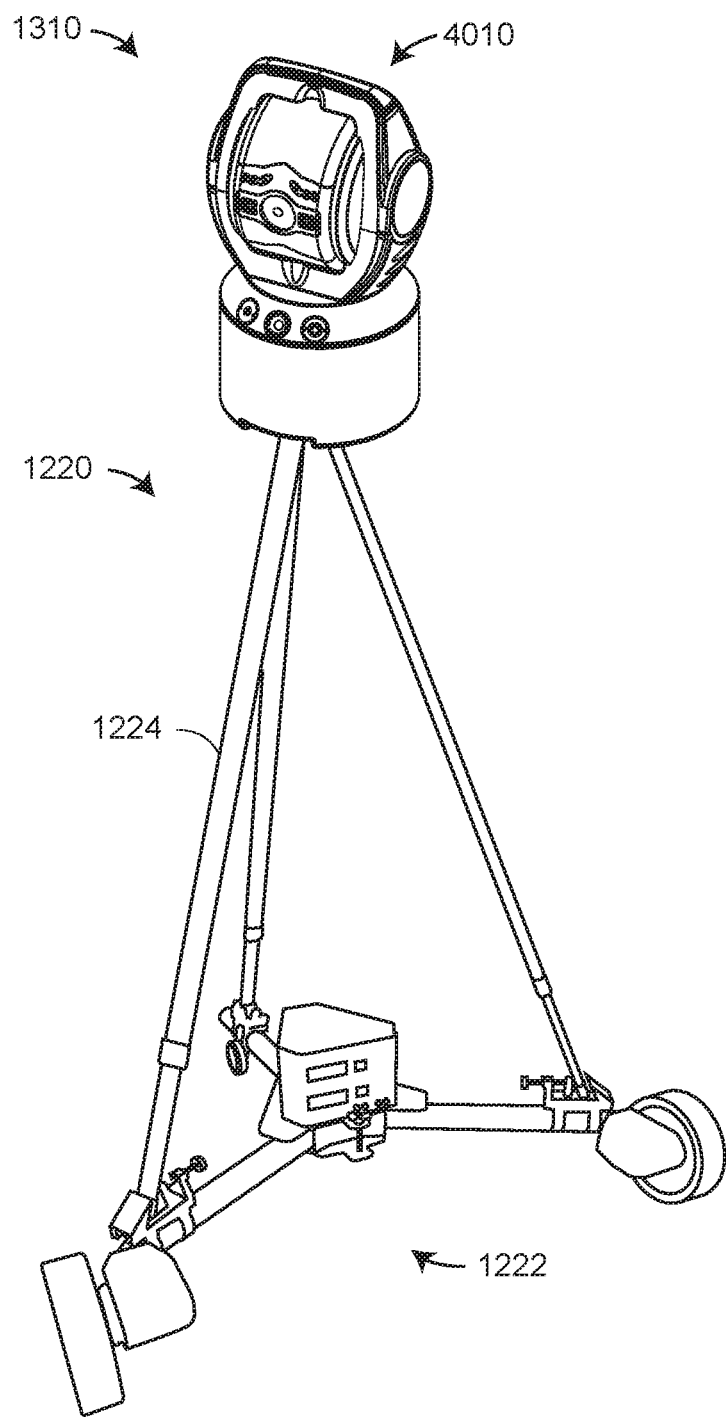
FIG. 13A shows a laser tracker mounted on a mobile structure according to an embodiment.

FIG. 13A shows an apparatus 1310 that includes a laser tracker 4010 mounted on a mobile structure 1220. In an embodiment, the mobile structure 1220 includes tripod legs 1224 and a motorized dolly 1222.

Figure 13B:
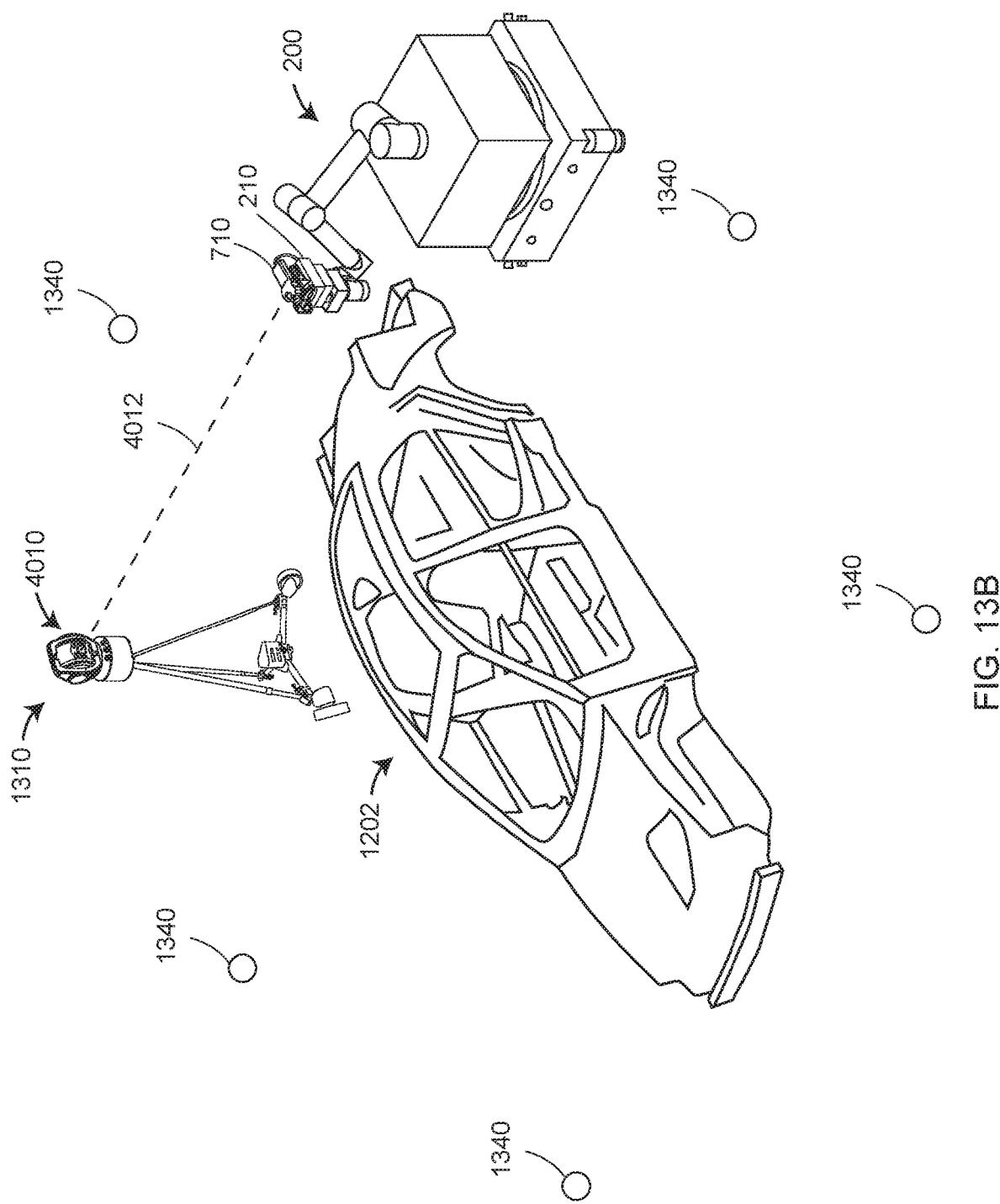
FIG. 13B shows a laser tracker following the position and orientation of a 3D probe according to an embodiment.

FIG. 13B-13E show a procedure for putting measurements collected over a wide volume into a common frame of reference. FIG. 13B shows a mobile measurement platform measuring 3D coordinates of a rear portion of a BiW1202. The end effector of the robotic articulated arm of the mobile platform includes a scanner 210 coupled to a six-DOF tracker target assembly. A six-DOF laser tracker 4010 sends a beam of light to the six-DOF tracker target assembly 710 and determines the six-DOF of freedom of the scanner 210. It is also possible for measurements to be made with the tactile probe 718 on the six-DOF tracker target assembly 710.

Figure 13C:
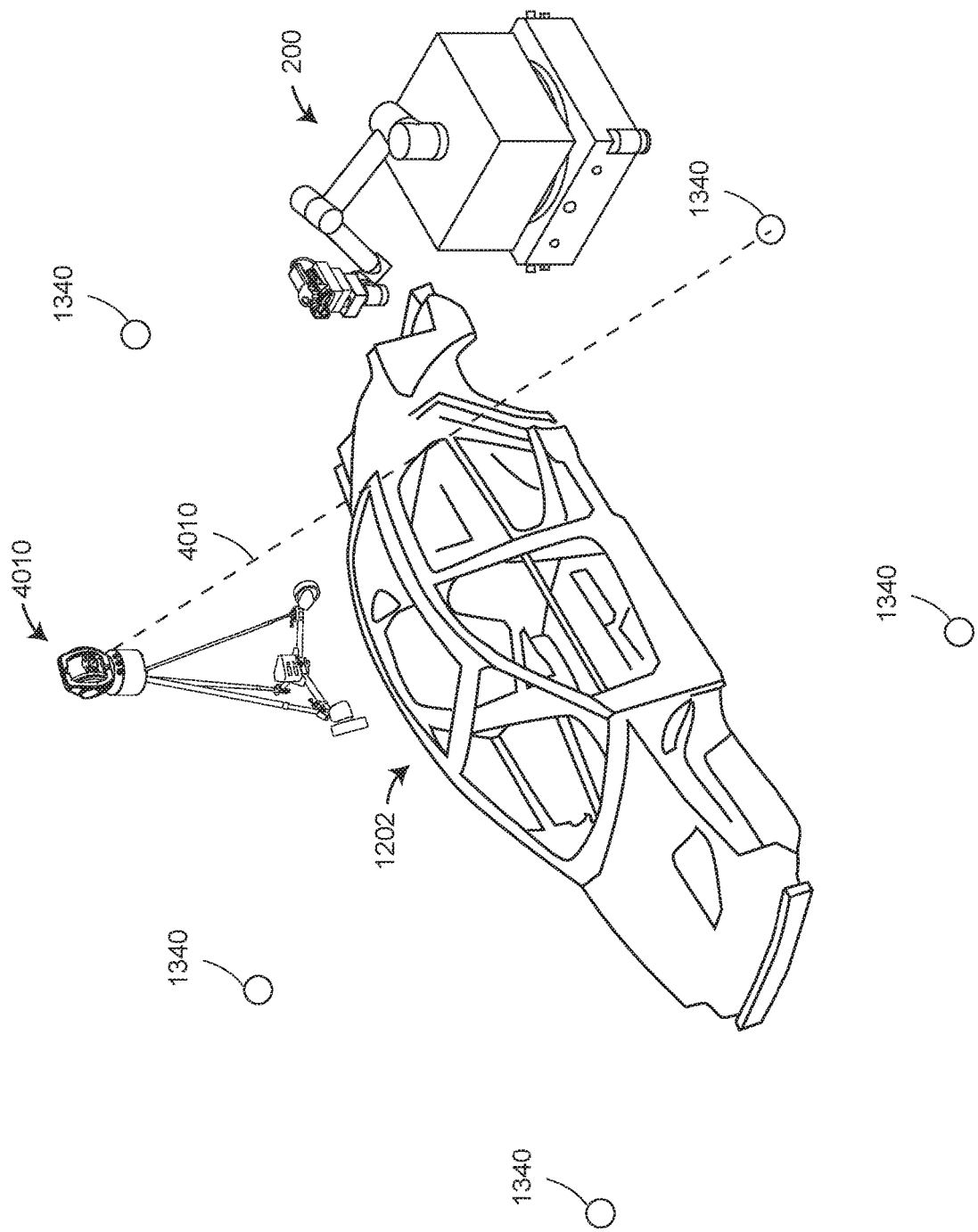
FIG. 13C shows a laser tracker measuring a six-DOF target according to an embodiment.
Figure 13D:
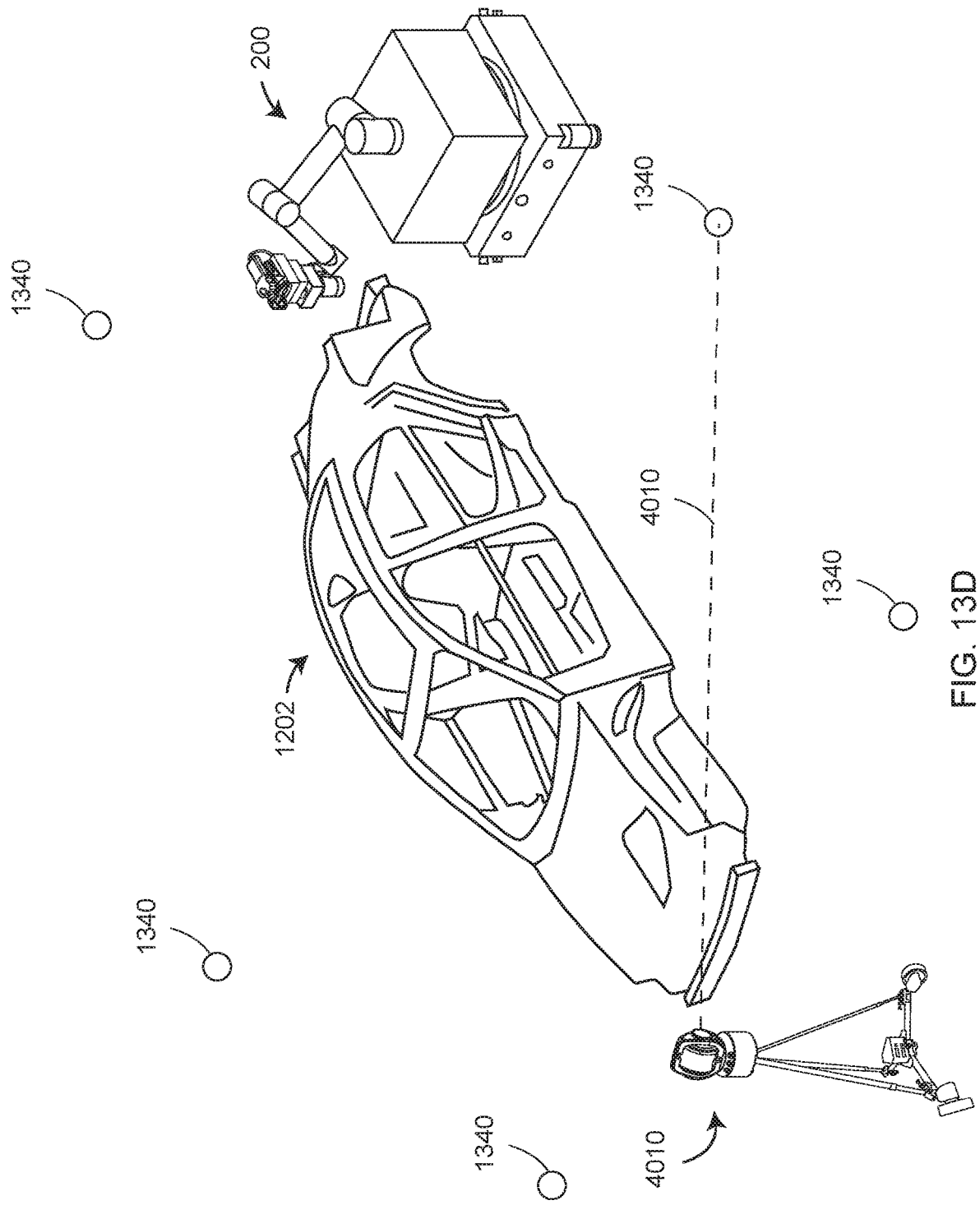
FIG. 13D shows the laser tracker moved to a new position and measuring the six-DOF target to obtain it pose in a frame of reference common to that of the tracker in FIG. 13C according to an embodiment.
Figure 13E:
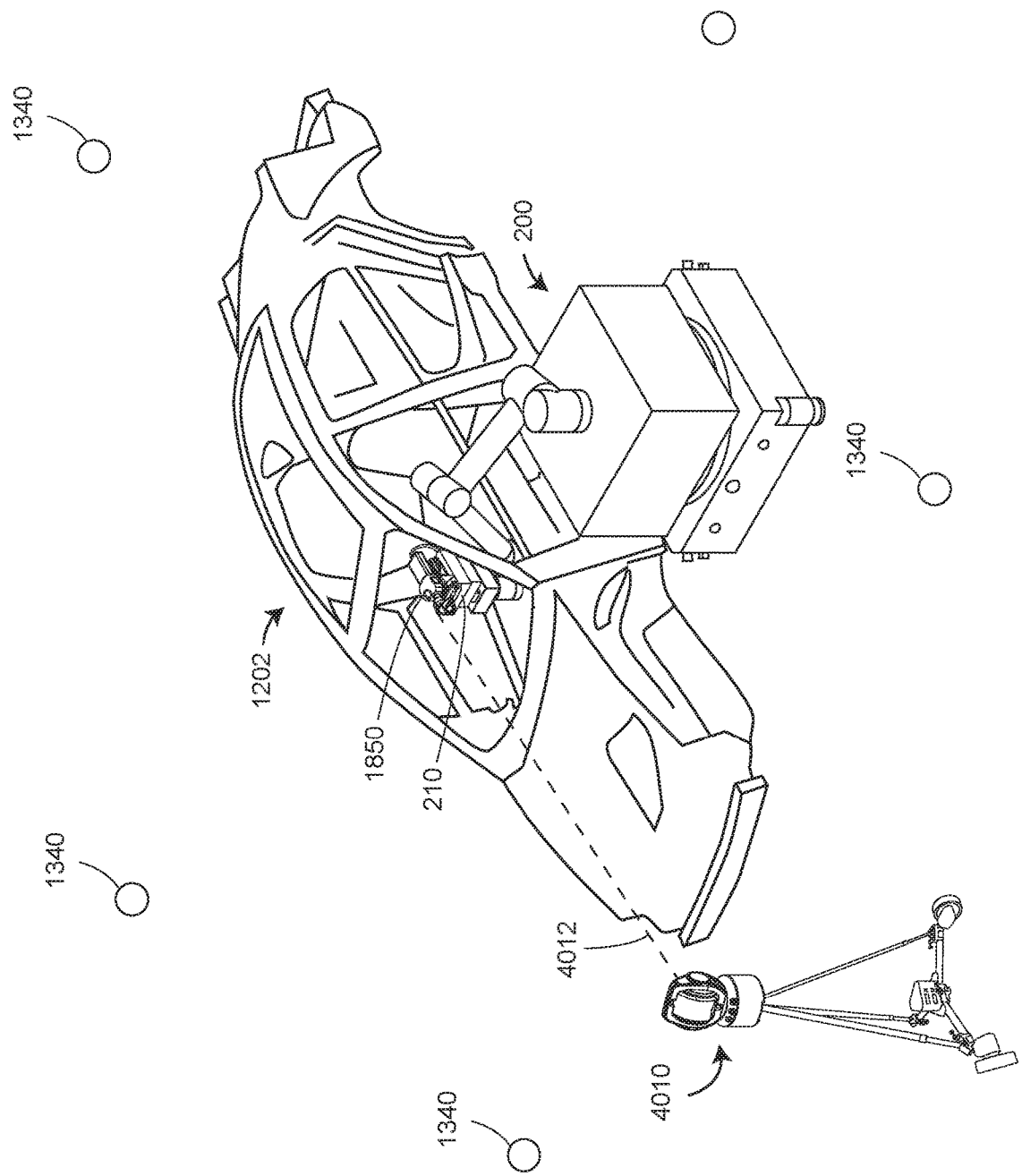
FIG. 13E shows the laser tracker measuring a six-DOF tracker target assembly while measuring a body-in-white interior with a triangulation scanner according to an embodiment.

The mobile platform 200 now wants to move to a new position to make additional measurements. In the new position, the BiW will block the beam of light from the laser tracker. It is therefore necessary to move the laser tracker but in a way that will enable 3D measurements made in each location to be placed in a common frame of reference. A procedure for performing this relocation of the laser tracker is to measure one or more six-DOF targets 1340 in a first instance as shown in FIG. 13C and then measure the same six-DOF targets in a second instance as shown in FIG. 13D.

These tracker measurements of a common six-DOF target enable a transformation matrix to be calculated that will enable measurements to be put into a common frame of reference. In a step illustrated in FIG. 13, the mobile platform continues measuring, now on the interior of the BiW, while the tracker monitors the six degrees of freedom of the scanner 210 and corrects for the movement of the scanner, which is to say, puts the scanner readings into a common frame of reference. Besides measuring a single six-DOF target to obtain a transformation matrix, it is also possible to obtain a transformation matrix by measuring three regular (three-DOF) retroreflectors with a laser tracker. This method of relocating using a six-DOF laser tracker can also be performed with a camera-bar device used in combination with a six-DOF light-point target assembly.

A mobile measurement platform 200 including any combination of end effector devices discussed herein above may be used to perform automated inspections. In an embodiment, an automated inspection is provided by centralized production scheduling software. Inspection instructions may be changed according to the type of device being inspected. In an embodiment, inspection instructions are put onto a tag, which might be an near-field communication (NFC) tag, a radio-frequency identification (RFID tag), a bar code, a quick-response (QR) code, or any other type of storage device that can conveniently convey information. In an embodiment, the tag travels with the object under test and is read by the mobile measurement platform. In an embodiment, an inspection plan includes information about the locations where measurements are to be made and the types of information to be gathered and analysis to be performed. A 3D measuring system may evaluate a wide variety of dimensional characteristics including point coordinates, diameters, lengths, angles, and so forth. An inspection plan can include the specific measurements to be performed and the dimensional characteristics to be evaluated. In an embodiment, a nominal value is provided for each of the measured dimensional characteristic. The error is calculated as the measured value minus the nominal value. In an embodiment, an alarm is given if the absolute value of an error exceeds a tolerance value. In an embodiment, a tolerance value is included as part of the inspection plan. In an embodiment, test results are put into a database and evaluated with statistical process control (SPC) software. In an embodiment, a CAD model is provided to the one or more processors that guide the movements and measurements of the mobile platform. Information about the dimensions of the object in the CAD model may be used to guide movement of the mobile platform. In an alternative embodiment, the mobile platform selects a path based on the dimensions of the object as observed by the 2D scanners and other sensors tied to the mobile platform.

Two types of navigation may be used. In a first type of navigation, internal sensors of the mobile platform are used to guide the platform movement. This method ordinarily provides an accuracy of movement of one to five centimeters. Internal sensors that may be used include 2D scanner sensors that emit a horizontal plane of light, usually near the floor. Such scanners held prevent collisions, but the data can also be used for navigation. Odometry sensors, in this case the angular encoders in the wheel assemblies provide information that can be used for navigation as do IMU and heading sensors. 2D and 3D cameras mounted around the mobile platform can also assist in navigation.

In a second type of navigation, a six-DOF measuring device such as a laser tracker or a camera bar (which may be two cameras separated and stable but not connected by an actual bar) is used to direct the movement of the mobile platform and robotic arm. Such navigation can be better than 100 micrometers in some cases, depending on the speed of the moving platform and other factors.

In a flexible factory environment a number of autonomous mobile devices may operate simultaneously. The factory itself may have obstructions such as walls, inventory, and machinery moved frequently within the environment, possibly resulting in confusion and conflict in traffic patterns. In a flexible factory, it may be desirable to decentralize planning and execution of tasks to autonomous mobile units and smart computing devices distributed throughout the factory. It may be desirable to provide location guidance to autonomous mobile systems within the environment. A kiosk that serves as a configurable active landmark may help satisfy these needs of a flexible factory environment.

Figure 14A:
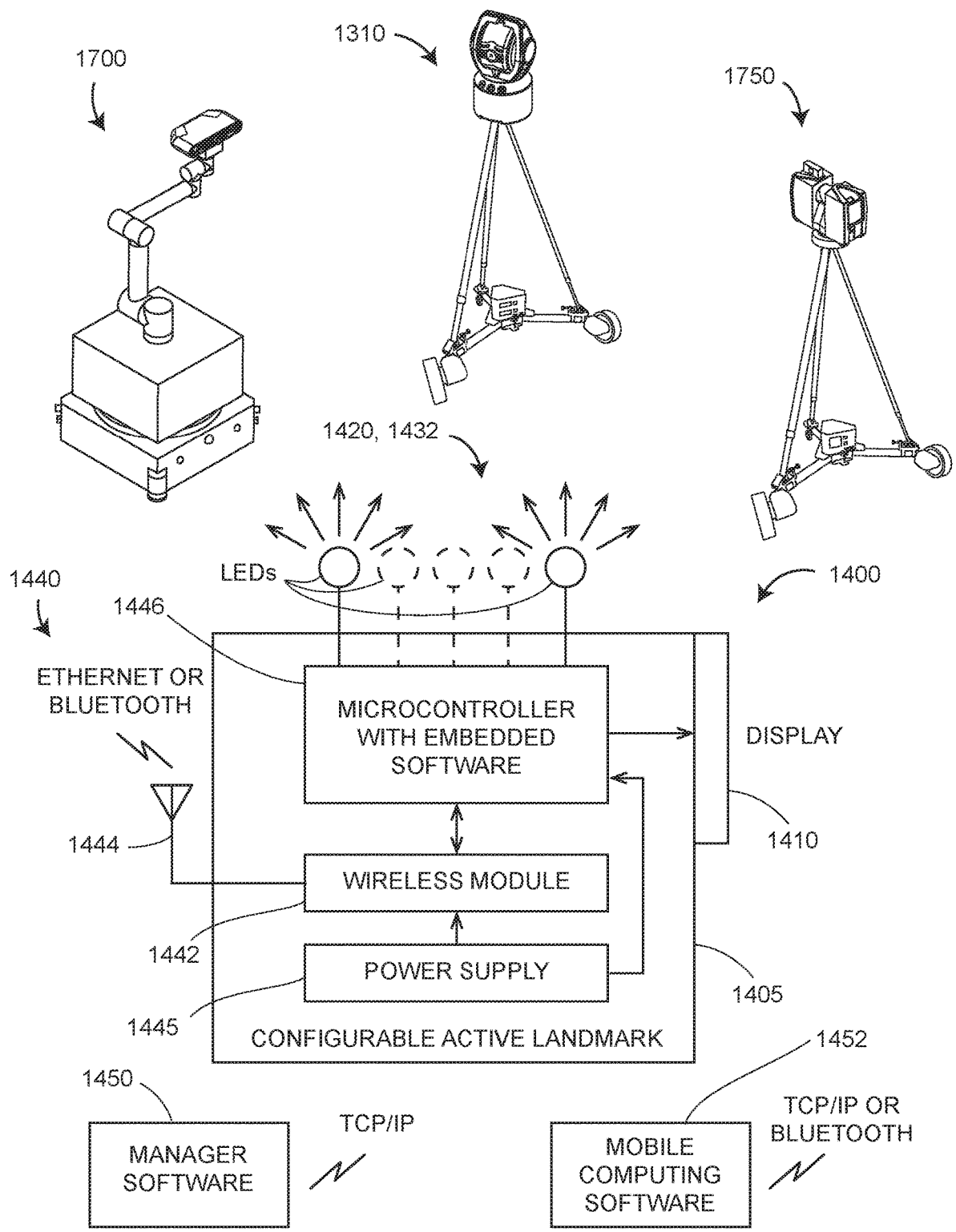
FIG. 14A is a schematic diagram of a kiosk that serves as a configurable active landmark.
Figures 14B, 14C, 14D:
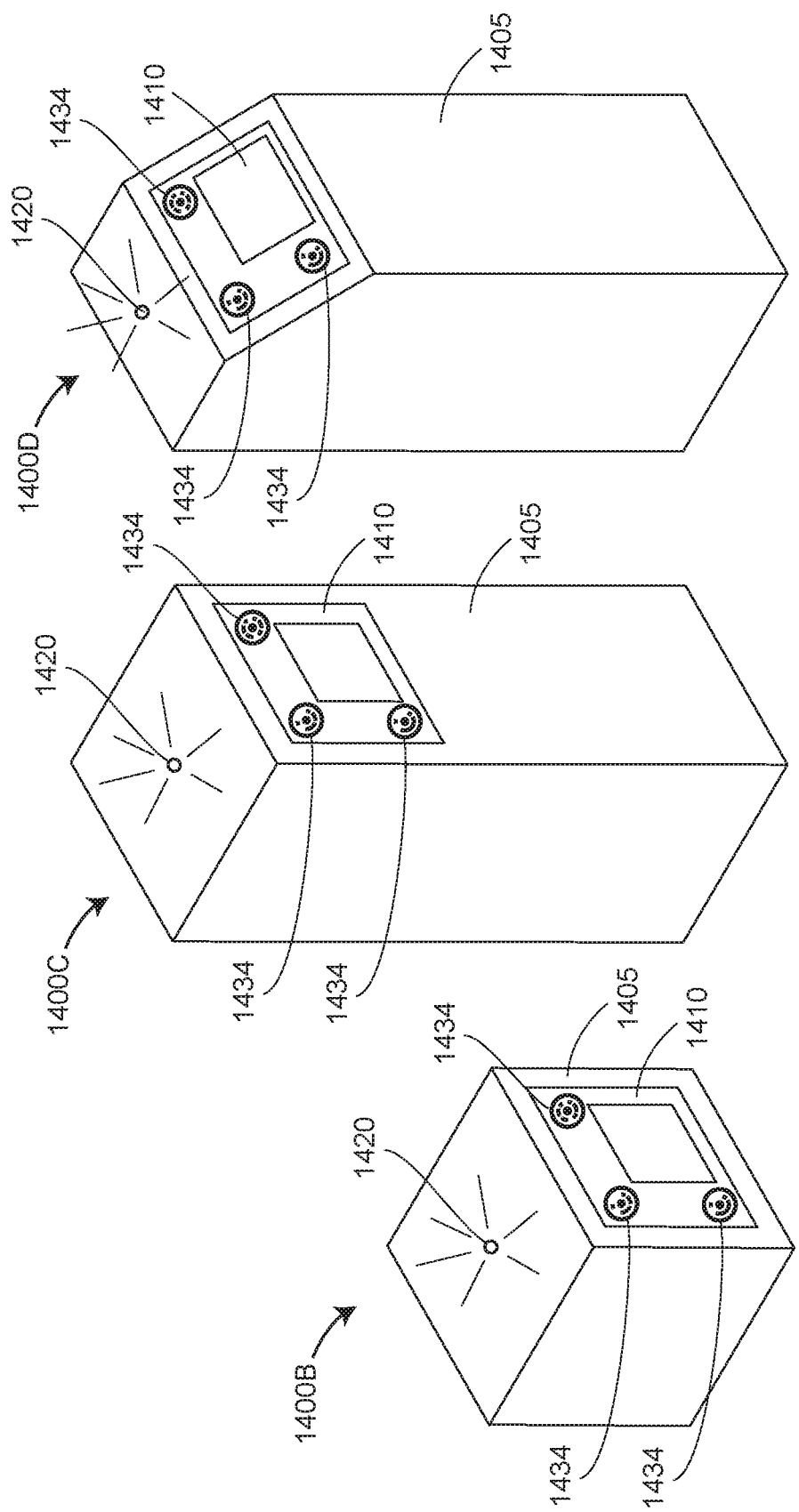

Some possible elements of a kiosk 1400 are shown in FIGS. 14A-14I. As shown in FIG. 14A, the kiosk 1400 may interact with a variety of mobile devices such as a motorized robotic 3D measuring system 1700, a motorized laser tracker 1310, and a motorized time-of-flight (TOF) laser scanner 1750. Further descriptions of these devices are given herein below.

In embodiments, kiosk 1400 may be a kiosk 1400B, 1400C, 1400D, 1400E, 1400F, or 1400G, as shown in FIGS. 14B-14G. In these embodiments, the kiosk is arranged for viewing by a mobile device. In an embodiment, the kiosk includes an enclosure 1405, which may be firmly mounted to the floor or arranged for movement as needed within the environment. The kiosk may include one or more lights 1420, such as LEDs, designed to be seen by a mobile device from a distance to help the mobile device locate the kiosk. The kiosk may include an electronic display 1410.

In an embodiment, the kiosk includes three or more markers that may be measured in 3D by the mobile device. The 3D coordinates of these three or more markers in the local frame of reference of the mobile device may be used to locate the mobile device within the global frame of reference of the factory. In an embodiment, the three or more markers are light sources 1432 such as LEDs. In another embodiment, the three or more markers are display markers 1434 located on the display 1410. In an embodiment, the display markers 1434 are coded to enable the mobile device to locate the particular kiosk within a collection of kiosks within the factory. The coding of the display markers 1434 may also be used to identify the general location within the factory, while the positions of the markers on the display may provide higher resolution 3D coordinates. For the markers 1432 or 1434 to provide the mobile device with 3D coordinates within the global factory frame of reference, the 3D coordinates of the markers 1432 or 1434 are determined ahead of time in a separate step. A variety of methods may be used to determine the 3D coordinates. For example, a laser tracker or a photogrammetry system may be used to determine the coordinates of the markers 1432, 1434, or the 3D coordinates of the display device may be determine based at least in part on the size of display pixels and the number of pixels between marker centers.

The display 1410 may also provide information to a mobile 3D measuring device. In an embodiment, such information is presented to the mobile 3D measuring device visually by providing an image on the display 1410 that can be viewed by a camera on the mobile 3D measuring device. In another embodiment, such information is sent over a wireless communication channel 1440 (FIG. 14A) such as IEEE 802.3 communication over Ethernet or IEEE 802.15 communication over Bluetooth. Such wireless communication may be generated by an electrical wireless module 1442 and transmitted from an antenna 1444. The wireless module 1442 and antenna 1444 also makes possible two-way wireless communications between a networked factory computing system and a microcontroller having embedded software 1446 within the kiosk 1400. Other forms of communication such as cellular communication are also possible. The kiosk 1400 may be configured for two-way communication with a mobile computing device such as a smart phone, smart tablet, laptop computer, or with a mobile 3D measuring device such as 1700, 1310, or 1750. In an embodiment, such two-way communication may be carried out, for example, using IEEE 802.15 (Bluetooth). In an embodiment, a mobile computing device includes mobile computing software 1452. Such software may be used to download information onto a kiosk 1400 if needed. The kiosk 1400 may also be configured for communication with an outside computer, such as a networked computer, having manager software 1550. The manager software 1550 may send instructions and receive updates from the kiosk 1400. In an embodiment, instructions are provided to the kiosk through mobile computing software 1452. The kiosk 1400 may include a power supply 1445 that provides power to the wireless module, display, and microcontroller.

Figures 14H, 14I:
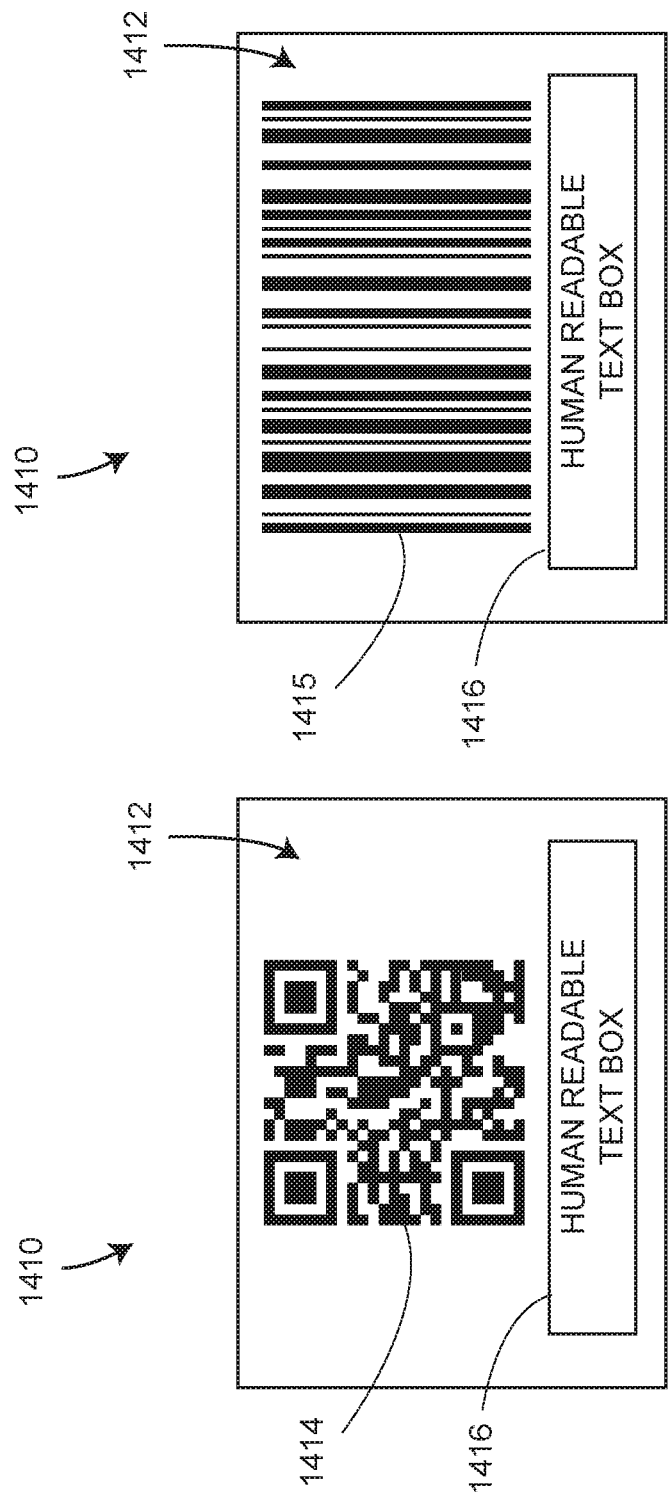
FIGS. 14H-14I are images on kiosk displays according to embodiments.

A visual image 1412 such as those shown in FIGS. 14H, 14I may be presented on the display 1410 for viewing by a camera on a mobile 3D measuring device. In an embodiment, the visual image 1412 may include an illuminated QR code 1414 or a bar code 1415. The visual image 1412 may also include a human readable text box 1416. Such a human readable text box is helpful for a human observer passing the kiosk. The human readable text box may also be sent wirelessly to an operator from a remote mobile platform that includes a camera. In an embodiment, a human readable text box 1416 may indicate the current status of manufacturing processes within the vicinity of the kiosk.

Information presented by the kiosk, either visually on the display 1410 or through a wireless signal, may provide many types of information to a mobile device or to a human observer. Such information may include any or all of the following: (1) location of the kiosk, possibly with respect to the three or more kiosk markers 1432 or 1434; (2) availability of pathways for travel; (3) required tasks to be performed; (4) measurements to be performed and objects to be measured; and (5) other areas within the factory in which assistance is needed. Other types of information may also be provided.

Figure 15:
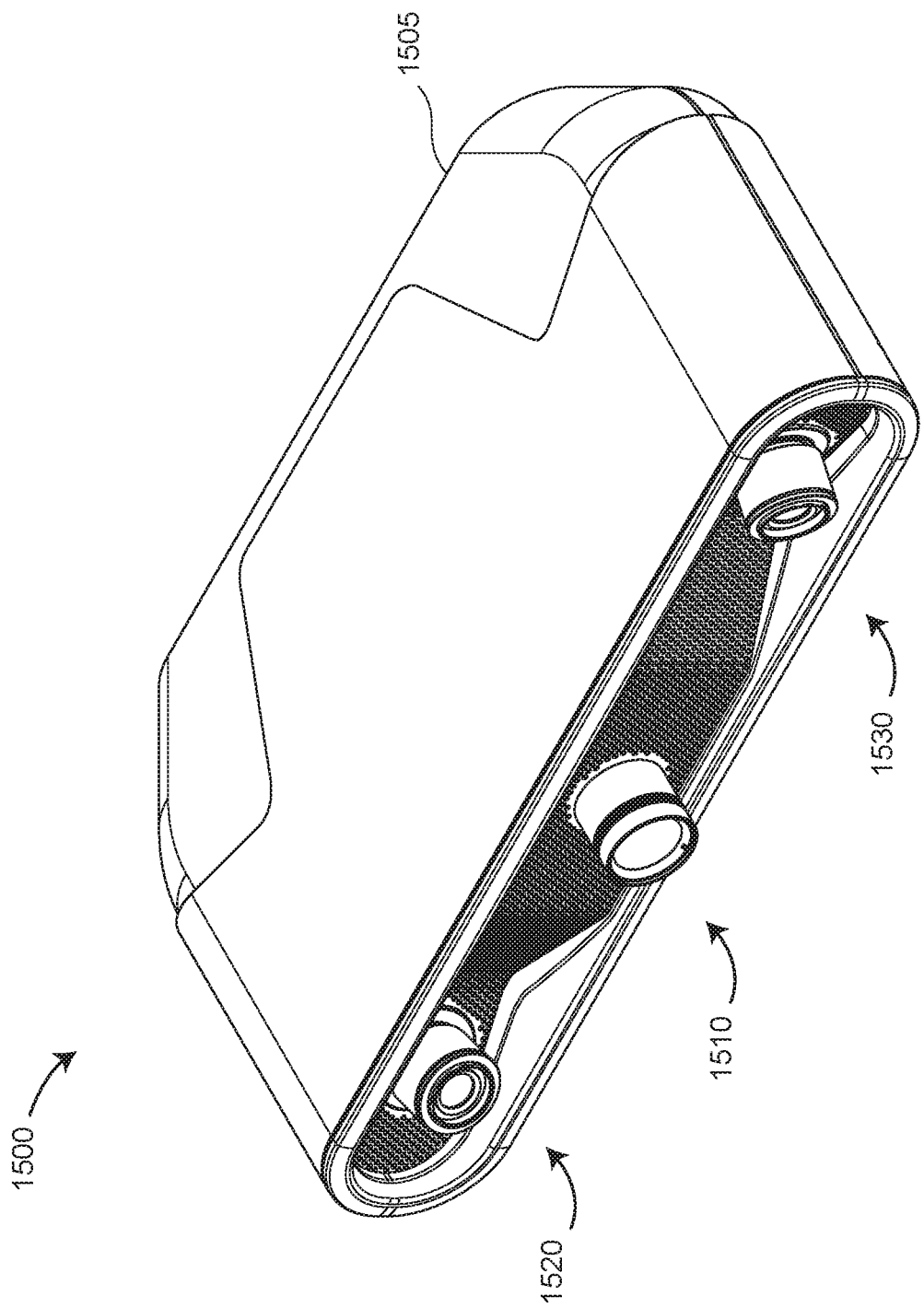
FIG. 15 is a perspective view of an triangulation area scanner according to an embodiment.

FIG. 14A illustrates use of an exemplary motorized robotic 3D measuring system 1700. The system 1700 includes a robotic arm attached to a 3D measuring device 1500 shown in FIG. 15. The 3D measuring device 1500 is a triangulation area scanner having a body 1505, a projector 1510, a first camera 1520, and a second camera 1530. In other embodiments, the first camera 1520 is included but the second camera is not. In an embodiment, the projector 1510 projects a pattern of light that covers an area. In an embodiment, the projector projects one or more patterns of light being recognizable by the cameras so that a correspondence between the projected pattern and the patterns imaged by the cameras may be determined. In another embodiment, the projector projects a sequence of patterns, for example, with points of the projected light having optical power sinusoidally modulated between successive images. Capture of light from such images enables determination of distances to points on a surface based on calculated phase values. The computing steps needed to determine distances to points on an object may be carried out, for example, by a processor within the 3D measuring device 1500 or by a computer external to the 3D measuring device 1500. Principles of triangulation are used to determine the 3D coordinates of points on the object, as explained herein above in reference to FIGS. 5A, 5B. In other embodiments, the triangulation scanner 1500 on the motorized robotic 3D measuring system 1700 is replaced with another 3D measuring device such as line scanner 210 shown in FIG. 3A-FIG. 3C. Other types of 3D measuring devices, such as the six-DOF scanning device shown in FIG. 7A and FIG. 7B, or multi-element devices such as those shown in FIG. 9 or FIG. 10B may also be used.

Figure 16:
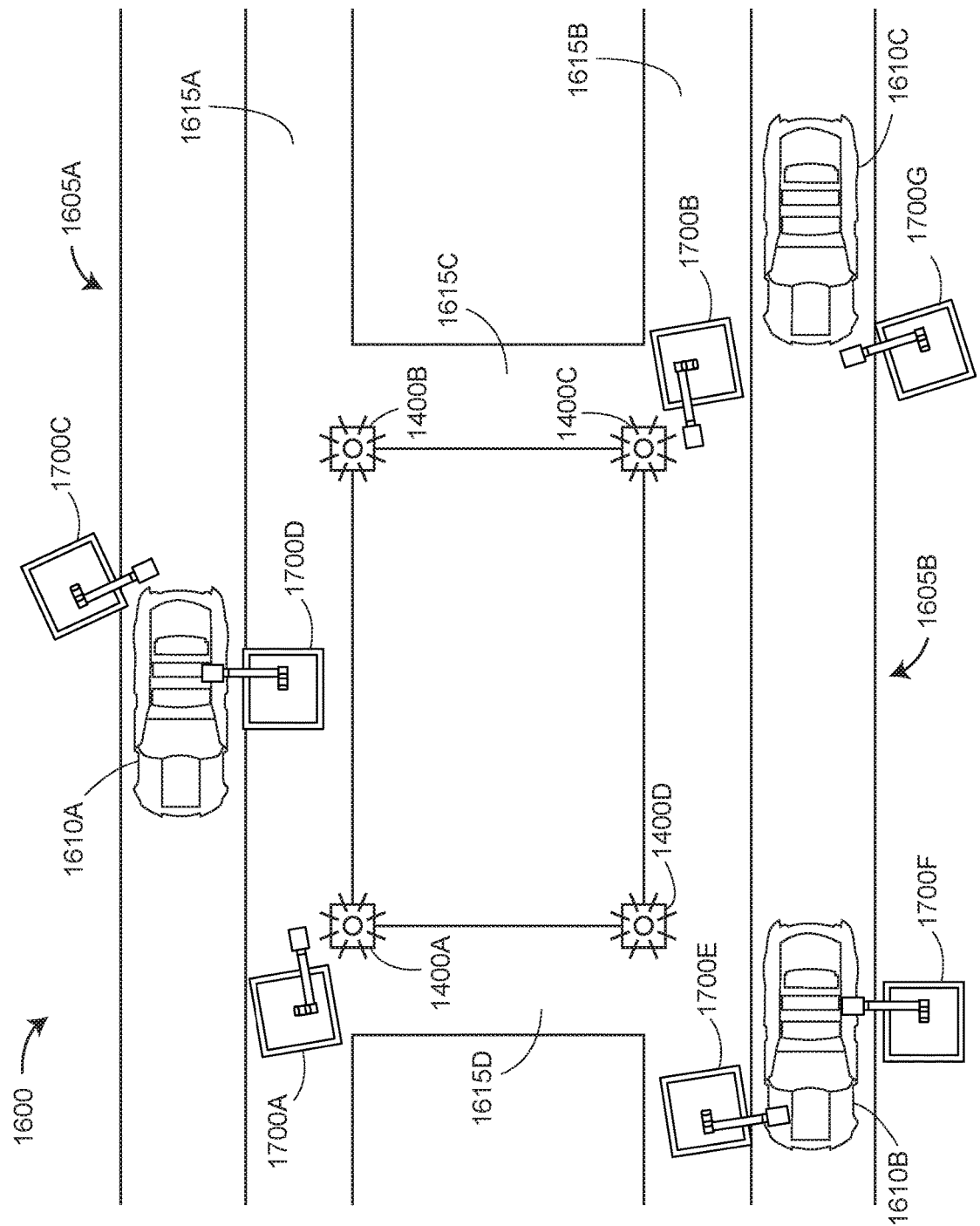
FIG. 16 is a plan view of a factory floor, showing placement and interaction of objects on assembly lines, 3D mobile measuring systems, and kiosks according to an embodiment.

As explained herein above, the kiosk 1400 may be used to provide information to a mobile 3D measuring device: where the mobile 3D measuring device is located, which pathways are available for the mobile 3D measuring device, and which measurement tasks need to be performed near the kiosk. An example of how a mobile 3D measuring device may use such information is illustrated in FIG. 16. In an embodiment, a plan view 1600 of a factory region includes two assembly lines on which objects 1610A, 1610B, and 1610C are carried on conveyor tracks 1605A, 1605B. In an embodiment, the objects 1610A, 1610B, 1610C are automobile bodies in white (BiW). In an embodiment, kiosks 1400A, 1400B, 1400C, 1400D are located at intersections of pathways 1615A, 1615, 1615C, 1615D. Mobile measurement devices such motorized 3D measuring systems 1700A-1700G are arranged in the pathways so as to measure 3D coordinates of the objects 1610A-1610C. In the example of FIG. 16, two of the motorized 3D measuring systems 1700A and 1700B are interacting with the kiosks to learn whether measurement assistance is needed, which pathways are accessible by the mobile device 1700A, 1700B, what types of measurements being performed, and which objects need to be measured. Other motorized 3D measuring systems 1700C, 1700D, 1700E, 1700F, 1700G are performing 3D measurements of the objects 1610A, 1610B, and 1610C.

Figure 17A:
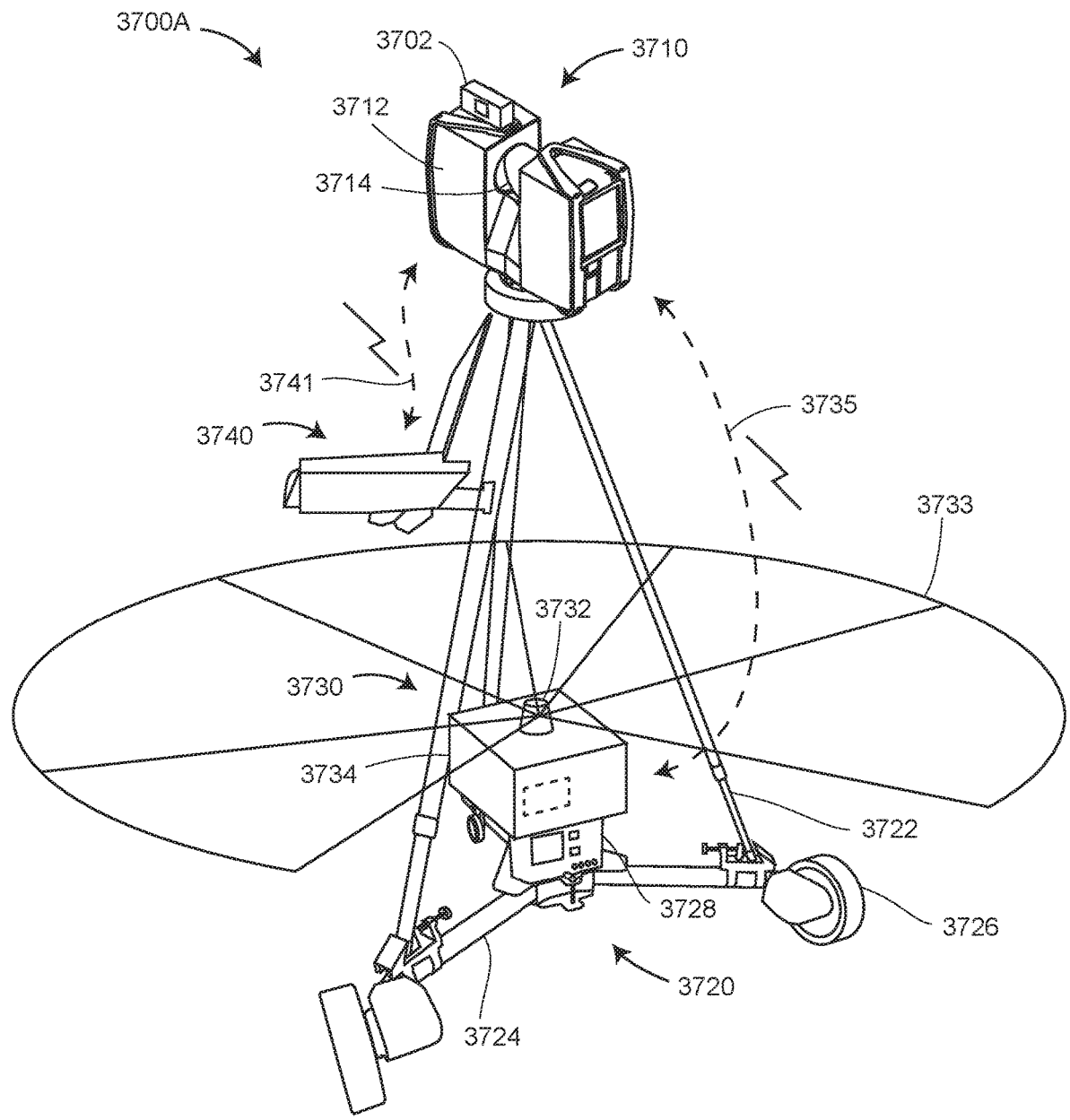
FIG. 17A is a perspective view of a 3D mobile measuring system that includes a time-of-flight (TOF) scanner, 2D scanner, and laptop computer mounted on a motorized platform according to an embodiment.

Examples are now given in FIG. 17A-FIG. 17D of motorized 3D measuring systems having enhanced navigation capabilities. FIG. 17A illustrates a motorized 3D measuring system 3700A having a time-of-flight (TOF) scanner 3710. In an embodiment, the TOF scanner 3710 projects laser light from a transmitter/receiver section 3712 onto a mirror 3714 that reflects the light onto an object. Light scattered off the object returns to the mirror and passes back into the transmitter/receiver section where it passes through optical elements before striking an optical detector. The scattered laser light received by the optical detector is processed electrically to determine a distance to the object at the illuminated point. A variety of distance measuring methods may be used with the TOF scanner 3710. In an embodiment, the TOF scanner modulates the laser light with a plurality of signals, each having a different frequency. The received light is then evaluated electrically to determine a phase for each of the modulation frequencies. The distance from the scanner to the object is determined based on these measured phases. In another embodiment, the laser light is pulsed, and the elapsed time from the launch of the pulsed to the receipt of the pulse by the optical detector is measured to determine the distance to the object point. In another embodiment, the optical wavelength of the laser light is swept (chirped), and the frequency difference between the launched light and the received light is measured to determine the distance to the object point. Many alternative distance measuring methods relying on the TOF of the emitted and received light are possible and may be used.

In an embodiment, the mirror 3714 rotates about a horizontal axis at a relatively rapid rate, while at the same time rotating about a vertical axis at a relatively slow rate. In this way the laser beam may scan a large volume. Angle transducers such as angular encoders are attached to the horizontal and vertical axles about which the mirror 3714 rotates. By combining the angular readings from the angle transducers with the distance readings, obtained from the optical detector and processing electronics, the TOF scanner 3710 determines 3D coordinates of points on the object. Besides the method of beam steering that uses the rotating mirror, many other methods of steering the beam from a TOF scanner are possible and may be used.

In an embodiment, the TOF scanner is placed on a stand 3720. In an embodiment, the stand includes a holding structure 3722, which might be a tripod. In an embodiment, the holding structure 3722 further includes a support frame 3724. In an embodiment, the support frame 3724 is attached to wheels 3726 that enable the stand 3720 to be wheeled from place to place, either by hand or under computer control through the use of motorized wheels 3726. In an embodiment, behavior of the wheels is further determined by a control box 3728.

In an embodiment, a two-dimensional (2D) scanner 3732 is configured to repetitively sweep a beam of light 3733 in a horizontal plane. The 2D scanner 3732 includes an angle transducer that measures the angle of the projected beam of light 3733 at each direction of the sweep. The 2D scanner 3732 further includes a distance meter to determine distance from the 2D scanner to an object intersected by the projected beam of light 3733. Hence the 2D scanner obtains a collection of 2D values, each of the 2D values including an angle and a distance. These 2D values provided by the 2D scanner 3732 may be used to monitor the movement of the TOF scanner 3710 through the environment. In an embodiment, data from the 2D scanner is sent to a computing device 3734. In an embodiment, the computing device 3734 keeps track of the relative change in position (x, y) of the scanner along a floor, for example, and a relative change in angle, for example about a vertical axis. In an embodiment, the computing device 3734 is also configured to identify registration targets, which might be natural features of the environment or artificial targets intentionally provided to assist in the registration process. In an embodiment, the TOF scanner is moved to a first position and a scan is made, including a scan of the registration targets. The TOF scanner is then moved to a second position and a second scan is made. The computing device 3734 determines whether enough common registration targets have been identified in the first and second scans. It may then complete the 3D registration calculations or leave the 3D registration to be performed by another computing element. The computing device 3734 may further determine registered 3D coordinates of object points obtained from the 3D scans at the first and second positions. Alternatively, the generation of the registered 3D point cloud obtained by combining the first and second scans may be carried out by an external computer, a network computer, a cloud computer, or an embedded computer within the TOF scanner 3710. In an embodiment, the computing device monitors movement of the system 3700A, verifies that enough common registration targets have been captured in the first and second scans, and then send the raw 3D point cloud data on to another computing system to complete the 3D registration of the first and second scans while the system 3700A moves from the second position to a third position. This approach minimizes the time required to complete a sequence of 3D measurements and obtain the resulting 3D coordinates.

A computing system 3740 may further be used to enable the operator to interact with the 3D laser scanner system. For example, the operator may indicate on a keyboard of the computing system 3740 the types of desired measurements. The display of the computing system 3740 may further display results obtained by the 3D scanning system and provide the capability for the operator to immediately check results—for example, to check measured dimensions or review unexpected results. Application software for processing point cloud data captured by the TOF scanner 3710 may have been loaded onto the computing system 3740 to provide the operator with flexibility in the operations and calculations to be performed. The computing system 3740 may communicate with other processors by wired or wireless communication such as the communication channels 3735 and 3741.

The 2D scanner 3732 helps avoid collisions with objects by detecting when the objects are near the system 3700A. In some cases, use of a 2D scanner or similar device may be legally required for autonomous operation of a motorized 3D measuring system.

In another embodiment, the 2D scanner 3732 is not used. Instead the TOF scanner is put into a mode enabling it to measure in a horizontal plane in the same manner as the 2D scanner 3732. This may be done, for example, by locking the mirror 3714 in position in such a way that the mirror 3714 projects the beam of laser light in a horizontal direction, while simultaneously rotating the scanner assembly relatively rapidly about a vertical axis. In this mode of operation, the TOF scanner provides the same information as a 2D scanner. In other words, in this mode, a TOF scanner performs 3D scans at certain positions in an environment and 2D scans when traveling between those positions.

Figure 17B:
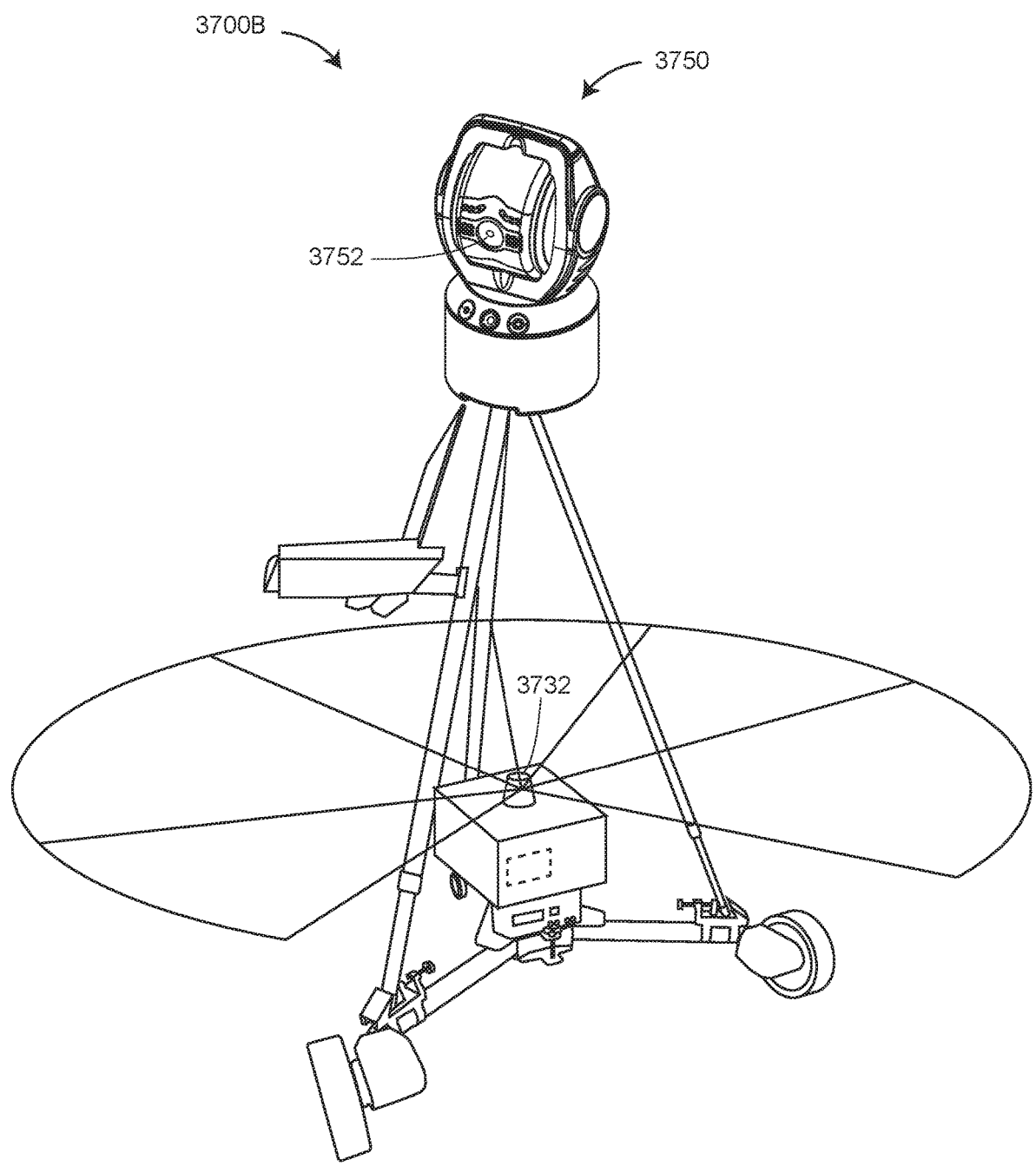
FIG. 17B is a perspective view of a 3D mobile measuring system that includes a laser tracker, 2D scanner, and laptop computer mounted on a motorized platform according to an embodiment.

FIG. 17B illustrates a motorized 3D laser tracker system 3700B having a laser tracker 4010 similar to the laser tracker mounted on a mobile structure of FIG. 13A. The motorized 3D laser tracker system 3700B is similar to the motorized 3D TOF scanner system of FIG. 17A except that TOF scanner 3710 is replaced with the laser tracker 4010. In one mode of operation, a laser tracker 4010 measures 3D coordinates of a retroreflector target. In another mode of operation, the laser tracker 4010 determines six degrees of freedom (DOF) of a six-DOF target, for example, as described in reference to FIG. 7A and FIG. 7B. In an embodiment, the laser tracker 4010 may be used to assist in monitoring the six-DOF position of a triangulation scanner attached to a motorized 3D measuring device, such as the 3D measuring devices illustrated in FIGS. 17A, 17C, and 17D. Examples of such monitoring are described herein above in reference to FIG. 13B-FIG. 13E. The 2D scanner 3732 enables the laser tracker system 3700B to safely navigate its position in the same manner as the TOF scanner system 3700A.

Figure 17C:
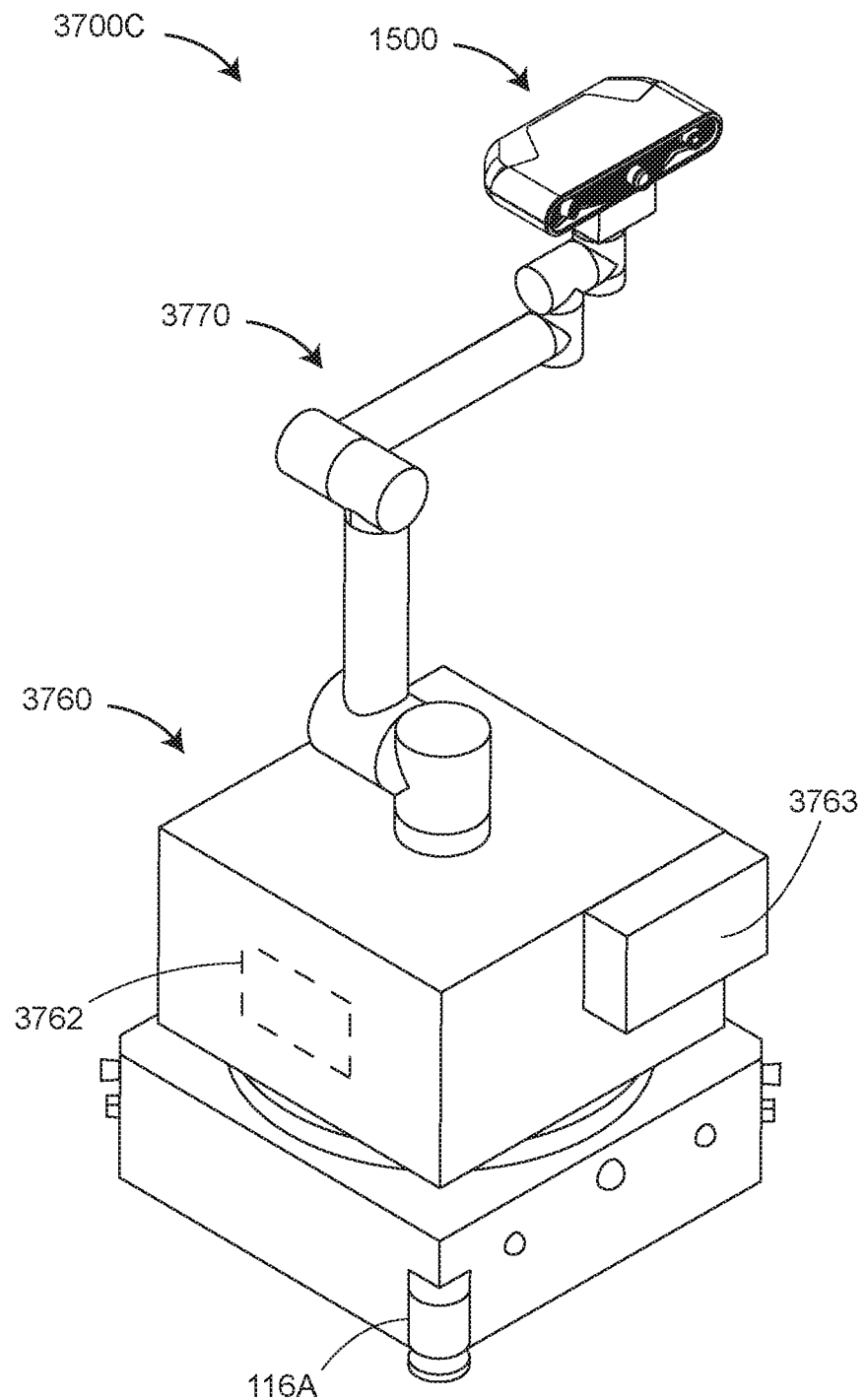
FIG. 17C is a perspective view of a triangulation area scanner mounted on a mobile robotic platform according to an embodiment.

The motorized 3D measuring system 3700C of FIG. 17C is similar to the motorized 3D measuring system 200 of FIG. 17A except that the triangulation scanner 210 is replaced with a triangulation scanner 1500. The navigation and safety functionality of the 2D scanner 3732 in FIG. 17A is provided by the 2D scanners 116A, 116B. A computing device 3762 within the mobile platform and a user interface device 3763 may provide the functionality of the computing and user interface devices 3734 and 3740 of FIG. 17A. Hence the motorized 3D measuring system 3700C is able to navigate autonomously or under direction of an operator.

Figure 17D:
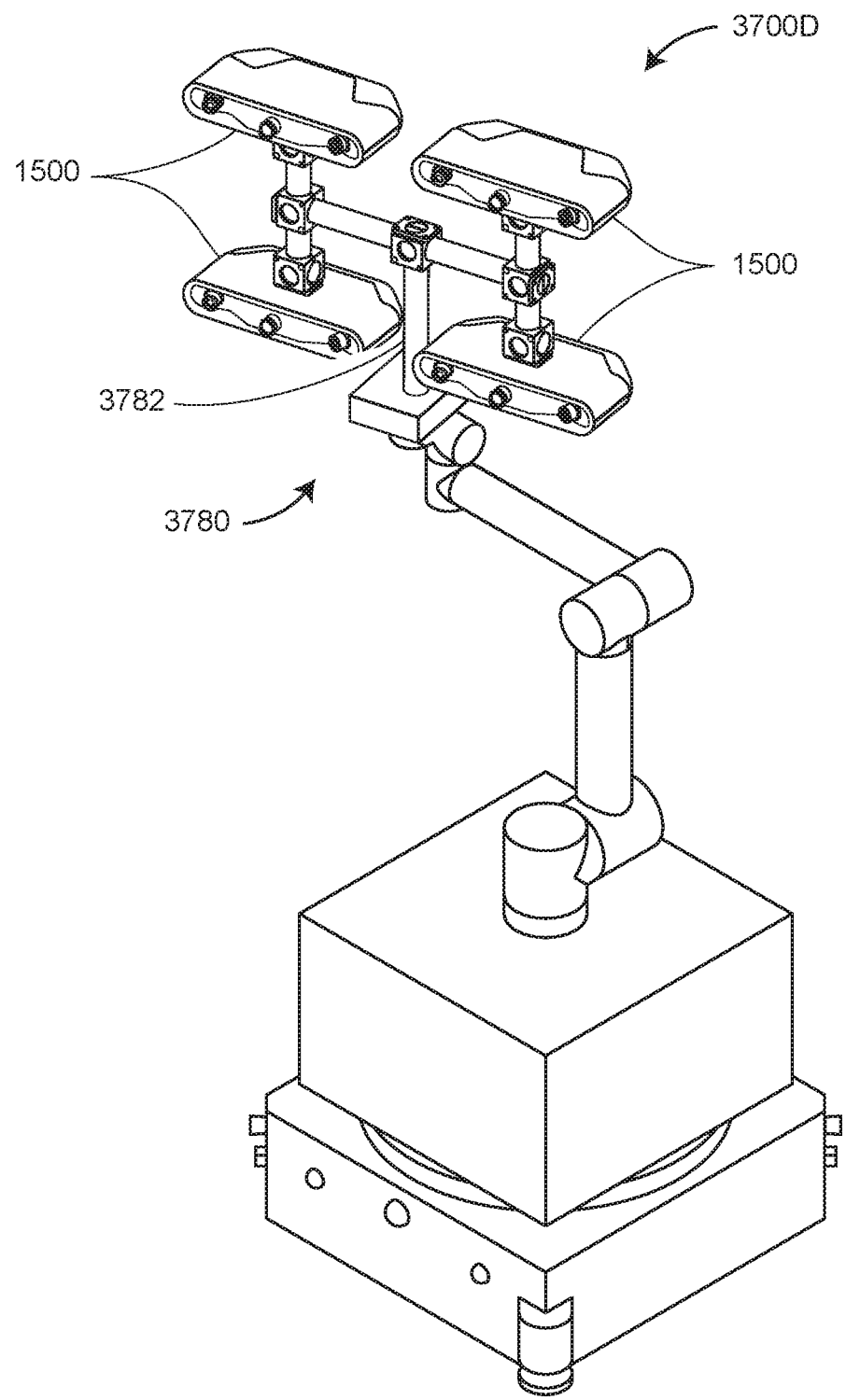
FIG. 17D is a perspective view of an array of triangulation area scanners mounted on a mobile robotic platform according to an embodiment.

The motorized 3D measuring system 3700D is similar to the 3D measuring system 3700D of FIG. 17D except that the triangulation scanner 1500 is replaced with a scanning array 3780 that includes a collection of scanners 1500 and a mounting structure 3872. In a single measurement, a scanning array 3780 may measure 3D coordinates of a relatively larger area of an object with a relatively higher resolution than can a single scanner 1500.

In an embodiment, a 3D representation is obtained for an environment, for example, by measuring 3D coordinates of the environment with a TOF scanner system 3700A of FIG. 17A, possibly in combination with other systems such as the systems 3700B, 3700C, 3700D of FIG. 17B-FIG. 17D. For example, the environment captured in 3D may include all regions of a factory. In an embodiment, the 3D representation of the environment is stored on a network computer or cloud computer. A system connected into the network, for example, through a wired communication channel such as IEEE 802.3 (Ethernet) or wireless communication channel such as IEEE 802.11 (Wi-Fi), may access information about the 3D environment from any position within the environment.

One possibility would be to have a camera on the mobile measuring system stream camera images over a wireless network to an operator at a remote terminal. The operator might control the movement of the mobile measuring system with a control such has a joystick. A potential problem with this approach, however, is a latency associated in downloading the camera image from the camera array and in transmitting the camera image over the wireless network. The latency makes control of the mobile measuring system more difficult and the possibility of a collision higher. A better alternative is now described.

Figure 18A:
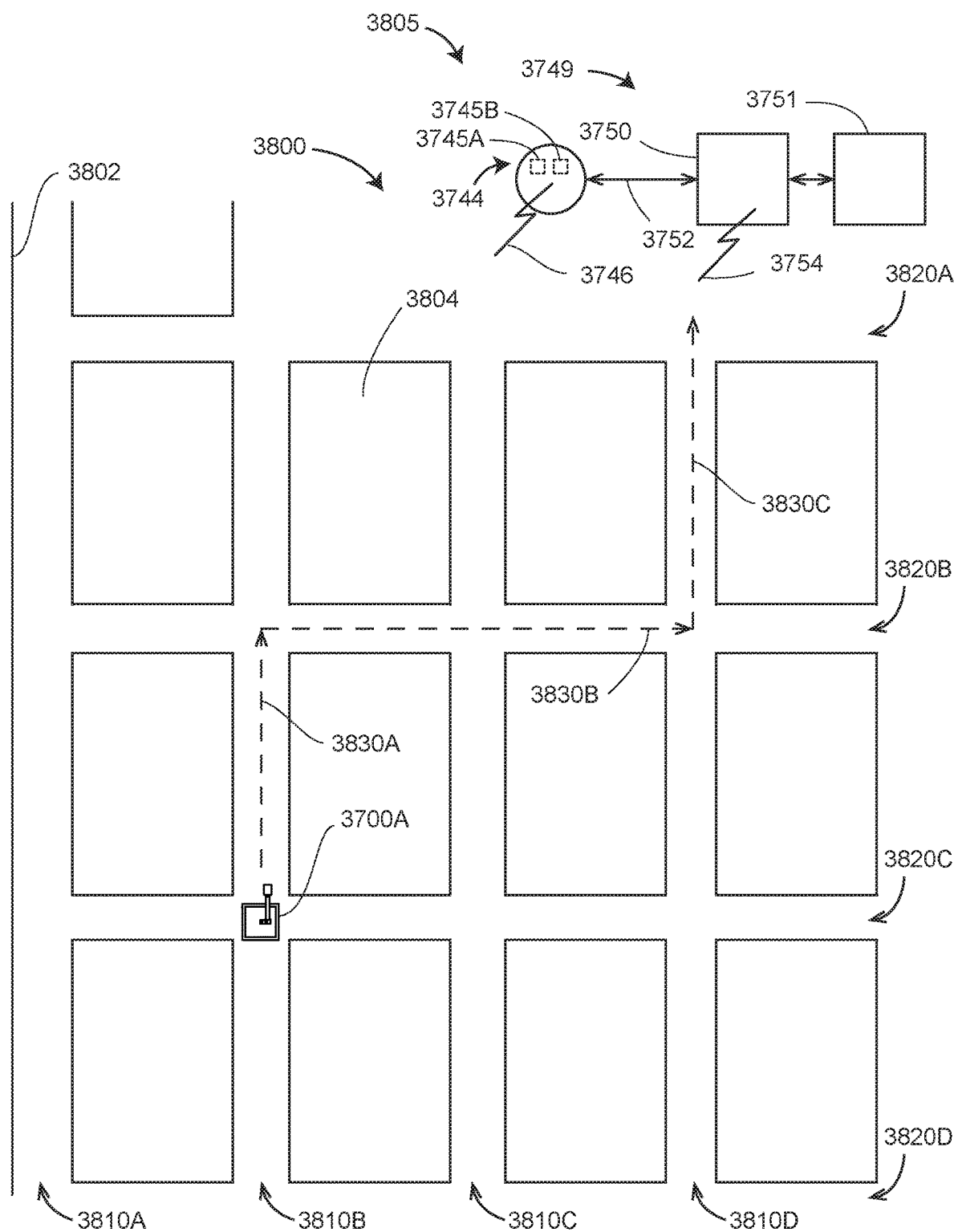
FIG. 18A is a plan view showing a 3D mobile measuring device driven in a factory by a remote operator controlling movement by interacting with a 3D representation of the factory generated in real time by a network computer according to an embodiment.
Figure 18B:
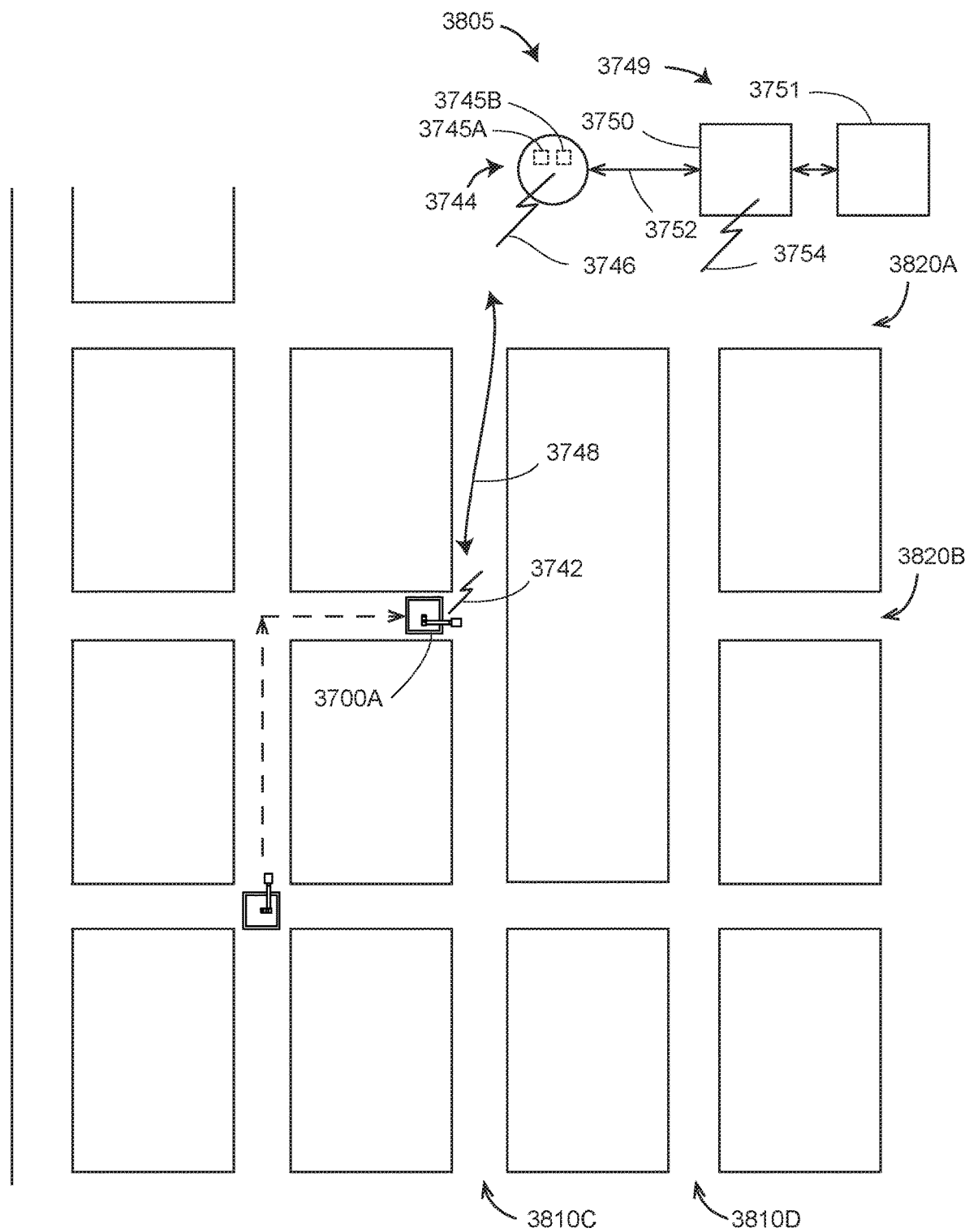
FIG. 18B is a plan view showing the 3D mobile measuring device of FIG. 18A recognizing a change in the 3D representation and providing updated 3D information to the network computer according to an embodiment.

FIG. 18A and FIG. 18B show a remote navigation method for a mobile measuring system. FIG. 18A shows a motorized measuring system 3700A navigating a path within an environment 3800. In an embodiment, the environment 3800 includes a wall 3802 and a collection of islands 3804. The islands 3804 are separated by pathways having pathway columns 3810A-3810D and pathway rows 3820A-3820D.

In an embodiment, a system 3805 includes a 3D mobile measurement system 3700, a user station 3749, and a computing device 3744. The 3D mobile measurement system 3700 includes a mobile base and a 3D measuring device. The mobile base might be a base 110 such as shown in FIGS. 1-5, a motorized tripod 1220 as in FIG. 13A, a stand 3720 as in FIG. 17A, or any other type of mobile base. The 3D measuring device may be a triangulation area scanner 1500 as shown in FIG. 17C, a triangulation laser line scanner 1850 as in FIG. 10B, a TOF scanner 1750 as shown in FIG. 14A, or any other type of 3D measuring device. In an embodiment illustrated in FIG. 18A, the 3D mobile measurement system 3700A is used.

The 3D mobile measurement system 3700 is further configured to produce a wireless feedback signal indicative of a local position of the 3D mobile measurement system. Such a feedback signal may be provided from any of a variety of sensors on the 3D mobile measurement system 3700. In an embodiment, the wireless feedback signal 3742 is provided by the 3D measuring device, which might be any of the devices as described in the previous paragraph. In an embodiment, the wireless feedback signal 3742 is provided by a 2D scanner such as the 2D scanner 116A of FIG. 17C or the 2D scanner 3732 of FIG. 17A. In an embodiment, the wireless feedback signal 3742 is provided by a camera attached to the 3D mobile measurement system 3700. In an embodiment, the camera is a 2D camera that provides a 2D image. In another embodiment, the camera is a 3D camera, which may be any of several types. It may for example be a depth camera, also referred to as a red-green-blue-depth (RGB-D) camera. In an embodiment, the 3D camera is a stereo sensor system that includes two 2D cameras separated by a baseline distance. In an embodiment, the 3D camera is a triangulation scanner that includes a projector and a camera separated by a baseline distance.

In an embodiment, the user station 3749 is separate from the 3D mobile measurement system. In an embodiment, the user station 3749 illustrated in FIG. 18A includes a user control device 3751 and a user display 3750. In an embodiment, the user control device 3751 is a joystick. In other embodiments, the user control device 3751 is a touch screen, a keyboard, a mouse, a gesture sensor, or other device. In an embodiment, the user display 3750 is one or more monitors, which might be a touchscreen display, for example. In an embodiment, the user station 3749 includes a wireless transceiver, which is capable of transmitting and receiving wireless signals 3754.

In an embodiment, the computing device 3744 is separate from the 3D mobile measurement system. In an embodiment, the computing device 3744 is a network computer or a cloud computer. In an embodiment, the computing device 3744 includes a first processor 3745A and a first memory 3745B. In an embodiment, the first memory 3745B is configured to store a global 3D representation of the global environment, which may include all the elements of the environment 3800, for example. The global 3D representation may be stored in the form of a point cloud, for example, in an octree format, or in any other form. The first processor 3745A is configured to send the user display 3750 a local visual representation of a local environment of the 3D mobile measurement system 3700. The local visual representation is determined by the first processor 3745A based at least in part on the global 3D representation, the user control signal, and the wireless feedback signal. For example, in an embodiment, the wireless feedback signal 3742 is a 2D image provided by a 2D camera attached to the 3D measuring device. As the 3D mobile measurement device 3700 moves from position to position, the 2D camera sends a wireless image of captured 2D image. However, there is some latency associated with capturing, processing, and transmitting the 2D image to the computing device 3744. To enable the 3D mobile measuring device 3700 to respond quickly to the user control signal 3746 or 3754, the first processor 3745A transforms the global 3D representation stored in the first memory 3745B to determine the expected local 3D representation of after movement of the 3D mobile measurement system 3700 in response to the wireless user control signal. Such a transformation can be carried out quickly by the processor 3744 and hence greatly reduce problems with latency. For the example given here, the user display 3750 is expected to show an image of the local 3D environment consistent with the wireless feedback signal provided by the 3D mobile measurement system 3700 to the computing device 3744 but with most of the latency removed. The computing device sends a wireless mobile control signal 3746 to the 3D mobile measurement device 3700 to direct movement of the 3D mobile measurement device in accordance with the user control signal.

The computing device 3744 is further configured to transmit to the 3D mobile measurement system 3700 wireless mobile control signals 3746 that determine the movement of the 3D mobile measurement system 3700. The wireless mobile control signals are based at least in part on the global 3D representation, the user control signal, and the wireless feedback signal.

In an embodiment, a 3D representation of the environment is stored on a computing device or memory device that travels with the system. An advantage of this approach is that the local information may be used to assist in navigation if the computing device 3744 or user station 3749 is not available. In an embodiment, the system is a motorized mobile 3D measuring system such as 3700A, 3700B, 3700C, or 3700D. Any other type of mobile measuring system may be used. In an embodiment, a computing device or a memory used for storing the 3D representation of the environment may include a computing device within the TOF scanner 3710, the laser tracker 3750, the triangulation scanner 1500, the triangulation scanner array 3780, or any other type of mobile measuring device. Alternatively, the 3D representation may be stored in a computing device 3734, 3762, 3740, or 3763. Any type of computing device or memory device configured to move with the mobile measuring device may be used to store the 3D representation.

In an embodiment illustrated in FIG. 18A, an operator views a virtual representation of the 3D environment as would be seen by the 3D camera or 2D camera 3702 on a display monitor 3750. The display monitor 3750 and joystick 3751 are attached through a wired communication channel 3752 such as IEEE 802.3 (Ethernet) to communicate with a computer 3744. The computer 3751 receives data over the channel 3752 indicating the movements of the joystick 3751. The computer 3744 applies the received joystick movement data to rotate, translate, and scale the 3D representation it has stored in its memory. The computer 3744 transfers the transformed 3D data to the display monitor 3750 that presents an image expected of the view of the 3D/2D camera 3702 of the mobile measuring system 3700A. Because of the high speed transformations available with standard computers available today, the 3D representation is displayed on the monitor without a noticeable lag in response. The movements of the joystick 3751 by the operator are sent over to the mobile 3D measuring device 3700 over a wireless communication channel.

In an embodiment in a factory environment, FIG. 18A shows a path initially open along the route segments 3830A, 3830B, and 3830C. In an embodiment, in FIG. 18B the path is no longer open because two islands have been combined to block the pathway row 3820B between the pathway columns 3810C, 3810D. The mobile measuring device 3700A observes the change in the structure relative to the virtual 3D representation produced by the computer 3744. It may do this through observations of the 3D camera 3702, through observations of the 2D scanner 3732, or through observations made by some other sensor of the mobile measuring device 3700A. In an embodiment, the computer 3744 is further configured to compare an image from the camera on the mobile measuring device 3700A to the transformed 3D representation. A large difference in the image from the camera and the transformed 3D representation is indicative of a change in the environment or a problem in the system and hence prompt further action on the part of the operator or the computer 3744.

In response, the computer 3744 may direct the mobile 3D measuring device 3700A to perform a 3D measurement of the changed area. The mobile 3D measuring device stores the revised 3D representation in its local memory and sends the new 3D representation to the network computer 3744 through the wireless communication channel 3746. The mobile measuring system may not be the system 3700A but a different 3D measuring system such as 3700B, 3700C, or 3700D.

In an embodiment, an operator interacts with a mobile measurement system through a user interface (UI) device. FIG. 19B-FIG. 19F illustrate UI devices with which an operator 1900 in FIG. 19A may interact.

Figure 19B:
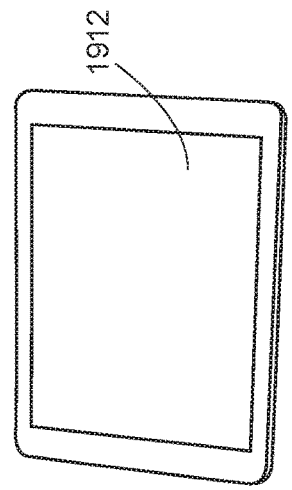
FIGS. 19A-19F show an operator and user interfaces that may be used with a 3D mobile measurement platform including a tablet computer, an augmented reality (AR) headset, a virtual reality (VR) headset, a VR hand controller, and a VR console controller according to an embodiment.

FIG. 19B shows a display device 1910 that includes a display 1912, such as a touchscreen display. In other embodiments, the display device 1910 includes a different user input feature. In an embodiment, an operator stands in the vicinity of a 3D measuring system, views the results of the 3D measurements on the display 1912 and gives instructions through an input feature on the display device 1910. In another embodiment, the operator and the display device are remotely located from one or more 3D measurement systems. In an embodiment, each 3D measurement device includes its own display device. A bank of such displays may provide the operator with an overview of the activities of a collection of 3D measurement devices.

Figure 19C:
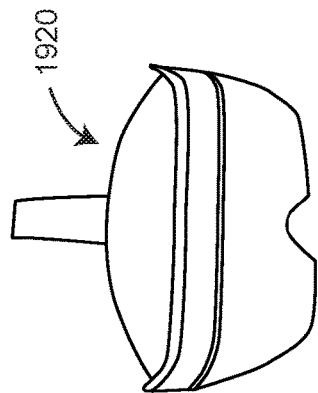
Figure 19A:
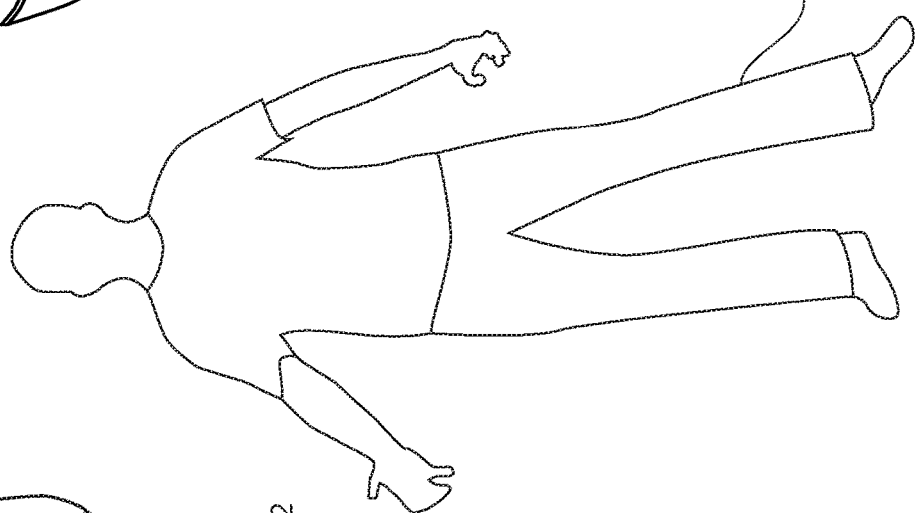

FIG. 19C shows an augmented reality (AR) display device 1920. Most AR devices enable an operator to view local surroundings while, at the same time, superimposing a digital representation over the local surroundings. The digital superposition may be obtained using a number of different methods. In one approach, a projector is used to project the digital pattern onto the glasses, which is captured by one or both eyes. At the same time, light from the surroundings passes through the glasses and is seen by the viewer. In another approach, the glasses are digital glasses that capture the surroundings with a camera, which might be a high dynamic range (HDR) camera in some cases. A digital image is superimposed onto the digital representation obtained by the camera. In yet another approach, the digital image is directly projected onto the eye or eyes of the observer. In one implementation of this approach, contact lenses are configured to both pass light from the surroundings and to superimpose a digital image from the contact lenses. In an embodiment, the AR display device 1920 interfaces with an external computer such as a networked computer or a stand-alone computer. In another embodiment, all computing capability is contained in the display device.

Figure 19D:
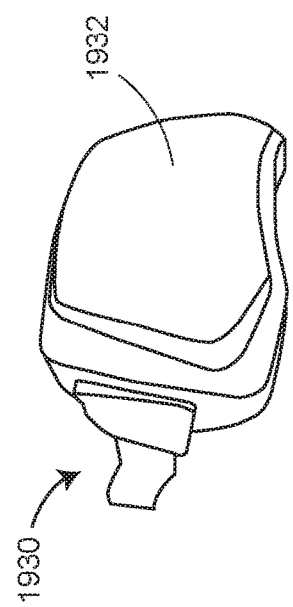
Figure 19E:
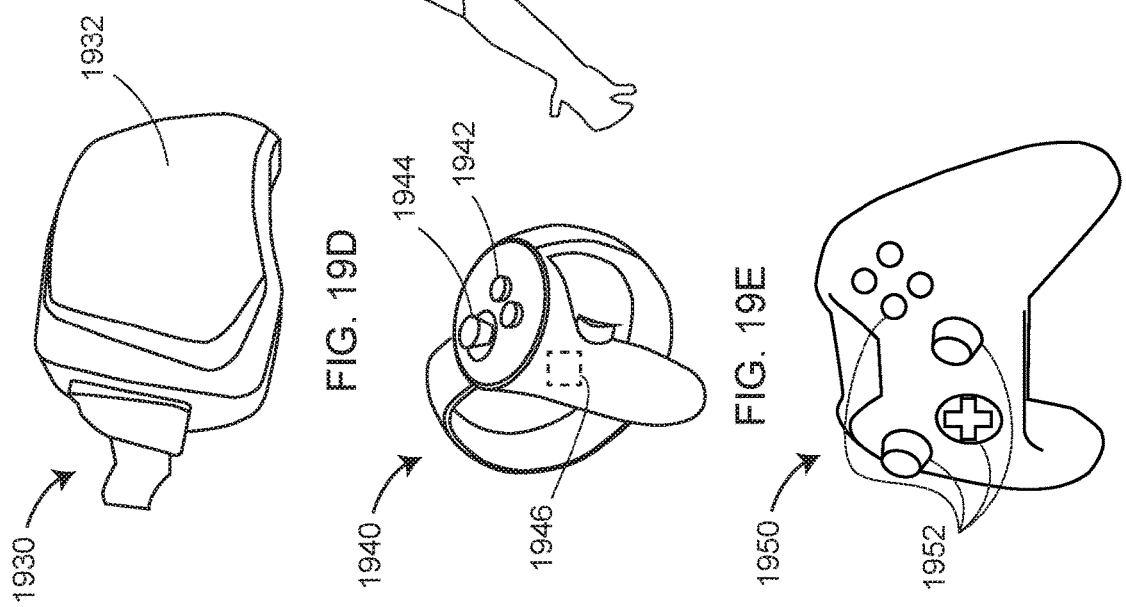
Figure 19F:
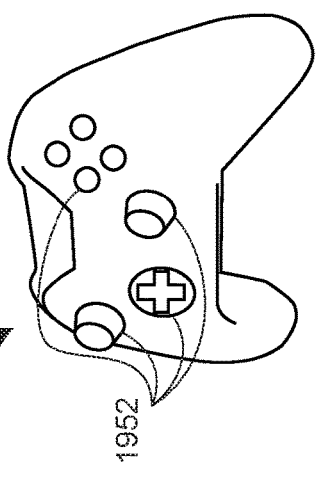

FIG. 19D shows a virtual reality (VR) display device 1930. A VR device enables an operator to interact with a virtual representation of an environment. In an embodiment, the VR device 1930 includes a headset digital display 1932 that displays the virtual environment. In an embodiment, a 3D representation of the environment, for example, as captured using 3D measuring instruments such as 3700A, 3700C, or 3700D, is presented to the headset digital display 1932.

In an embodiment, the operator uses UI devices to control movement of the operator within an AR environment. One such UI control device is a handheld device 1940 of FIG. 19E. Such a control device 1940 may include an inertial measurement unit 1946 that responds to positional and rotational movements. The control device may also include control buttons and a control joystick to control movements of the apparent operator location in relation to the displayed 3D images. Such controls may also be used to activate a menu with which choices can be on the types of information to be displayed or other actions to be taken. In an embodiment, the operator uses a console type UI control device having controls 1952 to control actions within the AR environment.

In an embodiment, the operator uses gestures rather than, or in addition to, a UI device. For example, an operator may use a gesture to move forward or backward, move left or right, turn right or left, look up, or look down. An operator may also use gestures to open menus and make selections.

In an embodiment, the VR display device 1930 interfaces with an external computer such as a networked computer or a stand-alone computer. In another embodiment, all computing capability is contained in the display device. The external computer may include a complete 3D representation of the environment, which might be, for example, a factory.

In an embodiment, the VR display device further receives video information, for example, from a camera. This enables the headset digital display 1932 to integrate real-time remote AR data into the VR representation. For example, such real-time AR data may be provided by the operator by moving a mobile measuring device to a position in the environment. A camera on the mobile measuring device captures remote AR information, which it sends to the system for integration with the displayed VR information.

In an embodiment, a 3D representation of an environment has been captured in 3D and stored in a remote computer such as the computer 3744. In an embodiment, an operator uses a VR display device 1930 and a control device such as 1940 or 1950 to move virtually through an environment. In an embodiment, an operator may pass along production lines, for example, and stop to view a 3D representation of the local virtual region. At points along the virtual path, the operator may stop to view information about the VR object. For example, an operator may be interested in productivity of a particular part of a production line. The operator may activate a menu on the remote control that brings up production output for that portion of the production line, along with failure data, for example.

In another embodiment, an operator may remotely control a mobile measuring device, as illustrated in FIG. 20. In an embodiment, an operator wears an AR headset that is further configured to project AR images provided by the mobile measuring device 1930. In an embodiment, remote 2D images or 3D images are provided by the mobile measuring device, which may be a device 3700A, 3700B, 3700C, as shown in FIG. 20, or another mobile measuring device. In an embodiment, the pose of the 3D measuring device is determined so that the 2D or 3D image provided by the mobile measuring device is aligned to the 3D representation. The operator may control mobile measuring systems and view their measuring results even if the mobile measuring systems are blocked from view by walls 2000A, 2000B, and 2000C. In an embodiment, an operator may move virtually to a 3D region within an environment and then view the same region with a 2D or RGBD (3D) camera to obtain a combination VR/AR display. This method may be used for example to remotely determine the number of parts in inventory in a storage shelf next to a production line. Using a VR/AR display, an operator may direct and monitor the actions of multiple mobile measurement systems, thereby quickly obtaining accurate 3D view of the current state of a factory environment.

In an embodiment, an operator may use gestures instead of or in addition to a UI device to move around an environment and to instruct mobile measuring devices to move to areas of interest and make 2D or 3D inspections. In a menu, an operator may request a plan view of an environment, locate available mobile measuring devices, and request the desired actions. As explained herein above in reference to FIG. 18A and FIG. 18B, a 3D measuring system may include a memory in which is stored a 3D representation of the global environment. Using this 3D representation, the 3D measuring system may navigate itself to any location indicated by the operator.

In an embodiment, a system includes a computer having a 3D representation of a global environment stored in memory, as discussed herein above. In an embodiment, the system further includes a mobile measurement system having a mobile base and a first camera, the first camera configured to view a local environment within the larger global environment. In an embodiment, a virtual-reality/augmented-reality (VR/AR) display is in communication with the first computer. Examples of a VR/AR display is a VR display 1930 further configured to images obtained from a camera traveling with the mobile measurement system. In an embodiment, the VR/AR display is configured to operate in at least three modes: a first mode being a VR mode based at least in part on the global 3D representation, a second mode being an AR mode based at least in part on a digital image from the first camera, and a third mode being a VR/AR mode being a superposition of the VR and AR modes on the VR/AR display. In an embodiment, a fourth mode is included that projects additional information such as annotations onto the VR/AR display. In an embodiment, the system further includes a user interface that is responsive to a user-interface command. The camera may be a 2D camera or a 3D camera such as a depth (RGBD) camera, a stereo camera, or a triangulation scanner. In an embodiment, the user-interface command directs the VR/AR display to operate in one of the first mode, the second mode, or the third mode. In a further embodiment, a user-interface command directs the mobile base to move. In various embodiments, the user interface command is selected from a gesture, a head movement, a keystroke, a mouse movement, a joystick movement, and a sensor movement in a UI device. In an embodiment, sensors within the UI device may include an accelerometer (equivalent to an inclinometer), a gyroscope, a magnetometer, and a pressure sensor (to measure altitude). In an embodiment, the VR/AR display includes a headset such as the headset 1930 or the headset 1920 in FIG. 19A. In an embodiment, an operator directs movement of the system based at least in part on a view of the local environment from the first camera. In another embodiment, the operator directs movement of the system based at least in part on a virtual representation of the 3D environment, the virtual representation of the 3D environment being based at least in part on the global 3D representation of the global environment. A discussion of how such direction may be applied was discussed with reference to FIG. 18A and FIG. 18B. In an embodiment, the virtual representation of the 3D environment is further based on a feedback signal provided by the mobile measurement system. Such a feedback system was also discussed in reference to FIGS. 18A, 18B. In an embodiment, the first computer is in wireless communication with the VR/AR display and with the first mobile measurement system. In an embodiment, the system further includes a 3D measuring device, which might for example by a triangulation scanner or a time-of-flight scanner. In an embodiment, VR and AR images are aligned in the VR/AR display. Methods for performing such an alignment were discussed herein above in regard to FIGS. 18A, 18B. In an embodiment, the 3D measuring device is used to make a 3D measurement of an object. In an embodiment, a dimensional characteristic is determined based at least in part on the 3D measurement data, and an annotation of the determined dimensional characteristic displayed on the VR/AR display.

Figure 21:
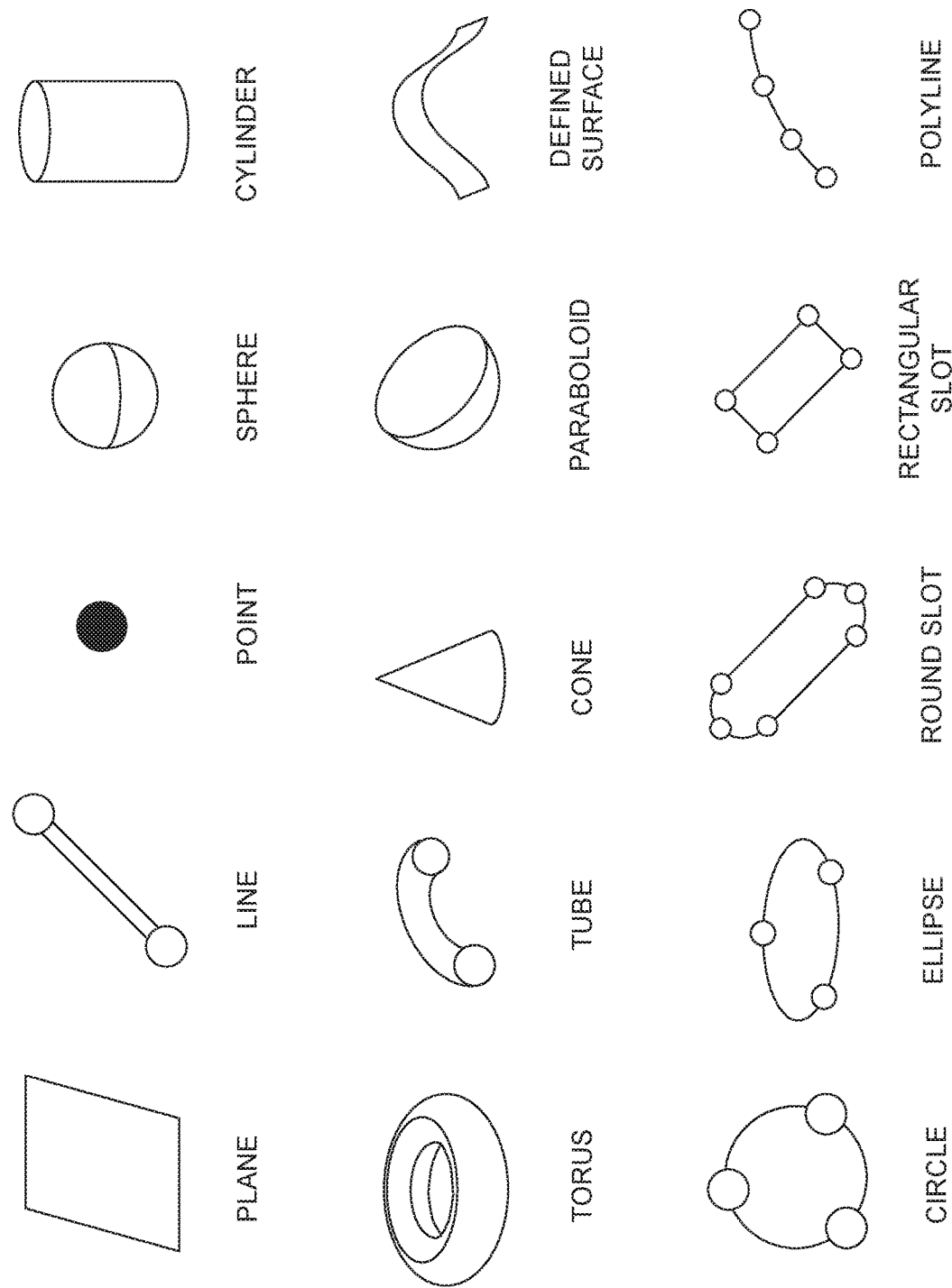
FIG. 21 depicts a collection of basic geometrical elements according to an embodiment.

In a 3D inspection of an object, it is convenient to describe the measured elements using basic geometrical elements as illustrated in FIG. 21. The illustrated examples of geometrical elements include a plane, line, point, cylinder, torus, tube, paraboloid, defined surface, circle, ellipse, round slot, rectangular slot, and polyline. Characterization of each geometrical element through a 3D measurement requires measurement of at least a prescribed minimum number of points. For example, at least three points must be measured to represent a plane; at least two points must be measured to represent a line; at least one point must be measured to represent a point; at least six points must be measured to represent a cylinder; at least nine points must be measured to represent a torus; and so forth.

Figure 22A:
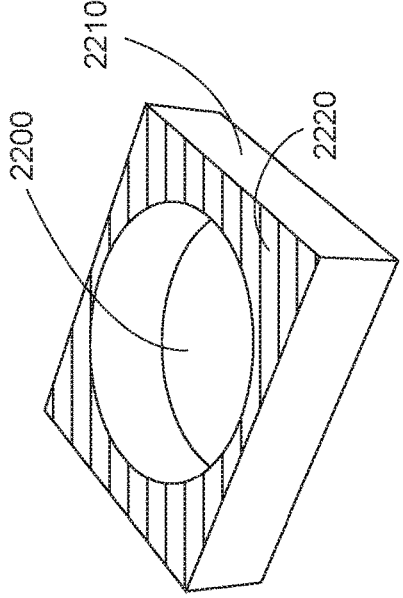
FIGS. 22A-22F are perspective views and top views showing representative measurements of a cylindrical hole in a plate according to an embodiment.
Figure 22B:
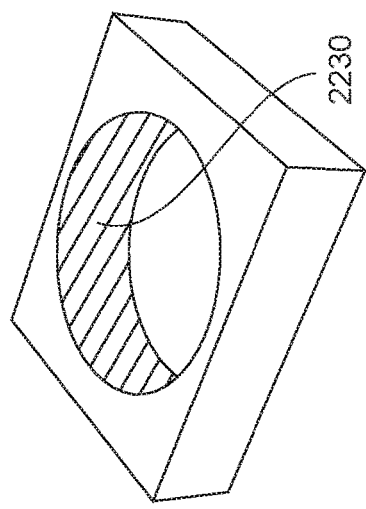
Figure 22C:
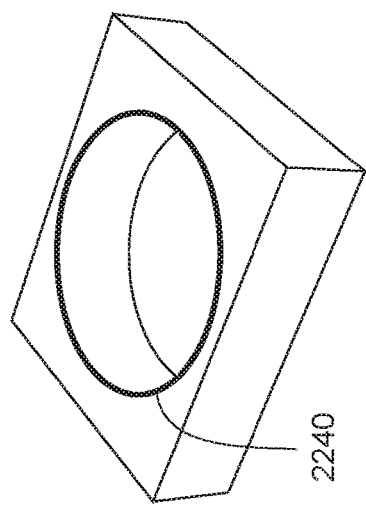
Figure 22D:
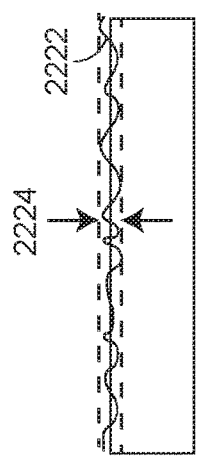
Figure 22E:
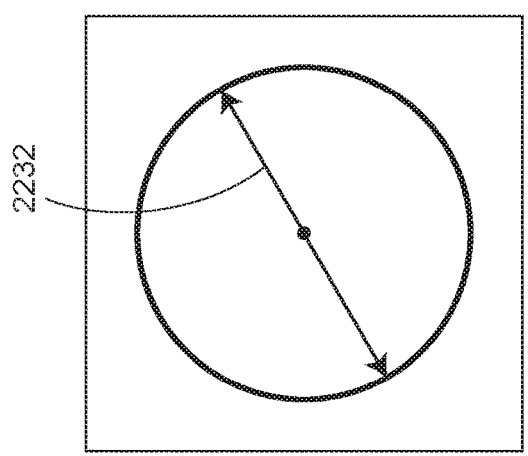
Figure 22F:
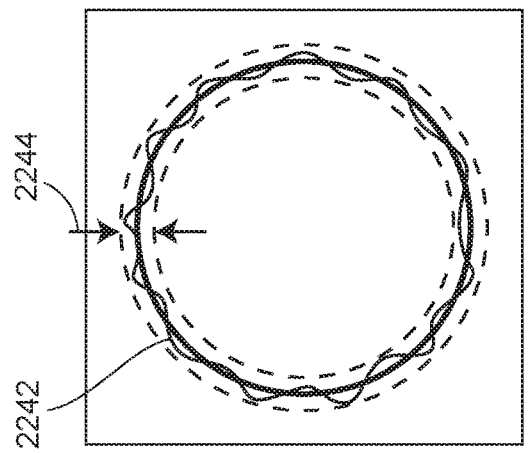

In some cases, measurements of a single geometrical element provide all the information needed to determine whether a geometrical characteristic is within a tolerance specified for it in a CAD drawing. FIG. 22A-FIG. 22F show a cylindrical hole 2200 in a flat plate 2210. The top planar surface 2220 shown hatched in the perspective view of FIG. 22A is shown to have small ripples 2222 when viewed from the side in FIG. 22D. The range of these ripples is referred to as the form error 2224 or flatness of the plane. The cylinder 2230 is shown hatched in the perspective view of FIG. 22B. The measured diameter 2232 of the cylinder 2230 is shown in a top view in FIG. 22E. The intersection of the plane 2210 and the cylinder 2230 is a circle 2240, which is shown in FIG. 22C to be a two-dimensional feature. FIG. 22F is a top view showing small ripples 2242 in the circle. The range of these ripples is the form error 2444 or circularity of the circle.

Figure 23A:
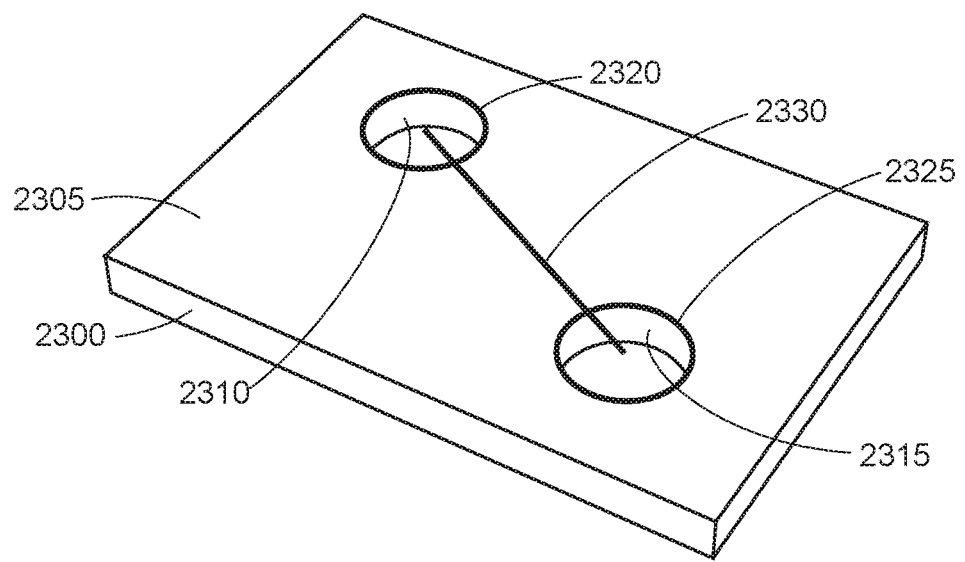
FIGS. 23A and 23B are perspective views showing representative measurements that involve two separated geometrical elements according to an embodiment.
Figure 23B:
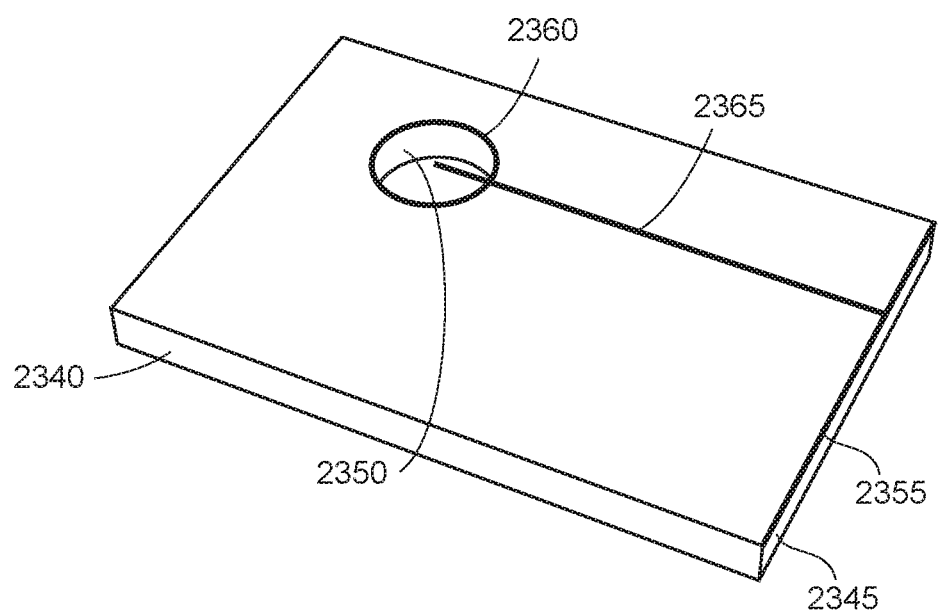

In other cases, measurements of two or more geometrical elements are needed to determine whether a geometrical characteristic is within a tolerance specified for it in a CAD drawing. FIG. 23A shows a flat plate 2300 having a planar top surface 2305, a cylindrical hole 2310 and a cylindrical hole 2315. The cylinders 2310, 2315 intersect the plane 2305 at circles 2320, 2325, respectively. The top planar surface 2305 and the two cylindrical holes 2310, 2315 are measured to determine the distance 2330 between the centers of the two holes. FIG. 23B shows a flat plate 2340 that includes a planar top surface 2345, a planar side surface 2350, and a cylindrical hole 2355. The intersection of the top plane 2345 and the side plane 2350 is a side line 2355. The intersection of the top plane 2345 and the cylinder 2355 is a circle 2360. The top plane 2345, the side plane 2350, and the cylinder 2355 are measured to determine the perpendicular distance 2365 from the circle center to the side line.

Figure 24A:
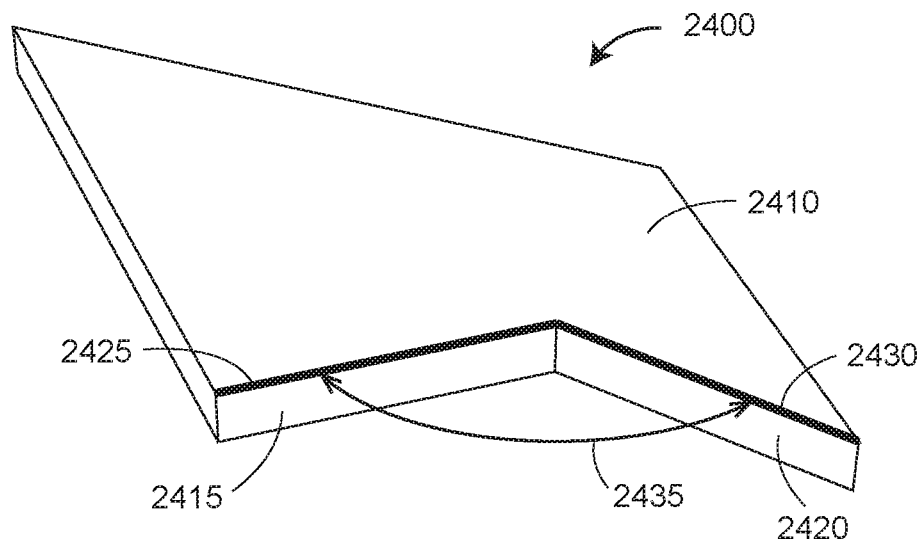
FIGS. 24A and 24B are perspective views show representative measurements that involve construction of geometrical elements according to an embodiment.
Figure 24B:
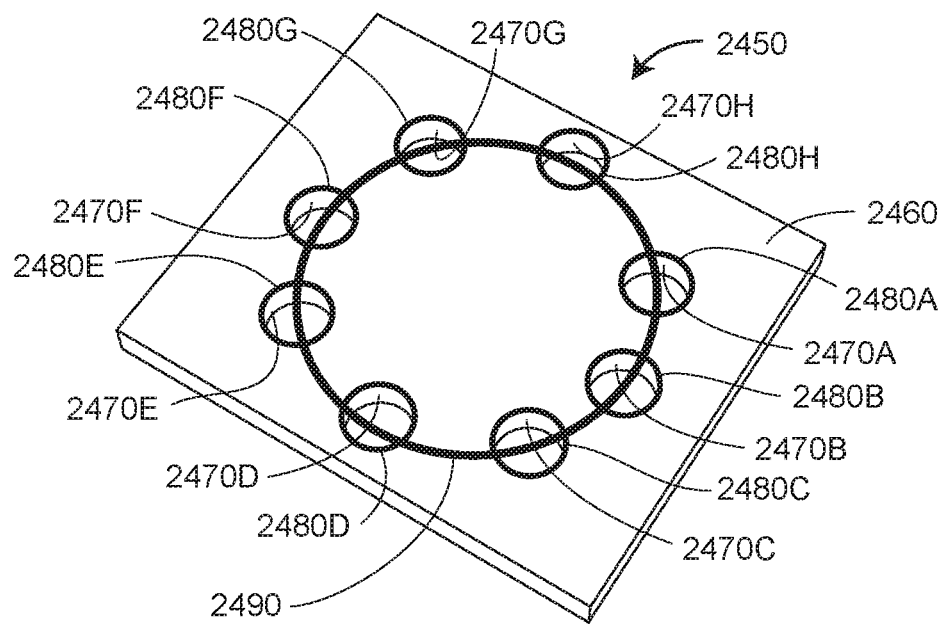

In still other cases, measurements are based at least in part on geometrical constructions. FIG. 24A illustrates the case in which an angle 2435 is to be found between two constructed lines 2425, 2430. A plate 2400 includes planar surfaces 2410, 2415, and 2420. The intersection of the planes 2410 and 2415 is the line 2425. The intersection of the planes 2410 and 2420 is the line 2430. The constructed lines 2425 and 2430 are used to determine the angle 2435. FIG. 24B illustrates the case in which a constructed circle 2490 is to be found that best fits centers of eight cylindrical holes 2470A-2470H in a planar plate 2460. To do this, circles are found by intersecting the plane 2460 with each of the cylindrical holes 2470A-2470H to find eight circles 2480A-2480H. A center is found for each of the eight circles and the constructed circle 2490 determined based on a best fit of the constructed circle to the eight centers. In an embodiment, the least squares method is used to determine the best fit.

Figure 25A:
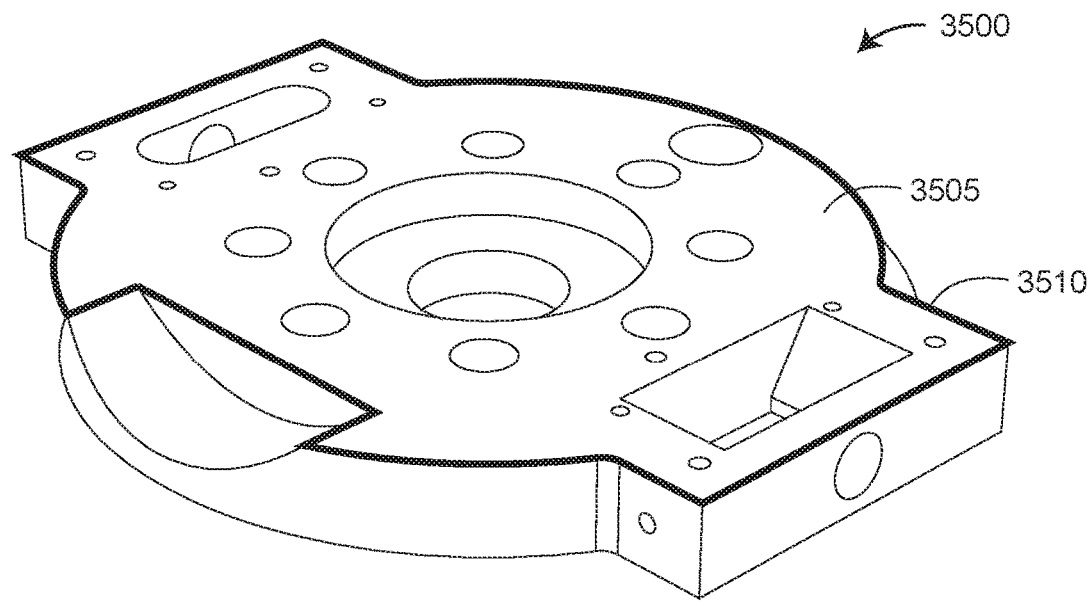
FIGS. 25A-25D are perspective views illustrating the generation of an x-y-z coordinate system on a part based on a measurement on a plane, a plane, and a cylinder on the part according to an embodiment.

FIG. 25A shows an example part 3500. In a first step, the top planar surface 3505 within the lines 3510 is measured in 3D. In a second step illustrated in FIG. 25B, the planar surface 3515 is measured in 3D. The intersection of the planes 3505 and 3515 is the line 3525. In a third step, illustrated in FIG. 25C, the cylinder 3530 is measured. The intersection of the cylinder 3530 and the plane 3503 is the circle 3535. In the example given here, the origin 3540 is set to the center of the circle 3535. In an embodiment, the z axis 3545 passes through the origin 3540 and is perpendicular to the measured plane 3505. The x axis is the line 3550 that passes through the origin 3540 and is parallel to the line 3520. They axis is a line perpendicular to the z and y axes that also passes through the origin. The direction of y is selected to satisfy the right-hand rule.

Geometrical dimensioning and tolerancing (GD&T) is a system for defining and communicating engineering tolerances. FIG. 26 shows some symbols commonly used in GD&T. Form includes form of a line, also known as straightness; form of a plane, also known as flatness; form of a circle, also known as circularity; and form of a cylinder, also known as cylindricity. The table of FIG. 26 is only a partial representation of GD&T symbols. For example, another measure of form is form of a sphere, also known as sphericity. Profile includes profile of a line and profile of a surface. Profile of a line is deviation within a plane of a prescribed curve. Profile of a surface is deviation from a prescribed two-dimensional surface. Orientation includes angularity, perpendicularity, and parallelism. Angularity relates to an angular measure, for example, between two lines or two planes. Perpendicularity relates to the extent to which two features are perpendicular. For example, perpendicularity may be applied to two planes having a nominal angular separation of 90 degrees. It may also apply to the deviation from 90 degrees of a line from a datum plane. Parallelism relates to the deviation of two planes or two lines from zero degrees. Location includes position, concentricity, and symmetry. Position relates to position of a feature. Concentricity relates to the deviation of a central axis of a reference feature to a datum axis. Symmetry relates to the deviation of two features about a datum plane. Runout includes circular runout and total runout. Circular runout relates to a deviation in a plane of a given reference feature with respect to another datum when the part is rotated 360° around the datum axis. Total runout relates to deviation of an entire feature or surface with respect to a datum when the part is rotated 360° around the datum axis.

FIG. 27A is a CAD drawing that shows of FIG. 25A-FIG. 25D in a front view in FIG. 27A and in a right side view in FIG. 27B. FIG. 27B identifies the datum plane A as the plane 3505 illustrated in FIG. 25A. FIG. 27A identifies the datum axis B as the line 3525 in FIG. 27B. FIG. 27C identifies the axis of the cylinder 3530 as the data axis C. It is convenient to align the assigned coordinate system x, y, z shown in FIG. 25D to the datum reference planes and axes, as has been done in FIG. 25D, FIG. 27A, and FIG. 27B.

Figure 25B:
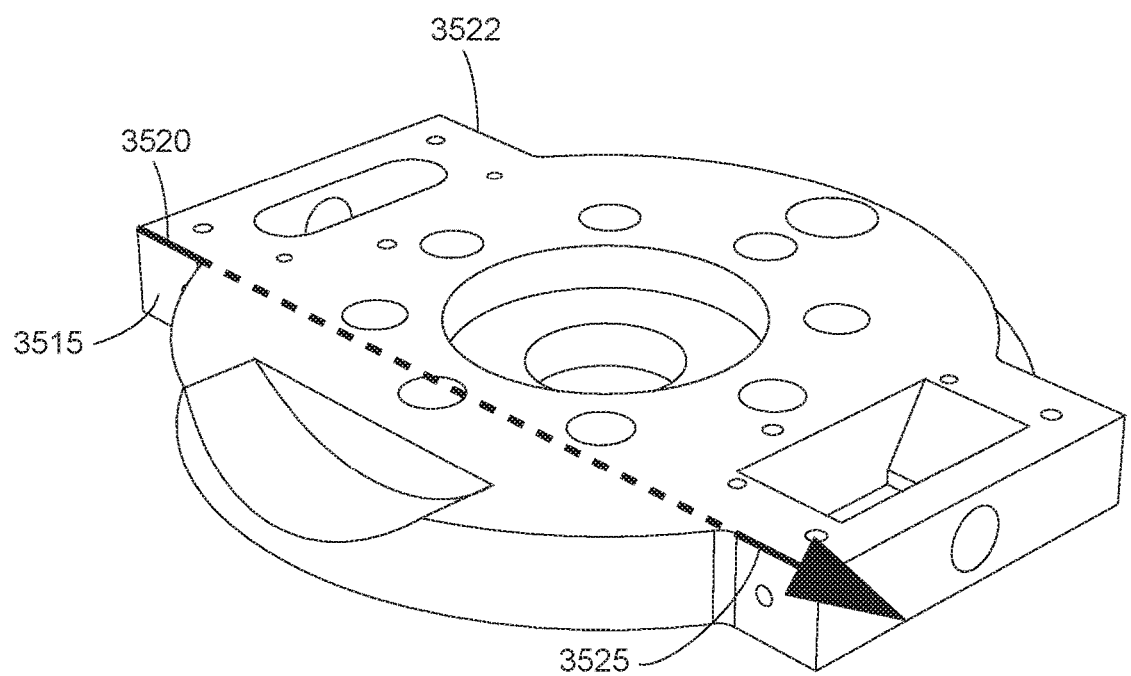
Figure 25C:
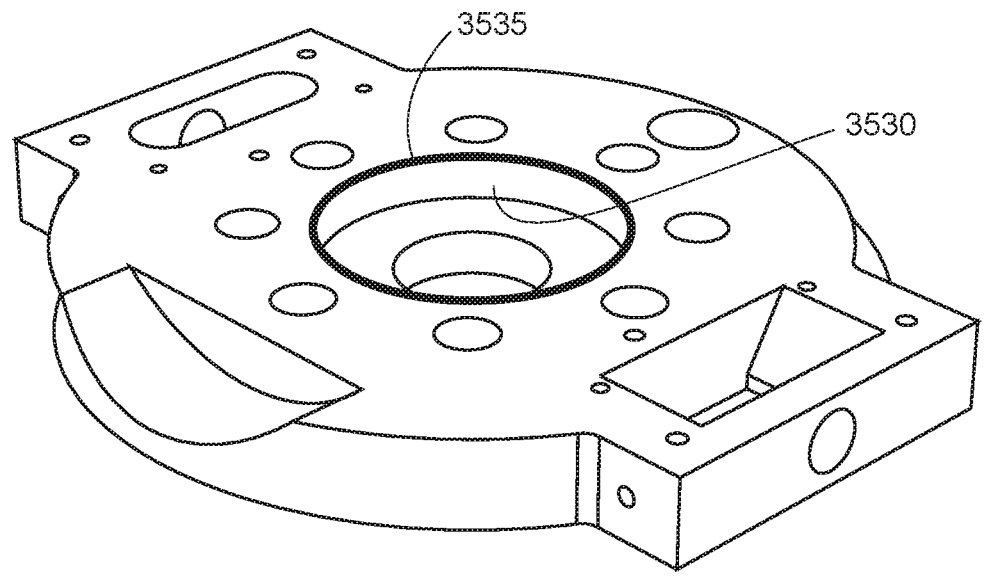
Figure 25D:
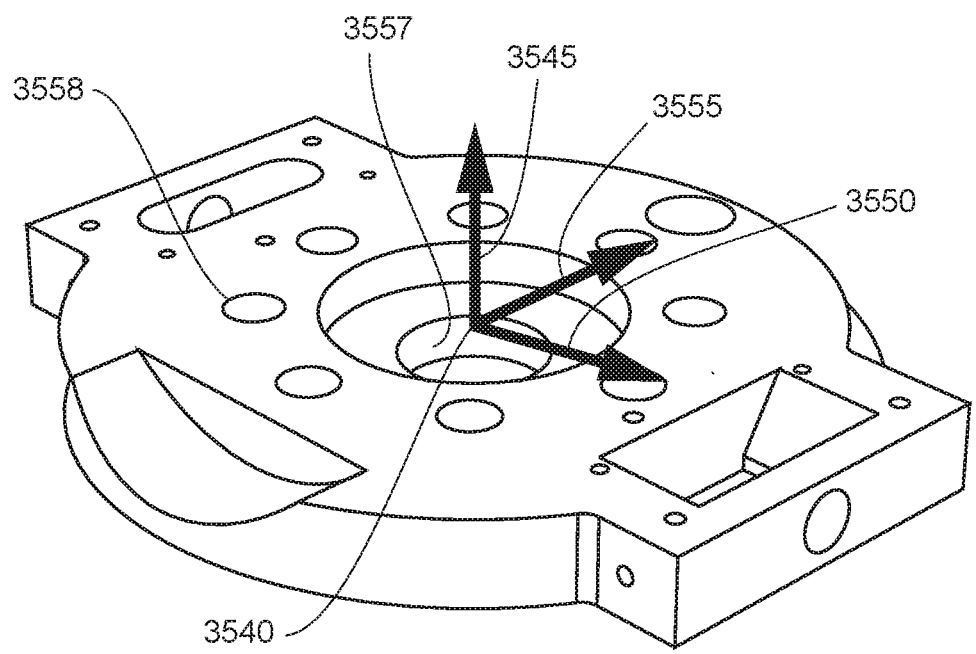

The meaning of the GD&T symbols in FIG. 27A and FIG. 27B can be understood from the discussion of FIG. 26. As indicated in FIG. 27B, the form tolerance for datum plane A is 0.5 mm. As indicated in FIG. 27A, the straightness tolerance for datum axis B is 0.5 mm, and the perpendicularity tolerance for the datum axis C is 0.5 mm. The parallelism tolerance for the line 3522 in FIG. 25B is shown in FIG. 27A to be 0.5 mm with respect to the datum axis B. The concentricity tolerance for the inner cylinder 3557 in FIG. 25D is shown in FIG. 27A to be 0.5 mm with respect to the datum axis C. The GD&T tolerance for the eight cylindrical holes surrounding the circle 3535 is shown in FIG. 27A to have several parts. The eight cylinders each have a diameter of 20 mm with a tolerance of +0.25 mm/−0.1 mm. In addition, the eight cylinders are equally spaced on a reference circle having a diameter of 140 mm. Also, each of the eight cylinders must fall within a one millimeter diameter centered on the indicated position, with the position determined by referencing datum A, then datum B, and then datum C.

Figure 28A:
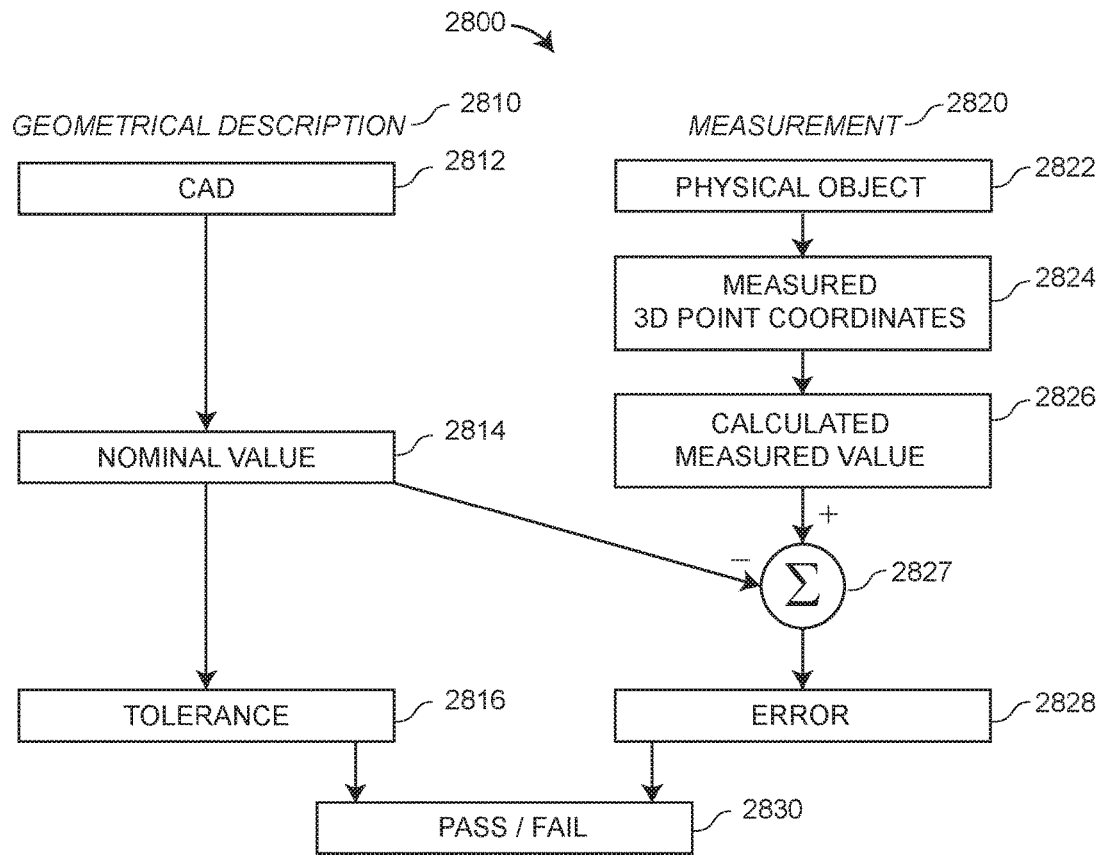
FIG. 28A is a block diagram illustrating elements of a geometrical feature characteristic according to an embodiment.

FIG. 28A refers to a method for making a dimensional measurement of an object. In the present application, the term "geometrical feature characteristic" refers to a combination of a geometrical description 2810 and a corresponding object measurement 2820. A visual representation of the object may be included in the geometrical description as a CAD file 2822 or a drawing on paper. The geometrical description further includes at least one nominal value 2814 and a corresponding tolerance 2816 for each geometrical feature in the CAD file or drawing. The object measurement 2820 includes identifying the physical object 2822, measuring the object 3D point coordinates 2824 corresponding to the at least one nominal value 2814, and calculating the measured value 2826 based on the measured 3D point coordinates. In a further step 2827, the nominal value 2814 is subtracted from the measured value 2826 to obtain an error 2828. If the absolute value of the error is less than the tolerance 2816, the geometrical feature is said to pass 2830. If all the geometrical in a geometrical description 2810 pass, the object 2822 is said to be within the prescribed tolerances.

FIG. 29B refers to elements 2840 needed to complete a measurement according to an inspection plan 2850. Such an inspection plan determines geometrical feature characteristics as described in reference to FIG. 28A. The block 2841 indicates some of the measuring and support elements that may be needed to complete the inspection. The block 2861 indicates some of the steps performed in obtaining a succession of measurements leading to the measurement result 2868.

The measuring and support elements include one or more 3D measuring instruments 2842, the CAD model 2844, a mover device 2846, and a positioning aide 2848. The 3D measuring device is any device capable of measuring 3D coordinates. Examples of 3D measuring devices include laser trackers 4010, triangulation scanners 210 and 1500, TOF scanners 3710, and articulated arm coordinate measuring machines (CMMs). Articulated arm CMMs are robotic arms that are moved by hand and that include either a tactile probe or a triangulation scanner at the measuring end of the CMM.

The CAD model 2844 (or paper drawing) was discussed herein above in reference to FIG. 28A. A mover is a device that moves the 3D measuring device. An example of a mover is the mobile measurement platform 100. Another example of a mover is the mobile measurement structure 1220.

An aide is a device that tracks movement of the 3D measuring instrument 2842. A six-DOF tactile probe or six-DOF scanner may be tracked at a distance by a laser tracker. In this case, the six-DOF probe or scanner is the 3D measuring instrument and the laser tracker is the aide. A triangulation scanner may be tracked in a variety of ways. A six-DOF probe may be attached to the triangulation scanner for tracking by a six-DOF laser tracker aide. Three or more retroreflector targets may be attached the triangulation scanner for tracking by a laser tracker aide. A collection of light source or reflective spots may be attached to the triangulation scanner for tracking by one or more calibrated camera systems aides. The triangulation scanner may determine its own position by measuring a collection of illuminated target points (aides) on or near the object under test. The 3D coordinates of the illuminated target points may in some cases be known ahead of the measurement by the triangulation scanner. In this case, a photogrammetry camera aide may be used to capture images of the large collection of targets (aides), along with calibrated scale bars, to determine the 3D coordinates of the target aides in a common frame of reference. The determined 3D coordinates of the illuminated target aides are visible to the triangulation scanner and may be used to place the multiple measurements of the triangulation scanner in a common frame of reference.

The inspection plan 2850 is a plan that combines the actions of the measuring and support elements 2841 with the measured values obtained by the measuring and support elements 2841 and with calculations needed to get the final results 2868.

The measurement and analysis steps 2861 include the measurement and analysis steps. In a step 2862, the measuring device is moved into position by a mover as described above. In some cases, the movement of the mover is further based on information provided by an aide, as explained herein above. In a step 2864, the 3D measuring device measures 3D point coordinates of the object surface. In some cases, a 3D measuring device may measure several 3D coordinates before the mover moves it to a new position in a step 2866. This is indicated by the dashed line between the measure step 2864 and move step 2866. Following collection of the 3D point coordinates, an evaluation 2866 is performed. In most cases, one or more mathematical calculations are performed in the evaluation 2866. In some cases, a single evaluation of the collected information will be sufficient to measure a nominal value as indicated in CAD model. For example, in some cases, the form error of a planar surface may be measured by a triangulation area scanner positioned at a single location. On the other hand, to measure the parallelism between two planar surfaces that are spaced relatively far apart, it may be necessary to follow a first measurement of the first planar surface with a triangulation area scanner with a second measurement of a second planar surface with the triangulation scanner. In either case, after measurements are completed with the 3D measuring device at a first position, the mover will need to move the 3D measuring device to a different location unless all the measurements in the inspection plan have been completed. When the measurement result is considered to have been obtained with the measurement result is successfully obtained.

Figure 29:
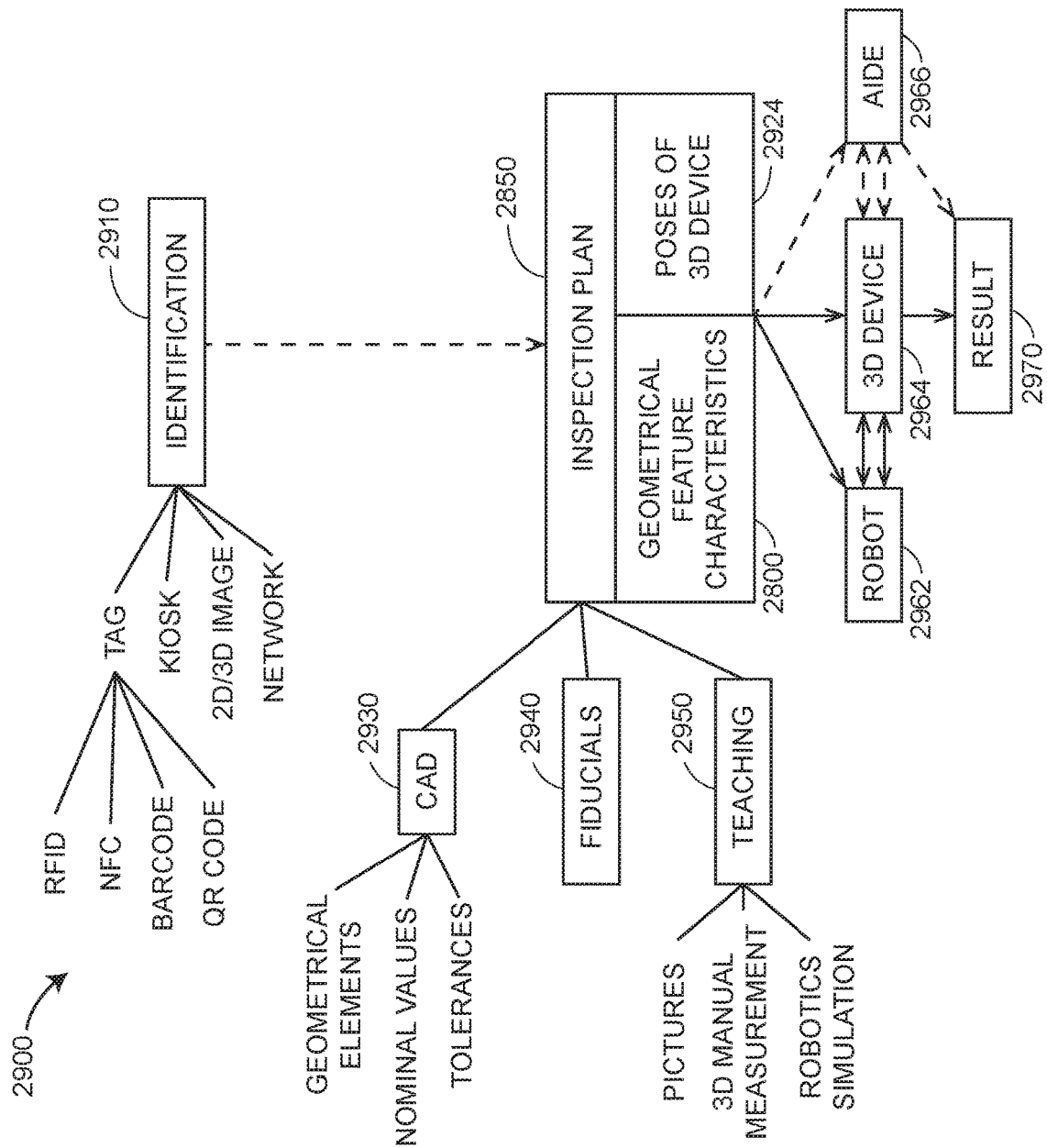
FIG. 29 is a block diagram illustrating steps in creating an inspection plan and executing an inspection according to an embodiment.

An inspection method 2900 for measuring 3D coordinates is further discussed in reference to FIG. 29, and the inspection plan 2850 is further described. An optional first element of the inspection 2900 is identification 2910 of the object to be measured. In some cases, a mobile 3D measuring device may have the possibility of measuring many different types of objects or performing multiple types of tests on a given object. The identification step 2910 is needed in this case. In other cases, the 3D inspection object and procedure may be unchanging, thereby eliminating the need for the identification step.

Figure 30:
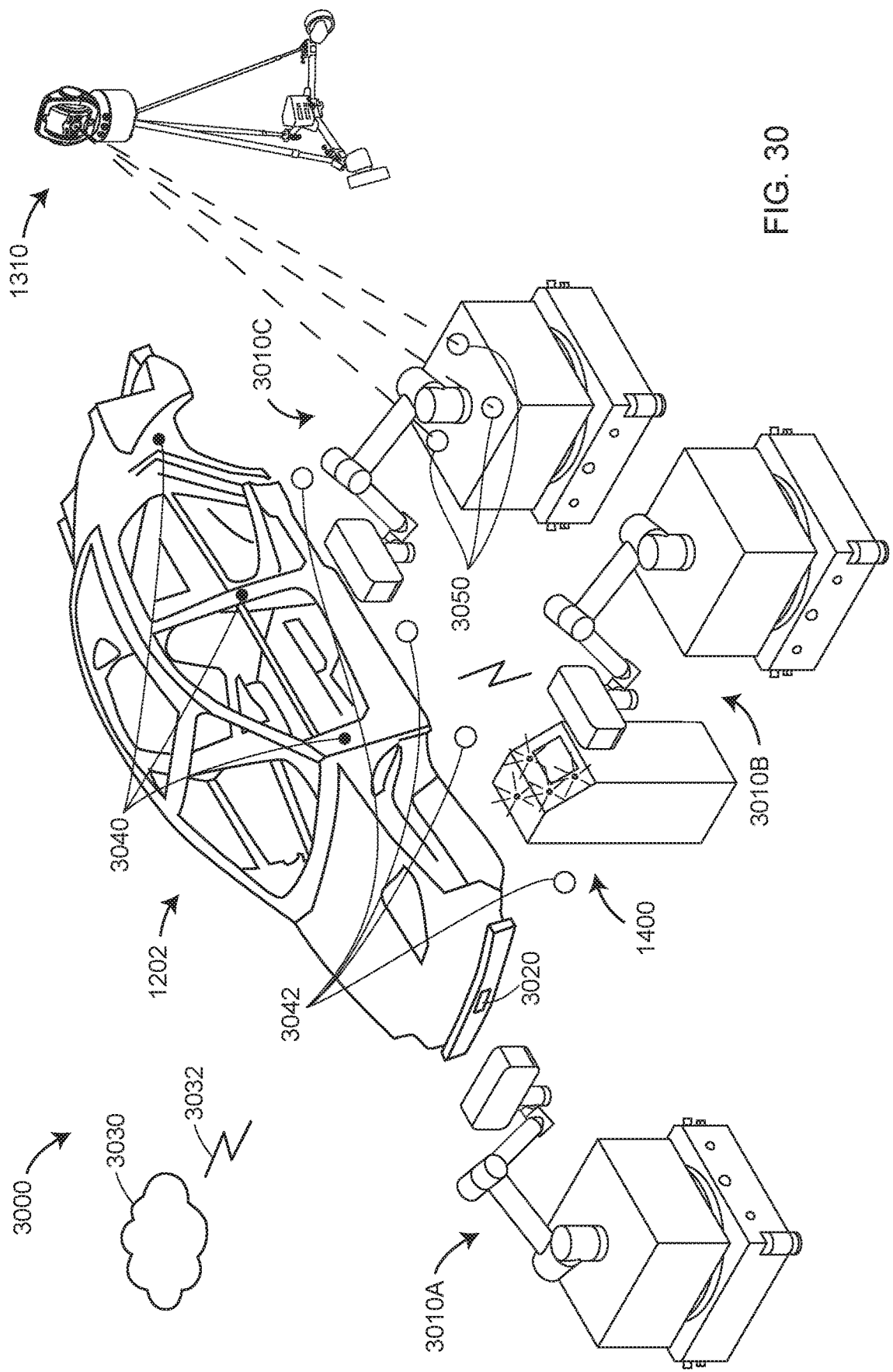
FIG. 30 is a perspective view illustrating alternative embodiments for identifying an object to be measured.

There are several possible ways to identify the object to be measured and measurements to be performed including use of: a tag, a kiosk 1400, a 2D image, a 3D image, and an instruction from an external computer such as a network computer. A tag may be of several types including: a radio-frequency identification (RFID) tag, a near field communication (NFC) tag, a barcode tag, or a QR tag. FIG. 30 illustrates methods 3000 for identifying an object 1202 to be measured and the types of measurements to be performed on the object 1202. In an embodiment, a 3D mobile measuring system 3010A reads a tag 3020. The 3D mobile measuring systems 3010A, 3010B, 3010C may be any type of mobile measuring system capable of determining 3D coordinates of an object. Examples of such 3D mobile measuring systems include systems 200, 1700, 1750, 3700A, 3700C, and 3700D. Many other types of 3D mobile measuring systems are possible and may be used. For the case in which the tag 3020 is an RFID or NFC tag, the 3D mobile measuring system 3010A may include an RFID reader or NFC reader, respectively. Alternatively, an RFID or NFC reader may be located off the 3D mobile measuring system 3010A but on the factory floor at such a position to enable it to read the tag 3020. For the case in which the tag 3020 is a barcode or QR tag, the 3D mobile measuring system 3010A may use a camera already present on system 3010A. Alternatively, a dedicated barcode reader or QR code reader may be used. FIG. 30 shows the tag 3010 attached to the object 1202, but the tag 3010 could equally well be attached to an element that travels with the object 1202.

FIG. 30 illustrates use of a 3D mobile measuring device 3010B interacting with a kiosk 1400. The kiosk 1400 may know the identity of the object 1202 and the measurements to be performed on the object 1202. In an embodiment, the kiosk displays information on the display 1410, for example, a barcode or QR tag that includes information on the identity of the object 1202 and measurements to be performed. Information may be sent to the kiosk from an external computer, for example, a networked computer 3030. Communication between the computer 3030 and the kiosk may be over a wireless communication channel 3032 or a wired communication channel.

Figure 28B:
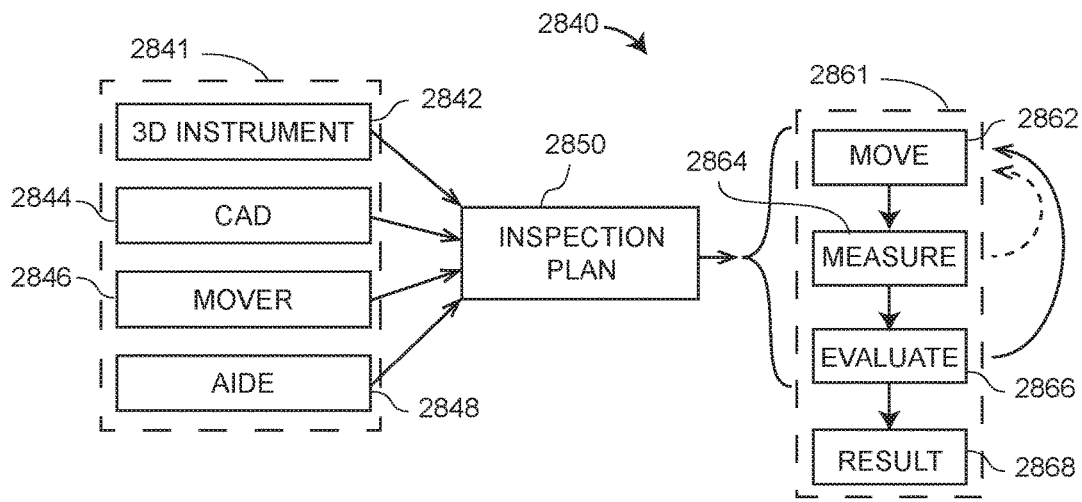
FIG. 28B is a block diagram illustrating elements on an inspection procedure according to an embodiment.

A 2D camera or a 3D camera attached to a mobile measuring device 3010C may also be used to determine the identity of the object 1202 and measurements to be performed, as illustrated in FIG. 30. In some cases, an object 1202 is relative large so that the 3D mobile measuring device will have to move between images obtained with the 2D camera or 3D camera. To assist in recognizing the amount of movement of the 3D mobile measuring system 3010C in relation to the object 1202, markers 3040 may be attached to the object 1202. Alternatively or additionally, markers 3042 may be located off the object 1202 but within view of the 2D camera or 3D camera on the mobile measuring device 3010C. Alternatively or additionally, an aide may be used to track movement of the mobile measuring system 3010C as it captures images with a 2D camera or 3D camera. In an embodiment, the aide is a mobile laser tracker system 1310. The laser tracker may measure three or more retroreflector targets 3050 or at least one six-DOF target. Other types of aides, as discussed herein above in reference to FIG. 28A and FIG. 28B may be used in place of the mobile laser tracker system 1310.

The networked computer may also send the identity the object 1202 the measurements to be performed on the object 1202 directly to a mobile 3D measuring system such as 3010A, 3010B, or 3010C through a wireless connection such as IEEE 802.11 (Wi-Fi).

The inspection plan 2850 of FIG. 29 includes at least the elements of the geometrical feature characteristics 2800 described in regard to FIG. 28A, which is to say that the inspection plan 2850 includes at least at a geometrical description 2810 of the object to be measured and measurement steps 2820 corresponding to the geometrical description 2810. In addition, if the mobile 3D measurement device makes a measurement at more than one pose, which is to say at more than one position or more than one orientation relative to the object 1202, then in some cases it is also important to determine the pose of the 3D measuring device in relation to the object 1202. The inspection plan 2850 therefore may also include a method for determining the poses of the 3D measuring device 2924.

Three input elements to the inspection plan illustrated in FIG. 29 are the inclusion of the CAD model 2930, the placing of fiducial markers in some cases on or around the object under test 2940, and the teaching of the method for carrying out the 3D inspection 2950. As already explained herein above with regard to FIG. 28A and FIG. 28B, the CAD model provides visual geometrical elements, nominal values 2814, and tolerances 2816.

In some embodiments, fiducial markers are placed on or around the object under test 1202. Examples of fiducial markers are discussed in reference to FIGS. 11B, 11C, 11F, 11G, 12A, and 12B. Fiducial targets may be used in many other ways, for example, as explained above, to establish a grid having known 3D coordinates through the use of a photogrammetry camera.

The method of instructing the 3D mobile measuring system to complete a 3D measurement according to the inspection plan is referred to herein as teaching the system 2950. Teaching 2950 may include: teaching based on pictures, teaching based on 3D manual measurement, and teaching based on robotics simulation.

In an embodiment, a method of teaching is carried out based on images captured by an operator or administrator. In an embodiment illustrated in FIG. 31, a method 3100 uses a tablet 3110 to capture an image of an object 1202 to be measured. The tablet 3110 includes a case 3112, a rear-facing camera 3114, and a touchscreen display 3118. The camera may be a 2D camera or a 3D camera. If the camera is a 3D camera, it may be a triangulation imager, a stereo camera, or a camera that uses a photosensitive array having the ability to determine distance as well as record colors at each pixel (an RGBD camera). In other embodiments, the tablet 3112 is replaced by a different type of electronic device such as a laptop computer or a smart phone. In some embodiments, the camera is not integral to the tablet 3112 but instead is detached from it.

Figure 31:
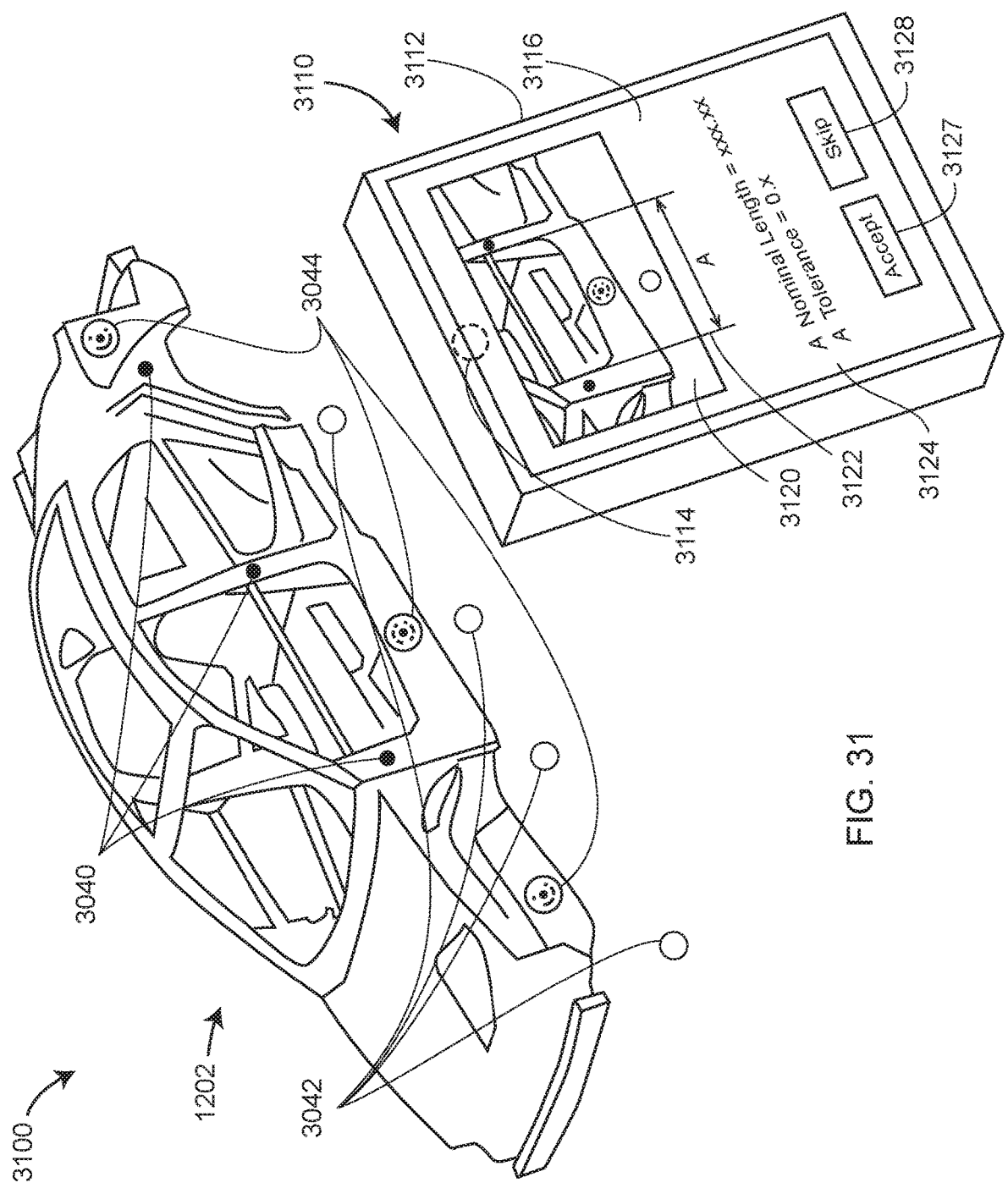
FIG. 31 is a perspective view illustrating a method of using a camera on a tablet computer to teach elements of an inspection plan according to an embodiment.

In an embodiment, markers are placed on or near the object 1202 to assist the operator in identifying the particular region being recorded in the camera images. Three types of markers 3040, 3042, and 3044 are illustrated in FIG. 31. Markers 3040 may be reflective spots or illuminated lights that are placed on the object 1202. Markers 3042 are reflective spots or illuminated lights that are placed off the object 1202. Markers 3044 are coded markers that may be placed on or off the object. In FIG. 31, the markers 3044 are shown on the object 1202. In an embodiment, the markers are similar to the markers 1434 in FIGS. 14B-14G. These markers include a defined center position as well as a code that distinguishes each marker from the others. Many other types of coded patterns are available and may be used.

Figure 32A:
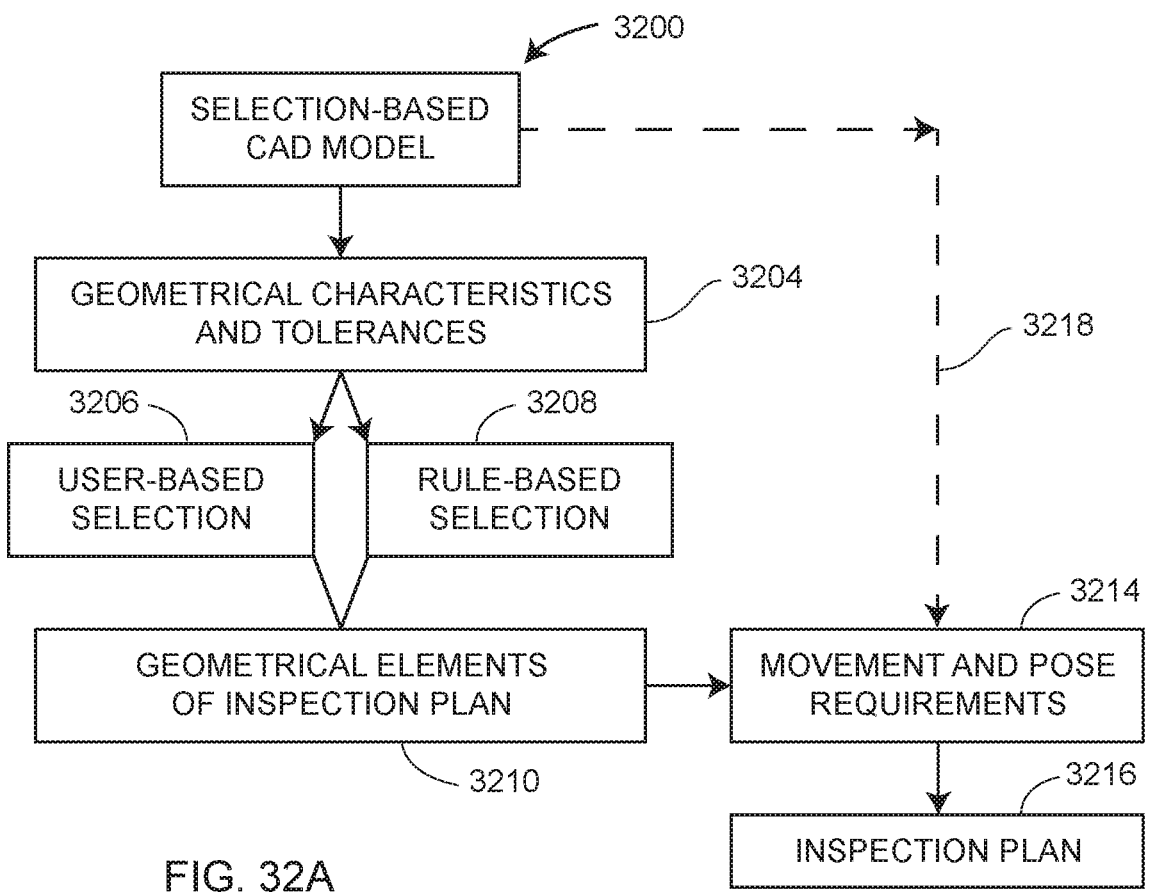
FIGS. 32A-32B are block diagrams that describe alternative approaches to selecting the geometrical feature characteristics to be included in an inspection plan according to an embodiment.

In an embodiment, an operator moves the tablet 3110 to a position at which the camera displays on a camera display portion 3120 a region of interest of the object 1202. In an embodiment, the camera display portion 3120 occupies only a fraction of the display 3116. There are two modes of operation that may be available to the operator, as illustrated in FIG. 32A. The method 3200 of FIG. 32A illustrates what is referred to as a selection-based CAD model because the CAD model that includes the geometrical characteristics, nominal values, and tolerances includes more elements that are desired in the measurement by the 3D mobile measuring system. Hence, either the software or the operator must select the measurements that are to be included. In a step 3204, the software obtains the geometrical characteristics and tolerances. These geometrical characteristics and tolerances are in most cases available in the CAD model, but not all may be included in the geometrical characteristics and tolerances sent to the 3D mobile measuring system. In one possible step 3206 of user-based selection, the operator (or administrator) determines the measurements to be made. For example, the operator may be presented with possible geometrical descriptions from which desired measurements may be selected. In the example of FIG. 31, an operator is presented with an image of a portion of the object 1202 and presented with one possible 3D measurement to be made according to the CAD model. The display indicates that the geometrical feature in this case is a distance between two points 3122, indicated by the letter A. Also indicated are the nominal value (of the distance) and the tolerance 3126. The operator is offered with a choice of accepting inclusion of this measurement in the inspection plan 3127 or skipping inclusion of this measurement in the inspection plan 3128. In another embodiment, an operator may be presented through the table display the functionality of a complete metrology measurement program for the 3D measuring instrument. In this case, a relatively more complicated measurement may be entered by the operator following the step 3206.

In the rule-based selection step 3208, the software determines the measurements to be made according to geometrical features in the images obtained by the operator. In other words, the rules determining what 3D measurements are to be determined in the inspection plan are determined ahead of time, although the complete CAD model is presented to the software for evaluation. From the operator's point of view, there are no choices to be made except in the capturing of the images indicating the established ahead of time. In a variant of this procedure, the operator is allowed to mark a region of the captured image for which 3D measurements are desired. The selected region may be indicated, for example, with a mouse.

The selection made in the step 3206 or 3208 feeds into the selected geometrical elements of the inspection plan 3210. In an embodiment, during a measurement of an object 1202, a 3D mobile measuring device changes its position and the pose of its 3D measuring device. In one case, the 3D mobile measuring device may be able to determine the approximate position of the mobile base based on readings of a 2D scanner as illustrated in FIGS. 17A-17D or by using odometers attached to the wheels of the mobile base. Likewise, the 3D mobile measuring device may be able to determine its position in relation to the feature or features to be measured by noting the local features of the object, either natural features or fiducial targets. The 3D measuring instrument may be able to determine relatively quickly whether it is in a proper pose to complete a 3D measurement and given instructions for the changes to the pose that are needed. In these cases, it may be sufficient to state an approximate position of the geometrical characteristic to be measured. Alternatively, it may be sufficient to simply mark electronically the desired location on a CAD model. Intelligent software may then to determine the approximate location of each feature in a sequence of measurements.

In most cases, the markers 3040 and 3044 will not be available on each object 1202 being inspected, or at least the markers 3040 and 3044 will not be in exactly the same positions. Hence if the measuring device needs to measure geometrical elements in two different poses before obtaining a measurement result and a corresponding error, the method of registration using natural features may not provide sufficient accuracy. In this case, it may be necessary to use a tracking aide as discussed herein above. For this situation, the operator may need to provide further information 3218 to enable the aides 2848 to track the movement and pose of the 3D measuring device in step 3214. With the geometrical elements of the inspection plan 3210 tied to the movement and pose requirements 3214, the inspection plan 3216 is complete.

In an embodiment, a teaching method is based on a manual measurement performed by an operator. In an embodiment, a 3D mobile measuring device is moved manually from position to position. In an embodiment, an operator pushes the 3D measuring device 3010 to a number of positions along paths A, B, C, and D. At each position, the 3D measuring device is moved up and down or side to side as needed as suggested by the letters E, F, and G. The operator may move the 3D measuring device attached to the robotic arm of the 3D mobile measuring device 3010 to place the 3D measuring device in the desired pose. At each position, a collection of 3D coordinates are collected for later analysis, for example, using metrology software to determine geometrical feature characteristics as explained in reference to FIG. 28A. The position of the mobile base of the 3D mobile measuring device 3010 and the pose of the 3D measuring device at each measurement position is recorded. Approximate values for the positions of the 3D mobile measuring device 3010 are determined based on the readings of the 2D scanner, the wheel odometers, or similar sensors. Approximate values for the pose of the 3D measuring device are based on the positions of the 3D mobile measuring device and further on the approximate pose of the robotic arm based on the readings of the robotic arm angular encoders. For some cases, the approximate poses of the 3D measuring device for each of the required measurements provides sufficient information to complete a 3D measurement of the object 2102. This is particularly the case if fiducial markers or projected fiducial spots are provided, as described herein above. In other cases, another tracking method using a tracking aide may be needed. An example of such a tracking aide is a six-DOF laser tracker assembly 1310 that is used to measure one of the six-DOF targets 3050 on the 3D measuring device. Multiple such six-DOF targets may be used to enable measurements of the 3D measuring device from different directions. Alternatively, the 3D measuring device, such as an area triangulation scanner 1500, may be integrated into a six-DOF measuring device. Other tracking aides may be used as discussed herein above.

After the data has been analyzed to determine the geometrical feature characteristics, the determined movements, 3D measurements, and measurement calculations may be combined in a computer program to perform the measurement as desired.

Figure 32B:
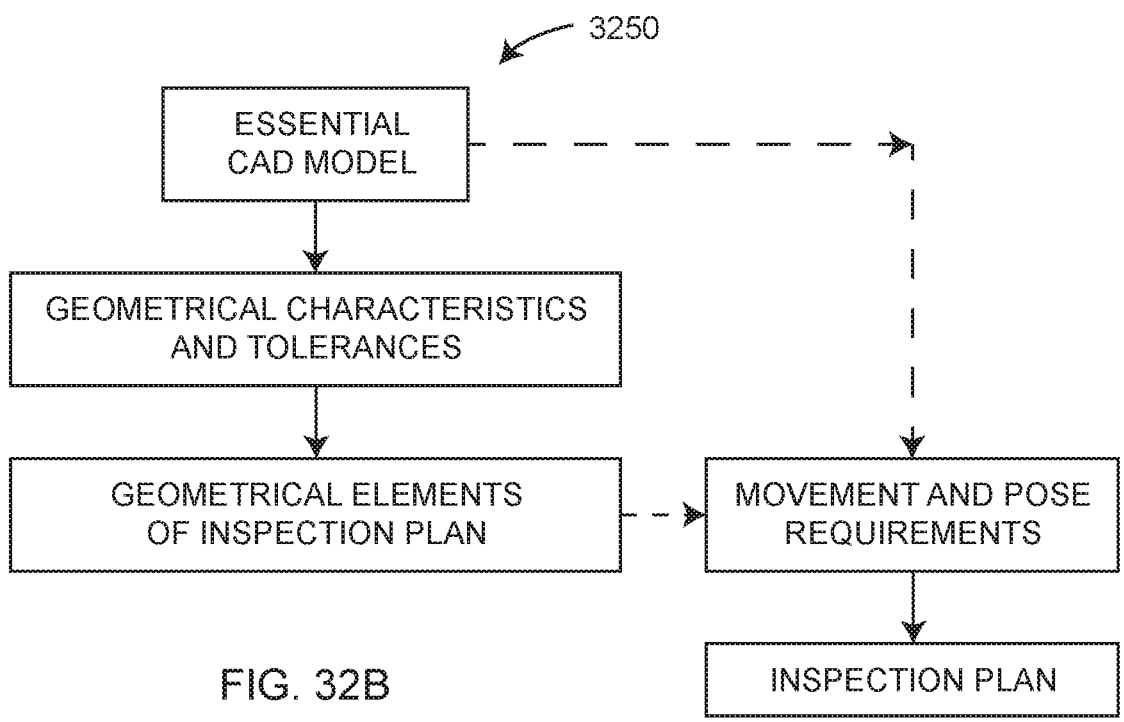
Figure 33:
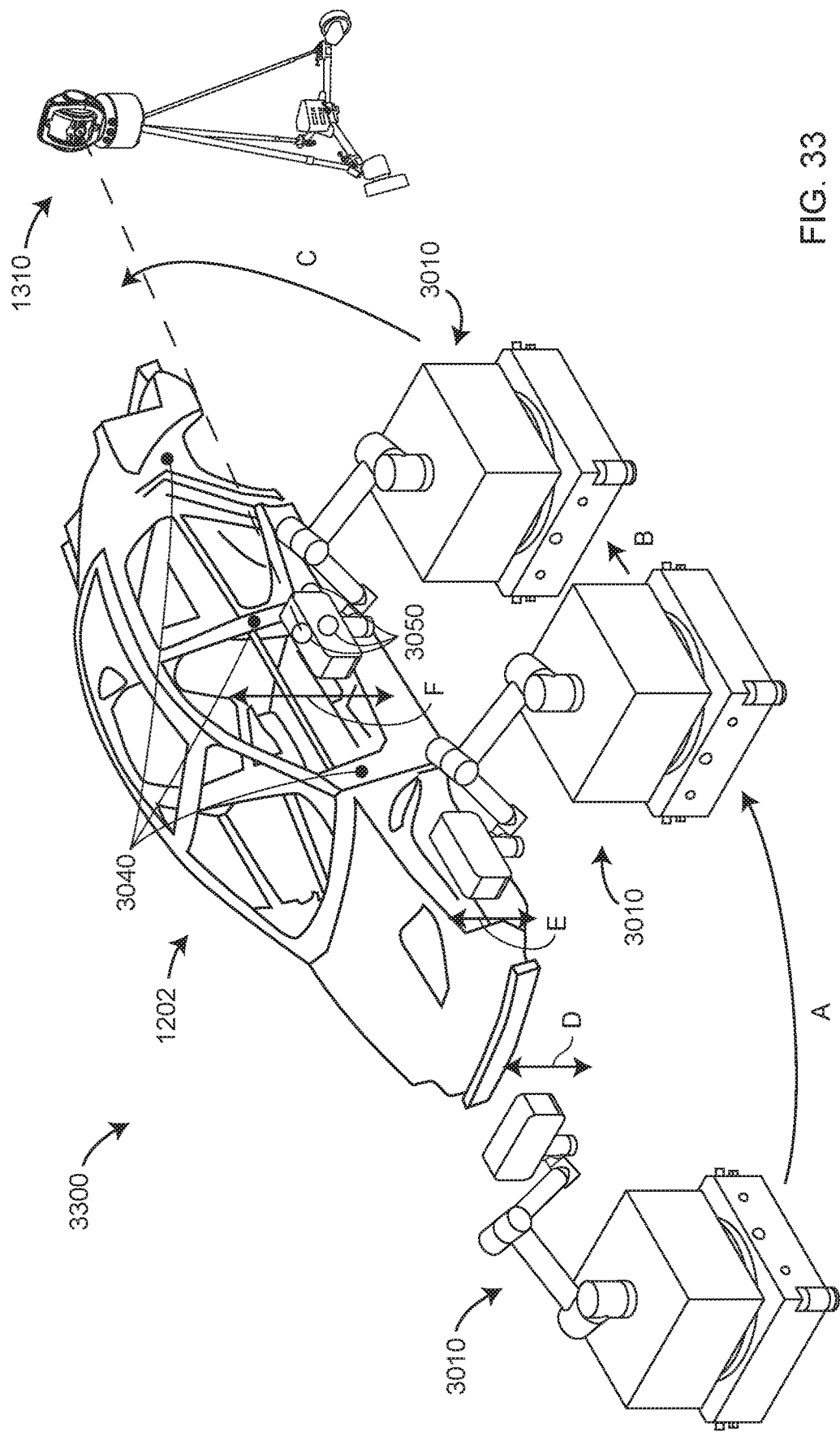
FIG. 33 is a perspective view illustrating a method of manually performing a measurement to teach elements of an inspection plan according to an embodiment.

In an embodiment, a teaching method is based on a robotic computer simulation. In a method, the geometrical characteristics and tolerances are determined, by extracting just the quantities needed in the overall measurement. The method 3250 of FIG. 32B illustrates what is referred to as an essential CAD model approach because only those geometrical characteristics, nominal values, and tolerances are retained that are desired in the measurement by the 3D mobile measuring system. Hence this approach is like the approach 3200 of FIG. 32A except that the element 3206, user-based selection, and the element 3208, rule-based selection, have been removed.

The teaching method 3400 based on robotic simulation is illustrated in FIG. 34. In this method, software 3400 is generated to simulate the behavior of the 3D mobile measuring system, including the mobile platform, the robotic arm, and the 3D measuring instrument. The geometrical characteristics, nominal values, and tolerances desired in the essential CAD model are extracted and included in the simulation. Any tracking by aides is also included in the program.

As shown in FIG. 29, the inspection plan is carried out through action of the 3D measuring device 2964 in cooperation with the robot 2962 or mover and, as needed, in cooperation with the tracking aide 2966. When all results have been obtained and analyzed according to the inspection plan, the final result 2970 is obtained.

An extension of the teaching methods given above is one in which a 3D mobile measuring device determines the identity of the object to be measured and the desired measurements to be performed and then continues to perform the 3D measurements by combining software elements as needed. For each type of geometrical feature characteristic, appropriate software is called upon to direct collection of the required points and perform the required calculation. If assistance of a tracking aide is required, an aide may be enlisted for assistance. Communication between the 3D mobile measuring system, the tracking aide, a network computer, and any other system elements may be carried out over wired communication channels or wired communication channels. This approach yields a completely flexible 3D mobile test system for factories.

Figure 35:
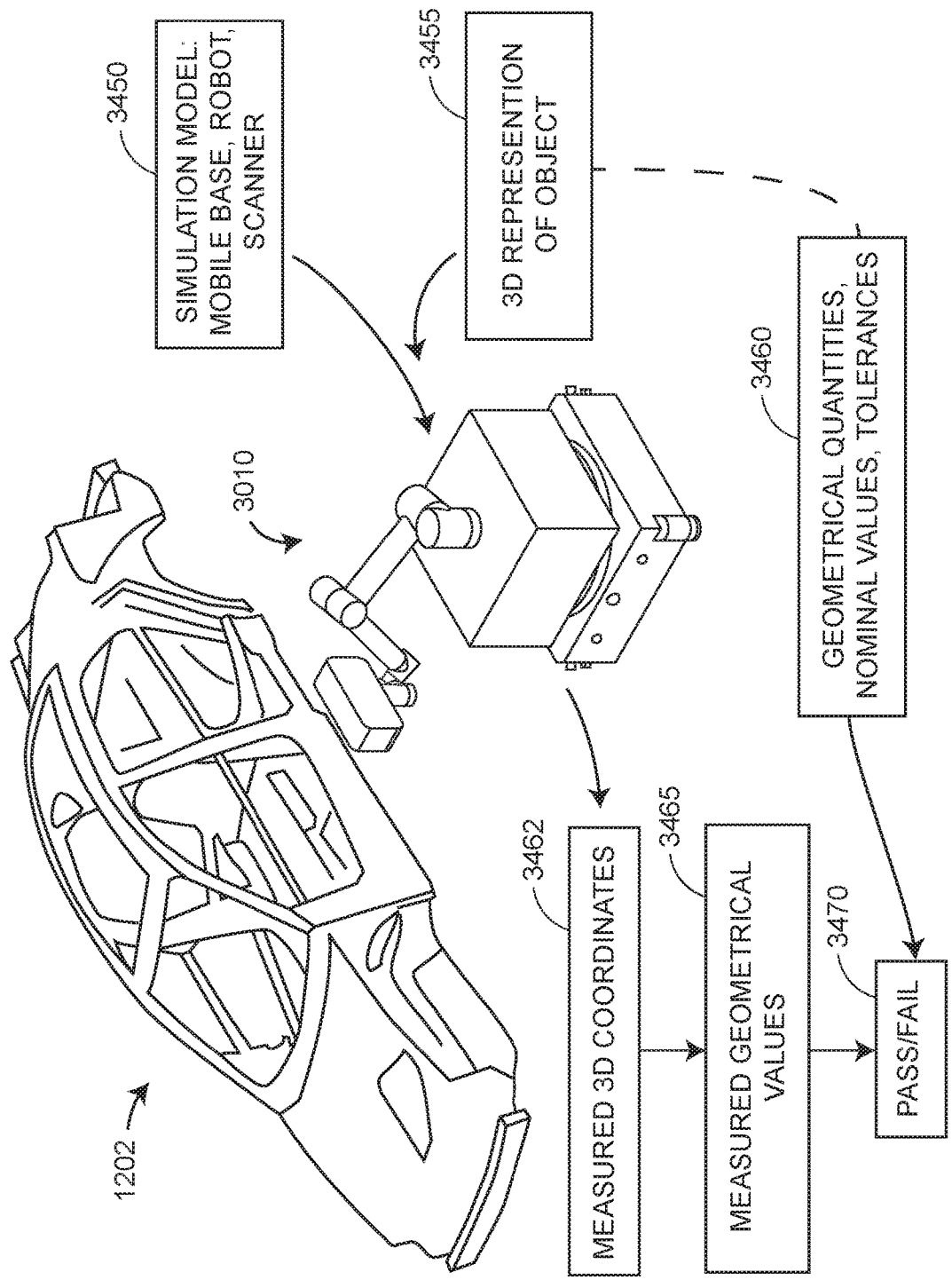
FIG. 35 is an annotated perspective view of a 3D measurement method according to an embodiment.

In an embodiment illustrated in FIG. 35, an automated 3D measurement is established and performed based on a measurement of a first region of an object 1202 followed by determination of measured geometrical values and a comparison of these values to nominal values of geometrical quantities. In an embodiment, a mobile 3D measurement system 3010 includes motorized robotic arm attached to a 3D measuring device and to a motorized base. In an embodiment, the 3D measuring device is a triangulation scanner, which might be an area scanner such as the scanner 1500 or a laser line scanner such as the mobile measurement platform 200. In an embodiment, the motorized robotic arm includes multiple jointed arm segments. In an embodiment, a 3D representation of the object 3455 is provided. The 3D representation 3455 could be, for example, a CAD model. Alternatively, it might be a representation obtained from a 3D measurement, for example, as a triangular meshed surface or a non-uniform rational B-spline (NURBS). In an embodiment, geometrical quantities 3460 having nominal values and tolerances are associated with the 3D representation of the object. Examples of such geometrical quantities include form errors as in FIGS. 22D and 22F, diameters as in FIG. 22E, a distance between two centers as in FIG. 23A, a distance from a center to a perpendicular edge as in FIG. 23B, a constructed feature as in FIG. 24A or FIG. 24B, a feature referenced to one or more datums, as in FIGS. 25A-25D, or any GD&T quantity as illustrated in FIGS. 26-27. Any type of geometrical quantity may be used.

In an embodiment, a first region is selected on the first object. In some cases, the first region may be the entire object. In other cases, it might be only one side or an object, or a smaller portion of the entire object. A processor is provided to execute a simulation model of the 3D mobile measurement system. In an embodiment, the simulation model includes a mobile simulation model, a robotic simulation model, and a scanner simulation model. The mobile simulation model simulates movement of the mobile base, which might include translation or rotation of the mobile base. The robotic simulation model simulates movement of the robotic arm segments. In an embodiment, the robotic arm segments are moved by a hinge action (with a hinge joint) or with a swivel action (with a swivel joint). In an embodiment, the end effector of the robotic arm enables rotation of the scanner. In many cases, it is important to position a triangulation scanner a preferred distance from the surface under test and also at a desired angle to the surface. In many cases, the scanner is best rotated to be approximately parallel to a surface being measured. The scanner simulation model simulates the collection of 3D point cloud data by an area scanner or collection of 3D data from a line scanner.

In an embodiment, the processor further determines steps in a 3D measurement protocol that determines 3D coordinates over the first region. In the protocol, the determining of the 3D coordinates is based on execution of a plurality of simulation steps. The simulation steps carry out functions similar to those that a human operator might carry out. Each step in the plurality of simulation steps includes one or more of simulation steps, which might be: (1) a simulated movement of the motorized mobile base according to the mobile simulation model; (2) a simulated movement of the motorized robotic arm according to the robot simulation model; and (3) a simulated collection of 3D coordinates of a portion of the surface of the first object. The steps in the 3D measurement protocol are stored.

In a further step, the steps in the 3D measurement protocol are executed using the real 3D mobile measurement device. The result is a measurement of 3D coordinates over the first region. In an embodiment, the first region includes a plurality of sub-regions, each of which is measured by the scanner. For example, a triangulation area scanner covers only a limited area, making it necessary to move the scanner if the first region is larger than the limited area covered by the scanner. In this case, a registration method will be used to register together the 3D coordinates measured for the plurality of sub-regions into a collection of 3D coordinates within a common frame of reference. One method of performing such a registration is to overlap the successive sub-regions to some extent and then use commonly observed natural features of the object 1202 to register the multiple frames together. Another method of performing a registration of multiple sub-regions is to use markers, which might include reflective markers, such as reflective stick-on dots, coded markers, light source markers such as LEDs, or projected spots of light from an external projector. The markers may be on or proximate the object under test. In an embodiment, a photogrammetry system is used to determine the 3D coordinates of each of the markers ahead of time. In an embodiment, a photogrammetry camera captures images of the markers from a variety of poses, with the camera rotated at least once. In an embodiment, a calibrated scale bar is included in each of the photogrammetry camera images. An advantage of using a photogrammetry camera to establish 3D coordinates of the targets in a global frame of reference is that it reduces the number of required targets and further reduces the need to overlap successive images obtained from the triangulation scanner on the 3D mobile measurement system. In an embodiment, the pose of the 3D mobile measurement system is tracked with a 3D measurement device such as a laser tracker. A laser tracker may be used to measure 3D coordinates of three or more retroreflector targets on the 3D measuring device or it may be used to measure six degrees-of-freedom (six-DOF) of a six-DOF target on the 3D measuring device. Other tracking methods are also possible, as described herein above.

In an embodiment illustrated in FIG. 35, the method further includes providing a collection of geometrical quantities to be measured. These geometrical quantities 3460, and the associated nominal values and tolerances, were described herein above. In an embodiment, the processor takes the 3D coordinates 3462 measured by the scanner, either as collected in the simulation phase or in the measurement phase, and extracts from these 3D coordinates the measured geometrical values 3465, which as explained herein above might be form errors, GD&T values, or any number of other geometrical quantities having nominal values. The measured geometrical values 3465 are compared to the nominal values for the corresponding geometrical quantity to obtain errors in the desired geometrical values. The absolute value of these errors are compared to the prescribed tolerances to determine whether a given geometrical value is within its specification, which is the same thing as saying that the determined quantity is within the specified tolerance. In an embodiment, this determines whether a measured device passes or fails in a step 3470.

In an embodiment, a system for measuring three-dimensional (3D) coordinates of an object surface includes: one or more processors; a mobile platform including a plurality of motorized wheels configured to translate and rotate the platform; a triangulation scanner including a projector and a camera, the camera having a photosensitive array, the projector and the camera separated by a baseline, the baseline being a line segment having a baseline length, the projector configured to project a first light onto the object surface, the camera configured to image on the photosensitive array the first light on the object surface and to send a first electrical signal to the one or more processors in response; and a robotic articulated arm coupled to the mobile platform at a first end and to an end effector at a second end, there being a plurality of connected arm segments between the mobile platform and the end effector, the scanner coupled to the end effector, the robotic articulated arm including a first motor configured to produce a swivel rotation of at least one of the arm segments, wherein the one or more processors is configured to control rotation of the motorized wheels, to control movement of the arm segments, and to operate the scanner, the one or more processors further configured to determine the 3D coordinates of the object surface based at least in part on the first light, the first electrical signal, and the baseline length.

In a further embodiment, the robotic articulated arm further includes a plurality of arm motors configured to move the arm segments.

In a further embodiment, the robotic articulated arm further includes: a collection of joints, each joint from the collection of joints having a corresponding axis of rotation, each joint being coupled to an associated arm segment or to an end effector, there being no intervening arm segment between the joint and the associated arm segment or between the joint and the end effector, wherein a first plurality of the joints from among the collection of joints are swivel joints having a swivel axis as the corresponding axis of rotation, each of the plurality of swivel joints being configured to produce rotation of the associated arm segment about the swivel axis or rotation of the end effector about the swivel axis, and wherein a second plurality of the joints from among the collection of joints are hinge joints having a hinge axis as the corresponding axis of rotation, each of the plurality of hinge joints being configured to produce rotation of the associated arm segment in a direction perpendicular to the hinge axis or rotation of the end effector in a direction perpendicular to the hinge axis.

In a further embodiment, the system further includes: an arm motor for each of the plurality of swivel joints and each of the plurality of hinge joints; and an angular transducer for each of the plurality of swivel joints and each of the plurality of hinge joints.

In a further embodiment, the projector is further configured to project a second light onto the object surface, the camera is further configured to image on the photosensitive array the second light on the object surface and to send a second projector electrical signal to the one or more processors in response, the second light being projected as a line of light on the object surface; and the one or more processors are further configured to determine second 3D coordinates of a plurality of second points on the object surface in the probe frame of reference based at least in part on the second light, the second projector electrical signal, and the baseline length.

In a further embodiment: the projector is further configured to project a second light onto the object surface, the camera is further configured to image on the photosensitive array the second light on the object surface and to send a second projector electrical signal to the one or more processors in response, the second light being projected as an area of light on the object surface; and the one or more processors are further configured to determine second 3D coordinates of a plurality of second points on the object surface in the probe frame of reference based at least in part on the second light, the second projector electrical signal, and the baseline length.

In a further embodiment, the one or more processors are configured, in a first instance, to obtain a first set of second 3D coordinates and to identify a first set of one or more image registration marks.

In a further embodiment, the one or more processors are configured, in a second instance different than the first instance, to obtain a second set of second 3D coordinates and to identify a second set of one or more image registration marks.

In a further embodiment, the one or more processors are configured to identify a common image registration mark from the first set of image registration marks and the second set of image registration marks, the common image registration mark being an image registration mark recognized by the one or more processors as being formed, in the first instance and the second instance, from a common element on the object surface.

In a further embodiment, the one or more processors are configured to transform the first set of second 3D coordinates and the second set of second 3D coordinates into a common frame of reference to obtain a combined set of 3D coordinates based at least in part on the first electrical signal in the first instance, the first electrical signal in the second instance, and the common registration mark.

In a further embodiment, the image registration marks in the first set and the second set are based at least in part on natural features on the object surface or on objects proximate the object surface.

In a further embodiment, the image registration marks in the first set and the second set are illuminated markers.

In a further embodiment, the illuminated markers are light emitting diodes (LEDs).

In a further embodiment, the illuminated markers are reflective spots.

In a further embodiment, the image registration marks are light spots projected onto the object or proximate the object by an external light projector not coupled to the scanner.

In a further embodiment, between the first instance and the second instance, the one or more processors are configured to change a position or an orientation of the end effector by activating one or more of the arm motors based at least in part on a coverage area of the second light on the object surface.

In a further embodiment, between the first instance and the second instance, the one or more processors are configured to turn the motorized wheels based at least in part on a coverage area of the second light on the object surface.

In a further embodiment, the robotic articulated arm is adjustable in at least six degrees of freedom.

In a further embodiment: the projector has a projector plane from which it projects the second light as a coded pattern of light; and the one or more processors are further configured to determine a correspondence between points on the image on the photosensitive array and the points of the second light at the projector plane, the one or more processors being further configured to determine the second 3D coordinates of a plurality of second points on the object surface in the probe frame of reference further based on the correspondence.

In a further embodiment: in a first instance, the projector is further configured to project a first pattern of the second light onto the object surface, the camera being further configured to image on the photosensitive array the second light on the object surface and to send a first instance of the second electrical signal to the one or more processors in response; in a second instance, the projector is further configured to project a second pattern of the second light onto the object surface, the second pattern being shifted in phase with respect to the first pattern, the camera being further configured to image on the photosensitive array the second light on the object surface and to send a second instance of the second electrical signal to the one or more processors in response; and the one or more processors are further configured to determine the second 3D coordinates of the plurality of second points on the object surface in the probe frame of reference based at least in part on the first pattern of the second light, the second pattern of the second light, the first instance of the second electrical signal, and the second instance of the second electrical signal.

In an embodiment, a system for measuring three-dimensional (3D) coordinates of an object surface includes: one or more processors; a mobile platform including a plurality of motorized wheels configured to translate and rotate the platform; a triangulation scanner including a projector, a first camera having a first photosensitive array, and a second camera having a second photosensitive array, the first camera and the second camera separated by a camera baseline, the camera baseline being a line segment having a camera-baseline length, the projector configured to project a first light onto the object surface, the first camera configured to image on the photosensitive array a first instance of the first light on the object surface and to send a first electrical signal to the one or more processors in response, the second camera configured to image on the photosensitive array a second instance of the second light on the object surface and to send a second electrical signal to the one or more processors in response; and a robotic articulated arm coupled to the mobile platform at a first end and to an end effector at a second end, there being a plurality of connected arm segments between the mobile platform and the end effector, the scanner coupled to the end effector, the robotic articulated arm including a first motor configured to produce a swivel rotation of at least one of the arm segments, wherein the one or more processors is configured to control rotation of the motorized wheels, to control movement of the arm segments, and to operate the scanner, the one or more processors further configured to determine the 3D coordinates of the object surface based at least in part on the first light, the first electrical signal, the second electrical signal, and the camera-baseline length.

In a further embodiment, the projector further includes a projector optical axis; the first camera further includes a first-camera optical axis; the second camera further includes a second-camera optical axis; and the projector, the first camera, and the second camera are arranged in a triangle, the triangle including three non-collinear points lying on a first plane, the first plane not including the first-camera optical axis, the second-camera optical axis, or the projector axis.

In an embodiment, a system for measuring three-dimensional (3D) coordinates of an object surface includes: one or more processors; a mobile platform including a plurality of motorized wheels configured to translate and rotate the platform; a robotic articulated arm coupled to the mobile platform at a first end and to an end effector at a second end, there being a plurality of connected arm segments between the mobile platform and the end effector; a 3D measuring device coupled to the end effector, the 3D measuring device including a 3D probe and a six degree-of-freedom (six-DOF) tracker target assembly, the 3D probe coupled to the six-DOF tracker target assembly, the 3D measuring device being configured to cooperate with the one or more processors to determine first 3D coordinates of a first point on the object surface in a probe frame of reference, the probe frame of reference being tied to the 3D probe; and a laser tracker located in a tracker frame of reference, the laser tracker configured to cooperate with the one or more processors to determine three translational degrees of freedom and three orientational degrees of freedom of the six-DOF tracker target assembly, wherein the one or more processors are configured to control rotation of the motorized wheels, to control movement of the connected arm segments, and to operate the 3D measuring device, the one or more processors further configured to determine 3D coordinates of the first point in the tracker frame of reference based at least in part on the 3D coordinates of the first point in the probe frame of reference, the three translational degrees of freedom of the six-DOF tracker target assembly, and the three orientational degrees of freedom of the six-DOF tracker target assembly.

In a further embodiment, the six-DOF tracker target assembly further comprises a retroreflector.

In a further embodiment, the retroreflector is a cube-corner retroreflector.

In an embodiment, the laser tracker further comprises: a first tracker light source configured to send a first tracker beam of light to the retroreflector, the retroreflector returning a portion of the first tracker beam as a second tracker beam; a first motor and a second motor that together direct the first tracker beam of light to a first direction, the first direction determined by a first angle of rotation about a first axis and a second angle of rotation about a second axis, the first angle of rotation produced by the first motor and the second angle of rotation produced by the second motor; a first angle measuring device that measures the first angle of rotation and a second angle measuring device that measures the second angle of rotation; a distance meter that measures a first tracker distance from the coordinate measurement device to the retroreflector based at least in part on a first portion of the second beam received by a first optical detector; a position detector assembly that includes a position detector configured to produce a first position-detector signal in response to a position of the second portion on the position detector; and a control system that sends a second position-detector signal to the first motor and a third position-detector signal to the second motor, the second position-detector signal and the third position-detector signal based at least in part on the first position-detector signal, the control system configured to adjust the first direction of the first tracker beam to the retroreflector.

In an embodiment, the one or more processors are further configured to determine three translational degrees of freedom of the six-DOF tracker target assembly based at least in part on the first tracker distance, the first angle of rotation, and the second angle of rotation.

In a further embodiment: the 3D measuring device further includes a tactile probe having a spherically shaped probe end; and the laser tracker is configured to cooperate with the one or more processors to determine the 3D coordinates of a center of the spherically shaped probe end in the tracker frame of reference.

In a further embodiment, the 3D measuring device includes a noncontact distance meter configured to cooperate with the one or more processors to determine the first distance, wherein the first distance is based at least in part on a speed of light in air.

In a further embodiment, the noncontact distance meter is selected from the group consisting of an absolute time-of-flight (TOF) distance meter and an absolute interferometer.

In a further embodiment, the 3D measuring device includes a noncontact distance meter configured to cooperate with the one or more processors to determine the first distance, wherein the noncontact distance meter is selected from the group consisting of a chromatic focusing meter, a contrast focusing meter, and an array focusing meter.

In a further embodiment, the 3D measuring device includes a noncontact distance meter configured to cooperate with the one or more processors to determine the first distance, wherein the noncontact distance meter measures distance based on the principle of conoscopic holography.

In a further embodiment, the 3D measuring device is a triangulation scanner that includes a projector and a camera, the camera having a photosensitive array, the projector and the camera separated by a baseline, the baseline being a line segment having a baseline length, the projector configured to project a first light onto the object surface, the camera configured to image on the photosensitive array the first light on the object surface and to send a first electrical signal to the one or more processors in response; and the one or more processors is further configured to determine first 3D coordinates of the first point in the probe frame of reference based on the first light, the first electrical signal, and the baseline length.

In a further embodiment, the projector is further configured to project a second light onto the object surface, the camera is further configured to image on the photosensitive array the second light on the object surface and to send a second electrical signal to the one or more processors in response, the second light being projected as a line of light on the object surface; and the one or more processors is further configured to determine second 3D coordinates of a plurality of second points on the object surface in the probe frame of reference based at least in part on the second light, the second electrical signal, and the baseline length, wherein the one or more processors are further configured to determine second 3D coordinates of the plurality of second points in the tracker frame of reference, the second 3D coordinates being based at least at least in part on the second 3D coordinates of the plurality of second points in the probe frame of reference, the three translational degrees of freedom of the six-DOF tracker target assembly, and the three orientational degrees of freedom of the six-DOF tracker target assembly.

In a further embodiment, the projector is further configured to project a second light onto the object surface, the camera is further configured to image on the photosensitive array the second light on the object surface and to send a second electrical signal to the one or more processors in response, the second light being projected as an area of light on the object surface; and the one or more processors are further configured to determine second 3D coordinates of a plurality of second points on the object surface in the probe frame of reference based at least in part on the second light, the second electrical signal, and the baseline length, wherein the one or more processors are further configured to determine second 3D coordinates of the plurality of second points in the tracker frame of reference, the second 3D coordinates being based at least at least in part on the second 3D coordinates of plurality of second points in the probe frame of reference, the three translational degrees of freedom of the six-DOF tracker target assembly, and the three orientational degrees of freedom of the six-DOF tracker target assembly.

In a further embodiment, the robotic articulated arm further includes a plurality of arm motors configured to move the arm segments.

In a further embodiment, the one or more processors are further configured to activate the plurality of arm motors to move the end effector from a first end-effector position and orientation to a second end-effector position and orientation based at least in part on the three determined orientational degrees of freedom and the three determined translational degrees of freedom.

In a further embodiment, the one or more processors are further configured to control rotation of the plurality of motorized wheels based at least in part on the three determined orientational degrees of freedom and the three determined translational degrees of freedom.

In a further embodiment, the robotic articulated arm further includes: a collection of joints, each joint from the collection of joints having a corresponding axis of rotation, each joint being coupled to an associated arm segment or to an end effector, there being no intervening arm segment between the joint and the associated arm segment or between the joint and the end effector, wherein a first plurality of the joints from among the collection of joints are swivel joints having a swivel axis as the corresponding axis of rotation, each of the plurality of swivel joints being configured to produce rotation of the associated arm segment about the swivel axis or rotation of the end effector about the swivel axis, and wherein a second plurality of the joints from among the collection of joints are hinge joints having a hinge axis as the corresponding axis of rotation, each of the plurality of hinge joints being configured to produce rotation of the associated arm segment in a direction perpendicular to the hinge axis or rotation of the end effector in a direction perpendicular to the hinge axis.

In a further embodiment, the system further includes: a motor for each of the plurality of swivel joints and each of the plurality of hinge joints; and an angular transducer for each of the plurality of swivel joints and each of the plurality of hinge joints.

In a further embodiment, the robotic articulated arm is adjustable in at least six degrees of freedom.

In a further embodiment, the projector has a projector plane from which it projects the second light as a coded pattern of light; and the one or more processors are further configured to determine a correspondence between points on the image of the photosensitive array and the points of the second light at the projector plane, the one or more processors being further configured to determine second 3D coordinates of a plurality of second points on the object surface in the probe frame of reference further based on the correspondence.

In a further embodiment: in a first instance, the projector is further configured to project a first pattern of the second light onto the object surface, the camera being further configured to image on the photosensitive array the second light on the object surface and to send a first instance of the second electrical signal to the one or more processors in response; in a second instance, the projector is further configured to project a second pattern of the second light, the second pattern being shifted in phase with respect to the first, the camera being further configured to image on the photosensitive array the second light on the object surface and to send a second instance of the second electrical signal to the one or more processors in response; and the one or more processors are further configured to determine the second 3D coordinates of the plurality of second points on the object surface in the probe frame of reference based at least in part on the first pattern of the second light, the second pattern of the second light, the first instance of the second electrical signal, and the second instance of the second electrical signal.

In a further embodiment, the 3D measuring device includes a triangulation scanner having a projector and a first camera and a second camera, the first camera having a first photosensitive array, the second camera having a second photosensitive array, the first camera and the second camera separated by a camera baseline, the camera baseline being a line segment having a camera-baseline length, the projector configured to project a first light onto the object surface, the first camera configured to image on the first photosensitive array the first light on the object surface and to send a first electrical signal to the one or more processors in response, the second camera configured to image on the second photosensitive array the first light on the object surface and to send a second electrical signal to the one or more processors in response; and the one or more processors is further configured to determine first 3D coordinates of the first point in the probe frame of reference based at least in part on the first light, the first electrical signal, the second electrical signal, and the camera-baseline length.

In a further embodiment, the projector further includes a projector optical axis; the first camera further includes a first-camera optical axis; the second camera further includes a second-camera optical axis; and the projector, the first camera, and the second camera are arranged in a triangle, the triangle including three non-collinear points lying on a first plane, the first plane not including the first-camera optical axis, the second-camera optical axis, or the projector axis.

In an embodiment, a system for measuring three-dimensional (3D) coordinates of an object surface comprises: one or more processors; a mobile platform including a plurality of motorized wheels configured to translate and rotate the platform; a robotic articulated arm coupled to the mobile platform at a first end and to an end effector at a second end, there being a plurality of connected arm segments between the mobile platform and the end effector; a 3D measuring device coupled to the end effector, the 3D measuring device including a 3D probe and a six degree-of-freedom (six-DOF) target assembly, the 3D probe coupled to the six-DOF target assembly, the six-DOF target assembly including a collection of light points, the 3D measuring device being configured to cooperate with the one or more processors to determine first 3D coordinates of a first point on the object surface in a probe frame of reference, the probe frame of reference being tied to the 3D probe; and a camera-bar device located in a camera-bar frame of reference, the camera-bar device including a first camera and a second camera separated by a camera-bar baseline distance, the first camera and the second camera fixed in space, the first camera configured to form a first light-point image of the collection of light points and to send a first electrical light-point signal to the processor in response, the second camera configured to form a second light-point image of the collection of light points and to send a second electrical light-point signal to the processor in response, the camera-bar device configured to cooperate with the one or more processors to determine three translational degrees of freedom and three orientational degrees of freedom of the six-DOF target assembly based at least in part on the first electrical light-point signal, the second electrical light-point signal, and the camera-bar baseline distance, wherein the one or more processors are configured to control rotation of the motorized wheels, to control movement of the connected arm segments, and to operate the 3D measuring device, the one or more processors further configured to determine 3D coordinates of the first point in the camera-bar frame of reference based at least in part on the 3D coordinates of the first point in the probe frame of reference, the three translational degrees of freedom of the six-DOF target assembly, and the three orientational degrees of freedom of the six-DOF target assembly.

In a further embodiment, the collection of light points in the six-DOF target assembly includes light emitting diodes (LEDs).

In a further embodiment, the collection of light points in the six-DOF target assembly includes reflective spots.

In a further embodiment, the 3D measuring device includes a tactile probe having a spherically shaped probe end; and the camera-bar device is configured to cooperate with the one or more processors to determine the coordinates of a center of the spherically shaped probe end in the camera-bar frame of reference.

In a further embodiment, the 3D measuring device includes a noncontact distance meter configured to cooperate with the one or more processors to determine the first distance, wherein the first distance is based at least in part on a speed of light in air.

In a further embodiment, the noncontact distance meter is selected from the group consisting of an absolute time-of-flight (TOF) distance meter and an absolute interferometer.

In a further embodiment, the 3D measuring device includes a noncontact distance meter configured to cooperate with the one or more processors to determine the first distance, wherein the noncontact distance meter is selected from the group consisting of a chromatic focusing meter, a contrast focusing meter, and an array focusing meter.

In a further embodiment, the 3D measuring device includes a noncontact distance meter configured to cooperate with the one or more processors to determine the first distance, wherein the noncontact distance meter measures distance based on the principle of conoscopic holography.

In a further embodiment, the 3D measuring device includes a triangulation scanner having a projector and a scanner camera, the scanner camera having a photosensitive array, the projector and the scanner camera separated by a baseline, the baseline being a line segment having a baseline length, the projector configured to project a first light onto the object surface, the scanner camera configured to image on the photosensitive array the first light on the object surface and to send a first electrical signal to the one or more processors in response; and the one or more processors is further configured to determine first 3D coordinates of the first point in the probe frame of reference based on the first light, the first electrical signal, and the baseline length.

In a further embodiment, the projector is further configured to project a second light onto the object surface, the scanner camera is further configured to image on the photosensitive array the second light on the object surface and to send a second electrical signal to the one or more processors in response, the second light being projected as a line of light on the object surface; and the one or more processors is further configured to determine second 3D coordinates of a plurality of second points on the object surface in the probe frame of reference based at least in part on the second light, the second electrical signal, and the baseline length, wherein the one or more processors are further configured to determine second 3D coordinates of the plurality of second points in the camera-bar frame of reference, the second 3D coordinates being based at least at least in part on the second 3D coordinates of the plurality of second points in the probe frame of reference, the three translational degrees of freedom of the six-DOF target assembly, and the three orientational degrees of freedom of the six-DOF target assembly.

In a further embodiment, the projector is further configured to project a second light onto the object surface, the scanner camera is further configured to image on the photosensitive array the second light on the object surface and to send a second electrical signal to the one or more processors in response, the second light being projected as an area of light on the object surface; and the one or more processors are further configured to determine second 3D coordinates of a plurality of second points on the object surface in the probe frame of reference based at least in part on the second light, the second electrical signal, and the baseline length, wherein the one or more processors are further configured to determine second 3D coordinates of the plurality of second points in the tracker frame of reference, the second 3D coordinates being based at least at least in part on the second 3D coordinates of plurality of second points in the probe frame of reference, the three translational degrees of freedom of the six-DOF target assembly, and the three orientational degrees of freedom of the six-DOF target assembly.

In a further embodiment, the robotic articulated arm further includes a plurality of arm motors configured to move the arm segments.

In a further embodiment, the one or more processors are further configured to activate the plurality of arm motors to move the end effector from a first end-effector position and orientation to a second end-effector position and orientation based at least in part on the three determined orientational degrees of freedom and the three determined translational degrees of freedom.

In a further embodiment, the one or more processors are further configured to control rotation of the plurality of motorized wheels based at least in part on the three determined orientational degrees of freedom and the three determined translational degrees of freedom.

In a further embodiment, each of the plurality of connected arm segments has a swivel axis parallel to its long axis and a hinge axis perpendicular to its long axis; the robotic articulated arm further includes a plurality of swivel joints configured to permit rotation of an arm segment to which it is coupled about the swivel axis of the arm segment; and the robotic articulated arm further includes a plurality of hinge joints configured to permit rotation of an arm segment to which it is coupled about the hinge axis of the arm segment.

In a further embodiment, a motor for each of the plurality of swivel joints and each of the plurality of hinge joints; and an angular transducer for each of the plurality of swivel joints and each of the plurality of hinge joints.

In a further embodiment, the robotic articulated arm is adjustable in at least six degrees of freedom.

In a further embodiment, the projector has a projector plane from which it projects the second light as a coded pattern of light; and the one or more processors are further configured to determine a correspondence between points on the image of the photosensitive array and the points of the second light at the projector plane, the one or more processors being further configured to determine second 3D coordinates of a plurality of second points on the object surface in the probe frame of reference further based on the correspondence.

In a further embodiment: in a first instance, the projector is further configured to project a first pattern of the second light onto the object surface, the camera being further configured to image on the photosensitive array the second light on the object surface and to send a first instance of the second electrical signal to the one or more processors in response; in a second instance, the projector is further configured to project a second pattern of the second light, the second pattern being shifted in phase with respect to the first, the camera being further configured to image on the photosensitive array the second light on the object surface and to send a second instance of the second electrical signal to the one or more processors in response; and the one or more processors are further configured to determine the second 3D coordinates of the plurality of second points on the object surface in the probe frame of reference based at least in part on the first pattern of the second light, the second pattern of the second light, the first instance of the second electrical signal, and the second instance of the second electrical signal.

In a further embodiment, the 3D measuring device includes a triangulation scanner having a projector and a first camera and a second camera, the first camera having a first photosensitive array, the second camera having a second photosensitive array, the first camera and the second camera separated by a camera baseline, the camera baseline being a line segment having a camera-baseline length, the projector configured to project a first light onto the object surface, the first camera configured to image on the first photosensitive array the first light on the object surface and to send a first electrical signal to the one or more processors in response, the second camera configured to image on the second photosensitive array the first light on the object surface and to send a second electrical signal to the one or more processors in response; and the one or more processors is further configured to determine first 3D coordinates of the first point in the probe frame of reference based at least in part on the first light, the first electrical signal, the second electrical signal, and the camera-baseline length.

In a further embodiment, the projector further includes a projector optical axis; the first camera further includes a first-camera optical axis; the second camera further includes a second-camera optical axis; and the projector, the first camera, and the second camera are arranged in a triangle, the triangle including three non-collinear points lying on a first plane, the first plane not including the first-camera optical axis, the second-camera optical axis, or the projector axis.

In an embodiment, a system for measuring three-dimensional (3D) coordinates of an object surface comprises: a mark on the object or proximate the object; one or more processors; a mobile platform including a plurality of motorized wheels configured to translate and rotate the platform; a robotic articulated arm coupled to the mobile platform at a first end and to an end effector at a second end, there being a plurality of connected arm segments between the mobile platform and the end effector; a triangulation scanner coupled to the end effector, the triangulation scanner including a projector and a scanner camera, the projector and the scanner camera separated by a scanner baseline, the scanner baseline being a line segment having a scanner-baseline length, the projector configured to project a first light onto the object surface, the scanner camera configured to image on a photosensitive array the first light on the object surface and to send an electrical scanner signal to the one or more processors in response; a camera assembly coupled to the triangulation scanner, the camera assembly including a first assembly camera configured to form an image of the mark and to send an electrical assembly signal to the one or more processors in response, wherein the one or more processors are configured to control rotation of the motorized wheels, to control movement of the connected arm segments, and to operate the triangulation scanner and the camera assembly, and wherein the one or more processors are further configured to determine 3D coordinates of a first point on the object surface based at least in part on the first light, the first electrical scanner signal, and the electrical assembly signal.

In a further embodiment, the camera assembly further includes a second assembly camera, there being an assembly-baseline distance between the first assembly camera and the second assembly camera; and the one or more processors are further configured to determine the 3D coordinates of the first point based on the assembly baseline distance.

In a further embodiment, the triangulation scanner is a laser line probe.

In a further embodiment, the projector is configured to project the first light as a line of light.

In a further embodiment, the triangulation scanner is an area scanner.

In a further embodiment, the projector is configured to project the first light as an area of light.

In a further embodiment, the projector is selected from the group consisting of a natural feature, a light emitting diode (LED), a reflective marker, and a spot of light from an external projector, the external projector being separate from the scanner and the scanner assembly.

In a further embodiment, the robotic articulated arm further includes a plurality of arm motors configured to move the arm segments.

In a further embodiment, the robotic articulated arm further includes a collection of joints, each joint from the collection of joints having a corresponding axis of rotation, each joint being coupled to an associated arm segment or to an end effector, there being no intervening arm segment between the joint and the associated arm segment or between the joint and the end effector, wherein a first plurality of the joints from among the collection of joints are swivel joints having a swivel axis as the corresponding axis of rotation, each of the plurality of swivel joints being configured to produce rotation of the associated arm segment about the swivel axis or rotation of the end effector about the swivel axis, and wherein a second plurality of the joints from among the collection of joints are hinge joints having a hinge axis as the corresponding axis of rotation, each of the plurality of hinge joints being configured to produce rotation of the associated arm segment in a direction perpendicular to the hinge axis or rotation of the end effector in a direction perpendicular to the hinge axis.

In a further embodiment, further including: an arm motor for each of the plurality of swivel joints and each of the plurality of hinge joints; and an angular transducer for each of the plurality of swivel joints and each of the plurality of hinge joints.

In an embodiment, a method for measuring an object comprises: providing the object, a mark, one or more processors, a mobile platform, a robotic articulated arm, a triangulation scanner, and a camera assembly, the mark being on the object or proximate the object, the mobile platform including a plurality of motorized wheels configured to translate and rotate the platform, the robotic articulated arm coupled to the mobile platform at a first end and to an end effector at a second end, there being a plurality of connected arm segments between the mobile platform and the end effector, the triangulation scanner coupled to the end effector, the triangulation scanner including a projector and a scanner camera, the projector and the scanner camera separated by a scanner baseline, the scanner baseline being a line segment having a scanner-baseline length, the camera assembly coupled to the triangulation scanner, the camera assembly including a first assembly camera; in a first instance: projecting with the projector a first light onto the object surface; forming with the scanner camera an image of the first light and sending a first electrical scan signal to the one or more processors in response; forming with the first assembly camera a first image of the mark and sending a first electrical mark signal to the one or more processors in response; in a second instance: projecting with the projector a second light onto the object surface; forming with the scanner camera an image of the second light and sending a second electrical scan signal to the one or more processors in response; forming with the first assembly camera a second image of the mark and sending a second electrical mark signal to the one or more processors in response; determining with the one or more processors 3D coordinates of a plurality of points on the object surface based at least in part on the first light, the second light, the first electrical scan signal, the second electrical scan signal, the first electrical mark signal, the second electrical mark signal; and storing the 3D coordinates.

In a further embodiment, between the first instance and the second instance, the one or more processors are configured to change a position or an orientation of the end effector by activating one or more of the arm motors based at least in part on a coverage area of the second light on the object surface.

In a further embodiment, between the first instance and the second instance, the one or more processors are configured to turn the motorized wheels based at least in part on a coverage area of the second light on the object surface.

In a further embodiment, the triangulation scanner includes a laser line probe.

In a further embodiment, the triangulation scanner includes an area scanner.

In a further embodiment, the mark is a natural feature of the object.

In a further embodiment, the mark is a light emitting diode (LED) placed on the object or in proximity to the object.

In a further embodiment, the mark is a reflective target.

In a further embodiment, the camera assembly further includes a light source.

In a further embodiment, the mark is a reflective target illuminated by the light source on the camera assembly.

In a further embodiment, the method further comprises providing an external projector, the external projector separate from the end effector.

In a further embodiment, the mark is a spot of light projected by the external projector.

In a further embodiment, the camera assembly further comprises a second assembly camera.

In a further embodiment, the method further comprises providing three marks.

In a further embodiment: in the first instance, forming with the first assembly camera a first image of the mark, the first image including the three marks; and in the second instance, forming with the first assembly camera a second image of the mark, the second image including the three marks.

In an embodiment, a system for measuring three-dimensional (3D) coordinates of an object surface comprises: a mark on the object or proximate the object; one or more processors; a mobile platform including a plurality of motorized wheels configured to translate and rotate the platform; a triangulation scanner including a projector, a first camera having a first photosensitive array, and a second camera having a second photosensitive array, the first camera and the second camera separated by a camera baseline, the camera baseline being a line segment having a camera-baseline length, the projector configured to project a first light onto the object surface, the first camera configured to image on the photosensitive array a first instance of the first light on the object surface and to send a first electrical signal to the one or more processors in response, the second camera configured to image on the photosensitive array a second instance of the second light on the object surface and to send a second electrical signal to the one or more processors in response; a robotic articulated arm coupled to the mobile platform at a first end and to an end effector at a second end, there being a plurality of connected arm segments between the mobile platform and the end effector, the scanner coupled to the end effector; and a camera assembly coupled to the triangulation scanner, the camera assembly including a first assembly camera configured to form an image of the mark and to send an electrical assembly signal to the one or more processors in response, wherein the one or more processors are configured to control rotation of the motorized wheels, to control movement of the arm segments, and to operate the triangulation scanner and the camera assembly, and wherein the one or more processors are further configured to determine the 3D coordinates of the object surface based at least in part on the first light, the first electrical signal, the second electrical signal, camera-baseline length, and the electrical assembly signal.

In a further embodiment, the projector further includes a projector optical axis; the first camera further includes a first-camera optical axis; the second camera further includes a second-camera optical axis; and the projector, the first camera, and the second camera are arranged in a triangle, the triangle including three non-collinear points lying on a first plane, the first plane not including the first-camera optical axis, the second-camera optical axis, or the projector axis.

In an embodiment, a system for measuring an object comprises: the object having a surface; one or more processors; a mobile platform including a plurality of motorized wheels configured to translate and rotate the platform; a robotic articulated arm coupled to the mobile platform at a first end and to an end effector at a second end, there being a plurality of connected arm segments between the mobile platform and the end effector; a first 3D measuring device configured for coupling to the end effector, the first 3D measuring device further configured to provide a first electrical signal; and an electrical adapter configured to match electrical lines from the robot end effector to electrical lines from the first 3D measuring device, the electrical adapter placed between the end effector and the first 3D measuring device, wherein the one or more processors are configured to control rotation of the motorized wheels, to control movement of the arm segments, and to operate the first 3D measuring device, the one or more processors further configured to determine 3D coordinates of a first point on the object surface based at least in part on the first electrical signal.

In an embodiment, a method for automated inspection comprises: providing an object having a surface; providing one or more processors; providing a mobile platform, a robotic articulated arm, and a three-dimensional (3D) probe, the mobile platform including a plurality of motorized wheels configured to translate and rotate the platform, the robotic articulated arm coupled to the mobile platform at a first end and to an end effector at a second end, there being a plurality of connected arm segments between the mobile platform and the end effector, the 3D probe coupled to the end effector; providing an inspection plan for the inspection of the object, the inspection plan including a collection of dimensional characteristics and inspection poses, each dimensional characteristic including one or more inspection poses; for each inspection pose of a first dimensional characteristic: (A) activating by the one or more processors the motorized wheels and the arm segments to move the 3D probe to the inspection pose; (B) measuring 3D coordinates of the object surface with the 3D probe; determining with the one or more processors a value of the first dimensional characteristic based at least in part on the inspection poses (A) and the measured 3D coordinates (B); for each inspection pose of a second dimensional characteristic: (C) activating by the one or more processors the motorized wheels and the arm segments to move the 3D probe to the inspection pose; (D) measuring 3D coordinates of the object surface with the 3D probe; determining with the one or more processors a value of the second dimensional characteristic based at least in part on the inspection poses (C) and the measured 3D coordinates (D); and storing the first dimensional characteristic and the second dimensional characteristic.

In a further embodiment, the step (A) and the step (C) of activating by the one or more processors the motorized wheels and the arm segments to move the 3D probe to the inspection pose are based at least in part on readings from one or more sensors coupled to the mobile platform, the sensors selected from the group consisting of: a two-dimensional (2D) scanner, an odometry sensor, an accelerometer, a gyroscope, a magnetometer, a pressure sensor, a 2D camera, a 3D camera, and a proximity sensor.

In a further embodiment, the method further comprises: providing a six degree-of-freedom (six-DOF) tracker target assembly coupled to the 3D probe; and providing a laser tracker, the laser tracker configured to cooperate with the one or more processors to determine three translational degrees of freedom and three orientational degrees of freedom of the six-DOF tracker target assembly.

In a further embodiment, the step (A) and the step (C) of activating by the one or more processors the motorized wheels and the arm segments to move the 3D probe to the inspection pose are based at least in part on readings obtained from the laser tracker in cooperation with six-DOF tracker target assembly and the one or more processors.

In a further embodiment, the step (B) and the step (D) of measuring 3D coordinates of the object surface with the 3D probe further include performing a measurement with the laser tracker in cooperation with the six-DOF tracker target assembly and with the one or more processors.

In a further embodiment, the method further comprises steps of: providing a six degree-of-freedom (six-DOF) target assembly coupled to the 3D probe, the six-DOF target assembly including a collection of light points; and providing a camera-bar device including a first camera and a second camera separated by a camera-bar baseline distance, the first camera and the second camera fixed in space, the first camera configured to form a first light-point image of the collection of light points and to send a first electrical light-point signal to the processor in response, the second camera configured to form a second light-point image of the collection of light points and to send a second electrical light-point signal to the processor in response, the camera-bar device configured to cooperate with the one or more processors to determine three translational degrees of freedom and three orientational degrees of freedom of the six-DOF target assembly based at least in part on the first electrical light-point signal, the second electrical light-point signal, and the camera-bar baseline distance.

In a further embodiment, the step (A) and the step (C) of activating by the one or more processors the motorized wheels and the arm segments to move the 3D probe to the inspection pose are based at least in part on readings obtained from the camera-bar device in cooperation with six-DOF target assembly and the one or more processors.

In a further embodiment, in the step of providing a mobile platform, a robotic articulated arm, and a three-dimensional (3D) probe, the 3D probe includes a triangulation scanner including a projector and a camera, the camera having a photosensitive array, the projector and the camera separated by a baseline, the baseline being a line segment having a baseline length, the projector configured to project a first light onto the object surface, the camera configured to image on the photosensitive array the first light on the object surface and to send an electrical scanner signal to the one or more processors in response.

In a further embodiment, the step of providing a mobile platform, a robotic articulated arm, and a three-dimensional (3D) probe further includes: providing a mark on the surface of the object or proximate the object; and providing a camera assembly coupled to the triangulation scanner, the camera assembly including a first assembly camera configured to form an image of the mark and to send an electrical assembly signal to the one or more processors in response.

In a further embodiment, the step (B) and the step (D) of measuring 3D coordinates of the object surface with the 3D probe are based at least in part on the first light, the first electrical scanner signal, and the electrical assembly signal.

In a further embodiment, the robotic articulated arm further includes: a collection of joints, each joint from the collection of joints having a corresponding axis of rotation, each joint being coupled to an associated arm segment or to an end effector, there being no intervening arm segment between the joint and the associated arm segment or between the joint and the end effector, wherein a first plurality of the joints from among the collection of joints are swivel joints having a swivel axis as the corresponding axis of rotation, each of the plurality of swivel joints being configured to produce rotation of the associated arm segment about the swivel axis or rotation of the end effector about the swivel axis, and wherein a second plurality of the joints from among the collection of joints are hinge joints having a hinge axis as the corresponding axis of rotation, each of the plurality of hinge joints being configured to produce rotation of the associated arm segment in a direction perpendicular to the hinge axis or rotation of the end effector in a direction perpendicular to the hinge axis.

In a further embodiment, the step of providing a mobile platform, a robotic articulated arm, and a three-dimensional (3D) probe further includes providing an arm motor for each of the plurality of swivel joints and each of the plurality of hinge joints and providing an angular transducer for each of the plurality of swivel joints and each of the plurality of hinge joints.

In a further embodiment, the dimensional characteristics are selected from the group consisting of: a 3D coordinate of a point on a surface of the object, a diameter of a hole, a diameter of a sphere, an angle between two lines, an angle between two planes, a distance from a first point on the surface to a second point on the surface, a perpendicular distance from a first line to a second line, a perpendicular distance from a first plane to a second plane, a radius of curvature of a curve, a form error of a plane, a form error of a spherical surface, a form error of a cylinder, and a normal vector to a surface.

In a further embodiment, the inspection plan further includes, for each dimensional characteristic, a nominal value of the dimensional characteristic and a tolerance value of the dimensional characteristic.

In a further embodiment, the method further comprises determining with the one or more processors, for a dimensional characteristic, an error of the dimensional characteristic based at least in part on the determined value of the dimensional characteristic and on the nominal value of the dimensional characteristic.

In a further embodiment, the method further comprises determining whether a dimensional characteristic is in tolerance based at least in part on the determined error and on the tolerance.

In a further embodiment, the method further comprises reporting dimensional characteristics found to be out of tolerance.

In a further embodiment, the mobile platform further includes a two-dimensional (2D) scanner configured to identify obstacles along a line of movement of the mobile platform.

In a further embodiment, the method further includes a step of stopping the mobile platform in response to the identifying of a first obstacle identified by the 2D scanner.

In a further embodiment, the method further includes a step of producing an alarm in response to the identifying of a first obstacle identified by the 2D scanner.

In a further embodiment, the method further includes: providing a tag; reading the tag to extract an inspection-plan identifier; and extracting the inspection plan based at least on the inspection-plan identifier, the inspection plan extracted from one the group consisting of: the one-or-more processors, a computer network, a memory, a data storage, and the tag.

In a further embodiment, the tag is selected from the group consisting of: a near-field communication (NFC) tag, a radio-frequency identification (RFID) tag, a bar code, and a QR code.

In a further embodiment, the tag is affixed to the object or is in the vicinity of the object.

In a further embodiment, the method further includes a step of measuring a dimensional characteristic not in the inspection plan, the step including an operator providing the one or more processors with an inspection location associated with the object and with an indication of the type of dimensional measurement to be performed.

In a further embodiment, the inspection location is based at least in part on a computer-aided drawing (CAD) model of the object.

In an embodiment, a method for measuring an object comprises: providing the object, one or more processors, a mobile platform, a robotic articulated arm, a three-dimensional (3D) probe, a six degree of freedom (six-DOF) target assembly, a six-DOF measuring device, and a reference six-DOF target, the object having a surface, the mobile platform including a plurality of motorized wheels configured to translate and rotate the platform, the robotic articulated arm coupled to the mobile platform at a first end and to an end effector at a second end, there being a plurality of connected arm segments at a first end and to an end effector at a second end, there being a plurality of connected arm segments between the mobile platform and the end effector, the 3D probe coupled to the end effector and to the six-DOF target assembly, wherein the 3D probe is configured to cooperate with the one or more processor to determine 3D coordinates of points on the object surface in a probe frame of reference tied to the 3D probe, and wherein the six-DOF measuring device is configured to cooperate with the six-DOF target assembly and the one or more processors to determine three translational degrees of freedom and three orientational degrees of freedom of the 3D probe, the reference six-DOF target being uncoupled from the mobile platform; in a first instance: placing the six-DOF measuring device at a first station; measuring with the six-DOF measuring device, in cooperation with the one or more processors, the reference six-DOF target to obtain first values for the three translational degrees of freedom of the six-DOF reference target and first values for the three orientational degrees of freedom of the six-DOF reference target; measuring, with the 3D probe, 3D coordinates of a first point on the object surface, the 3D coordinates of the first point given in the probe frame of reference; measuring with the six-DOF measuring device, in cooperation with the six-DOF target assembly and the one or more processors, first values for the three translational degrees of freedom of the 3D probe and first values for the three orientational degrees of freedom of the 3D probe; determining with the one or more processors 3D coordinates of the first point in a global frame of reference based at least in part on the determined 3D coordinates in the probe frame of reference of the first point on the object surface, the first values for the three translational degrees of freedom of the 3D probe, and the first values for the three orientational degrees of freedom of the 3D probe; in a second instance different than the first instance: placing the six-DOF measuring device at a second station different than the first station; measuring with the six-DOF measuring device, in cooperation with the one or more processors, the reference six-DOF target to obtain second values for the three translational degrees of freedom of the six-DOF reference target and second values for the three orientational degrees of freedom of the six-DOF reference target; measuring, with the 3D probe, 3D coordinates of a second point on the object surface, the 3D coordinates of the second point given in the probe frame of reference; measuring with the six-DOF measuring device, in cooperation with the six-DOF target assembly and the one or more processors, second values for the three translational degrees of freedom of the 3D probe and second values for the three orientational degrees of freedom of the 3D probe; determining with the one or more processors 3D coordinates of the second point in the global frame of reference based at least in part on the determined 3D coordinates in the probe frame of reference of the second point on the object surface, the second values for the three translational degrees of freedom of the 3D probe, the second values for the three orientational degrees of freedom of the 3D probe, the first values for the three translational degrees of freedom of the six-DOF reference target, the first values for the three orientational degrees of freedom of the six-DOF reference target, the second values for the three translational degrees of freedom of the six-DOF reference target, and the second values for the three orientational degrees of freedom of the six-DOF reference target; and storing the 3D coordinates of the first point in a global frame of reference and the 3D coordinates of the second point in the global frame of reference.

In a further embodiment, the six-DOF target assembly is mounted on a mobile structure having motorized wheels.

In a further embodiment, the method further includes activating by the one or more processors the motorized wheels of the mobile structure to move the six-DOF measuring device from the first station to the second station.

In a further embodiment, the six-DOF target assembly is a six-DOF tracker target assembly and the six-DOF measuring device is a laser tracker, the laser tracker being configured to cooperate with the six-DOF tracker target assembly and the one or more processors to determine three translational degrees of freedom and three orientational degrees of freedom of the 3D probe.

In a further embodiment, the six-DOF tracker target assembly further includes a retroreflector.

In a further embodiment, the laser tracker further comprises a first tracker light source, a first motor, a second motor, a first angle measuring device, a second angle measuring device, a distance meter, a position detector assembly, and a control system, the first tracker light source configured to send a first tracker beam of light to the retroreflector, the retroreflector returning a portion of the first tracker beam as a second tracker beam, the first motor and the second motor together configured to direct the first tracker beam of light to a first direction, the first direction determined by a first angle of rotation about a first axis and a second angle of rotation about a second axis, the first angle of rotation produced by the first motor and the second angle of rotation produced by the second motor, the first angle measuring device configured to measure the first angle of rotation, the second angle measuring device configured to measure the second angle of rotation, the distance meter configured to measure a first tracker distance from the laser tracker to the retroreflector based at least in part on a first portion of the second beam received by a first optical detector, the position detector assembly including a position detector configured to produce a first position-detector signal in response to a position of the second portion of the position detector, the control system configured to send a second position-detector signal to the first motor and a third position-detector signal to the second motor, the second position-detector signal and the third position-detector signal based at least in part on the first position-detector signal, the control system being configured to adjust the first direction of the first tracker beam to the retroreflector.

In a further embodiment, the six-DOF target assembly is a six-DOF light-point target assembly and the six-DOF measuring device is a camera-bar device, the six-DOF light-point target assembly including a collection of light points, the camera-bar device including a first camera and a second camera separated by a camera-bar baseline distance, the first camera and the second camera fixed in space, the first camera configured to form a first light-point image of the collection of light points and to send a first electrical light-point signal to the processor in response, the second camera configured to form a second light-point image of the collection of light points and to send a second electrical light-point signal to the processor in response, the camera-bar device configured to cooperate with the one or more processors to determine three translational degrees of freedom and three orientational degrees of freedom of the six-DOF target assembly based at least in part on the first electrical light-point signal, the second electrical light-point signal, and the camera-bar baseline distance.

In an embodiment, a method for measuring an object comprises: providing the object, one or more processors, a mobile platform, a robotic articulated arm, a three-dimensional (3D) probe, a six degree of freedom (six-DOF) target assembly, a six-DOF measuring device, a first reference retroreflector, a second reference retroreflector, and a third reference retroreflector, the object having a surface, the mobile platform including a plurality of motorized wheels configured to translate and rotate the platform, the robotic articulated arm coupled to the mobile platform at a first end and to an end effector at a second end, there being a plurality of connected arm segments at a first end and to an end effector at a second end, there being a plurality of connected arm segments between the mobile platform and the end effector, the 3D probe coupled to the end effector and to the end effector and to the six-DOF target assembly, wherein the 3D probe is configured to cooperate with the one or more processor to determine 3D coordinates of points on the object surface in a probe frame of reference tied to the 3D probe, and wherein the six-DOF measuring device is configured to cooperate with the six-DOF target assembly and the one or more processors to determine three translational degrees of freedom and three orientational degrees of freedom of the 3D probe, the first reference retroreflector being at a first retroreflector position, the second reference retroreflector being at a second retroreflector position, and the third retroreflector being at a third retroreflector position; in a first instance: placing the six-DOF measuring device at a first station; measuring with the six-DOF measuring device, in cooperation with the one or more processors, the first retroreflector, the second retroreflector and the third retroreflector to obtain first 3D coordinates of the first retroreflector, first 3D coordinates of the second retroreflector, and first 3D coordinates of the third retroreflector; measuring, with the 3D probe, 3D coordinates of a first point on the object surface, the 3D coordinates of the first point given in the probe frame of reference; measuring with the six-DOF measuring device, in cooperation with the six-DOF target assembly and the one or more processors, first values for the three translational degrees of freedom of the 3D probe and first values for the three orientational degrees of freedom of the 3D probe; determining with the one or more processors 3D coordinates of the first point in a global frame of reference based at least in part on the determined 3D coordinates in the probe frame of reference of the first point on the object surface, the first values for the three translational degrees of freedom of the 3D probe, and the first values for the three orientational degrees of freedom of the 3D probe; in a second instance different than the first instance: placing the six-DOF measuring device at a second station different than the first station; measuring with the six-DOF measuring device, in cooperation with the one or more processors, the first retroreflector, the second retroreflector and the third retroreflector to obtain second 3D coordinates of the first retroreflector, second 3D coordinates of the second retroreflector, and second 3D coordinates of the third retroreflector; measuring, with the 3D probe, 3D coordinates of a second point on the object surface, the 3D coordinates of the second point given in the probe frame of reference; measuring with the six-DOF measuring device, in cooperation with the six-DOF target assembly and the one or more processors, second values for the three translational degrees of freedom of the 3D probe and second values for the three orientational degrees of freedom of the 3D probe; determining with the one or more processors 3D coordinates of the second point in the global frame of reference based at least in part on the 3D coordinates in the probe frame of reference of the second point on the object surface, the second values for the three translational degrees of freedom of the 3D probe, the second values for the three orientational degrees of freedom of the 3D probe, the first 3D coordinates of the first retroreflector, the first 3D coordinates of the second retroreflector, the first 3D coordinates of the third retroreflector, the second 3D coordinates of the first retroreflector, the second 3D coordinates of the second retroreflector, and the second 3D coordinates of the third retroreflector; and storing the 3D coordinates of the first point in a global frame of reference and the 3D coordinates of the second point in the global frame of reference.

In a further embodiment, the six-DOF measuring device is mounted on a mobile structure having motorized wheels.

In a further embodiment, the step of placing the six-DOF measuring device at a second station different than the first station further includes activating by the one or more processors the motorized wheels of the mobile structure to move the six-DOF measuring device from the first station to the second station.

In a further embodiment, the six-DOF target assembly is a six-DOF tracker target assembly and the six-DOF measuring device is a laser tracker, the laser tracker being configured to cooperate with the six-DOF tracker target assembly and the one or more processors to determine three translational degrees of freedom and three orientational degrees of freedom of the 3D probe.

In a further embodiment, the six-DOF tracker target assembly further includes a retroreflector.

In a further embodiment, the laser tracker further comprises a first tracker light source, a first motor, a second motor, a first angle measuring device, a second angle measuring device, a distance meter, a position detector assembly, and a control system, the first tracker light source configured to send a first tracker beam of light to the retroreflector, the retroreflector returning a portion of the first tracker beam as a second tracker beam, the first motor and the second motor together configured to direct the first tracker beam of light to a first direction, the first direction determined by a first angle of rotation about a first axis and a second angle of rotation about a second axis, the first angle of rotation produced by the first motor and the second angle of rotation produced by the second motor, the first angle measuring device configured to measure the first angle of rotation, the second angle measuring device configured to measure the second angle of rotation, the distance meter configured to measure a first tracker distance from the laser tracker to the retroreflector based at least in part on a first portion of the second beam received by a first optical detector, the position detector assembly including a position detector configured to produce a first position-detector signal in response to a position of the second portion of the position detector, the control system configured to send a second position-detector signal to the first motor and a third position-detector signal to the second motor, the second position-detector signal and the third position-detector signal based at least in part on the first position-detector signal, the control system being configured to adjust the first direction of the first tracker beam to the retroreflector.

In a further embodiment, the six-DOF target assembly is a six-DOF light-point target assembly and the six-DOF measuring device is a camera-bar device, the six-DOF light-point target assembly including a collection of light points, the camera-bar device including a first camera and a second camera separated by a camera-bar baseline distance, the first camera and the second camera fixed in space, the first camera configured to form a first light-point image of the collection of light points and to send a first electrical light-point signal to the processor in response, the second camera configured to form a second light-point image of the collection of light points and to send a second electrical light-point signal to the processor in response, the camera-bar device configured to cooperate with the one or more processors to determine three translational degrees of freedom and three orientational degrees of freedom of the six-DOF target assembly based at least in part on the first electrical light-point signal, the second electrical light-point signal, and the camera-bar baseline distance.

In an embodiment, a method for measuring an object comprises: providing the object, one or more processors, a mobile platform, a robotic articulated arm, a three-dimensional (3D) probe, a six degree of freedom (six-DOF) target assembly, a six-DOF measuring device, the object having a surface, the mobile platform including a plurality of motorized wheels configured to translate and rotate the platform, the robotic articulated arm coupled to the mobile platform at a first end and to an end effector at a second end, there being a plurality of connected arm segments at a first end and to an end effector at a second end, there being a plurality of connected arm segments between the mobile platform and the end effector, the 3D probe coupled to the end effector and to the end effector and to the six-DOF target assembly, wherein the 3D probe is configured to cooperate with the one or more processor to determine 3D coordinates of points on the object surface in a probe frame of reference tied to the 3D probe, and wherein the six-DOF measuring device is configured to cooperate with the six-DOF target assembly and the one or more processors to determine three translational degrees of freedom and three orientational degrees of freedom of the 3D probe; directing by the one or more processors turning of the motorized wheels and the arm segments of the robotic articulated arm to move the 3D probe from a first pose to a second pose based on control loop feedback, the first pose including three translational degrees of freedom of the 3D probe at a first starting time and three orientational degrees of freedom of the 3D probe at the first starting time, the second pose including three translational degrees of freedom of the 3D probe at a first finishing time and three orientational degrees of freedom of the 3D probe at the first finishing time, the control loop feedback provided by a plurality of six-DOF readings provided to the one or more processors between the first starting time and the first finishing time, each of the plurality of six-DOF readings corresponding to an instance of three translational degrees of freedom of the 3D probe and three orientational degrees of freedom of the 3D probe determined by the six-DOF measuring device in cooperation with the one or more processors; measuring, with the 3D probe at the second pose, 3D coordinates of a first point on the object surface; and storing the 3D coordinates of the first point.

In a further embodiment, the method further comprises: directing by the one or more processors turning of the motorized wheels and the arm segments of the robotic articulated arm to move the 3D probe from a third pose to a fourth pose based on control loop feedback, the first pose including three translational degrees of freedom of the 3D probe at a second starting time and three orientational degrees of freedom of the 3D probe at the second starting time, the second pose including three translational degrees of freedom of the 3D probe at a second finishing time and three orientational degrees of freedom of the 3D probe at the second finishing time, the control loop feedback provided by a plurality of six-DOF readings provided to the one or more processors between the second starting time and the second finishing time, each of the plurality of six-DOF readings corresponding to an instance of three translational degrees of freedom of the 3D probe and three orientational degrees of freedom of the 3D probe determined by the six-DOF measuring device in cooperation with the one or more processors, wherein the second starting time is later in time than the first finishing time; and measuring, with the 3D probe at the fourth pose, 3D coordinates of a second point on the object surface.

In a further embodiment, the method further includes: determining by the one or more processors the first pose in a global frame of reference and the second pose in global frame of reference.

In a further embodiment, the method further includes: providing a six-DOF reference target at a first station; measuring the six-DOF reference target with the six-DOF measuring device to obtain three translational degrees of freedom for the six-DOF reference target and three orientational degrees of freedom for the six-DOF reference target; and determining the first pose in a global frame of reference and the second pose in a global frame of reference based at least in part on the three translational degrees of freedom for the six-DOF reference target and three orientational degrees of freedom for the six-DOF reference target.

In a further embodiment, the method further includes: providing a first retroreflector at a first station, a second retroreflector at a second station, and a third retroreflector at a third station; measuring with the six-DOF measuring device 3D coordinates of the first retroreflector, 3D coordinates of the second retroreflector, and 3D coordinates of the third retroreflector; and determining the first pose in a global frame of reference and the second pose in a global frame of reference based at least in part on the 3D coordinates of the first retroreflector, the 3D coordinates of the second retroreflector, and the 3D coordinates of the third retroreflector.

In a further embodiment, the method further includes: determining by the one or more processors an object pose of the object in a global frame of reference.

In a further embodiment, the method further includes: placing the object in a fixture having a known pose in the global frame of reference.

In a further embodiment, the method further includes a step of measuring one or more points on the object surface with the six-DOF measuring device.

In a further embodiment, the one or more processors determines the object pose based at least in part on a computer-aided drawing (CAD) model of the object.

In an embodiment, a method for measuring an object comprises: providing the object, one or more processors, a mobile platform, a robotic articulated arm, a 3D probe, a camera assembly, and an external projector assembly, the object having a surface, the mobile platform including a plurality of motorized wheels configured to translate and rotate the platform, the robotic articulated arm coupled to the mobile platform at a first end and to an end effector at a second end, there being a plurality of connected arm segments between the mobile platform and the end effector, the 3D probe coupled to the end effector and to the camera assembly, the 3D probe configured to cooperate with the one or more processors to determine 3D coordinates of points on the object surface in a probe frame of reference tied to the 3D probe, the camera assembly including a first assembly camera; in a first instance: moving by the one or more processors the end effector to a first pose; measuring, with the 3D probe, 3D coordinates of a first point on the object surface, the 3D coordinates of the first point given in a first frame of reference; projecting with the first external projector assembly a first collection of spots on the object surface; forming with the assembly camera a first image of a first portion of the first collection of spots and sending a first electrical signal to the one or more processors in response; in a second instance different than the first instance: moving by the one or more processors the end effector to a second pose different than the first pose; measuring, with the 3D probe, 3D coordinates of a second point on the object surface, the 3D coordinates of the second point given in a second frame of reference; forming with the assembly camera a second image of a second portion of the first collection of spots and sending a second electrical signal to the one or more processors in response; determining with the one or more processors 3D coordinates of the first point and the second point in a common frame of reference based at least in part on the 3D coordinates of the first point in the first frame of reference, the 3D coordinates of the second point in the second frame of reference, the first electrical signal, and the second electrical signal; and storing the 3D coordinates.

In a further embodiment, the first external projector assembly includes a first projector selected from the group consisting of: a first light source configured to project a first light through a diffraction grating, a digital micromirror device (DMD) configured to project spots of light, and a second light source configured to project a second light through a slide having a pattern of spots.

In a further embodiment, the first external projector is mounted on a first stationary structure.

In a further embodiment, the method further includes providing a second external projector assembly mounted on a second stationary structure.

In a further embodiment, the first external projector assembly and the second external projector assembly are configured to project at different times.

In a further embodiment, the first external projector assembly is mounted on a mobile structure having motorized wheels.

In a further embodiment, the method further includes a step of activating by the one or more processors the motorized wheels to move the first external projector assembly so that the first portion of the first collection of spots and the second portion of the first collection of spots include at least one common spot.

In a further embodiment, the mobile structure further comprises a multi-legged stand and a motorized dolly detachably coupled to the multi-legged stand.

In a further embodiment, the mobile structure includes a second mobile platform and a second robotic articulated arm, the second mobile platform including a second plurality of motorized wheels configured to translate and rotate the second mobile platform, the second robotic articulated arm coupled to the second mobile platform at a first end of the second robotic articulated arm and to a second end effector at a second end of the second robotic articulated arm, there being a second plurality of connected arm segments between the second mobile platform and the second end effector, the first external projector assembly being connected to the second end effector.

In a further embodiment, the one or more processors adjusts the position of the second end effector of the second mobile platform in relation to the end effector of the mobile platform.

In an embodiment, a kiosk comprises: a first display configured to convey visual information to a three-dimensional (3D) mobile measurement system, the 3D mobile measurement system including a mobile base and a 3D measuring device, the mobile base configured for motorized movement, the 3D measuring device configured to measure 3D coordinates of an object, the 3D measuring device further including a first camera being configured to receive the visual information from the kiosk.

In a further embodiment, the 3D mobile measurement system further comprises a robotic arm attached to the mobile base and to the 3D measuring device.

In a further embodiment, the robotic arm includes a plurality of motorized and jointed arm segments.

In a further embodiment, the kiosk further comprises an enclosure to which the first display is affixed.

In a further embodiment, the visual information includes a barcode or a QR code.

In a further embodiment, the visual information includes a text box.

In a further embodiment, the visual information in the text box is readable by a human observer.

In a further embodiment, the first camera sends the visual information in the text box to the human observer.

In a further embodiment, the visual information includes an availability of pathways for travel.

In a further embodiment, the visual information includes tasks to be performed.

In a further embodiment, the visual information includes an identity of an object to be measured.

In a further embodiment, the visual information further includes measurements to be performed on the identified object.

In a further embodiment, the visual information includes a location of the kiosk.

In a further embodiment, the visual information includes at least three markers.

In a further embodiment, the at least three markers are indicative of a location of the kiosk.

In a further embodiment, the at least three markers include a coded marker.

In a further embodiment, the at least three markers include a reflective marker.

In a further embodiment, the at least three markers include a light source.

In a further embodiment, the light source is a light-emitting diode (LED).

In a further embodiment, the kiosk further comprising a wireless module, the wireless module configured to transmit wireless signals and to receive wireless signals.

In a further embodiment, the wireless module is configured to communicate with a networked computer.

In a further embodiment, the wireless module is further configured to communicate with a smart device, the smart device selected from group consisting of: a tablet computer, a smart phone, a laptop computer, and a wearable device.

In a further embodiment, the wireless module is configured to transmit wireless signals and receive wireless signals using IEEE 802.3 (Ethernet), IEEE 802.11 (Wi-Fi) or IEEE 802.15 (Bluetooth).

In a further embodiment, the smart device is configured to communicate with the kiosk when the kiosk does not have wireless connectivity with a networked computer.

In a further embodiment, the 3D measuring device includes the first camera.

In an embodiment, a system comprises: a three-dimensional (3D) mobile measurement system including a mobile base and a 3D measuring device, the mobile base configured to receive and to move in response to a first wireless mobile control signal, the 3D measuring device configured to measure 3D coordinates, the 3D mobile measurement system further configured to produce a wireless feedback signal indicative of a local position of the 3D mobile measurement system; a user station separate from the 3D mobile measurement system, the user station including a user control device and a user display, the user control device configured to produce a user control signal; and a computing device separate from the 3D mobile measuring system, the computing device configured to receive the wireless feedback signal, the computing device including a first processor and a first memory, the first memory configured to store a global 3D representation of the global environment, the first processor configured to transmit to the 3D mobile measurement system the wireless mobile control signals based at least in part on the global 3D representation, the user control signal, and the wireless feedback signal, the processor further configured to send the user display a local visual representation of a local environment of the 3D mobile measurement system, the local visual representation based at least in part on the global 3D representation, the user control signal, and the wireless feedback signal.

In a further embodiment, the 3D mobile measurement system further comprises a robotic arm attached to the mobile base and to the 3D measuring device.

In a further embodiment, the robotic arm includes a plurality of motorized and jointed arm segments.

In a further embodiment, the 3D mobile measurement system further comprises a first camera configured to view the local environment within the larger global environment.

In a further embodiment, the first camera includes a two-dimensional (2D) camera.

In a further embodiment, the first camera includes a 3D camera selected from the group consisting of: a stereo camera system, a triangulation sensor having a projector separated from a two-dimensional (2D) camera by a baseline distance, and a depth camera having a collection of pixels that display an image, each pixel further configured to determine a distance to an object.

In a further embodiment, the wireless feedback signal is provided at least in part by a first camera, the first camera being selected from the group consisting of a two-dimensional (2D) camera and a 3D camera.

In a further embodiment, the wireless feedback signal is provided at least in part by a two-dimensional (2D) scanner.

In a further embodiment, the wireless feedback signal is provided at least in part by the 3D measuring device.

In a further embodiment, the 3D measuring device includes a triangulation scanner.

In a further embodiment, the triangulation scanner is an area scanner.

In a further embodiment, the 3D mobile measurement system further includes a mobile memory, the mobile memory configured to store a portion of the global 3D representation.

In a further embodiment, the mobile memory is further configured to provide direction to the 3D mobile measurement system when the 3D mobile measurement system does not receive the first mobile control signal.

In a further embodiment: the 3D mobile measurement system further comprises a first wireless receiver and a first wireless transmitter; and the computing device further comprises a second wireless receiver and a second wireless transmitter.

In a further embodiment, the computing device is further configured to send a message to the 3D mobile measuring system when the wireless feedback signal is inconsistent with the global 3D representation.

In a further embodiment, the computing device is further configured to send the 3D mobile measurement device a request to measure 3D coordinates of a portion of the local environment for which the wireless feedback signal is found to be inconsistent with the global 3D representation.

In a further embodiment, the 3D mobile measuring device is further configured to send a message to the computing device when the wireless mobile control signals are inconsistent with portion of the global 3D representation stored on the mobile memory.

In a further embodiment, the user display is further configured to display information in the wireless feedback signal.

In a further embodiment, the 3D measuring device is further configured to measure 3D coordinates of the local environment in response to the request to measure 3D coordinates.

In a further embodiment, the 3D mobile measurement system is further configured to send the measured 3D coordinates of the local environment to the computing device.

In a further embodiment, the 3D mobile measurement system is further configured to update the portion of the global 3D representation stored in the mobile memory.

In an embodiment, a system comprises: a first computer having a global 3D representation of a global environment stored in memory; a first mobile measurement system including a mobile base and a first camera, the first camera configured to view a local environment within the larger global environment; and a virtual-reality/augmented-reality (VR/AR) display in communication with the first computer, the VR/AR display configured to operate in a first mode, a second mode, and a third mode, the first mode being a virtual reality (VR) mode based at least in part on the global 3D representation, the second mode being an augmented reality (AR) mode based at least in part on a digital image from the first camera, the third mode being a VR/AR mode being a superposition of the VR mode and the AR mode on the VR/AR display.

In a further embodiment, the system further comprises a user interface, the user interface being responsive to a user-interface command.

In a further embodiment, the user-interface command directs the VR/AR display to operate in a mode selected from the group consisting of the first mode, the second mode, and the third mode.

In a further embodiment, the user-interface command directs the mobile base to move.

In a further embodiment, the user-interface command is selected from the group consisting of a gesture and a head movement.

In a further embodiment, the user-interface command is selected from the group consisting of a keystroke, a mouse movement, a joystick movement.

In a further embodiment, the user-interface command is based at least in part on a sensor movement.

In a further embodiment, the sensor is selected from the group consisting of: an accelerometer, a gyroscope, a magnetometer, and a pressure sensor.

In a further embodiment, the VR/AR display comprises a headset that fits over a head of an operator.

In a further embodiment, the operator directs movement of the system based at least in part on the view of the local environment from the first camera.

In a further embodiment, the operator directs movement of the system based at least in part on a virtual representation of the 3D environment, the virtual representation of the 3D environment based at least in part on the global 3D representation of the global environment.

In a further embodiment, the first mobile measurement system is further configured to produce a feedback signal indicative of a local position of the mobile measurement system.

In a further embodiment, the virtual representation of the 3D environment is further based on the feedback signal.

In a further embodiment, the virtual representation is further based on a user-interface command.

In a further embodiment, the first computer is in wireless communication with the VR/AR display and with the first mobile measurement system.

In a further embodiment, the first computer is coupled to the first mobile measurement system, the first mobile measurement system being in wireless communication with the VR/AR display.

In a further embodiment, the first mobile measurement system further comprises an onboard memory that includes a 3D representation of the global environment.

In a further embodiment, the first camera is a two-dimensional (2D) camera configured to capture 2D images.

In a further embodiment, the first camera is a three-dimensional (3D) camera configured to capture 3D images.

In a further embodiment, the system further comprises a three-dimensional (3D) measuring device.

In a further embodiment, the system further comprises a robotic arm attached to the mobile measurement system at one end and to the 3D measuring device at the other end.

In a further embodiment, an operator identifies with the VR/AR display a desired location within the global environment and gives the first mobile measurement system an instruction to move to the identified location.

In a further embodiment, in the third mode of the VR/AR display, the AR and VR images are aligned.

In a further embodiment, the VR/AR display is further configured to operate in a fourth mode in which supplementary image information is superimposed on a first AR image from the first camera.

In a further embodiment, the system is further configured to provide the user with an image of items in an inventory depot and to superimpose text indicating the number of items recorded in inventory in the inventory depot.

In a further embodiment, the system is further configured to make 3D measurements of a first region of global environment and to display on the VR/AR display a 3D representation of the measured first region.

In a further embodiment, the system is further configured to select the first region based at least in part on a first user-interface command.

In a further embodiment, the system is further configured to determine a dimensional characteristic of the first region.

In a further embodiment, the system is further configured to display an indication of the determined dimensional characteristic on the VR/AR display.

In a further embodiment, the system is further configured to superimpose a second AR image from the first camera.

In a further embodiment, the 3D measuring device comprises a triangulation scanner.

In a further embodiment, the 3D measuring device comprises a time-of-flight camera.

In an embodiment, a method comprises: providing a first mobile measurement system and a virtual reality/augmented reality (VR/AR) display, the first mobile measurement system including a mobile base and a first camera, the VR/AR display having a user-interface responsive to a user-interface command, the VR/AR display in communication with the first computer, the first computer having a global 3D representation of a global environment stored in memory, the VR/AR display configured to operate in a first mode, a second mode, and a third mode, the first mode being a virtual reality (VR) mode based at least in part on the global 3D representation, the second mode being an augmented reality (AR) mode based at least in part on a digital image from the first camera, the third mode being a VR/AR mode being a superposition of the VR mode and the AR mode on the VR/AR display; sending the user interface a user-interface command causing the VR/AR display to operate in a mode selected from: the first mode, the second mode, and the third mode; and showing on the VR/AR display a displayed image consistent with the selected mode.

In a further embodiment, the method further comprises sending the user interface a user-interface command that causes the mobile base to move.

In a further embodiment, the user interface is responsive to an action selected from the group consisting of a gesture and a head movement.

In a further embodiment, the user interface is responsive to an action selected from the group consisting of: a keystroke, a mouse movement, a joystick movement.

In a further embodiment, the user interface is responsive to a signal from a sensor, the sensor selected from the group consisting of: an accelerometer, a gyroscope, a magnetometer, and a pressure sensor.

In a further embodiment, the VR/AR display comprises a headset that fits over a head of an operator.

In a further embodiment, the user directs movement of the system based at least in part on the view of the local environment from the first camera.

In a further embodiment, the method further includes the user directing movement of the system based at least in part on a virtual representation of the 3D environment, the virtual representation of the 3D environment based at least in part on the global 3D representation of the global environment.

In a further embodiment, the method further comprises generating a feedback signal indicative of a local position of the mobile measurement system.

In a further embodiment, the virtual representation of the 3D environment is further based on the feedback signal.

In a further embodiment, the virtual representation of the 3D environment is further based on a user-interface command provided by the user to direct movement of the mobile base.

In a further embodiment, the first computer is in wireless communication with the VR/AR display and with the first mobile measurement system.

In a further embodiment, the first computer is coupled to the first mobile measurement system, the first mobile measurement system being in wireless communication with the VR/AR display.

In a further embodiment, the method further comprises providing an onboard memory that includes a 3D representation of the global environment.

In a further embodiment, the first camera is a two-dimensional (2D) camera configured to capture 2D images.

In a further embodiment, the first camera is a two-dimensional (3D) camera configured to capture 3D images.

In a further embodiment, the step of providing the first mobile measurement system and the VR/AR display further includes providing a three-dimensional (3D) measuring device.

In a further embodiment, the method further includes providing a robotic arm attached to the mobile measurement system at one end and to the 3D measuring device at the other end.

In a further embodiment, the method further comprising aligning with the first computer the VR and AR images in the VR/AR display.

In a further embodiment, the VR/AR display is further configured to operate in a fourth mode in which supplementary image information is superimposed on a first AR image from the first camera.

In a further embodiment, the system is further configured to make 3D measurements of a first region of global environment and to display on the VR/AR display a 3D representation of the measured first region.

In a further embodiment, the 3D measuring device comprises a triangulation scanner.

In a further embodiment, the 3D measuring device comprises a time-of-flight scanner.

In an embodiment, a method comprises: capturing an image of a portion of the object on an electronic computing device, the electronic computing device having a display and a rear-facing camera; selecting dimensional measurements to be made on the object in a region spanned by the image, the dimensional measurements selected from a list, the list based on a computer-aided design (CAD) model of the object, each selected dimensional measurement having a nominal value and a tolerance; providing a three-dimensional (3D) mobile measuring device having a motorized base on which is mounted a robotic arm attached to a 3D measuring device; for each selected dimensional measurement, under automated control, adjusting the pose of the 3D measuring device, measuring 3D coordinates with the 3D measuring device, determining with a processor the measured dimensional value, and determining with the processor whether the measured dimensional value is within the specified tolerance of the nominal value; and storing the measured dimensional values.

In a further embodiment, the method further comprises: creating an inspection plan based on the selected dimensional measurements and the resulting measurement procedure.

In a further embodiment, the method further comprises: capturing a plurality of images of portions of the object on the electronic computing device; and selecting dimensional measurements to be made on the object for each region spanned by the plurality of images.

In a further embodiment, the method further comprises adding markers on the object or off the object to assist in locating dimensional features on the object.

In a further embodiment, the method further comprises marking a region of the image further includes selecting a portion of the image.

In a further embodiment, the portion of the image is selected using a mouse.

In an embodiment, a method comprises: providing a three-dimensional (3D) mobile measurement system having a motorized robotic arm attached to a 3D measuring device and to a motorized base, the 3D measuring device including a triangulation scanner; providing a three-dimensional (3D) representation of a first object; providing a first region to be measured on the first object; providing a processor configured to execute a first simulation model of the 3D mobile measurement system, the first simulation model including a mobile simulation model, a robotic simulation model, and a scanner simulation model, the mobile simulation model configured to simulate movement of the motorized base, the robotic simulation model configured to simulate movement of the motorized robotic arm, the scanner simulation model configured to simulate 3D data acquisition by the 3D measuring device; determining with the processor steps in a 3D measurement protocol for determining 3D coordinates over the first region, the determining based on execution of the first simulation model in a plurality of simulation steps, each simulation step including at least one of: a simulated movement of the mobile base according to the mobile simulation model, a simulated movement of the robotic arm according to the robotic simulation model, and a simulated collection of 3D coordinates of a portion of the surface of the first object; and storing the steps in the 3D measurement protocol.

In a further embodiment, the robotic arm includes a plurality of jointed arm segments.

In a further embodiment, the triangulation scanner is a triangulation area scanner configured to project a pattern of light over an area.

In a further embodiment, the method further includes executing the steps in the 3D measurement protocol with the 3D mobile measurement device to obtain the measured 3D coordinates over the first region.

In a further embodiment, the first region includes a plurality of sub-regions.

In a further embodiment, the 3D measuring device measures 3D coordinates of each of the plurality of sub-regions.

In a further embodiment, the method further comprises registering in a common frame of reference the measured 3D coordinates of the plurality of sub-regions.

In a further embodiment, the registering is performed based at least in part on a matching of natural features of the first object in adjacent sub-regions.

In a further embodiment, the registering is performed based at least in part on a matching of first targets on the first object or proximate the first object.

In a further embodiment, the first targets are selected from the group consisting of: reflective markers, coded markers, light sources, and projected spots, the projected spots being projected from a projector separate from the 3D mobile measurement system.

In a further embodiment, the 3D coordinates of the first targets are determined by a photogrammetry system, the photogrammetry system including at least one camera and a calibrated scale bar.

In a further embodiment, the registering is performed by tracking the position of the 3D mobile measurement system with a reference measuring instrument.

In a further embodiment, the reference measuring instrument is a laser tracker configured to measure three or more retroreflector targets.

In a further embodiment, the reference measuring instrument is a laser tracker configured to measure the pose of a six degree-of-freedom (six-DOF) target.

In a further embodiment, the method further comprises providing a collection of geometrical quantities to be measured, each geometrical quantity associated with one or more features of the 3D representation of the first object, each geometrical quantity having a nominal value and a tolerance.

In a further embodiment, the processor determines a measured geometrical value associated with the geometrical quantity, the measured geometrical value based at least on the measured 3D coordinates over the first region and on the 3D representation of the first object.

In a further embodiment, the method further comprises: determining with the processor an error by comparing the measured geometrical value to the corresponding nominal value of the associated geometrical quantity.

In a further embodiment, the method further comprises: determining whether the geometrical quantity is within a specification by comparing an absolute value of the error to the tolerance of the associated geometrical quantity.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for measuring three-dimensional (3D) coordinates of an object surface comprising:
   a mobile platform including at least one motorized wheel configured to translate and rotate the mobile platform;
   a triangulation scanner including a projector and a camera, the camera having a photosensitive array, the projector and the camera separated by a baseline distance, the projector projecting in operation a first light onto the object surface, the camera acquiring in operation a first image the first light on the object surface with the photosensitive array;
   a robotic articulated arm coupled to the mobile platform at a first end and having an end effector at a second end, there being a plurality of connected arm segments between the mobile platform and the end effector, the triangulation scanner coupled to the end effector, the robotic articulated arm including a first motor configured to produce a swivel rotation of at least one of the plurality of connected arm segments; and one or more processors that are responsive to executable computer instructions when executed on the one or more processors for controlling in operation the triangulation scanner and a movement of the plurality of connected arm segments, the one or more processors further being operable to determine first 3D coordinates of the object surface based at least in part on the first light, the first image, and the baseline distance.

2. The system of claim 1, wherein the one or more processors are further operable to control in operation a rotation of the at least one motorized wheel.

3. The system of claim 1, wherein the robotic articulated arm further includes a plurality of arm motors configured to move the plurality of connected arm segments.

4. The system of claim 1, wherein the robotic articulated arm further includes a plurality of joints, each joint being directly coupled to at least one associated arm segment, the plurality of joints including at least one hinge joint and at least one swivel joint, the at least one hinge joint having a first axis of rotation perpendicular to an associated arm segment of the at least one hinge joint, the at least one swivel joint having a second axis of rotation along a direction of the associated arm segment of the at least one swivel joint.

5. The system of claim 4, further including:
a first arm motor operably coupled to the at least one swivel joint;
a second arm motor operably coupled to the at least one hinge joint;
a first angular transducer operably coupled to the at least one swivel joint; and
a second angular transducer operably coupled to the at least one hinge joint.

6. The system of claim 5, wherein the first light is a line of light and the first 3D coordinates are for a plurality of points on the object surface.

7. The system of claim 5, wherein the first light is an area of light and the first 3D coordinates are for a plurality of points on the object surface.

8. The system of claim 1, wherein the one or more processors, in a first instance, determine in operation a first set of second 3D coordinates and identify a first set of one or more image registration marks.

9. The system of claim 8, wherein the one or more processors, in a second instance, determine in operation a second set of second 3D coordinates and identify a second set of one or more image registration marks.

10. The system of claim 9, wherein the one or more processors identify in operation a common image registration mark from the first set of one or more image registration marks and the second set of one or more image registration marks, the common image registration mark being an image registration mark identified by the one or more processors as being formed, in the first instance and the second instance, from a common element on the object surface.

11. The system of claim 10, wherein the one or more processors transform in operation the first set of second 3D coordinates and the second set of second 3D coordinates into a common frame of reference to obtain a combined set of 3D coordinates based at least in part on a second image in the first instance, a third image in the second instance, and a common registration mark.

12. The system of claim 11, wherein the second image and the third image are acquired by the camera when the triangulation scanner projects the first light.

13. The system of claim 10, wherein the image registration marks in the first set of one or more image registration marks and the second set of one or more image registration marks are based at least in part on natural features on the object surface or on objects proximate the object surface.

14. The system of claim 10, wherein the image registration marks in the first set of one or more image registration marks and the second set of one or more image registration marks are illuminated markers.

15. The system of claim 14, wherein the illuminated markers are light emitting diodes (LEDs).

16. The system of claim 14, wherein the image registration marks in the first set of one or more image registration marks and the second set of one or more image registration marks are reflective spots.

17. The system of claim 10, wherein the image registration marks in the first set of one or more image registration marks and the second set of one or more image registration marks are light spots projected onto the object surface or proximate the object surface by an external light projector not coupled to the triangulation scanner.

18. The system of claim 11, wherein, between the first instance and the second instance, the one or more processors change in operation a position or an orientation of the end effector by activating the first motor.

19. The system of claim 11, wherein, between the first instance and the second instance, the one or more processors turn in operation the at least one motorized wheel.

20. The system of claim 15 wherein the robotic articulated arm is adjustable in at least six degrees of freedom.

21. The system of claim 7, wherein:
the projector has a projector plane from which it projects the first light as a coded pattern of light; and
the one or more processors further determine in operation a correspondence between the points on the first image of the photosensitive array and the points of the first light at the projector plane, the one or more processors further determining in operation the first 3D coordinates of a plurality of points on the object surface further based on the correspondence.

22. The system of claim 7, wherein:
in a first instance, the projector projects in operation a first pattern of the first light onto the object surface, and the first image of the first instance includes the first pattern;
in a second instance, the projector projects in operation a second pattern of the first light onto the object surface, the first image in the second instance includes the second pattern, the second pattern being shifted in phase with respect to the first pattern; and
the one or more processors further determining in operation the first 3D coordinates of the plurality of points on the object surface based at least in part on the first pattern of the first light, the second pattern of the first light, the first image of the first instance and the first image of the second instance.

* * * * *